(12) United States Patent
Kaimi et al.

(10) Patent No.: US 8,350,927 B2
(45) Date of Patent: Jan. 8, 2013

(54) IMAGE-DATA PROCESSING APPARATUS AND IMAGE-DATA PROCESSING METHOD

(75) Inventors: Toshiyuki Kaimi, Tokyo (JP); Tohru Kurata, Saitama (JP); Kimitaka Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 1520 days.

(21) Appl. No.: 11/852,852

(22) Filed: Sep. 10, 2007

(65) Prior Publication Data

US 2008/0174822 A1 Jul. 24, 2008

(30) Foreign Application Priority Data

Sep. 11, 2006 (JP) ................. P2006-245006

(51) Int. Cl.
*H04N 5/76* (2006.01)
(52) U.S. Cl. .................................. 348/231.9
(58) Field of Classification Search .............. 348/222.1, 348/231.99, 231.1, 231.2, 231.3, 231.6, 231.7, 348/231.9

See application file for complete search history.

(56) References Cited

U.S. PATENT DOCUMENTS

| 2,956,527 | A | | 10/1960 | Hopwood | |
|---|---|---|---|---|---|
| 5,517,241 | A | * | 5/1996 | Adachi et al. | 348/231.7 |
| 6,683,642 | B1 | * | 1/2004 | Kobayashi et al. | 348/231.2 |
| 6,873,658 | B2 | * | 3/2005 | Zhou | 375/240.25 |
| 2008/0049113 | A1 | * | 2/2008 | Hirai | 348/222.1 |

FOREIGN PATENT DOCUMENTS

| JP | 2956527 | 7/1999 |
|---|---|---|
| JP | 2006-222827 | 8/2006 |

* cited by examiner

*Primary Examiner* — Timothy J Henn
(74) *Attorney, Agent, or Firm* — K&L Gates LLP

(57) ABSTRACT

An image-data processing apparatus is provided. The apparatus includes: an image memory for storing image data; a plurality of processing sections each configured to output image data to be stored in the image memory, receive image data read out from the image memory and carry out image processing determined in advance on the received image data; and a memory control section configured to receive a write or read request from each of the processing sections and control a write access to store image data in the image memory in accordance with the write request and a read access to read out image data from the image memory in accordance with the read request.

12 Claims, 60 Drawing Sheets

ORIGINAL PICKED-UP SCENE IMAGE

SCENE IMAGE SHOT FROM A LOCATION INSIDE A RUNNING TRAIN

SCENE IMAGE PICKED UP BY A CMOS IMAGER EXPERIENCING HAND MOVEMENT

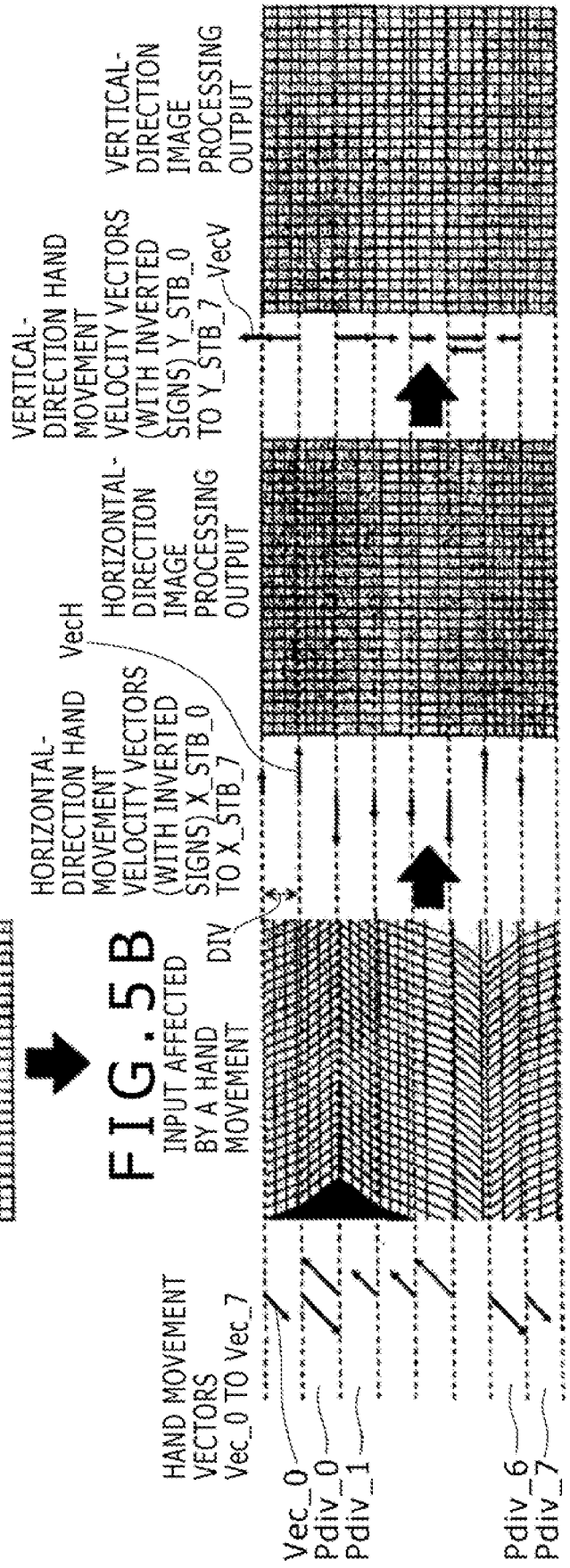

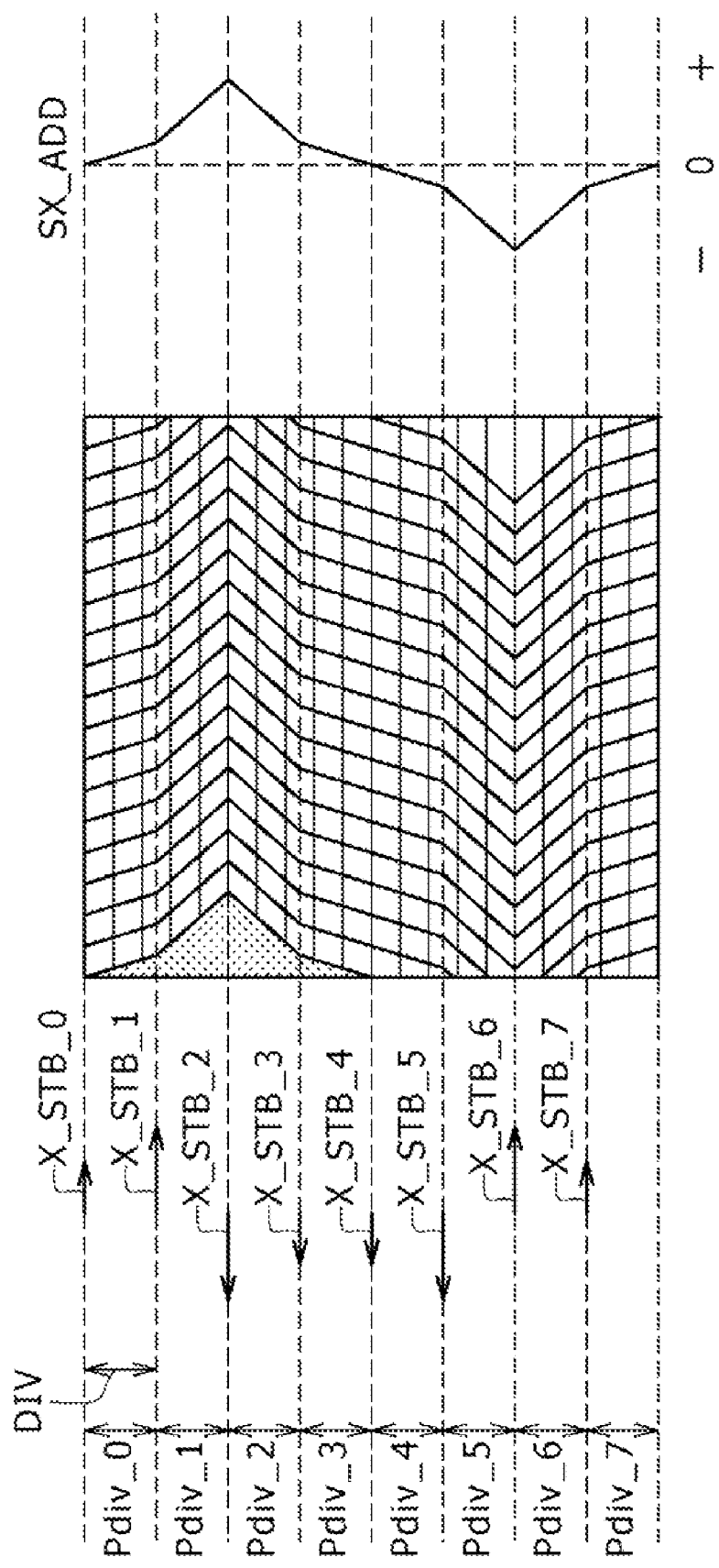

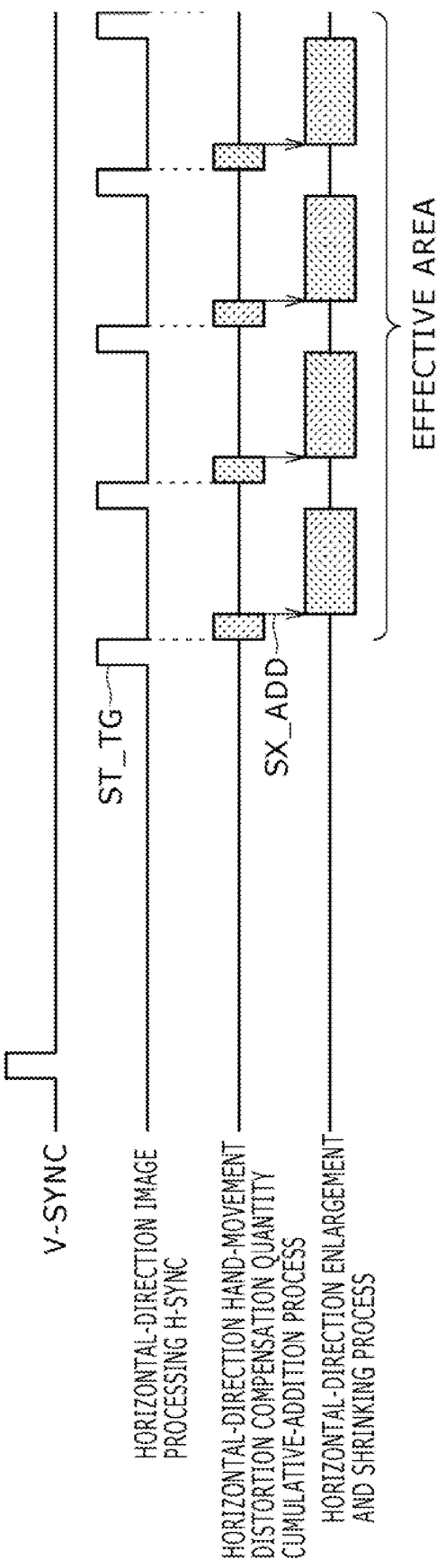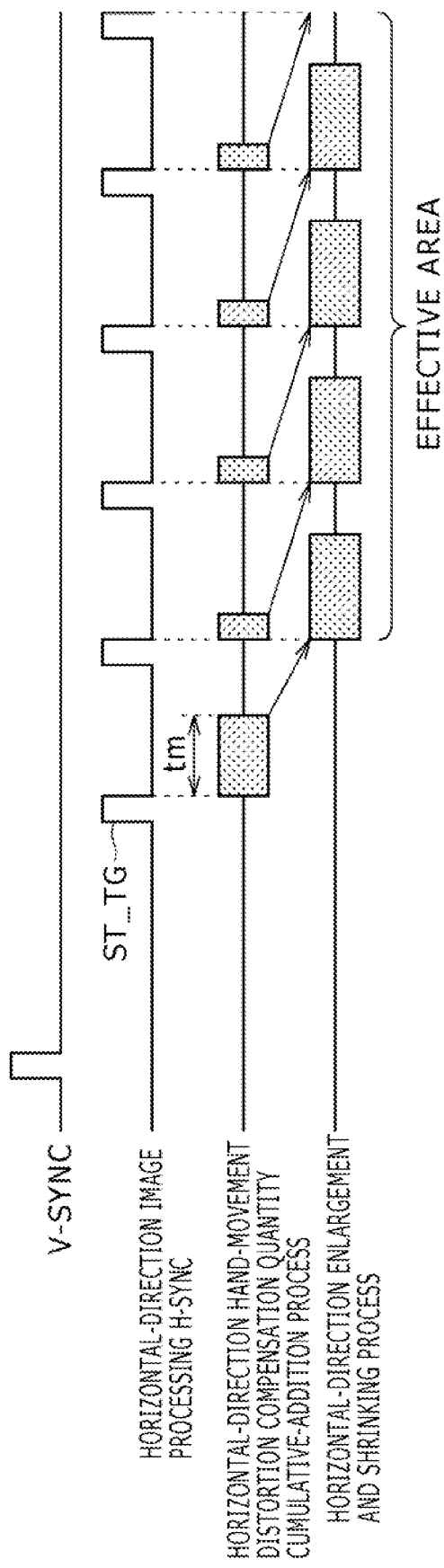

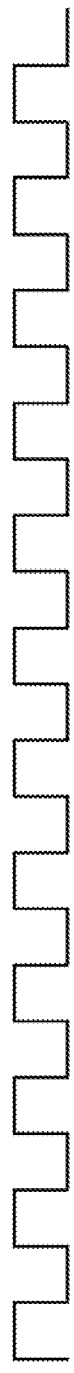
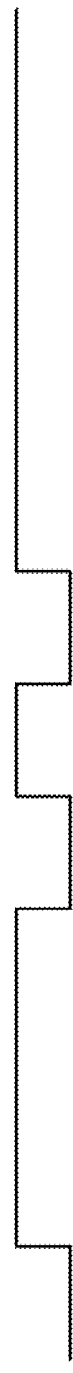
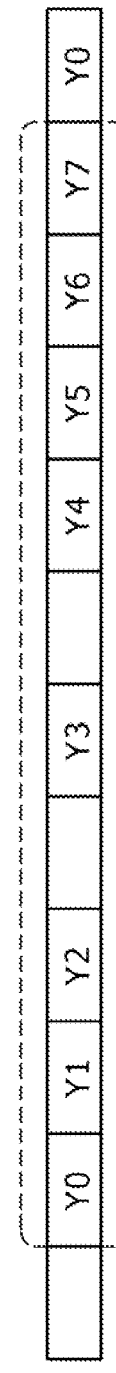
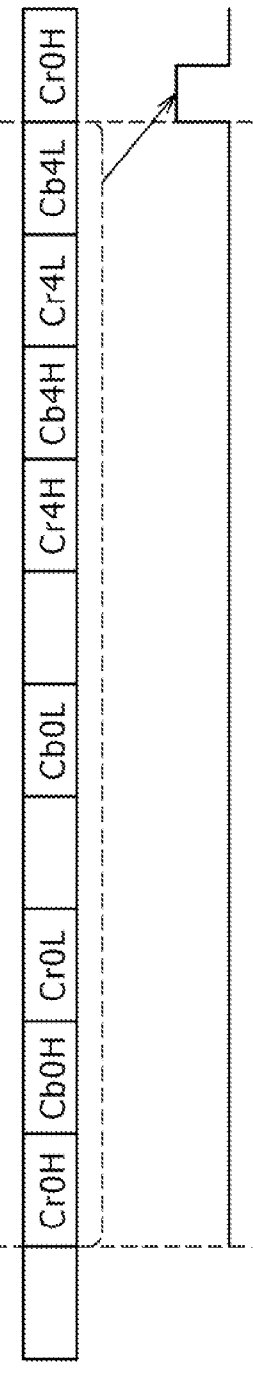
FIG. 23A CLOCK CLK
FIG. 23B DATA ENABLE EN
FIG. 23C LUMINANCE SIGNAL
FIG. 23D COLOR-DIFFERENCE SIGNAL
FIG. 23E WRITE REQUEST

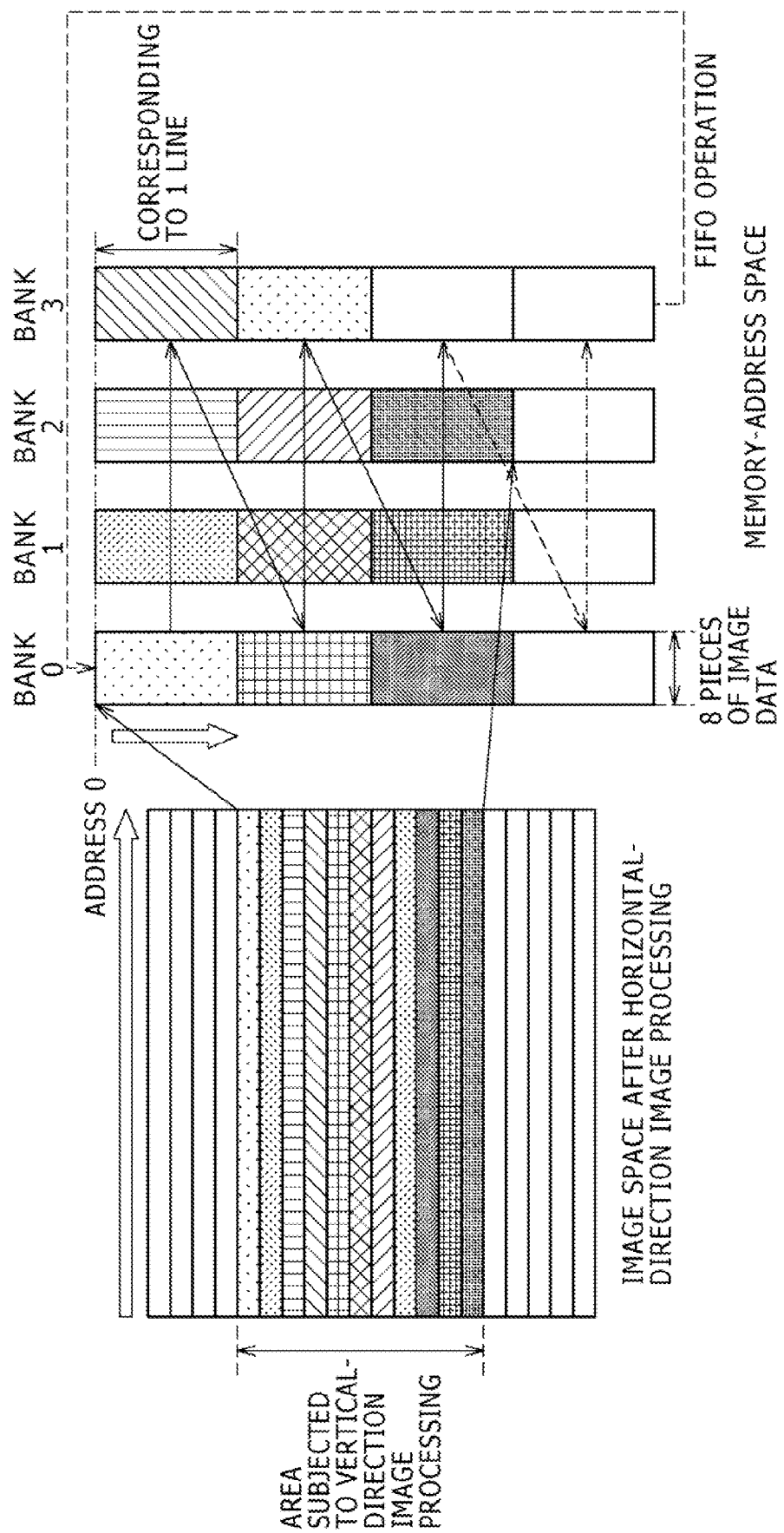

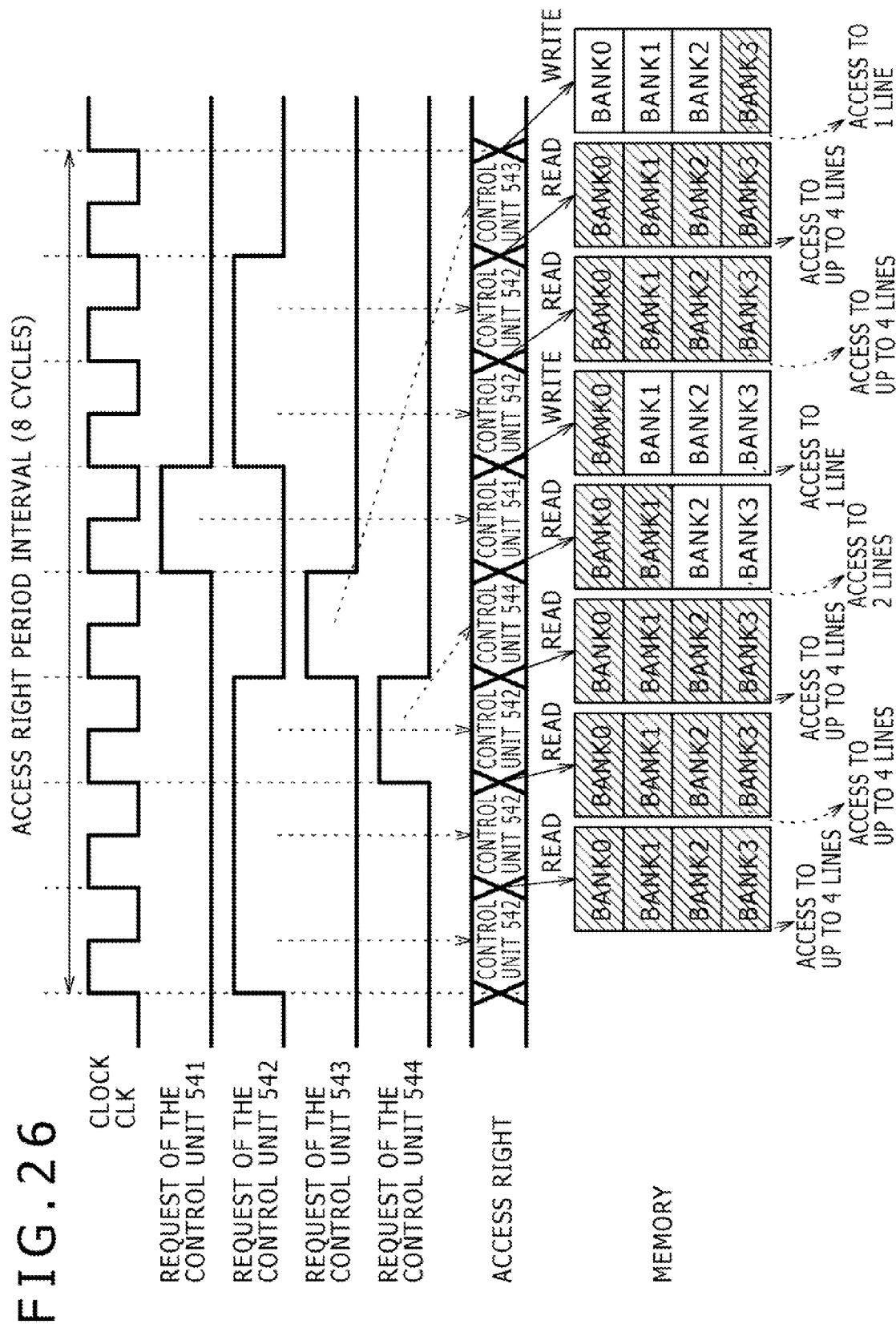

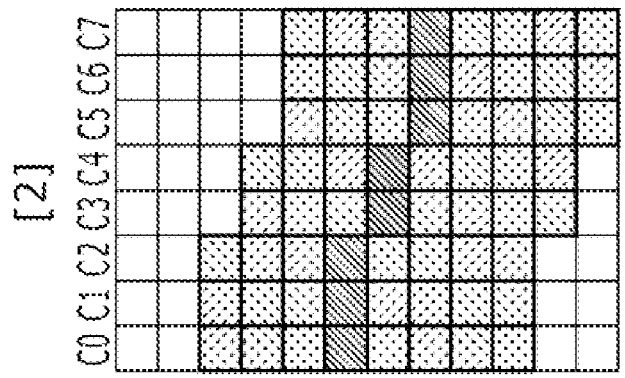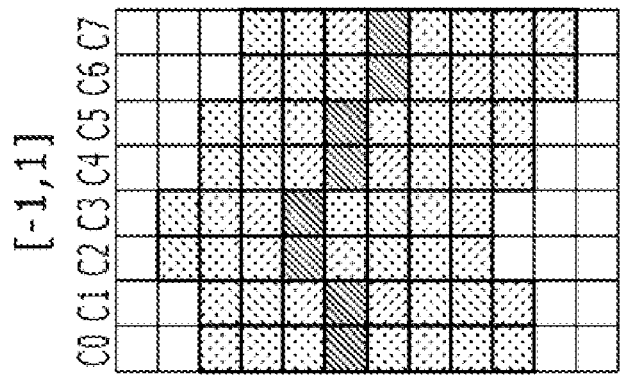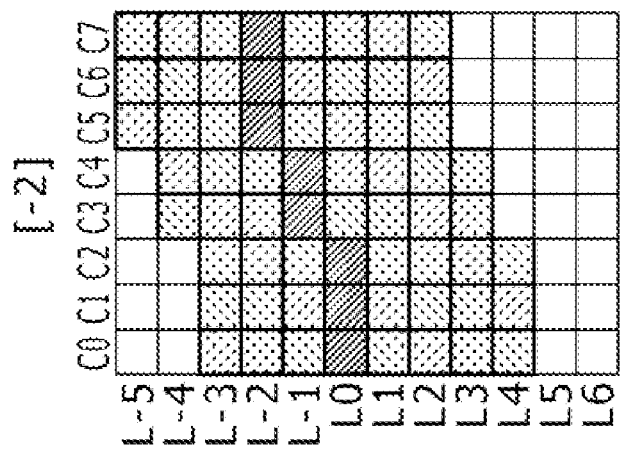

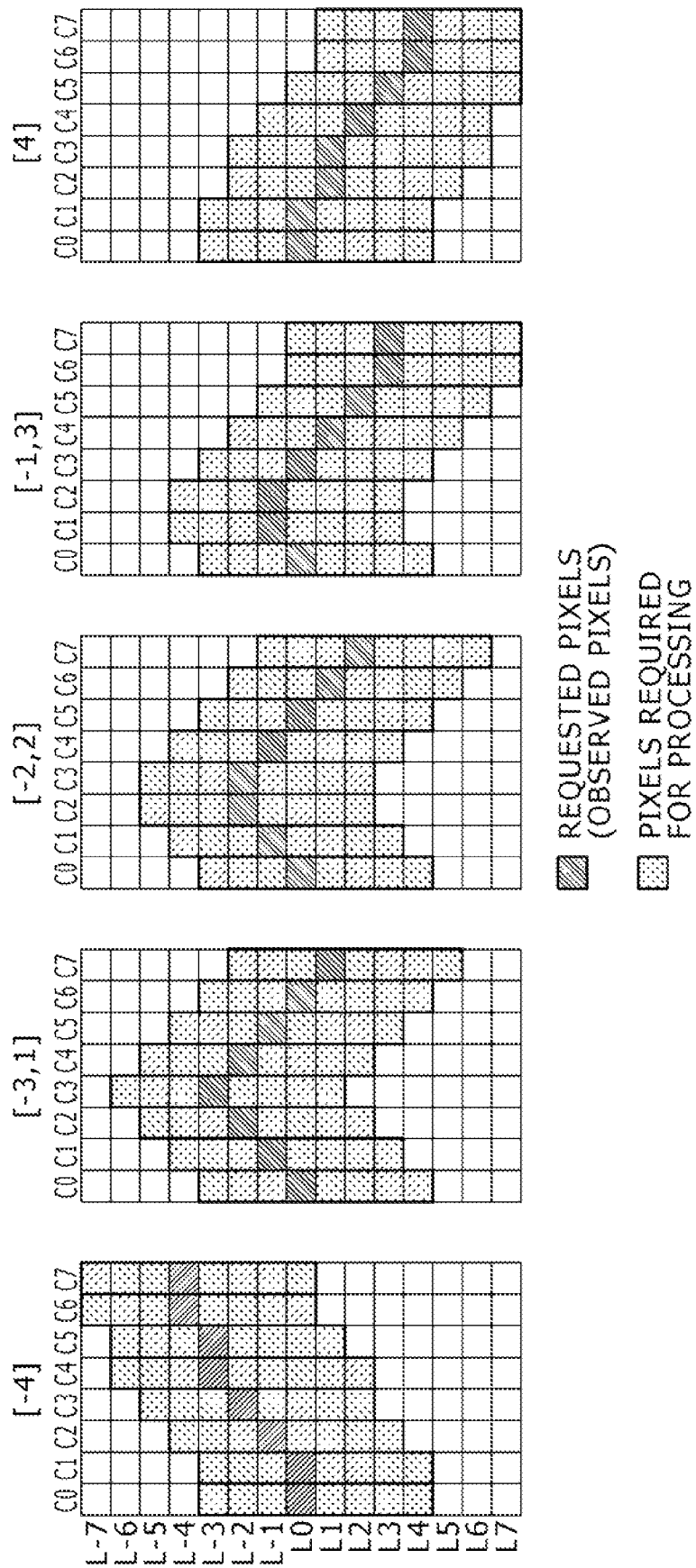

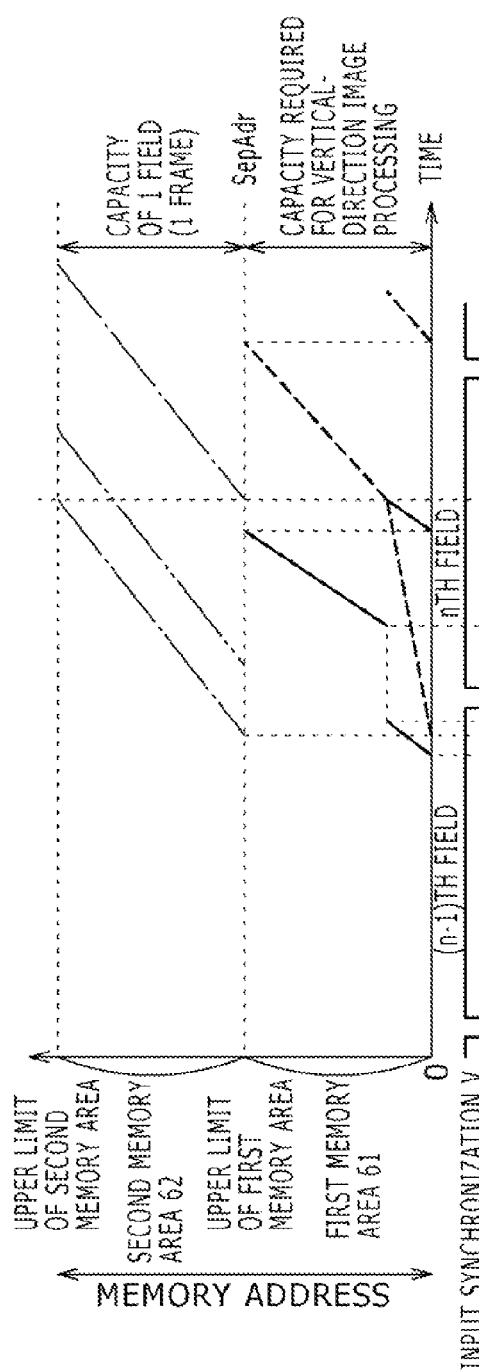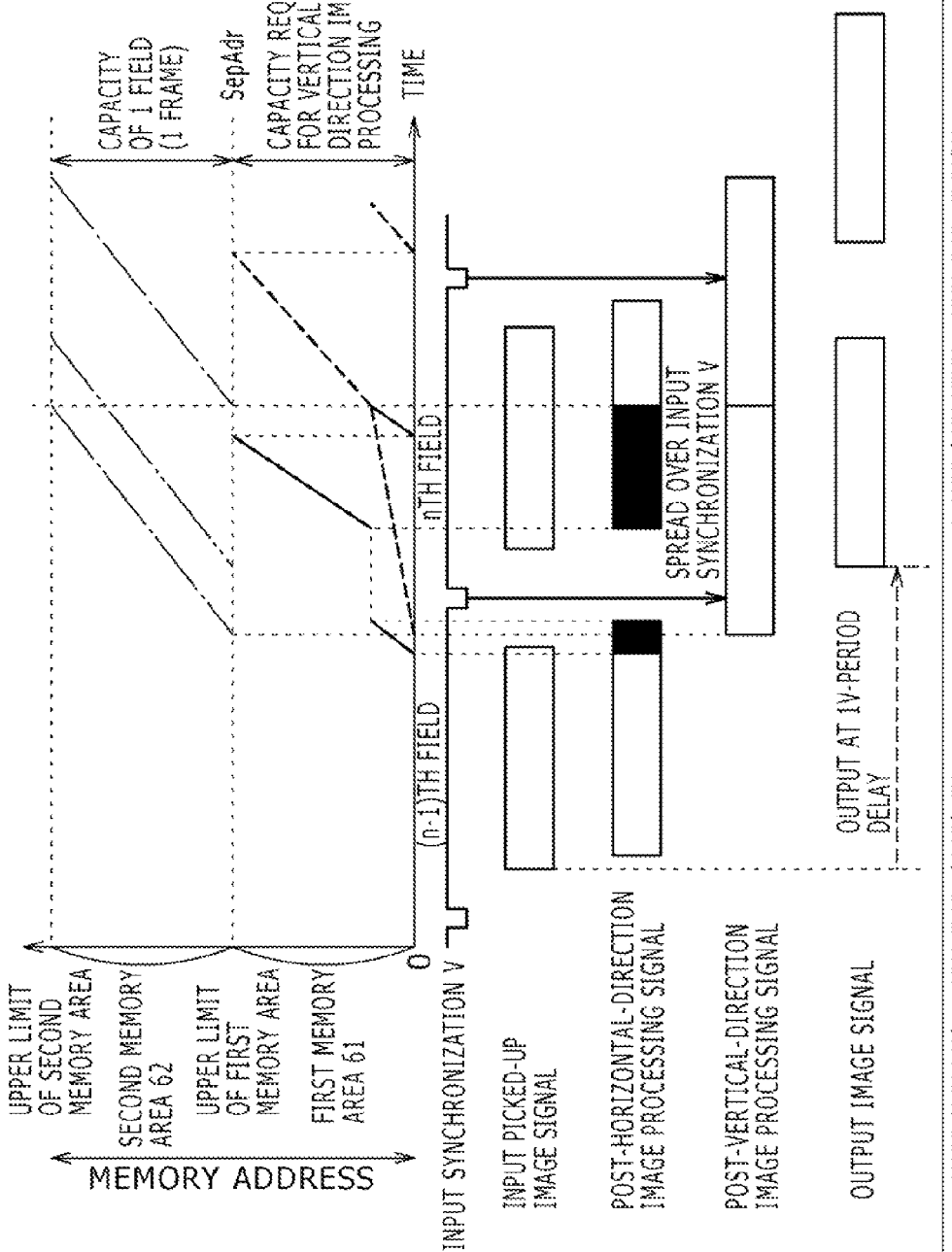

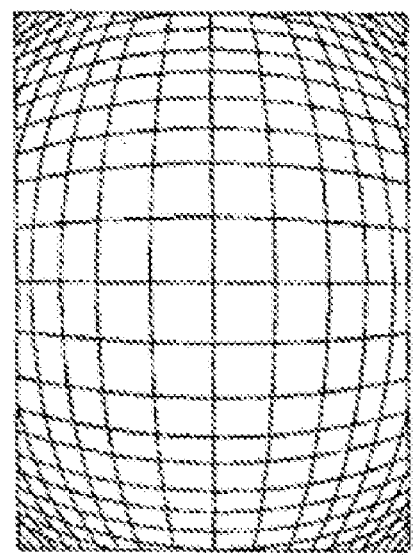
FIG.58B
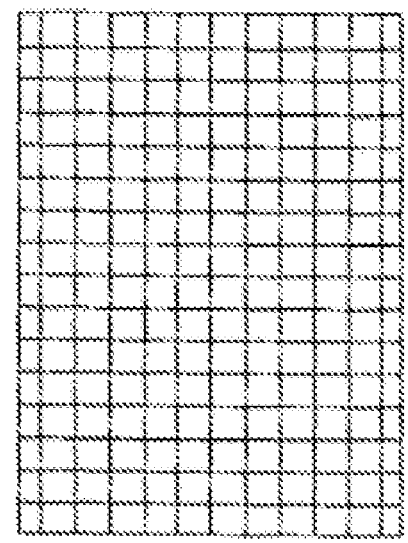
FIG.58A

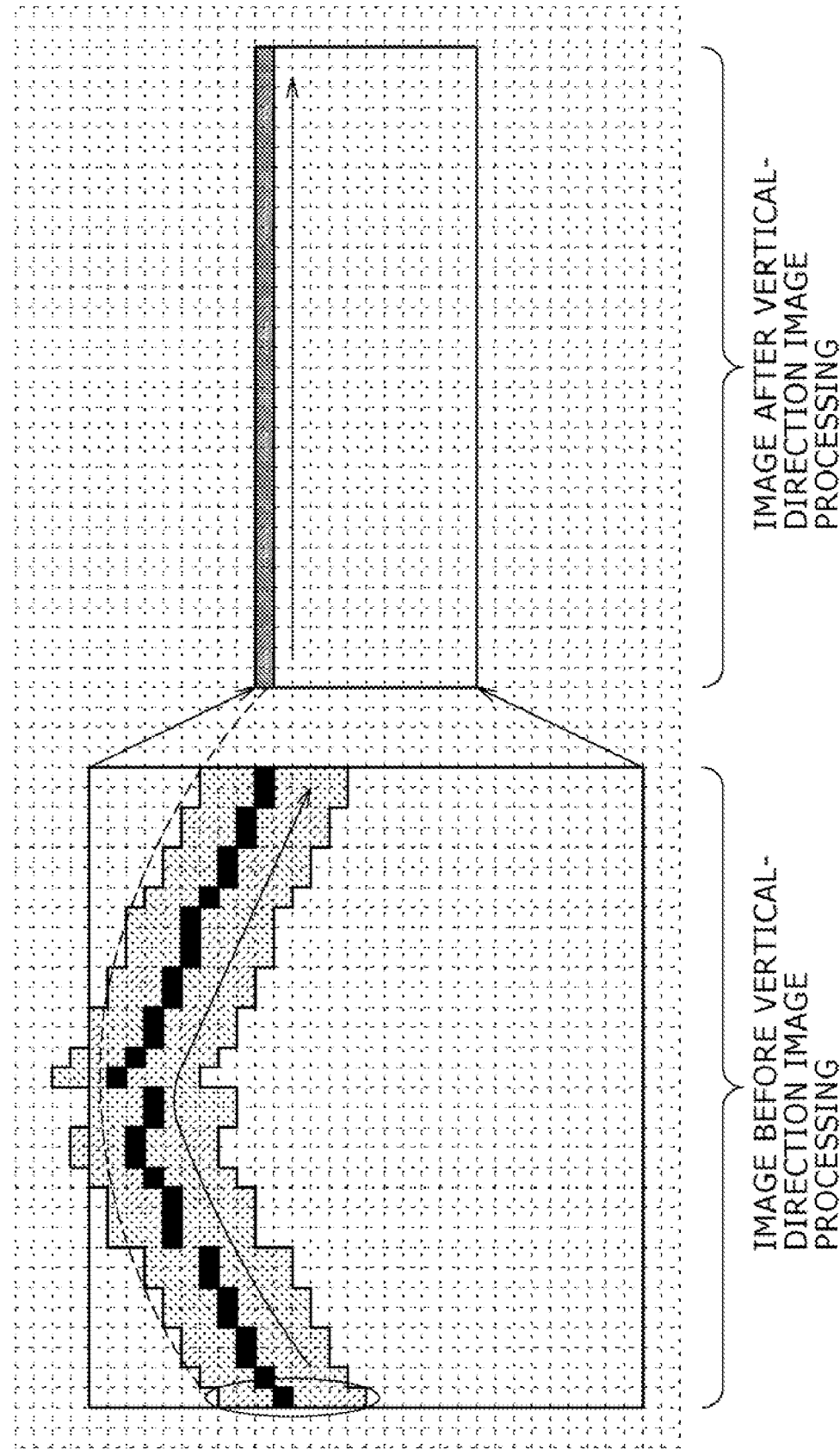

IMAGE BEFORE VERTICAL-DIRECTION PROCESSING

IMAGE BEFORE VERTICAL-DIRECTION IMAGE PROCESSING

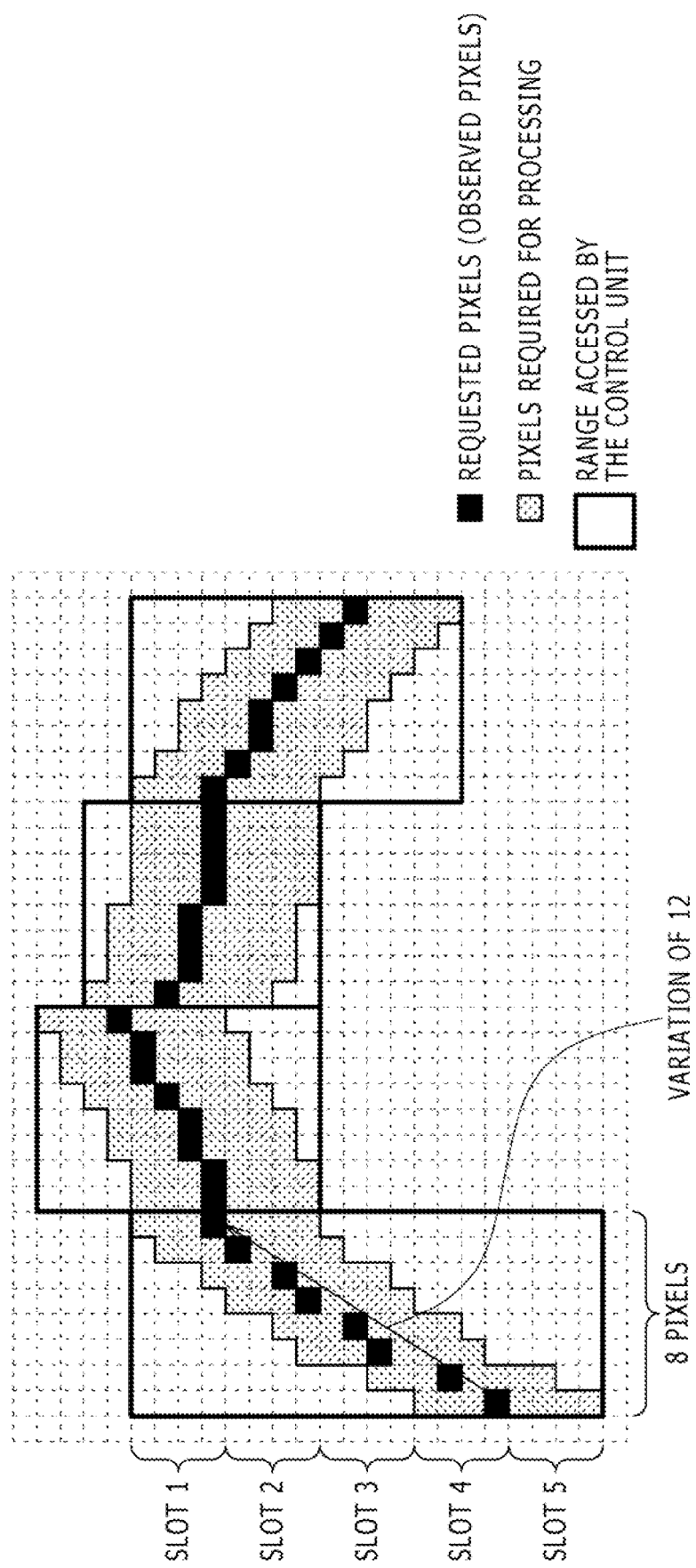

IMAGE-DATA PROCESSING APPARATUS AND IMAGE-DATA PROCESSING METHOD

CROSS REFERENCES TO RELATED APPLICATIONS

The present application claims priority to Japanese Patent Application JP 2006-245006 filed in the Japan Patent Office on Sep. 11, 2006, the entire contents of which being incorporated herein by reference.

BACKGROUND

The present application relates to an image-data processing apparatus suitable for image processing carried out on a picked-up image by using a digital video camera or the like and relates to an image-data processing method adopted in the image-data processing apparatus.

An image pickup apparatus such as a video camera employs an image memory used for temporarily storing picked-up image data. By making use of such an image memory, many image pickup apparatus are capable of carrying out image-processing functions such as a function to convert data stored in the image memory as the data of a picked-up image into output image data having a desired resolution, a function to compensate the picked-up image data for an electronic effect caused by a hand movement and an function to execute effect processing such as the so-called electronic zoom.

As a traditional method for processing image data by making use an image memory of this type, an image-data processing method is described in U.S. Pat. No. 2,956,527 used as patent document 1. In accordance with the image-data processing method described in patent document 1, image processing is carried out by splitting the processing into a horizontal-direction image process and a vertical-direction image process. The image-data processing method disclosed in patent document 1 is explained by referring to FIG. 54 as follows.

As shown in FIG. 54, in accordance with write control based on a write/read control signal W/R generated by a control unit 301, data input from an imager as the data of picked-up image is stored in an image memory 302 having a storage capacity large enough for holding picked-up image data with a quantity equivalent to one screen. The picked-up image data is a digital image signal obtained as a result of an A/D process to convert an original analog signal. In the following description, a hardware unit such as the control unit 301 is also referred to as a section.

After the lapse of a vertical-direction synchronization period, the data stored in the image memory 302 as the picked-up image data is read out from the memory unit 301 in accordance with read control based on a write/read control signal W/R generated by the control unit 301 and supplied to a horizontal-direction image processing unit 303 for carrying out horizontal-direction image processing such as a horizontal-direction resolution conversion process and a process to compensate the data for an effect caused by a horizontal-direction hand movement. To put it in detail, the horizontal-direction image processing unit 303 is a section for carrying out pixel skipping and pixel interpolation processes on the picked-up image data in order to make the resolution in the horizontal direction equal to a specified value or compensate the data for an effect caused by a hand movement occurring in the horizontal direction.

The picked-up image data completing the horizontal-direction image processing carried out by the horizontal-direction image processing unit 303 is supplied to a vertical-direction image processing unit 304. By the same token, the vertical-direction image processing unit 304 is a section for carrying out vertical-direction image processing such as a vertical-direction resolution conversion process and a process to compensate the data for an effect caused by a vertical-direction hand movement. To put it in detail, the vertical-direction image processing unit 304 is a section for carrying out pixel skipping and pixel interpolation processes on the data of the picked-up image in order to make the resolution in the vertical direction equal to a specified value or compensate the data for an effect caused by a hand movement occurring in the vertical direction. Thereafter, a signal of an output image in a desired resolution performed such as a compensation of hand movement is output.

As described above, the image memory 302 has a storage capacity large enough for holding picked-up image data with a quantity at least equivalent to one screen or equivalent to one vertical-direction period. As shown by a solid inclined line in FIG. 55, the data of a picked-up image is stored in the image memory 302. As shown by a dashed inclined line in FIG. 55, on the other hand, the data of a picked-up image is read out from the image memory 302 with a timing delayed from the operation to store the data in the image memory 302 by one vertical-direction period. As shown in the figure, the operation to store the data of a picked-up image in the image memory 302 and the operation to read out the data from the image memory 302 are carried out repeatedly.

The image memory 302 has a storage capacity large enough for holding picked-up image data with an quantity at least equivalent to one screen because, in this typical configuration, the data of a picked-up image is read out from the image memory 302 with a timing delayed from the operation to store the data in the image memory 302 by one vertical-direction period. That is to say, after the lapse of one vertical-direction synchronization period, picked-up image data stored in the image memory 302 would be undesirably overwritten by picked-up image data of the next vertical-direction synchronization period. Thus, in order to avoid the overwriting of the imager-created image data stored in the image memory 302 before the data is read out from the image memory 302, the data must be read out from the image memory 302 before the operation to store the data of the next vertical-direction synchronization period is started. That is to say, the image memory 302 is required to have a margin in the storage capacity as a margin added to the capacity equivalent to one screen if the data is not read out from the image memory 302 before the operation to store the data of the next vertical-direction synchronization period is started.

By providing the image memory 302 with such a storage capacity, data of a picked-up image can be read out from the image memory 302 while preventing a read operation from surpassing an outgoing write operation. Thus, the process to convert the resolution of the image can be carried out to generate image data having attributes including a desired resolution.

In accordance with the image-data processing method described in patent document 1, however, the image memory 302 is required to have a storage capacity corresponding to a highest-resolution pixel count of the imager. The pixel count is defined as a product obtained by multiplying the number of pixels per horizontal line by the number of horizontal lines. As an example, let us assume data of an HD (High Definition) image. In this case, if luminance and color-difference signals of one field of the HD image data are stored in a memory as eight bits per pixel, the image memory 302 is required to have a storage capacity of about 12M bits. Thus, the image memory 302 has a large size and is also expensive.

In addition, an imager having a larger pixel count raises a problem of a required large storage capacity of the image memory 302.

As an alternative configuration, the horizontal-direction image processing unit 303 is provided at a stage in front of the image memory 302 as shown in FIG. 56. In this alternative configuration, the picked-up image data from the imager is not stored directly in the image memory 302 as it is. Instead, in accordance with a method conceivable for this alternative configuration, the data of the picked-up image is subjected to horizontal-direction image processing such as a horizontal-direction resolution conversion process in the horizontal-direction image processing unit 303 in order to reduce the horizontal-direction amount of the data before the data of one screen is stored in the image memory 302. Also in the case of the method provided for this alternative configuration, the data of a picked-up image is read out from the image memory 302 with a timing delayed from the operation to store the data in the image memory 302 by one vertical-direction period. Then, the picked-up image data read out from the image memory 302 is supplied to the vertical-direction image processing unit 304 for carrying out vertical-direction image processing such as a vertical-direction resolution conversion process and a process to compensate the data for an effect caused by a vertical-direction hand movement.

In the case of the typical configuration shown in FIG. 56, the image memory 302 is used for storing one-screen picked-up image data having a pixel count reduced by the horizontal-direction image processing carried out by the horizontal-direction image processing unit 303. For this reason, the image memory 302 is required to have a storage capacity for accommodating data with an amount merely equivalent to one screen after the horizontal-direction image processing. Thus, the storage capacity of the image memory 302 employed in the configuration shown in FIG. 56 can be reduced to a small value in comparison with the image memory 302 employed in the configuration shown in FIG. 54.

By the way, in an operation to store data completing the horizontal-direction image processing in the horizontal-direction image processing unit 303 and an operation to read out the data from the image memory 302 to be subjected to the vertical-direction image processing in the configuration shown in FIG. 56, the following problem may be raised, depending on the substances of the horizontal-direction image processing and the vertical-direction image processing.

In the vertical-direction image processing carried out in the configuration shown in FIG. 56, a request REQ indicating a horizontal line whose data is about to be processed is supplied by the vertical-direction image processing unit 304 to the control unit 301. On the basis of the horizontal line indicated by the request REQ, the control unit 301 determines a plurality of horizontal lines to be used in processing such as a vertical-direction interpolation process for computing the picked-up image data of the horizontal line indicated by the request REQ and identifies the addresses of the horizontal lines in the image memory 302. Then, the control unit 301 reads out the picked-up image data of the determined horizontal lines from the identified addresses in the image memory 302 as data required in the vertical-direction image processing such as a vertical-direction interpolation process for computing the picked-up image data of the horizontal line indicated by the request REQ. In the following description, the horizontal line indicated by the request REQ is referred to as a requested horizontal line.

In this case, for example, when a horizontal line whose data is about to be processed by the vertical-direction image processing unit 304 is determined, that is, when the requested horizontal line is determined, the addresses (strictly speaking, vertical-direction addresses) of the horizontal lines to be used in vertical-direction processing such as a vertical-direction interpolation process for computing the picked-up image data of the determined horizontal line do not generally change in the horizontal-direction in the image processing such as an electronic hand movement distortion compensation process, an electronic zoom process and a resolution conversion process as shown in FIG. 57.

Thus, when the request REQ indicating a horizontal line whose data is about to be processed arrives at the control unit 301, in processing of picked-up image data of one horizontal line, by specifying the same vertical-direction address of any individual one of the horizontal lines to be used in vertical-direction image processing, the control unit 301 is capable of reading out the data of the picked-up image for the individual horizontal line from the image memory 302.

When the request REQ indicating a horizontal line whose data is about to be processed arrives at the control unit 301 in the course of image processing, however, the control unit 301 does not merely specify the same vertical-direction address in an operation to read out picked-up image data of one horizontal line from the image memory 302, but must also change the vertical-direction address in accordance with the horizontal-direction position of the pixel on the horizontal line. An example of this case is explained as follows.

In general, an image pickup lens has a distortion characteristic, which distorts a picked-up image as typically shown in FIG. 58. If a high-precision and high-performance image pickup lens is employed, the distortion is not noticeable. If a cheap image pickup lens or an optical zoom lens is used, however, unignorable distortion is generated in the image.

For example, if an image of a lattice stripe pattern like one shown in FIG. 58A as a stripe pattern serving as an object of photographing is taken in a photographing operation by using an image pickup lens having a much-distortion characteristic, the horizontal-direction and vertical-direction straight horizontal lines composing the lattice stripe pattern of the image are bent due to distortion generated by the much-distortion characteristic in the image as shown in FIG. 58B. The image distortion caused by the image pickup lens depends on the position of every pixel in the imager and is peculiar to the image pickup lens, varying from lens to lens. In addition, the image distortion caused by the image pickup lens also depends on the position of the lens. That is to say, when the position of the image pickup lens is changed, the image distortion caused by the image pickup lens also varies in accordance with the change in position.

Also if a process to compensate an image for distortion caused by an image pickup lens as described above is carried out, it is possible to think of a method by which the distortion is split into horizontal-direction image distortion and vertical-direction image distortion. Then, the horizontal-direction image processing unit 303 compensates the image for the horizontal-direction image distortion and stores the result of the compensation process in the image memory 302. Subsequently, on the basis of a horizontal line request REQ received from the vertical-direction image processing unit 304, the control unit 301 determines a plurality of horizontal lines to be used in vertical-direction image processing and reads out data of a picked-up image from the image memory 302.

However, for a requested horizontal line in this case, it is necessary to carry out a process to change the vertical-direction address of a pixel on any one of the horizontal lines to be used in vertical-direction image processing in accordance with the horizontal-direction position of the pixel as shown in FIG. 59. That is to say, after the vertical-direction image processing, the pixel data of the requested horizontal line is shifted to a correct location in the vertical direction from an incorrect position in the image prior to the vertical-direction image processing as shown in the left-side portion of FIG. 59.

The vertical-direction image processing is an interpolation process carried out by making use of a plurality of horizontal lines above and beneath the requested horizontal line. In this case, the vertical-direction address of any specific pixel included in each of a plurality of horizontal lines above and beneath pixels on the requested horizontal line on an image prior to the vertical-direction image processing changes in accordance with the horizontal-direction position of a pixel located on the requested horizontal line as a pixel corresponding to the specific pixel. That is to say, the vertical-direction address associated with a storage location in the image memory 302 as an address required in the vertical-direction image processing to be carried out on a horizontal line is not an address fixed for the processing to be carried out on the horizontal line, but an address changing randomly in accordance with the horizontal-direction position of a pixel located on the requested horizontal line.

As a result, in the vertical-direction image processing carried out as a part of processing to compensate a picked-up image for distortion caused by the image pickup lens, data of the image is read out from a horizontal-line position located in the image memory 302 as a position varying randomly in accordance with the horizontal-direction position of a pixel located on the requested horizontal line. That is to say, random accesses are required.

FIG. 60 is an explanatory diagram to be referred to in description of an easiest method for avoiding random accesses in an operation to read out the data of a picked-up image from the image memory 302. In accordance with this method, first of all, attention is paid to the requested horizontal line. Then, the picked-up image is searched for the uppermost and lowermost ones of a plurality of horizontal lines shown in the figure as horizontal lines required in the vertical-direction image processing to be carried out on the requested horizontal line. Finally, the data of all the horizontal lines in a range between the uppermost and lowermost ones is read out from the image memory 302.

In accordance with this method, while the addresses of the horizontal lines whose data is to be read out from the image memory 302 can be computed with ease, data of a large number of pixels not required in the vertical-direction image processing (in FIG. 60, unpainted spaces surrounded by dashed grid lines) is inadvertently read out from the image memory 302. Thus, the power consumption is increased by a quantity corresponding to the operation to inadvertently read out the data of a large number of pixels not required in the vertical-direction image processing from the image memory 302. If the worst comes to worst, in order to carry out real-time processing, the clock frequency must be increased.

As shown in FIG. 61, on the other hand, for every pixel on the requested horizontal line, a plurality of horizontal-line addresses required in the vertical-direction image processing are computed and pixel data required in the vertical-direction image processing is read out from the horizontal-line addresses required in the vertical-direction image processing. In this way, data of pixels not required in the vertical-direction image processing is never read out from the image memory 302. Thus, the problem of the method explained above by referring to FIG. 60 is not raised.

However, in the case of the method explained above by referring to FIG. 61, it is necessary to compute a plurality of horizontal-line addresses required in the vertical-direction image processing for every pixel on the requested horizontal line and, in addition, issue a read command for each of the horizontal-line addresses. Thus, from the power-consumption point of view, the method explained above by referring to FIG. 61 is also impractical.

Addressing the problems described above, inventors presented an image-data processing method and an image-data processing apparatus, which are capable of solving the power-consumption and processing-efficiency problems described above as described in Japanese Patent Laid-open No. 2006-222827 used as patent document 2.

In accordance with the image-data processing method disclosed in patent document 2, a picked-up image is not searched for the uppermost and lowermost ones of a plurality of whole horizontal lines associated with the requested horizontal line as horizontal lines required in the vertical-direction image processing as is the case with the method explained earlier by referring to FIG. 60. Instead, the image is searched for the uppermost and lowermost ones of a plurality of partial horizontal lines associated with the requested horizontal line as horizontal lines required in the vertical-direction image processing. In this case, a partial horizontal line is a horizontal line portion composed of a plurality of pixels arranged in the horizontal-direction. The number of pixels arranged in the horizontal-direction is equal to 1/N of effective pixels on the entire horizontal line where N is a positive integer at least equal to 2. The process to search the image for the uppermost and lowermost ones of a plurality of partial horizontal lines each composed of a plurality of pixels arranged in the horizontal-direction is carried out for each plurality of such partial horizontal lines. That is to say, the process to search the image for the uppermost and lowermost ones of a plurality of partial horizontal lines each composed of a plurality of pixels arranged in the horizontal-direction is carried out N times for the whole horizontal line.

FIG. 62 is a diagram showing a typical case in which the process to search the image for the uppermost and lowermost ones of a plurality of partial horizontal lines each composed of a plurality of pixels arranged in the horizontal direction is carried out for each partial horizontal line composed of eight pixels arranged in the horizontal direction.

In accordance with the method disclosed in patent document 2, data of a picked-up image is stored in an area of an image memory or read out from the area in horizontal line segments each including a plurality of pixels. Thus, in comparison with a method for reading out image data of a plurality of whole horizontal lines as is the case with the method explained earlier by referring to FIG. 60, it is possible to reduce the number of pixels whose data is read out from an area of an image memory as data not required in the vertical-direction image processing. As a result, the processing efficiency is improved.

To put it in detail, after vertical-direction distortion variations of the eight pixels arranged in the horizontal-direction are checked, the access range is determined in order to limit vertical-direction accesses to the image memory to accesses to only a minimum required range in the eight pixels arranged in the horizontal direction. It is thus possible to decrease the number of operations to read out data not required in the vertical-direction image processing from the image memory. As is evident from FIG. 62, it is possible to decrease the number of operations to read out data not required in the vertical-direction image processing from the image memory in comparison with a method for reading out image data of a plurality of whole horizontal lines as is the case with the method explained earlier by referring to FIG. 60.

In addition, in accordance with the method disclosed in patent document 2, data of a picked-up image is read out from the image memory in horizontal line segments each including a plurality of pixels, for example, in horizontal line segments each including eight pixels. Thus, a read command is issued for every plurality of pixels. As a result, in comparison with a method whereby a read command is issued for each pixel as is the case with the method explained earlier by referring to FIG. 61, the number of operations to issue a command can be reduced, allowing the power consumption to be also decreased as well.

As is evident from what is described above, the method disclosed in patent document 2 is capable of solving the problems raised by the methods explained by referring to FIGS. 60 and 61. It is thus possible to implement reduction of the power consumption and improvement of the processing efficiency.

By the way, the image memory 302 employed in the processing configuration shown in FIG. 56 can be divided into a first memory area 3021 used for storing a processing result output by the horizontal-direction processing unit 303 and a second memory area 3022. FIG. 63 is a block diagram showing a configuration, which includes the horizontal-direction image processing unit 303, the first image memory area 3021, the vertical-direction image processing unit 304 and the second image memory area 3022, as well as detailed write and read accesses made to the first image memory area 3021 and the second image memory area 3022.

As shown in FIG. 63, an access W1 is a process to store image data obtained as a result of horizontal-direction image processing carried out by the horizontal-direction image processing unit 303 into the first image memory area 3021 of the image memory 302. An access R1 is a process to read out the image data obtained as a result of the horizontal-direction image processing carried out by the horizontal-direction image processing unit 303 from the first image memory area 3021 of the image memory 302. An access W2 is a process to store image data obtained as a result of vertical-direction image processing carried out by the vertical-direction image processing unit 304 into the second image memory area 3022 of the image memory 302. An access R2 is a process to read out the image data obtained as a result of the vertical-direction image processing carried out by the vertical-direction image processing unit 304 from the second image memory area 3022 of the image memory 302.

The horizontal-direction and vertical-direction image processing of input data of a picked-up image as well as processing to produce output data of the image may need to be carried out in a real-time manner as is the case with processing to record and/or reproduce data of a moving image for example. In the case of such real-time manner processing, the four accesses W1, W2, R1 and R2 need to be made to every horizontal-direction multi-pixel line segment consisting of eight pixels in accordance with the image-data processing method adopted in the image-data processing apparatus disclosed in patent document 2.

In accordance with the image-data processing method adopted in the image-data processing apparatus disclosed in patent document 2, an access to one pixel is made in one memory-access cycle, which is referred to hereafter as a cycle. Thus, an access to a write/read unit, which is the aforementioned horizontal line segment consisting of eight pixels, is made in eight cycles referred to as one processing time unit period. Each cycle of one processing time unit period is allocated to one of the four accesses W1, W2, R1 and R2 for example as shown in FIG. 64. That is to say, each individual one of the four accesses W1, W2, R1 and R2 is made in a cycle allocated to the individual access.

One of the four accesses W1, W2, R1 and R2 is the read access R1. As described before, the read access R1 is made in order to read out not only eight pixels arranged in the horizontal-direction, but also eight pixels arranged in the vertical-direction for each of the eight pixels arranged in the horizontal-direction. Thus, one cycle allocated to the read access R1 is not sufficient. By allocating one cycle to each of the three remaining accesses W1, W2 and R2, however, each of the accesses can be made.

In order to solve the problem described above, in accordance with the image-data processing method adopted in the image-data processing apparatus disclosed in patent document 2, 3 of the eight cycles in one processing time unit period are allocated to the three accesses W1, W2 and R2 respectively whereas up to five cycles are allocated to the read access R1 as shown in FIG. 64.

In addition, the image memory 302 is configured to include four banks and the control unit 301 is capable of carrying out an operation to read out data of a picked-up image from each of the banks of the image memory 302 in horizontal line units as well as an operation to store such image data into each of the banks of the image memory 302 also in horizontal line units. On top of that, in a read access R1, four horizontal lines can be read out from all the four banks of the image memory 302 at the same time.

As is evident from the above description, up to five access rights are given to the read access R1 made by the control unit 301 to read out image data required in the vertical-direction image processing in one processing time unit period, allowing four horizontal lines to be read out from all the four banks of the image memory 302 at the same time for each of the given access rights. Thus, image data of 20 (=4 horizontal lines/access right×5 access rights) horizontal lines can be acquired during one processing time unit period.

Accordingly, in one processing time unit period, vertical-direction image distortion (or a vertical-direction variation) can be dealt with in real-time processing in horizontal-direction eight-pixel units as shown in FIG. 65 provided that the distortion is in a distortion range of up to a variation 12 (which is a vertical-direction variation of 12 pixels). As described earlier, one processing time unit period consists of eight consecutive cycles, which form a range executable in a real-time manner.

That is to say, in an image pickup apparatus according to this embodiment, if the vertical-direction variations in the eight pixels arranged in the horizontal-direction are variations having an amplitude of 12 pixels, processing to compensate the image for the variation can be carried out in a real-time manner. It is to be noted that slots 1 to 5 in the example shown in FIG. 65 each correspond to one access. In the following description, the amplitude of 12 pixels is referred to as a variation amplitude of 12.

As described above, if the lens distortion has a magnitude not exceeding a value determined in advance, that is, if the lens distortion is variations having an amplitude smaller than the variation amplitude of 12 in the case of the example described above, it is possible to carry out the processing to compensate an image for the distortion in order to result in an image having a high quality and implement a resolution conversion process. In the case of a lens employed in an ordinary digital camera or an ordinary video camera, the variations caused by image distortion are variations having an amplitude smaller than the variation amplitude of 12. Thus, such a variation can be dealt with sufficiently.

However, let us assume for example that an image pickup apparatus is provided on the rear part of a car and an image taken by the image pickup apparatus is referred to in an operation to drive back the car in order to park the car in a garage. In this case, a super-wide angle lens such as a fish-eye lens is employed in the image pickup apparatus. If a special lens such as a fish-eye lens is employed in the image pickup apparatus, variations caused by image distortion may be variations having an amplitude greater than the variation amplitude of 12, raising a problem that it is impossible to read out required image data of a plurality of horizontal lines in a unit consisting of eight pixels arranged in the horizontal direction in one processing time unit period.

SUMMARY

An image-data processing apparatus and an image-data processing method adopted in the image-data processing apparatus as an image-data processing apparatus and an image-data processing method are provided, which are capable of completing requested accesses to an image memory even if the access cannot be made in one processing time unit period, according to an embodiment.

The image-data processing apparatus includes:

an image memory used for storing image data;

a plurality of processing sections each configured to output image data to be stored in the image memory, receive image data read out from the image memory and carry out image processing determined in advance on the received image data; and a memory control section configured to receive a write or read request from each of the processing sections and control a write access to store image data in the image memory in accordance with the write request and a read access to read out image data from the image memory in accordance with the read request, wherein:

the memory control section:

executes every cycle of the write access to the image memory or every cycle of the read access to the image memory for each horizontal-direction multi-pixel line segment consisting of 1/N times the number of pixels included in one horizontal line where N is a positive integer at least equal to 2; and takes a plurality of aforementioned cycles as a processing time unit period during which the memory control section carries out access processing to make write and read accesses according to the write and read requests made by the processing sections as accesses to the image memory by allocating each of the cycles in the processing time unit period to one of the processing sections and repeats the processing time unit period, and the memory control section has:

a determination section configured to produce a result of determination as to whether or not the access processing specified on the basis of the write or read request made by any specific one of the processing sections in a particular processing time unit period can be completed in the cycles included in the particular processing time unit period as cycles allocated to the specific processing section; and an access execution section configured to supply a wait request signal in the particular processing time unit period to the specific processing section to temporarily stop making further requests and continue the access processing uncompleted in the particular processing time unit period to cycles allocated to the specific processing section in one or a plurality of aforementioned processing time unit periods following the particular processing time unit period if the determination result produced by the determination section indicates that the access processing cannot be completed in the cycles included in the particular processing time unit period as cycles allocated to the specific processing section.

In the configuration of the image-data processing apparatus according to the embodiment described above, the determination section produces a result of determination as to whether or not the access processing specified on the basis of the write or read request made by any specific one of the processing sections in a particular processing time unit period can be completed in the cycles included in the particular processing time unit period as cycles allocated to the specific processing section.

In addition, if the determination result produced by the determination section indicates that the access processing cannot be completed in the cycles included in the particular processing time unit period as cycles allocated to the specific processing section, the access execution section supplies a wait request signal in the particular processing time unit period to the specific processing section to temporarily stop making further requests and continues the access processing uncompleted in the particular processing time unit period to cycles allocated to the specific processing section in one or a plurality of aforementioned processing time unit periods following the particular processing time unit period.

Thus, there is no longer a case in which it is impossible to carry out processing to make an access specified on the basis of a request issued by a processing section as an access to an image memory. As a result, the problems described above can be solved.

In accordance with an embodiment, processing to make an access to an image memory can be completed even if the processing cannot be completed in one processing time unit period.

Additional features and advantages are described herein, and will be apparent from, the following Detailed Description and the figures.

BRIEF DESCRIPTION OF THE FIGURES

FIG. 5A is an explanatory diagram showing an original image generated by an embodiment implementing an image-data processing apparatus;

FIG. 5B is an explanatory diagram showing an image distortion generated by a CMOS hand movement;

FIG. 5C is an explanatory diagram showing an image after being corrected for horizontal-direction distortion;

FIG. 5D is an explanatory diagram showing an image after being corrected for horizontal-direction distortion and vertical-direction distortion;

FIG. 6 is an explanatory diagram to be referred to in description of a process to compensate an image for distortion caused by a hand movement in an embodiment implementing an image-data processing apparatus provided;

FIG. 17A is an explanatory diagram showing timing charts of operations carried out by the horizontal-direction image processing unit shown in FIG. 16 for a case in which a horizontal-direction cutting-out process and a partial enlargement process are not supported;

FIG. 17B is an explanatory diagram showing timing charts of operations carried out by the horizontal-direction image processing unit shown in FIG. 16 for a case in which a horizontal-direction cutting-out process and a partial enlargement process are supported;

FIG. 23 is an explanatory block diagram to be referred to in description of typical control of accesses to an image memory in an embodiment implementing an image-data processing apparatus;

FIG. 23A shows the waveform of a clock signal CLK;

FIG. 23B shows the waveform of a data enable signal EN;

FIG. 23C shows a luminance signal;

FIG. 23D shows a color-difference signal;

FIG. 23E shows a write request pulse;

FIG. 24 is an explanatory diagram to be referred to in description of operations to store image data in an image memory in an embodiment implementing an image-data processing apparatus;

FIG. 26 is an explanatory diagram to be referred to in description of typical granting of an access right to one of requests for each of clock cycles in an access-right acquisition time interval during which some of control units make the requests simultaneously;

FIGS. 28A to 28C are explanatory diagrams to be referred to in description of control of operations to read out image data to be subjected to vertical-direction image processing from an image memory for a second variation amplitude in an embodiment implementing an image-data processing apparatus;

FIGS. 30A to 30E are explanatory diagrams to be referred to in description of control of operations to read out image data to be subjected to vertical-direction image processing from an image memory for a fourth variation amplitude in an embodiment implementing an image-data processing apparatus;

FIG. 44A is an explanatory diagram to be referred to in description of typical operations to store image data into an image memory and read out image data from the memory during the typical processing shown in FIG. 43 in an embodiment implementing an image-data processing apparatus;

FIG. 44B shows an input synchronization signal;

FIG. 44C shows a signal representing an input picked-up image;

FIG. 44D shows a signal obtained as a result of horizontal-direction image processing;

FIG. 44E shows a signal obtained as a result of vertical-direction image processing;

FIG. 44F shows an output image signal;

FIG. 58A is a diagram showing an image without distortion;

FIG. 58B is an explanatory diagram showing an image including distortion caused by a distortion characteristic of an image pickup lens;

FIG. 59 is an explanatory block diagram to be referred to in description of operations to read out image data from an image memory as image data to be subjected to vertical-direction image processing to be carried out for compensating the image data for distortion caused by a distortion characteristic of an image pickup lens;

FIG. 65 is an explanatory block diagram to be referred to in description of operations to read out image data to be subjected to vertical-direction image processing from an image memory in an embodiment implementing an image-data processing apparatus.

DETAILED DESCRIPTION

An image-data processing apparatus described below as an image-data processing apparatus according to an embodiment is an image pickup apparatus making use of a CMOS (Complementary Metal-Oxide Semiconductor) imager as an imager. Also referred to hereafter as a CMOS solid-state imager, the CMOS imager is a representative of X-Y address solid-state image pickup devices. The image pickup apparatus is capable of carrying out image processing such as a process to compensate a picked-up image for two types of distortion, an electronic zoom process and a resolution conversion process to generate output data of an image having a desired resolution. The two types of distortion are the picked-up-image distortion caused by a hand movement and the picked-up-image distortion caused by a distortion characteristic of an image pickup lens.

It is to be noted that the image pickup apparatus according to the embodiment is capable of taking both a moving picture and a still picture in a photographing operation. The image processing cited above can be carried out to process data of both moving and still pictures taken in a photographing operation.

Before explaining the image pickup apparatus according to the embodiment, the following description explains image distortion caused by a hand movement as distortion peculiar to the X-Y address solid-state image pickup device such as the CMOS imager.

In the case of a solid-state image pickup device making use of a CCD (Charge Couple Device) generally employed in the past, for example, all pixels are exposed simultaneously during the same period and image data of one frame (or one field) is fetched with exactly the same timing. It is thus possible to think that a positional displacement caused by a hand movement can be represented by a hand movement positional displacement Vcs shown as an arrow in FIG. 2 as a displacement provided for all pixels of one frame. In the following description, a solid-state image pickup device making use of a CCD is also referred to as a CCD imager. In addition, the technical term 'frame' used in the following description can also be interpreted to imply a field.

Figure 2:
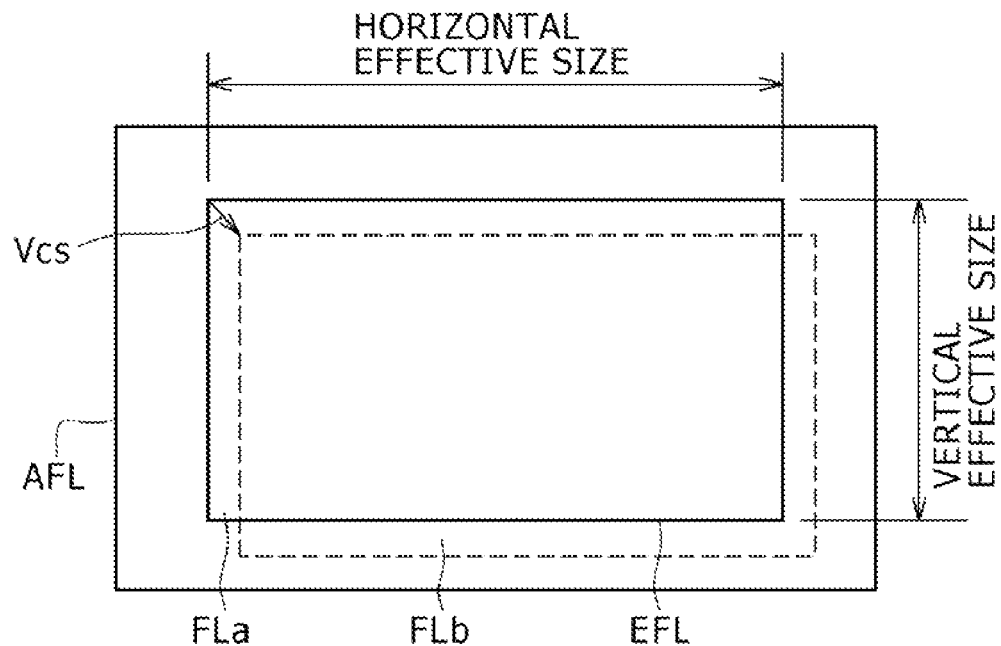
FIG. 2 is an explanatory diagram to be referred to in description of a process to compensate an image for distortion caused by a hand movement.

That is to say, let us assume that electric charge naturally accumulated in an area FLa enclosed by a solid line in FIG. 2 as electric charge representing an image of a photographing object is displaced to an area FLb enclosed by a dotted line due to a hand movement. In this case, a hand movement positional displacement Vcs is detected as a displacement of all pixels of one frame and every read pixel position (or every sampling pixel position) is corrected by a quantity corresponding to the hand movement positional displacement Vcs in order to compensate the image for picked-up-image distortion caused by the hand movement. That is to say, instead of reading out pixel data from every individual read pixel position, pixel data is read out from every position displaced from the individual read pixel position.

It is to be noted that, as shown in FIG. 2, instead of taking every pixel of an imager as an effective pixel, in general, peripheral areas are excluded from an available image area AFL covering all pixels of the imager to leave an area at the center of the available image area AFL as an effective image area EFL having a width referred to as a horizontal-direction effective size and a height referred to as a vertical-direction effective size.

If such a CCD imager is used, it is possible to compensate an image for distortion by correcting every read pixel position by a quantity corresponding to the hand movement positional displacement caused by a hand movement in order to read out pixel data stored in the CCD imager from every position displaced from a present read pixel position provided that the hand movement positional displacement is within a range smaller than a difference between the available image area AFL and the effective image area EFL. Thus, in comparison with a method to generate data required in a hand movement distortion compensation process by adoption of an interpolation technique or the like, deterioration of the image is little.

In the case of an X-Y address solid-state image pickup device such as a CMOS imager, on the other hand, the data of a picked-up image can be read out from the X-Y address solid-state image pickup device in pixel units by specifying an X-direction position and a Y-direction position. In this case, the X and Y directions are respectively the horizontal and vertical directions of the screen. In the X-Y address solid-state image pickup device such as a CMOS imager, however, from a practical point of view, pieces of pixel data are generally read out (or sampled) from the X-Y address solid-state image pickup device in pixel-group units each equivalent to one horizontal line in order to generate the data of a picked-up image.

Figure 3:
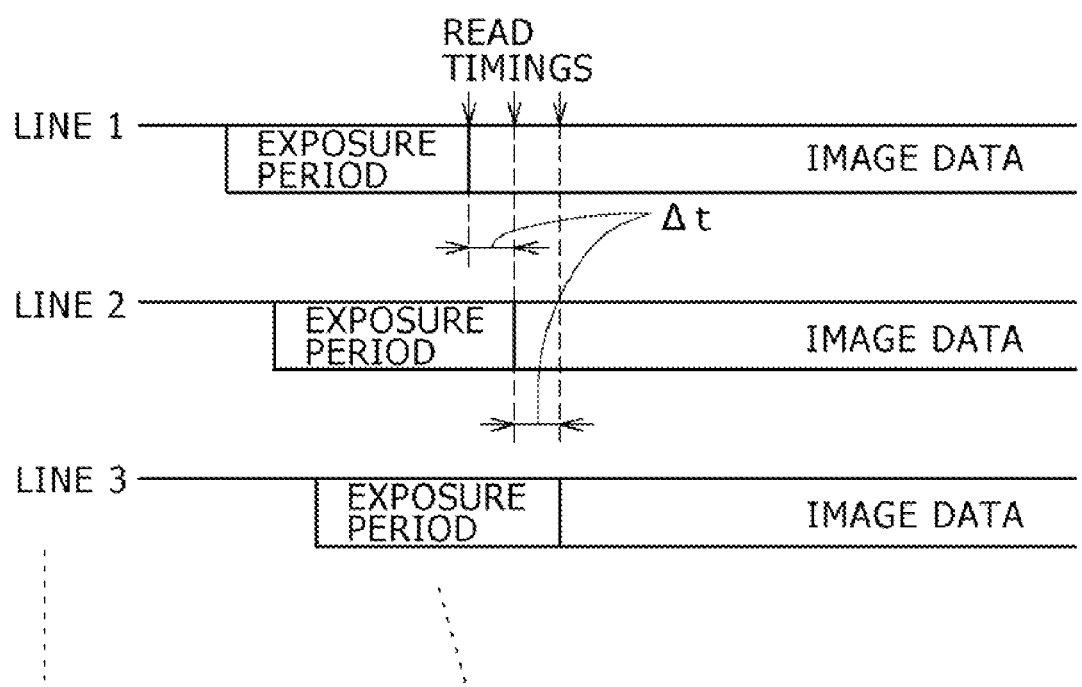
FIG. 3 is an explanatory diagram to be referred to in description of frame image distortion generated by a hand movement in a CMOS imager.

If the data of a picked-up image is read out from the CMOS imager in horizontal line units as described above, as shown in FIG. 3, the exposure period of any specific horizontal line is shifted from the exposure period of a horizontal line immediately preceding the specific horizontal line by a time shift $\Delta t$ corresponding to a difference between a timing to read out image data from the immediately preceding horizontal line and a timing to read out image data from the specific horizontal line. If the data of a picked-up image is read out from the imager in pixel units, a difference between timings to read out data from successive pixels is so small that the difference is ignorable in comparison with the difference between a timing to read out image data from the immediately preceding horizontal line and a timing to read out image data from the specific horizontal line. Even if the data of a picked-up image is read out from the imager in pixel units, however, generation of a similar time shift between exposure periods can be assumed.

Figure 4A:
FIG. 4A is a diagram showing an original image picked up by a CMOS imager without distortion.
Figure 4B:
FIG. 4B is a diagram showing an image picked up by a CMOS imager as a result of shooting from a place inside a running train.

Let us assume for example that a photographing operation is carried out to take an image of an external scene from a position inside a running train by making use of an image pickup apparatus making use of a CMOS imager. In this case, an image like one shown in FIG. 4A should naturally be obtained. Due to a movement of the image pickup apparatus held by the user in the running train, however, an output picked-up image undesirably shows an inclined home and an inclined tree, which should naturally be erected vertically, as shown in FIG. 4B. The appearances of these inclined things shown on the output image taken in the photographing operation are referred to as a focal plane phenomenon peculiar to the CMOS imager.

The typical image displaying inclined objects of photographing as shown in FIG. 4B is obtained as a result of a photographing operation carried out by a photographer while the photographer is moving in the horizontal direction. If a photographing operation is carried out by a photographer while the photographer is moving in the vertical-direction, on the other hand, the image obtained as a result of the photographing operation will show photographing objects contracted or expanded in the vertical direction. However, the image obtained as a result of the photographing operation carried out by the photographer while the photographer is moving in the vertical direction is not shown in the figures.

The focal plane phenomenon peculiar to a CMOS imager occurs because a photographer holding an image pickup apparatus making use of the CMOS imager carries out a photographing operation while the photographer is moving at a high velocity or, conversely speaking, a standstill photographer carries out a photographing operation in order to take an image of a photographing object, which is moving at a high velocity. That is to say, the focal plane phenomenon occurs because a movement is made by the photographer at a high velocity as a movement relative to the object of photographing or a movement is made by the object of photographing at a high velocity as a movement relative to the photographer. In general, however, it can be said that a photographing operation is hardly carried out in such a situation.

When the photographer carries out a photographing operation by holding the image pickup apparatus, however, the hand of the photographer holding the image pickup apparatus may vibrate at a small amplitude but at a high velocity, that is, the hand holding the image pickup apparatus may tremble. In this case, the focal plane phenomenon described above also occurs as well.

Unlike a CCD imager, however, the effect of the hand movement occurring on a CMOS imager cannot be represented by a single value. Instead, due to differences described earlier as differences in sampling time between pixels on the frame or between horizontal lines on the frame, the effect of the hand movement varies from pixel to pixel or from horizontal line to horizontal line so that the effect must be represented by a plurality of values. For this reason, in the case of an image pickup apparatus making use of a CMOS imager, by merely carrying out a compensation process based on a hand movement quantity found for a frame unit, the image cannot be compensated for distortion caused by the focal plane phenomenon. As a result, the distortion is left uncompensated for in the image. By the way, the hand movement affecting a CMOS imager is referred to as a CMOS hand movement.

Figure 4C:
FIG. 4C is a diagram showing a picked-up image shot by an image pickup apparatus employing a CMOS imager experiencing hand movement.

This is because the direction, the quantity and the velocity, which serve as attributes of the hand movement, vary from pixel to pixel or from horizontal line to horizontal line in one frame or one picked-up image. That is to say, the hand movement exhibits non-uniform directions, quantities and velocities in one frame or one picked-up image. FIG. 4C is a diagram showing a image picked up in a photographing operation carried out by making use of an image pickup apparatus employing a CMOS imager experiencing a CMOS hand movement as an image of a photographing object. As shown in the figure, squishy odd distortion is generated in the image.

In order to solve the distortion problem described above, when data of a picked-up image is read out from the CMOS imager in horizontal line units, the embodiment detects a positional displacement caused by a hand movement for every horizontal line and compensates the image for distortion caused by a hand movement by reading out the data of each individual one of the horizontal lines from a location shifted from an incorrect location of the individual horizontal line by the positional displacement detected for the individual horizontal line in a direction opposite to the direction of the hand movement. In the following description, the distortion caused by a hand movement is also referred to as hand-movement distortion.

However, a process to find the quantity of a hand movement for each horizontal line is difficult to carry out due to conditions such as the sampling frequency of a sensor for detecting the quantity of a hand movement. Taking the difficulty of such a process into consideration, the embodiment detects the magnitude of a hand movement with discrete timings separated from each other by a time interval corresponding to a plurality of successive horizontal lines arranged in the vertical direction of the screen. That is to say, the embodiment detects one quantity of a hand movement for every plurality of consecutive horizontal lines. A hand movement quantity detected for a specific horizontal line is also used as a hand movement quantity for each other horizontal line in a range represented by the specific horizontal line. This is because the hand movement quantity for each of the horizontal lines other than the specific horizontal line is not detected directly.

First of all, by referring to FIG. 5, the following description explains an outline of processing carried out in accordance with an embodiment provided by the present application to implement an embodiment compensation method to compensate a picked-up image signal for distortion as processing to compensate a picked-up image for image distortion including a focal plane phenomenon based on a positional change caused by a hand movement or the like as a positional change in an imager.

In the rough explanatory diagram of FIG. 5, an original distortionless image shown in FIG. 5A and a distorted image shown in FIG. 5B are assumed in order to make distortion generated by a CMOS hand movement in the distorted image easy to understand. As shown in FIG. 5A, the original image is assumed to be a lattice stripe pattern consisting of a large number of rectangles. As shown in FIG. 5B, the distortion generated by a CMOS hand movement in the distorted image appears as distortion of the shape of each rectangle in the lattice stripe pattern.

It is to be noted that, also in the case of this embodiment, the CMOS imager has an available image area AFL with a range wider than an effective image area EFL corresponding to one vertical-direction period as shown in FIG. 2. Forming one screen, the effective image area EFL has a width defined by a horizontal-direction effective size and a height defined by a vertical-direction effective size as shown in the same figure. It is also worth noting that FIGS. 5A to 5D each show an image of one screen, which corresponds to the effective image area EFL shown in FIG. 2.

In this embodiment, the speed of a horizontal-direction pixel clock signal is assumed to be sufficiently higher than the velocity of a hand movement. In addition, the data of a picked-up image is read out sequentially in horizontal line units and the image is thus compensated for distortion caused by the hand movement also in horizontal line units.

Also in this embodiment, the picture segment of the effective image area EFL of the CMOS imager is divided in the vertical direction into a plurality of picture divisions Pdiv as shown in FIGS. 5B, 5C and 5D. Image data in every picture division Pdiv is assumed to be displaced by the same distance caused by a hand moving at a velocity. In this case, the number of divisions is so determined that the size of every picture division Pdiv is small enough to give a sufficient necessary effect in the distortion compensation process. In particular, in the case of the embodiment to be described below, the picture segment of the effective image area EFL of the CMOS imager is divided in the vertical direction into eight picture divisions Pdiv_0 to Pdiv_7. That is to say, in this embodiment, the height of every picture division Pdiv is ⅛ of the aforementioned vertical-direction effective size of the effective image area EFL.

Every picture division Pdiv includes a plurality of horizontal lines described above. In this embodiment, the distortion compensation process is carried out on the assumption that image data on every horizontal line pertaining to the same picture division Pdiv is displaced by the same distance caused by a hand moving at a velocity, that is, the hand movement applied to the image data of the picture division Pdiv.

Each arrow shown on the left side of FIG. 5B represents the velocity vector of a hand movement applied to the first horizontal line in one of the eight picture divisions Pdiv_0 to Pdiv_7, which is associated with the arrow. In this embodiment, the hand-movement velocity vector is detected by a hand-movement velocity detection unit configured to detect the vector of the velocity of a hand movement. That is to say, in this embodiment, hand-movement velocity vectors for a picked-up image of one screen are detected at eight discrete locations.

The image shown in FIG. 5B has picked-up-image distortion caused by hand movements represented by the arrows each shown on the left side of the figure to represent a hand-movement velocity vector as hand movements each applied to a picture division Pdiv. In this embodiment, a picked-up-image distortion caused by a hand movement is processed by carrying out distortion compensation processing split into horizontal-direction and vertical-direction image processes in order to compensate the picked-up image for two types of distortion in the horizontal direction and the vertical direction respectively.

As will be described later in detail, in this embodiment, first of all, the horizontal-direction image process of the distortion compensation processing for a distortion is carried out on the horizontal-direction component of the distortion. Then, the vertical-direction image process of the distortion compensation processing for the distortion is carried out on the vertical-direction component of the distortion. In the distortion compensation processing, the vertical-direction distortion compensation process is started as soon as the vertical-direction distortion compensation process can be carried out on the vertical-direction component of distortion even if the horizontal-direction distortion compensation process has not been completed yet for the data of the entire picked-up image of one screen. In this way, the vertical-direction distortion compensation process can be carried out concurrently with the horizontal-direction distortion compensation process in order to perform the distortion compensation processing with a high degree of efficiency.

In this embodiment, first of all, in order to compensate a picked-up image for distortion caused by a hand movement in the horizontal direction, a horizontal-direction distortion compensation process is carried out to find inverted-sign components X_STB_0 to X_STB_7. The inverted-sign component X_STB for a hand-movement velocity vector Vec detected for a picture division Pdiv is a component in a direction opposite to the direction of the horizontal-direction component of the hand-movement velocity vector Vec. In the case of this embodiment, hand-movement velocity vectors Vec_0 to Vec_7 are detected for picture divisions Pdiv_0 to Pdiv_7 respectively, and the inverted-sign components X_STB_0 to X_STB_7 are found for the hand-movement velocity vectors Vec_0 to Vec_7 respectively. The inverted-sign components X_STB_0 to X_STB_7 are shown on the left side of FIGS. 5C and 6. In the following description, the inverted-sign component X_STB in a direction opposite to the direction of the horizontal-direction component of the hand-movement velocity vector Vec is referred to as a horizontal-direction compensation velocity component, which is found in the horizontal-direction distortion compensation process cited above.

The inverted-sign component X_STB (or the horizontal-direction compensation velocity component) found for each picture division Pdiv as described above is cumulatively added with respect to time covering all the horizontal lines of the picture division Pdiv by taking the point of time corresponding to the first horizontal line of the picture division Pdiv as the cumulative addition start in order to compute a compensation quantity used for compensating image data for a hand-movement distance in the horizontal direction for all the horizontal lines. To be more specific, the inverted-sign components X_STB_0 to X_STB_7 found for the picture divisions Pdiv_0 to Pdiv_7 respectively as described above are each cumulatively added with respect to time. On the right side of FIG. 6, a cumulative addition result SX_ADD is shown to represent a quantity for compensating the image for distortion caused by a hand movement in the horizontal direction. In the following description, the quantity for compensating the image for distortion caused by a hand movement in the horizontal direction is referred to simply as a horizontal-direction hand-movement distortion compensation quantity.

As is evident from FIG. 6, in each of the picture divisions Pdiv_0 to Pdiv_7, the horizontal-direction hand-movement distortion compensation quantity SX_ADD representing compensation quantities for all the horizontal lines in the picture division changes at a fixed gradient. In addition, since the horizontal-direction hand-movement distortion compensation quantity SX_ADD is obtained as a result of cumulative addition, the horizontal-direction hand-movement distortion compensation quantity SX_ADD changes smoothly even though the horizontal-direction hand-movement distortion compensation quantity SX_ADD forms a broken curve on the boundary point between any two adjacent picture divisions Pdiv_n and Pdiv_(n+1) where n is an integer at least equal to zero. That is to say, the horizontal-direction hand-movement distortion compensation quantity SX_ADD does not show an abrupt change.

In the horizontal-direction hand-movement distortion compensation process to compensate the data of a picked-up image for distortion, the horizontal-direction hand-movement distortion compensation quantity SX_ADD computed as described above as compensation quantities for all the horizontal lines in a picture division is used for finding the correct horizontal-direction read start position to read out image data for each of the horizontal line from the CMOS imager. That is to say, a position shifted in the horizontal direction by a hand movement applied to a horizontal line as shown in FIG. 5B is taken as the correct horizontal-direction read start position for the horizontal line. Thus, the picked-up image is compensated for the distortion in the horizontal-direction to result in an image shown in FIG. 5C.

The image shown in FIG. 5C is obtained as a result of compensating the image shown in FIG. 5B for image distortion in the horizontal direction. In this image, distortion in the vertical direction has not been compensated for.

Thus, in order to compensate a picked-up image for distortion caused by a hand movement in the vertical direction, a vertical-direction hand-movement distortion compensation process is carried out to find inverted-sign components Y_STB_0 to Y_STB_7. The inverted-sign component Y_STB for a hand-movement velocity vector Vec detected for a picture division Pdiv is a component in a direction opposite to the direction of the vertical-direction component of the hand-movement velocity vector Vec. In the case of this embodiment, hand-movement velocity vectors Vec_0 to Vec_7 are detected for picture divisions Pdiv_0 to Pdiv_7 respectively, and the inverted-sign components Y_STB_0 to Y_STB_7 are found for the hand-movement velocity vectors Vec_0 to Vec_7 respectively. The inverted-sign components Y_STB_0 to Y_STB_7 are shown on the left side of FIG. 5D. In the following description, the inverted-sign component Y_STB in a direction opposite to the direction of the vertical-direction component of the hand-movement velocity vector Vec is referred to as a vertical-direction compensation velocity component, which is found in the vertical-direction hand-movement distortion compensation process cited above.

The inverted-sign component Y_STB (or the vertical-direction compensation velocity component) found for each picture division Pdiv as described above is cumulatively added with respect to time covering all the horizontal lines of the picture division Pdiv by taking the point of time corresponding to the first horizontal line of the picture division Pdiv as the cumulative addition start point in order to compute a compensation quantity used for compensating image data for a hand-movement distance in the vertical-direction for all the horizontal lines. To be more specific, the inverted-sign components Y_STB_0 to Y_STB_7 found for the picture divisions Pdiv_0 to Pdiv_7 respectively as described above are each cumulatively added with respect to time. In the following description, the quantity for compensating the image for distortion caused by a hand movement in the vertical direction is referred to simply as a vertical-direction hand-movement distortion compensation quantity.

In each of the picture divisions Pdiv_0 to Pdiv_7, the vertical-direction hand-movement distortion compensation quantity SY_ADD representing compensation quantities for all the horizontal lines in the picture division changes at a fixed gradient. In addition, since the vertical-direction hand-movement distortion compensation quantity SY_ADD is obtained as a result of cumulative addition, the vertical-direction hand-movement distortion compensation quantity SY_ADD changes smoothly even though the vertical-direction hand-movement distortion compensation quantity SY_ADD forms a broken curve on the boundary point between any two adjacent picture divisions Pdiv_n and Pdiv_(n+1) where n is an integer at least equal to zero. That is to say, the vertical-direction hand-movement distortion compensation quantity SY_ADD does not show an abrupt change.

In the vertical-direction hand-movement distortion compensation process to compensate the data of a picked-up image for distortion, the vertical-direction hand-movement distortion compensation quantity SY_ADD computed as described above as compensation quantities for all the horizontal lines in a picture division is used for finding the correct vertical-direction read start position to read out image data for each of the horizontal line from the CMOS imager. That is to say, a position shifted in the vertical direction by a hand movement applied to a horizontal line as shown in FIG. 5C is taken as the correct vertical-direction read start position for the horizontal line. Thus, the picked-up image is compensated for the distortion in the vertical direction to result in an image shown in FIG. 5D.

It is to be noted that, in the above description, in a process to extract the horizontal-direction and vertical-direction components of a hand-movement velocity vector, the inverted-sign components of the horizontal-direction and vertical-direction components are each found and used as a compensation velocity component. The sign of a velocity component or the sign of a hand movement distance is inverted to give a compensation velocity component or a hand-movement distortion compensation distance because the process to generate the compensation velocity component or the hand-movement distortion compensation distance can be carried out at any point of time as long as the point of time precedes the execution of the process to compensate the data of the picked-up image for the effect of a hand movement.

The following description explains a process to compensate an image for picked-up-image distortion caused by the distortion characteristic of an image pickup lens.

As described above, in general, an image pickup lens has a distortion characteristic. Thus, when an image of a photographing object having a lattice stripe pattern like one shown in FIG. 58A is taken in a photographing operation by using an image pickup apparatus employing an image pickup lens with a much-distortion characteristic, the horizontal-direction and vertical-direction straight lines composing the lattice stripe pattern of the image are bent due to distortion generated in the image as shown in FIG. 58B. The image distortion caused by the image pickup lens depends on the position of every pixel in the imager and is peculiar to the image pickup lens, varying from lens to lens. In addition, the image distortion caused by the image pickup lens also depends on the position of the lens. That is to say, when the position of the image pickup lens is changed, the image distortion caused by the image pickup lens also varies in accordance with the change in position.

Thus, in the case of an image pickup apparatus employing an X-Y address imager such as the CMOS imager, by merely compensating the image for distortion caused by a hand movement, distortion caused by the distortion characteristic of an image pickup lens employed in the image pickup apparatus is left in the image.

In order to solve this problem, in accordance with the embodiment, an image pickup apparatus employing an X-Y address imager reduces the distortion caused by the distortion characteristic of an image pickup lens as well as the distortion caused by a hand movement.

That is to say, in accordance with the embodiment, the image is compensated for both the distortion caused by a hand movement and the distortion caused by the distortion characteristic of an image pickup lens at the same time by:

adding a compensation quantity for distortion caused by the distortion characteristic of an image pickup lens to a horizontal-direction hand-movement distortion compensation quantity and a vertical-direction hand-movement distortion compensation quantity to give a total compensation quantity; and making use of the total compensation quantity to compensate the data of the imager-created image for the two types of distortion.

By the way, in the following description, the distortion caused by the distortion characteristic of an image pickup lens is referred to simply as lens distortion.

In accordance with the splitting of the hand-movement distortion compensation processing into a horizontal-direction image process and a vertical-direction image process as described earlier, in this embodiment, the lens distortion compensation processing is also divided into a horizontal-direction image process and a vertical-direction image process. As also explained before, the lens distortion is distortion peculiar to the image pickup lens. Thus, the compensation quantity of the lens distortion can be provided in advance for every pixel in the imager.

In the case of this embodiment, the compensation quantity provided in advance for every pixel in the imager as a quantity for compensating the image for the lens distortion is encoded into a compensation vector for the position of the pixel. The compensation vector is then supplied to a compensation quantity decoding unit employed in the image pickup apparatus. The compensation quantity decoding unit receives the coordinates of each pixel position from a processing unit as arguments and identifies a compensation vector at the position of each pixel for the processing unit. Then, the compensation quantity decoding unit decodes the compensation vector in order to produce horizontal-direction and vertical-direction compensation components of the compensation quantity provided for the position of the pixel as the compensation quantity of the lens distortion. The coordinates of each pixel position are absolute coordinates the pixel position on the imager.

Then, the pixel data on every horizontal line of the picked-up image to be read out from the imager is compensated for the distortion caused by the hand movement by shifting the coordinate position of the pixel data in the horizontal direction by the horizontal-direction hand-movement distortion compensation quantity SX_ADD found as described above as a result of cumulatively adding the horizontal-direction component of the hand-movement velocity. The pixel data on every horizontal line of the picked-up image on the imager is also compensated for the lens distortion occurring at the shifted coordinate position (or the shifted pixel position) by further shifting the shifted coordinate position of the pixel data in the horizontal direction by the horizontal-direction compensation component of the compensation quantity of the lens distortion occurring at the shifted coordinate position. That is to say, the data of a pixel on the imager is to be eventually read out from a coordinate position obtained as a result of shifting the original coordinate position of the pixel data twice as described above. The horizontal-direction compensation component of the compensation quantity of the lens distortion occurring at the coordinate position shifted by the horizontal-direction hand-movement distortion compensation quantity SX_ADD is acquired from the compensation quantity decoding unit by supplying the shifted coordinate position to the compensation quantity decoding unit as an argument as described above.

By the same token, the pixel data on every horizontal line of the picked-up image to be read out from the imager is compensated for the distortion caused by the hand movement by shifting the coordinate position of the pixel data in the vertical-direction by the vertical-direction hand-movement distortion compensation quantity SY_ADD found as described above as a result of cumulatively adding the vertical-direction component of the hand-movement velocity. The pixel data on every horizontal line of the picked-up image on the imager is also compensated for the lens distortion occurring at the shifted coordinate position (or the shifted pixel position) by further shifting the shifted coordinate position of the pixel data in the vertical-direction by the vertical-direction compensation component of the compensation quantity of the lens distortion occurring at the shifted coordinate position. That is to say, the pixel data on the imager is to be eventually read out from a coordinate position obtained as a result of shifting the original coordinate position of the pixel data twice as described above. The vertical-direction compensation component of the compensation quantity of the lens distortion occurring at the coordinate position shifted by the horizontal-direction hand-movement distortion compensation quantity SY_ADD is acquired from the compensation quantity decoding unit by supplying the shifted coordinate position to the compensation quantity decoding unit as an argument as described above.

It is to be noted that the lens distortion is dependent on the position of the image pickup lens on the optical axis. That is to say, when the position of the image pickup lens on the optical axis is changed in an optical zoom operation, the lens distortion also varies. For this reason, if an optical zoom function is used, a compensation vector depending on the position of the image pickup lens on the optical axis is also supplied to the compensation quantity decoding unit.

In addition, in the image pickup apparatus according to the embodiment, the image processing includes not only the process to compensate the image for distortion caused by a hand movement as described above and the process to compensate the image for lens distortion caused by the distortion characteristic of the image pickup lens as explained above, but also enlargement and shrinking processes carried out by execution of a zoom function and a process to convert the resolution of a picked-up output image into a desired resolution, which is typically specified by the user.

CONFIGURATION OF THE EMBODIMENT

Figure 1:
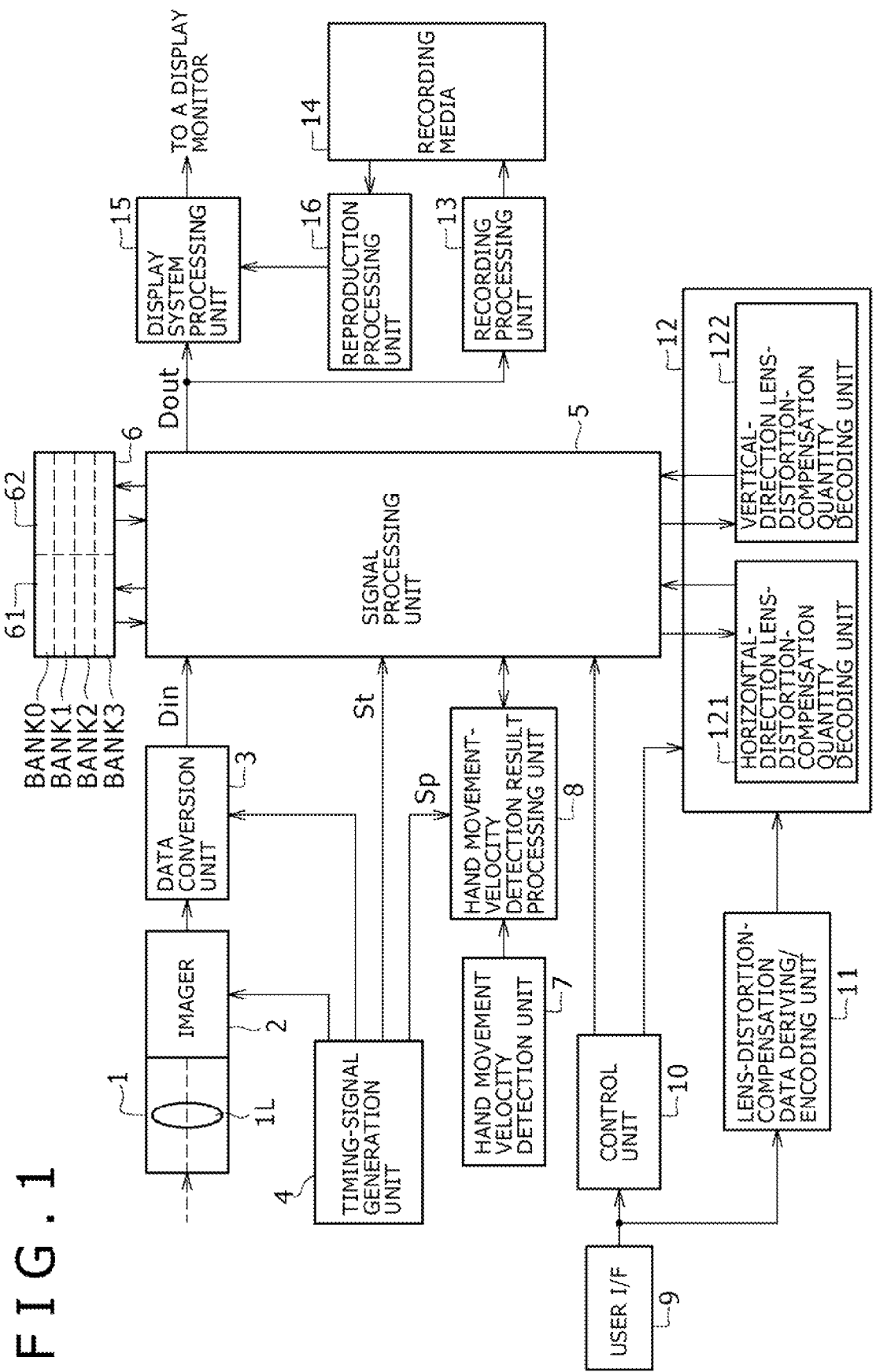
FIG. 1 is a block diagram showing a typical configuration of an embodiment implementing an image-data processing apparatus.

Next, an image-data processing method according to the embodiment and an image-data processing-apparatus adopting the image-data processing method are explained by referring to diagrams as follows. FIG. 1 is a block diagram showing a typical configuration of an embodiment implementing the image-data processing apparatus provided by the present application.

As shown in FIG. 1, an incident light beam coming from an object of photographing by way of a camera optical system 1 employing an image pickup lens 1L is radiated to an imager 2 for creating an image from the light beam. In this embodiment, the imager 2 is a CMOS imager, which is a representative of the X-Y address solid-state image pickup device as described before.

One-horizontal line units are each fetched (or sampled) from the imager 2 in synchronization with a timing signal generated by a timing-signal generation unit 4 and output as an analog picked-up image signal, which is then supplied to a data conversion unit 3.

The data conversion unit 3 carries out a necessary compensation process on the analog picked-up image signal received from the imager 2 and, then, converts the analog picked-up image signal into a digital picked-up image signal synchronously with a clock signal generated by the timing-signal generation unit 4. Subsequently, the data conversion unit 3 converts the digital picked-up image signal into picked-up image data Din and supplies the picked-up image data Din to a signal processing unit 5. The picked-up image data Din includes a luminance signal component and color-difference signal components.

The signal processing unit 5 carries out distortion compensation processing and electronic zoom processing while controlling operations to store the picked-up image data Din received from the data conversion unit 3 into an image memory 6 connected to the signal processing unit 5 and read out the input picked-up image data Din from the image memory 6. In addition, the signal processing unit 5 generates output picked-up image data Dout as an output having a specified resolution. The distortion compensation processing is processing to compensate the input picked-up image data Din for distortion caused by a hand movement and distortion caused by the distortion characteristic of an image pickup lens. The electronic zoom processing includes processes to enlarge and shrink the input picked-up image data Din.

The image memory 6 is designed into a single unit physically split into four banks named BANK0, BANK1, BANK2 and BANK3 respectively. In addition, in the case of this embodiment, a memory control unit employed in the signal processing unit 5 executes address management and read/write control so as to allow the image memory 6 to be logically used as 2 memory areas, i.e., a first image memory area 61 and a second image memory area 62. That is to say, the banks named BANK0, BANK1, BANK2 and BANK3 are used by logically dividing the banks into the first image memory area 61 and the second image memory area 62.

Figure 7:
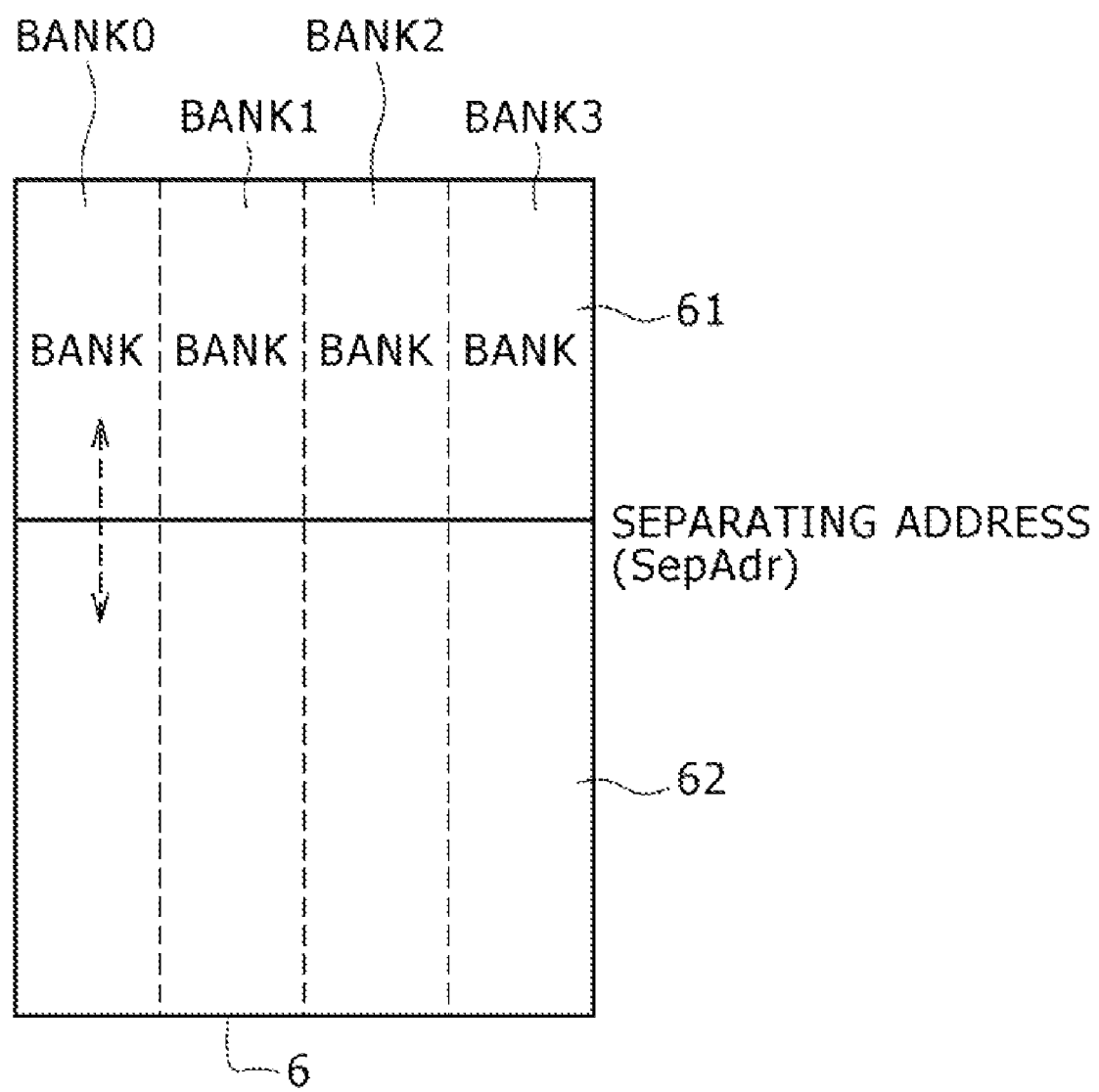
FIG. 7 is an explanatory diagram to be referred to in description of memory areas of an image memory in an embodiment implementing an image-data processing apparatus.

In addition, in this embodiment, SepAdr standing for a separating address serving as the division line between the first image memory area 61 and the second image memory area 62 is common to the banks named BANK0, BANK1, BANK2 and BANK3 as shown in FIG. 7. As will be described later, the separating address SepAdr can be changed in accordance with the image processing being processed.

As will be explained later, a control unit 10 sets the separating address SepAdr and supplies the separating address SepAdr to the signal processing unit 5. The control unit 10 receives an input selecting an output resolution, an input specifying an electronic zoom rate, an input indicating whether or not a hand-movement distortion compensation process is required and an input indicating whether or not a lens distortion compensation process is required. The user enters these inputs to the control unit 10 via a user interface 9. The control unit 10 sets the separating address SepAdr on the basis of information on the inputs received from the user interface 9. A method adopted by the control unit 10 to set the separating address SepAdr will be described later.

As will be described later, in this embodiment, the first image memory area 61 is used for storing picked-up image data obtained as a result of horizontal-direction image processing. Then, as picked-up image data with an amount large enough for starting vertical-direction image processing has been stored in the first image memory area 61, the picked-up image data is read out from the first image memory area 61, starting with the beginning of the data. The picked-up image data read out from the first image memory area 61 is subjected to the vertical-direction image processing in order to produce a result, which is then stored in the second image memory area 62.

In addition, in this embodiment, image data is read out from the image memory 6 in units each consisting of a plurality of pixels and stored in the image memory 6 in same units. The number of pixels composing the read/write unit is desirably 1/N times the number of effective pixels on one horizontal line where N is a positive integer at least equal to 2. In this embodiment, the number of pixels composing the read/write unit is eight. That is to say, in this embodiment, image data is read out from and stored into the image memory 6 in eight-pixel units.

In addition, as will be described later, image data is stored in the four banks BANK0, BANK1, BANK2 and BANK3 of the first image memory area 61 or the second image memory area 62 in aforementioned read/write units by switching the write operation from one bank to another for each logical unit having a length determined in advance. That is to say, image data is stored in the four banks by switching the write operation sequentially from any specific one of the banks to the next bank upon completion of an operation to write a logical unit in the specific bank. For example, the logical unit is the length of one horizontal line. On the other hand, each aforementioned read/write unit of image data is read out from the first image memory area 61 or the second image memory area 62 by making simultaneous accesses to the four banks BANK0, BANK1, BANK2 and BANK3 at the same time.

To put it concretely, for example, after image data of one horizontal line is stored in a first one bank, image data of the next one horizontal line is stored in the next bank following the first bank. After image data of four horizontal lines is stored in the four banks respectively, the write operation goes back to the first bank to repeat the storing of one horizontal line in each of the banks as will be described later by referring to FIG. 24. By carrying out the write operation repeatedly in this way thereafter, image data can be stored in the image memory 6.

On the other hand, image data is typically read out from the image memory 6 as follows. For example, data of two successive horizontal lines is read out from two adjacent banks at the same time or data of four successive horizontal lines is read out from all the four banks at the same time as will be described later by referring to FIG. 25.

The image memory 6 is controlled so that image data is stored in the four banks BANK0, BANK1, BANK2 and BANK3 of the first image memory area 61 or the second image memory area 62 and read out from the banks at the same time on a FIFO (First-In First-Out) operation basis as will be described later. Even though a time delay is introduced inevitably, the data of a picked-up image is processed in a real-time manner. In this case, the banks BANK0, BANK1, BANK2 and BANK3 of the first image memory area 61 are used as a ring memory buffer as will be described later in detail by referring to FIG. 24. By the same token, the banks BANK0, BANK1, BANK2 and BANK3 of the second image memory area 62 are also used as a ring memory buffer as well.

The storage capacity of the first image memory area 61 (or the total storage capacity of the four banks of the first image memory area 61) will be sufficient if the storage capacity is set at the sum of a capacity large enough for starting the vertical-direction image processing and a margin determined in advance. Thus, the storage capacity of the first image memory area 61 can be a value not exceeding the capacity for accommodating image data of one screen (that is, one field or one frame). In the case of this embodiment, however, the storage capacity of the first image memory area 61 (or the total storage capacity of the four banks of the first image memory area 61) needs to be set at a value corresponding to at least several image horizontal lines according to the number of taps of a digital filter for vertical-direction resolution conversion.

On the other hand, the storage capacity of the second image memory area 62 (or the total storage capacity of the four banks of the second image memory area 62) of this embodiment is required to be large enough for storing one screen (that is, one field or one frame) of the output image data Dout. That is to say, the storage capacity of the second image memory area 62 needs to be set at a value at least equivalent to one screen of the output image data Dout.

Since the storage capacity of the first image memory area 61 (or the total storage capacity of the four banks of the first image memory area 61) is dependent on the amount of data obtained as a result of the horizontal-direction image processing whereas the storage capacity of the second image memory area 62 (or the total storage capacity of the four banks of the second image memory area 62) is dependent on the amount of the output image data Dout, however, it is not necessary to change the storage capacity of the first image memory area 61 even if the number of pixels in the imager 2 is changed. Nevertheless, the storage capacity of the entire image memory 6 is determined by assuming a case for the highest possible resolution among selectable resolutions. Image processing making use of the image memory 6 will be described later in detail.

In addition, as will be described later, a memory control unit employed in the signal processing unit 5 executes control of addresses in the first image memory area 61 and the second image memory area 62 for each of the banks BANK0, BANK1, BANK2 and BANK3 so that an operation to store image data into a bank does not surpass an operation to read out image data previously stored in the bank.

It is to be noted that a later detailed description will explain a method for making an access to the image memory 6 in an operation to store image data into the image memory 6 and/or an operation read out image data from the image memory 6.

The signal processing unit 5 receives processing timing signals from the timing-signal generation unit 4. The processing timing signals include a horizontal-direction synchronization signal H-SYNC, a vertical-direction synchronization signal V-SYNC, a single-pixel clock signal CLK and a clock signal. The horizontal-direction synchronization signal H-SYNC is a signal synchronized to the horizontal-direction periods of the output image data. On the other hand, the vertical-direction synchronization signal V-SYNC is a signal synchronized to the vertical-direction periods of the output image data. The clock signal is a signal synchronized to the horizontal-direction synchronization signal H-SYNC, the vertical-direction synchronization signal V-SYNC and the single-pixel clock signal CLK. It is to be noted that these signals are not shown in FIG. 1.

The image pickup apparatus also employs a hand-movement velocity detection unit 7 for detecting the velocity of a hand movement made by a photographer holding the image pickup apparatus in a photographing operation. To be more specific, the hand-movement velocity detection unit 7 is a section for detecting a velocity vector representing the velocity of the hand movement defined as a positional change, which is made by the imager 2 at a relatively high velocity at least equal to a value determined in advance in the horizontal and/or vertical directions of a taken image created on the imager 2. The positional change detected as a hand movement must be made by the imager 2 at a relatively high velocity at least equal to a value determined in advance because movements in panning and tilting operations carried out by the photographer are not to be detected as hand movements. The panning operation is an operation to move the image pickup apparatus in the left and right directions whereas the tilting operation is an operation to move the image pickup apparatus in the up and down directions.

The hand-movement velocity detection unit 7 is typically an angular velocity sensor provided for example on the case of the image pickup apparatus. As is evident from the above description, a detection result output by the hand-movement velocity detection unit 7 is a hand-movement velocity vector. In place of an angular velocity sensor, an acceleration sensor can also be employed as a substitute for the hand-movement velocity detection unit 7. If an acceleration sensor is employed as a substitute for the hand-movement velocity detection unit 7, a hand-movement velocity vector representing the velocity of a hand movement can be found by cumulatively adding a value output by the acceleration sensor. Since the value output by the acceleration sensor consists of a magnitude and a direction, the resulting hand-movement velocity vector also consists of a magnitude and a direction as well.

The detection result of the hand-movement velocity detection unit 7 is supplied to a hand-movement-velocity detection result processing unit 8. The hand-movement-velocity detection result processing unit 8 also receives a sampling signal Sp from the timing-signal generation unit 4. On the basis of the sampling signal Sp, the hand-movement-velocity detection result processing unit eight samples a signal representing the hand-movement velocity vector received as a result of detection from the hand-movement-velocity detection unit 7 in order to find eight hand-movement velocity vectors Vec_0 to Vec_7 for respectively the eight picture divisions Pdiv_0 to Pdiv_7 described earlier.

To put it in detail, the hand-movement-velocity detection result processing unit 8 splits each of the eight hand-movement velocity vectors Vec_0 to Vec_7 into horizontal-direction and vertical-direction components and generates inverted-sign quantities of the horizontal-direction and vertical-direction components of each individual one of the vectors as a horizontal-direction compensation velocity component and a vertical-direction compensation velocity component for the individual vector. Then, the hand-movement-velocity detection result processing unit 8 supplies the horizontal-direction compensation velocity component and the vertical-direction compensation velocity component to the signal processing unit 5.

In addition, the image pickup apparatus also has the control unit 10 with a configuration including a microcomputer for controlling other units employed in the apparatus. The control unit 10 is connected to the user interface 9. The user enters inputs to the control unit 10 via the user interface 9. The inputs entered by the user include a command for enlarging/shrinking an image, a command specifying a resolution of an output image and a command specifying a zoom magnification. The control unit 10 generates control signals according to the input commands and supplies the control signals to the timing-signal generation unit 4 and the signal processing unit 5.

In addition, in this embodiment, the control unit 10 sets the separating address SepAdr serving as a division point address between the first image memory area 61 and the second image memory area 62, which are included in the image memory 6, in accordance with an input entered by the user via the user interface 9 as an input concerning the image processing described earlier. Then, the control unit 10 supplies information on SepAdr to the signal processing unit 5. On the basis of the separating address SepAdr, the signal processing unit 5 recognizes the first image memory area 61 and the second image memory area 62 and is thus capable of carrying out operations to correctly store image data into the first image memory area 61 and the second image memory area 62 and correctly read out image data from the first image memory area 61 and the second image memory area 62.

In addition, the image pickup apparatus also has a lens-distortion-compensation data deriving/encoding unit 11 for computing a lens-distortion compensation vector in advance as a vector dependent on the position of a pixel on the imager 2 for every pixel on the imager 2 on the basis of various kinds of information, which includes data entered by the user via the user interface 9 as data related to the distortion characteristic of the image pickup lens 1L and information received from the control unit 10. Being dependent on information on the optical zoom operation, the information received from the control unit 10 is information on the optical position of the image pickup lens 1L. The lens-distortion-compensation data deriving/encoding unit 11 encodes the received information in order to generate a lens-distortion compensation vector. Then, the lens-distortion-compensation data deriving/encoding unit 11 carries out processing including a process to compress the vector and supplies the result of the encoding to a lens-distortion-compensation data decoding unit 12.

Required to be capable of carrying out processing of a very heavy load, the lens-distortion-compensation data deriving/encoding unit 11 is configured to typically include a special-purpose microcomputer and/or a DSP (Digital Signal Processor).

The lens-distortion-compensation data decoding unit 12 employs a horizontal-direction lens-distortion-compensation quantity decoding unit 121 and a vertical-direction lens-distortion-compensation quantity decoding unit 122. The horizontal-direction lens-distortion-compensation quantity decoding unit 121 is a section for generating a horizontal-direction lens-distortion compensation quantity from a lens-distortion compensation vector received from the lens-distortion-compensation data deriving/encoding unit 11. On the other hand, the vertical-direction lens-distortion-compensation quantity decoding unit 122 is a section for generating a vertical-direction lens-distortion compensation quantity from a lens-distortion compensation vector received from the lens-distortion-compensation data deriving/encoding unit 11.

The horizontal-direction lens-distortion-compensation quantity decoding unit 121 receives an argument, which is information on a pixel position serving as a member to be subjected to a distortion compensation process, from the signal processing unit 5 and supplies a horizontal-direction lens-distortion compensation quantity for the pixel position to the signal processing unit 5 as a return value. By the same token, the vertical-direction lens-distortion-compensation quantity decoding unit 122 receives an argument, which is information on a pixel position serving as a member to be subjected to a distortion compensation process, from the signal processing unit 5 and supplies a vertical-direction lens-distortion compensation quantity for the pixel position to the signal processing unit 5 as a return value.

While executing control of operations to store image data into the image memory 6 and read out image data from the image memory 6, the signal processing unit 5 computes the horizontal-direction hand-movement distortion compensation quantity SX_ADD and the vertical-direction hand-movement distortion compensation quantity SY_ADD for each horizontal line from the horizontal-direction compensation velocity component and the vertical-direction compensation velocity component, which are received from the hand-movement-velocity detection result processing unit 8, as will be described later in detail.

Then, the signal processing unit 5 makes use of the computed horizontal-direction compensation quantities SX_ADD, the computed vertical-direction compensation quantities SY_ADD, the horizontal-direction lens-distortion compensation quantities received from the lens-distortion-compensation data decoding unit 12 and the vertical-direction lens-distortion compensation quantities also received from the lens-distortion-compensation data decoding unit 12 in processing to compensate the picked-up image data Din received from the data conversion unit 3 for image distortion caused by a hand movement and lens distortion in order to generate output image data Dout.

It is to be noted that, as described earlier, in addition to the processing to compensate the picked-up image data Din for image distortion caused by a hand movement and lens distortion, the signal processing unit 5 also carries out electronic zoom processing to enlarge or shrink the picked-up image and resolution conversion processing to generate different high-definition degrees such as a standard degree of high definition and an enhanced degree of high definition.

The output image data Dout generated by the signal processing unit 5 is supplied to a recording processing unit 13 for carrying out typically a data compression process on the output image data Dout and a modulation process suitable for an operation to record the compressed data onto recording media 14. Then, after the recording processing unit 13 carries out the modulation process on the compressed data, the recording processing unit 13 records the modulated data onto the recording media 14. The recording media 14 can be a magnetic recording medium (such as a magnetic tape or a magnetic disc), an optical disc recording medium (such as a DVD (Digital Versatile Disc)), a hard disc or a card memory to mention a few. It is to be noted that the output image data Dout generated by the signal processing unit 5 can also be recorded onto the recording media 14 through the Internet or wireless communication means.

In addition, the output image data Dout generated by the signal processing unit 5 is also supplied to a display monitor by way of the display system processing unit 15. An example of the display monitor is an LCD (Liquid Crystal Display) unit used for displaying an image based on the output image data Dout. Data recorded on the recording media 14 as the data of a picked-up image is reproduced by a reproduction processing unit 16 and supplied to the display monitor by way of the display system processing unit 15. In this case, the display monitor displays an image based on the data reproduced from the recording media 14.

Figure 8:
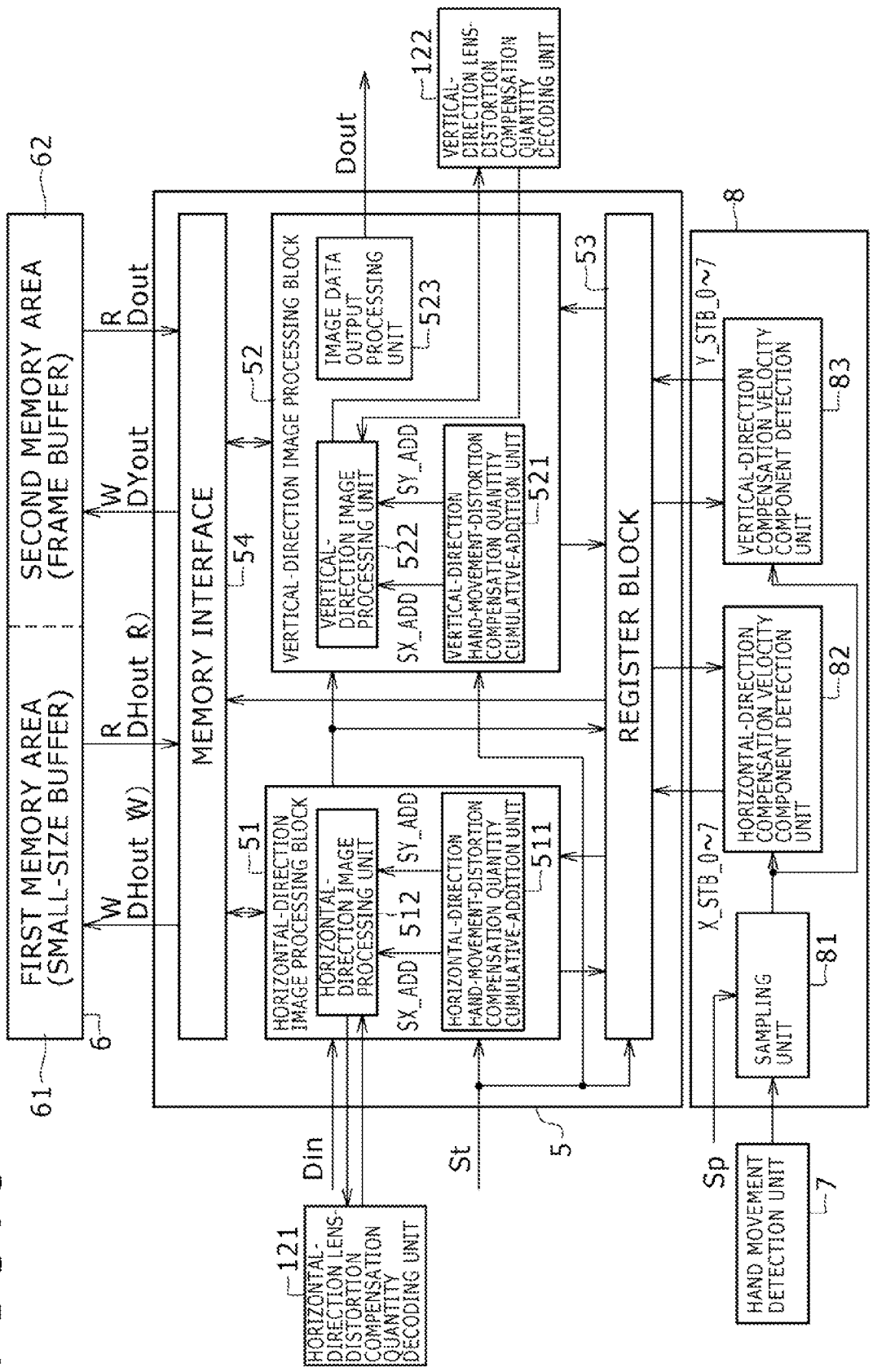
FIG. 8 is a block diagram showing a detailed typical configuration of a portion of the image-data processing apparatus shown in FIG. 1.

By referring to FIG. 8, the following description explains the signal processing unit 5, the image memory 6 and the hand-movement-velocity detection result processing unit 8, which are employed in the image pickup apparatus as shown in FIG. 1, in more detail.

In order to carry out the processing to compensate an image for distortion caused by a hand movement and lens distortion, as shown in FIG. 8, the electronic zoom processing, the resolution conversion processing and the processing to generate the output image data Dout, the signal processing unit 5 is provided with a horizontal-direction image processing block 51, a vertical-direction image processing block 52, a register block 53 and a memory interface 54 having functions of a memory control unit. The horizontal-direction image processing block 51 employs a horizontal-direction hand-movement-distortion compensation quantity cumulative-addition unit 511 and a horizontal-direction image processing unit 512. By the same token, the vertical-direction image processing block 52 employs a vertical-direction hand-movement-distortion compensation quantity cumulative-addition unit 521 and a vertical-direction image processing unit 522.

The horizontal-direction image processing unit 512 is connected to a horizontal-direction lens-distortion-compensation quantity decoding unit 121 whereas the vertical-direction image processing unit 522 is connected to a vertical-direction lens-distortion-compensation quantity decoding unit 122.

The horizontal-direction image processing block 51 is a section for carrying out horizontal-direction image processing on the picked-up image data Din received from the data conversion unit 3. The horizontal-direction image processing includes a horizontal-direction hand-movement distortion compensation process, a horizontal-direction lens-distortion compensation process, a horizontal-direction image enlargement/shrinking process and a horizontal-direction resolution compensation process.

On the other hand, the vertical-direction image processing block 52 is a section for carrying out vertical-direction image processing on the picked-up image data Din received from the data conversion unit 3. The vertical-direction image processing includes a vertical-direction hand-movement distortion compensation process, a vertical-direction lens-distortion compensation process, a vertical-direction image enlargement/shrinking process and a vertical-direction resolution compensation process.

The register block 53 is a section for carrying out processing to pass information on a hand-movement velocity detected by the hand-movement-velocity detection result processing unit 8 to the horizontal-direction image processing block 51 and the vertical-direction image processing block 52. In addition, the register block 53 also carries out processing to pass on a separating address SepAdr of the image memory 6 to the memory interface 54.

The hand-movement-velocity detection result processing unit 8 employs a sampling unit 81, a horizontal-direction compensation velocity-component detection unit 82 and a vertical-direction compensation velocity-component detection unit 83.

Figure 9:
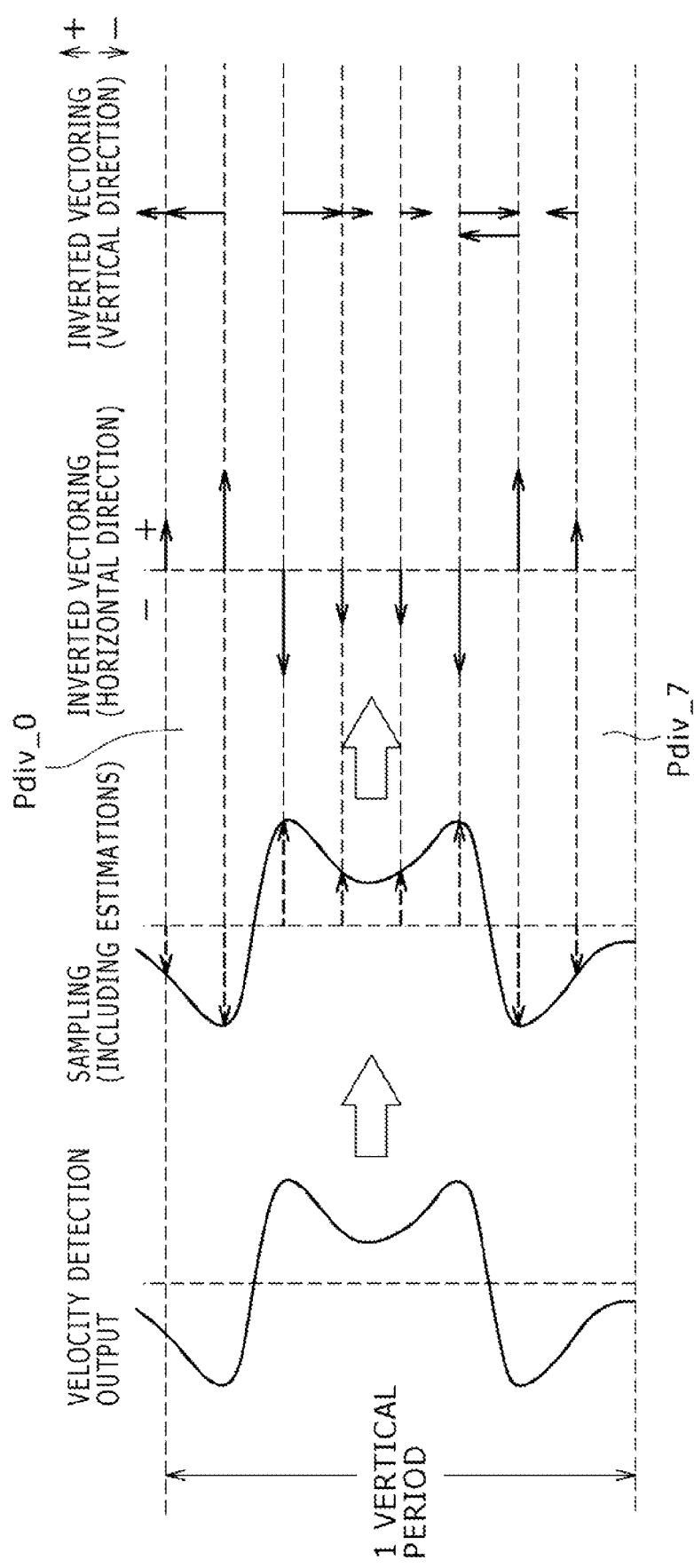
FIG. 9A is an explanatory diagram showing the waveform of a signal representing a hand-movement-velocity detection output in an embodiment implementing an image-data processing apparatus.
FIG. 9B is an explanatory diagram to be referred to in description of a process to sample the signal shown in FIG. 9A.
FIG. 9C is an explanatory diagram showing inverted-sign horizontal-direction vectors representing effects of a hand movement.
FIG. 9D is an explanatory diagram showing inverted-sign vertical-direction vectors representing effects of a hand movement.

The sampling unit 81 is a section for sampling a signal shown in FIG. 9A as a signal representing a hand-movement-velocity detection result output generated by the hand-movement-velocity detection unit 7 with sampling timings according to a sampling signal Sp generated by the timing-signal generation unit 4 in order to generate hand-movement velocity vectors Vec_0 to Vec_7 shown in FIG. 9B for the picture divisions Pdiv_0 to Pdiv_7 respectively. To put it in detail, in the case of this embodiment, as described earlier, the sampling unit 81 samples the hand-movement-velocity detection result output at sampling intervals each equal to $1/8$ times the vertical-direction period in order to acquire the hand-movement velocity vectors Vec_0 to Vec_7 for the first horizontal line of each of the picture divisions Pdiv_0 to Pdiv_7 respectively.

In this case, however, the value of the hand-movement velocity vector to be acquired is not the value at the sampling time of a corresponding horizontal line of the data of the picked-up image generated by the imager 2. This is because, as described before, an exposure period is provided for each pixel on the imager 2 and an image taking signal fetched from the imager 2 for a horizontal line as a signal representing the luminance value output by a color filter is an average value computed from values observed for the horizontal line over the exposure period seen by going back from the sampling time.

Figure 10:
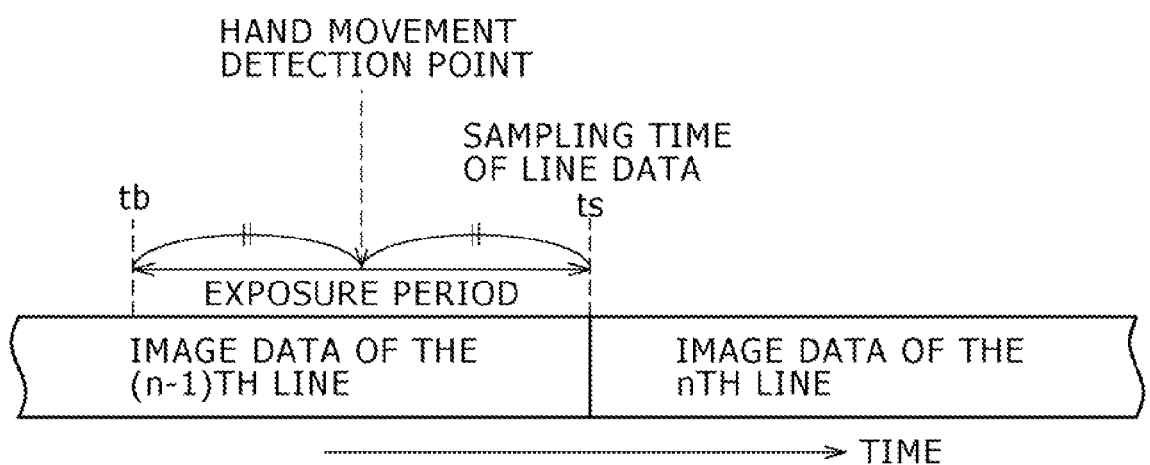
FIG. 10 is an explanatory diagram to be referred to in description of a process to compensate an image for distortion caused by a hand movement in an embodiment implementing an image-data processing apparatus.

In order to solve this problem, in this embodiment, the sampling timing according to the sampling signal Sp is adjusted so that the hand-movement detection point of a horizontal line coincides with the middle point of a period between the point ts to sample image data for the horizontal line and a time tb leading ahead of the sampling point ts by the exposure time as shown in FIG. 10.

If the exposure period is not short, with the timing of the head of image data for a horizontal line, the value of a hand-movement velocity vector can be confirmed. If the exposure period becomes shorter, however, with the timing of the head of image data for a horizontal line, the value of a hand-movement velocity vector can no longer be confirmed in some cases. In such cases, the sampling unit 81 estimates the value of a hand-movement velocity vector by referring to the values of hand-movement velocity vectors sampled in the past.

The eight hand-movement velocity vectors Vec_0 to Vec_7 sampled by the sampling unit 81 for one frame (or one vertical-direction period) are supplied to the horizontal-direction compensation velocity-component detection unit 82 and the vertical-direction compensation velocity-component detection unit 83.

The horizontal-direction compensation velocity-component detection unit 82 extracts horizontal-direction components from the hand-movement velocity vectors Vec_0 to Vec_7 sampled for the picture divisions Pdiv_0 to Pdiv_7 respectively in order to find respectively inverted-sign horizontal-direction compensation velocity components X_STB_0 to X_STB_7 having signs opposite to the signs of their respective horizontal-direction components as shown in FIG. 9C.

On the other hand, the vertical-direction compensation velocity-component detection unit 83 extracts vertical-direction components from the hand-movement velocity vectors Vec_0 to Vec_7 sampled for the picture divisions Pdiv_0 to Pdiv_7 respectively in order to find respectively inverted-sign vertical-direction compensation velocity components Y_STB_0 to Y_STB_7 having signs opposite to the signs of their respective vertical-direction components as shown in FIG. 9D.

The values of the inverted-sign horizontal-direction compensation velocity components X_STB_0 to X_STB_7 and the inverted-sign vertical-direction compensation velocity components Y_STB_0 to Y_STB_7 are each used as a hand-movement distortion compensation quantity per the time length of one horizontal line segment.

That is to say, the inverted-sign horizontal-direction compensation velocity component X_STB, which is the generic reference notation for reference notations X_STB_0 to X_STB_7, can be quantitatively expressed as follows:

X_STB=Horizontal-direction hand-movement distortion compensation quantity/the time length of one horizontal line segment On the other hand, the inverted-sign vertical-direction compensation velocity component Y_STB, which is the generic reference notation for reference notations Y_STB_0 to Y_STB_7, can be quantitatively expressed as follows:

Y_STB=Vertical-direction hand-movement distortion compensation quantity/the time length of one horizontal line segment In addition, the inverted-sign horizontal-direction compensation velocity components X_STB_0 to X_STB_7 are each expressed as a multiple of the horizontal-direction pixel pitch dx, which is the distance between the centers of 2 adjacent pixels arranged in the horizontal direction. The multiple is an integer obtained by discarding the fraction part of a ratio of the inverted-sign horizontal-direction compensation velocity component X_STB to the horizontal-direction pixel pitch dx. In the following description, such a multiple can be interpreted in the same way as the pixel count defined here. In other words, the inverted-sign horizontal-direction compensation velocity component X_STB is expressed by the number of pixels arranged in the horizontal direction. In this case, the number of pixels arranged in the horizontal direction is also an integer obtained by discarding the fraction part of a ratio of the inverted-sign horizontal-direction compensation velocity component X_STB to the horizontal-direction pixel pitch dx. In the following description, such a pixel count representing number of pixels can be interpreted in the same way as the pixel count defined here.

By the same token, the inverted-sign vertical-direction compensation velocity components Y_STB_0 to Y_STB_7 are each expressed as a multiple of the vertical-direction pixel pitch dy, which is the distance between the centers of 2 adjacent pixels arranged in the vertical direction. The multiple is an integer obtained by discarding the fraction part of a ratio of the inverted-sign vertical-direction compensation velocity component Y_STB to the vertical-direction pixel pitch dy. In other words, the inverted-sign vertical-direction compensation velocity component Y_STB is expressed by the number of pixels arranged in the vertical direction. In this case, the number of pixels arranged in the vertical direction is also an integer obtained by discarding the fraction part of a ratio of the inverted-sign vertical-direction compensation velocity component Y_STB to the vertical-direction pixel pitch dy.

The pixel count can be found from the horizontal-direction and vertical-direction components of a hand-movement-velocity detection output received from the sampling unit 81 by making use a table prepared in advance as a table showing relations of the horizontal-direction and vertical-direction components versus pixel counts, which are each an integer obtained by discarding the fraction part of a ratio of the inverted-sign compensation velocity component to the pixel pitch as described above. In the following description, a pixel count shown in such a table can be interpreted in the same way the pixel count defined above. That is to say, for an input hand-movement velocity component, the table is searched for a pixel count corresponding to the input hand-movement velocity component. Then, a sign opposite to the sign of the input hand-movement velocity component is appended to the pixel count to obtain one of the inverted-sign horizontal-direction compensation velocity components X_STB_0 to X_STB_7 and the inverted-sign vertical-direction compensation velocity components Y_STB_0 to Y_STB_7.

In this embodiment, by determining the values of the inverted-sign horizontal-direction compensation velocity components X_STB_0 to X_STB_7 as described above, it is possible to find a line-unit cumulative-addition result called a horizontal-direction hand-movement distortion compensation quantity SX_ADD to be described later by carrying out a simple cumulative addition process on the inverted-sign horizontal-direction compensation velocity components X_STB_0 to X_STB_7. By the same token, by determining the values of the inverted-sign vertical-direction compensation velocity components Y_STB_0 to Y_STB_7 as described above, it is possible to find another line-unit cumulative-addition result called a vertical-direction hand-movement distortion compensation quantity SY_ADD to be described later by carrying out a simple cumulative addition process on the inverted-sign vertical-direction compensation velocity components Y_STB_0 to Y_STB_7.

Then, the inverted-sign horizontal-direction compensation velocity components X_STB_0 to X_STB_7 computed by the horizontal-direction compensation velocity-component detection unit 82 and the inverted-sign vertical-direction compensation velocity components Y_STB_0 to Y_STB_7 computed by the vertical-direction compensation velocity-component detection unit 83 are supplied sequentially to an IF (interface) register included in the register block 53 employed in the signal processing unit 5 with timings according to a timing signal St generated by the timing-signal generation unit 4. It is to be noted that the IF register itself is not shown in FIG. 8.

Subsequently, the inverted-sign horizontal-direction compensation velocity components X_STB_0 to X_STB_7 are sequentially transferred from the IF (interface) register to a horizontal-direction image processing register employed in the register block 53 with processing timings generated for the horizontal-direction image processing block 51 as timings other than the above timings set by the timing signal St. By the same token, the inverted-sign vertical-direction compensation velocity components Y_STB_0 to Y_STB_7 are sequentially transferred from the interface register to a vertical-direction image processing register employed in the register block 53 with processing timings generated for the vertical-direction image processing block 52 as timings other than the above timings set by the timing signal St. It is to be noted that the horizontal-direction image processing register and the vertical-direction image processing register are not shown in FIG. 8.

The horizontal-direction hand-movement distortion compensation quantity cumulative-addition unit 511 employed in the horizontal-direction image processing block 51 carries out an aforementioned process of cumulative addition with respect to time on the inverted-sign horizontal-direction compensation velocity components X_STB_0 to X_STB_7 stored in the horizontal-direction image processing register employed in the register block 53 for the picture divisions Pdiv_0 to Pdiv_7 respectively in order to find a horizontal-direction hand-movement distortion compensation quantity SX_ADD for each horizontal line in the picture divisions Pdiv_0 to Pdiv_7 as shown in FIG. 6. By the same token, the vertical-direction hand-movement-distortion compensation quantity cumulative-addition unit 521 employed in the vertical-direction image processing block 52 carries out the process of cumulative addition with respect to time on the inverted-sign vertical-direction compensation velocity components Y_STB_0 to Y_STB_7 stored in the vertical-direction image processing register employed in the register block 53 for the picture divisions Pdiv_0 to Pdiv_7 respectively in order to find a vertical-direction hand-movement distortion compensation quantity SY_ADD for the picture divisions Pdiv_0 to Pdiv_7.

The horizontal-direction image processing unit 512 employed in the horizontal-direction image processing block 51 carries out a compensation process in order to compensate the image for the distortion caused by a hand movement in the horizontal direction by shifting the x coordinates of the pixel data of each horizontal line in the horizontal direction by the horizontal-direction hand-movement distortion compensation quantity SX_ADD computed by the horizontal-direction hand-movement distortion compensation quantity cumulative-addition unit 511. Considering the fact that the y coordinate of every pixel data is required in compensating the image for the horizontal-direction lens distortion, the horizontal-direction image processing unit 512 also acquires the vertical-direction hand-movement distortion compensation quantity SY_ADD computed by the vertical-direction hand-movement-distortion compensation quantity cumulative-addition unit 521 as a distance by which the y coordinate of the pixel data to be compensated is shifted in the vertical direction in order to compensate the image for the distortion caused by the vertical-direction component of a hand movement.

Then, the horizontal-direction image processing unit 512 supplies the x and y coordinates shifted in the horizontal and vertical directions by distances according to a hand movement as the coordinates of each pixel data to the horizontal-direction lens-distortion-compensation quantity decoding unit 121 as arguments. In return for the shifted x and y coordinates, the horizontal-direction lens-distortion-compensation quantity decoding unit 121 supplies a horizontal-direction lens-distortion compensation quantity for a pixel position indicated by the shifted x and y coordinates. The horizontal-direction lens-distortion compensation quantity is a horizontal-direction coordinate shift distance.

Then, the horizontal-direction image processing unit 512 adds the horizontal-direction lens-distortion compensation quantity received from the horizontal-direction lens-distortion-compensation quantity decoding unit 121 as a horizontal-direction coordinate shift distance to the x coordinate shifted by the horizontal-direction hand-movement distortion compensation quantity SX_ADD in order to further shift the x coordinate by the horizontal-direction lens-distortion compensation quantity. Subsequently, the horizontal-direction image processing unit 512 makes use of the further shifted x coordinate in order to compensate the image for distortion caused by the horizontal-direction component of the hand movement and the horizontal-direction lens distortion.

By the same token, the vertical-direction image processing unit 522 employed in the vertical-direction image processing block 52 carries out a compensation process in order to compensate the image for distortion caused by a hand movement in the vertical direction by shifting the y coordinates of the pixel data of each horizontal line in the vertical direction by the vertical-direction hand-movement distortion compensation quantity SY_ADD computed by the vertical-direction hand-movement-distortion compensation quantity cumulative-addition unit 521. In addition, considering the fact that the x coordinate of every pixel data is required in compensating the image for the vertical-direction lens distortion, the vertical-direction image processing unit 522 also acquires the horizontal-direction hand-movement distortion compensation quantity SX_ADD computed by the horizontal-direction hand-movement distortion compensation quantity cumulative-addition unit 511 as a distance by which the x coordinate of the pixel data to be compensated is shifted in the horizontal direction in order to compensate the image for the distortion caused by the horizontal-direction component of a hand movement.

Then, the vertical-direction image processing unit 522 supplies the x and y coordinates shifted in the horizontal and vertical directions by distances according to a hand movement as the coordinates of each pixel data to the vertical-direction lens-distortion-compensation quantity decoding unit 122 as arguments. In return for the shifted x and y coordinates, the vertical-direction lens-distortion-compensation quantity decoding unit 122 supplies a vertical-direction lens-distortion compensation quantity for a pixel position indicated by the shifted x and y coordinates. The vertical-direction lens-distortion compensation quantity is a vertical-direction coordinate shift distance.

Then, the vertical-direction image processing unit 522 adds the vertical-direction lens-distortion compensation quantity received from the vertical-direction lens-distortion-compensation quantity decoding unit 122 as a vertical-direction coordinate shift distance to the y coordinate shifted by the vertical-direction hand-movement distortion compensation quantity SY_ADD in order to further shift the y coordinate by the vertical-direction lens-distortion compensation quantity. Subsequently, the vertical-direction image processing unit 522 makes use of the further shifted y coordinate in order to compensate the image for distortion caused by the vertical-direction component of the hand movement and the vertical-direction lens distortion.

The horizontal-direction image processing unit 512 employed in the horizontal-direction image processing block 51 and the vertical-direction image processing unit 522 employed in the vertical-direction image processing block 52 carry out the image compensation processing described above while reading out the image data from the image memory 6 and storing the image data into the image memory 6.

In this embodiment, the image memory 6 is logically divided into the first image memory area 61 and the second image memory area 62 on the basis of address management executed by the memory interface 54. The first image memory area 61 is used for storing picked-up image data obtained as a result of the horizontal-direction image processing carried out by the horizontal-direction image processing unit 512 employed in the horizontal-direction image processing block 51.

In this embodiment, the first image memory area 61 has a storage capacity for accommodating image data of at least as many as horizontal lines as taps of a FIR (Finite Impulse Response) filter provided for vertical-direction interpolation processing to be described later. The FIR filter provided for vertical-direction interpolation processing includes a filter for vertical-direction hand-movement distortion compensation processing, a filter for vertical-direction lens distortion compensation processing and a filter for vertical-direction resolution conversion processing.

The storage capacity of the first image memory area 61 changes in accordance with not only the number of taps of the FIR filter provided for vertical-direction interpolation processing, but also the electronic zoom rate, the lens distortion compensation rate and the hand-movement distortion compensation rate.

As image data with an amount sufficient for starting the vertical-direction image processing has been stored in the first image memory area 61, the image data is read out from the first image memory area 61 and subjected to the vertical-direction image processing carried out by the vertical-direction image processing unit 522 employed in the vertical-direction image processing block 52. The result of the vertical-direction image processing is stored in the second image memory area 62. Then, the image data is read out from the second image memory area 62 as output image data Dout.

Thus, the second image memory area 62 is required to have a storage capacity large enough for accommodating output image data Dout of at least one screen (that is, one field or one frame).

The horizontal-direction image processing unit 512 employed in the horizontal-direction image processing block 51 is provided with a horizontal-direction image processing FIFO horizontal-line memory, a FIFO memory controller and a horizontal-direction interpolation processing unit, which are not shown in FIG. 8. As will be described later, the horizontal-direction image processing FIFO horizontal-line memory has a storage capacity for accommodating image data of one horizontal line. The FIFO memory controller is a section for controlling operations to store image data into the horizontal-direction image processing FIFO horizontal-line memory and read out image data from the horizontal-direction image processing FIFO horizontal-line memory. The horizontal-direction interpolation processing unit is a section provided on the assumption that the horizontal-direction hand-movement distortion compensation quantity SX_ADD includes a fraction part in some cases. The fraction part included in the horizontal-direction hand-movement distortion compensation quantity SX_ADD indicates that a post-compensation position computed for a pixel is a position shifted in the horizontal direction from a real pixel position by the fraction part. As will be described later, in this embodiment, the horizontal-direction interpolation processing unit carries out horizontal-direction interpolation processing by making use of a horizontal-direction digital FIR filter, which is referred to hereafter simply as a horizontal-direction FIR filter.

Let us keep in mind that it is also possible to provide a configuration in which the horizontal-direction image processing FIFO horizontal-line memory is provided as a part of the image memory 6 whereas the FIFO memory controller is employed in the memory interface 54.

Then, the memory interface 54 controls an operation to store image data obtained as a result of the horizontal-direction image processing carried out by the horizontal-direction image processing unit 512 into the first image memory area 61 as well as an operation to read out image data from the first image memory area 61 and supply the image data read out from the first image memory area 61 to the vertical-direction image processing unit 522 employed in the vertical-direction image processing block 52. In addition, the memory interface 54 also controls an operation to store image data obtained as a result of the vertical-direction image processing carried out by the vertical-direction image processing unit 522 into the second image memory area 62 as well as an operation to read out image data from the second image memory area 62 as output image data Dout.

Image data read out from the second image memory area 62 is supplied to a image data output unit 523, which is a section for generating the output image data Dout as the output of the signal processing unit 5.

In addition, the vertical-direction image processing unit 522 employed in the vertical-direction image processing block 52 is provided with a vertical-direction interpolation processing unit not shown in FIG. 8. The vertical-direction interpolation processing unit is a section provided on the assumption that the vertical-direction hand-movement distortion compensation quantity SY_ADD includes a fraction part in some cases. The fraction part included in the vertical-direction hand-movement distortion compensation quantity SY_ADD indicates that a post-compensation position computed for a pixel is a position shifted in the vertical direction from a real pixel position by the fraction part. As will be described later, in this embodiment, the vertical-direction interpolation processing unit carries out vertical-direction interpolation processing by making use of a vertical-direction digital FIR filter, which is referred to hereafter simply as a vertical-direction FIR filter. The determination of the tap number of the FIR filter is based on the consideration of the numbers of lines required in compensation for lens distortion and vertical-direction resolution conversion.

The following description explains interpolation processing for a case in which the sum of the computed horizontal-direction hand-movement distortion compensation quantity SX_ADD and the horizontal-direction lens-distortion compensation quantity and/or the sum of the computed vertical-direction hand-movement distortion compensation quantity SY_ADD and/or the vertical-direction lens-distortion compensation quantity each include a fraction part.

Figure 11:
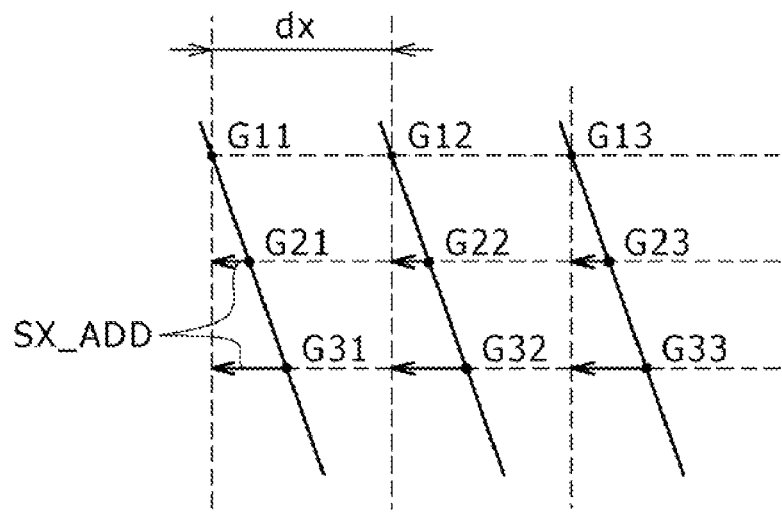
FIG. 11 is an explanatory diagram to be referred to in description of a process to compensate an image for image distortion in an embodiment implementing an image-data processing apparatus.

First of all, hand-movement distortion compensation processing is explained. Let us assume for example a case in which horizontal-direction image distortion like one shown in FIG. 11 is generated due to the horizontal-direction component of the velocity of a hand movement. If there is no hand movement, pixels G11, G21, G31 and so on, G12, G22, G32 and so on as well as G13, G23, G33 and so on of the typical image shown in FIG. 11 should each be located at an intersection of a straight vertical line shown as a dashed line and a horizontal line in the same figure. Due to the horizontal-direction component of the velocity of a hand movement, however, the positions of the pixels are each displaced to an intersection of an inclined line shown as a solid line and a horizontal line in the same figure.

In order to compensate the image for the distortion caused by a hand movement, it is necessary to restore the shifted pixel positions to their original positions. As shown in FIG. 11, the magnitude of a pixel-position shift for a horizontal line is the horizontal-direction hand-movement distortion compensation quantity SX_ADD computed for the horizontal line. If the computed horizontal-direction hand-movement distortion compensation quantity SX_ADD is a multiple of a horizontal-direction pixel pitch dx, in order to compensate the image for the distortion caused by the hand movement, image data read out from a specific position is taken as the image data of a pixel at a position shifted from the specific position by a distance equal to the horizontal-direction hand-movement distortion compensation quantity SX_ADD, which is a multiple of the horizontal-direction pixel pitch dx.

If the computed horizontal-direction hand-movement distortion compensation quantity SX_ADD is not a multiple of the pixel pitch dx, that is, if the computed horizontal-direction hand-movement distortion compensation quantity SX_ADD has a fraction part, however, a pixel does not exist at a position shifted from the specific position by a distance equal to the computed horizontal-direction hand-movement distortion compensation quantity SX_ADD. In this case, the image data of a pixel at an observed position needs to be obtained by carrying out an interpolation technique based on image data of pixels at a plurality of positions each shifted from the observed position by a distance, which is equal to a multiple of the horizontal-direction pixel pitch dx and closest to the computed horizontal-direction hand-movement distortion compensation quantity SX_ADD.

Figure 12:
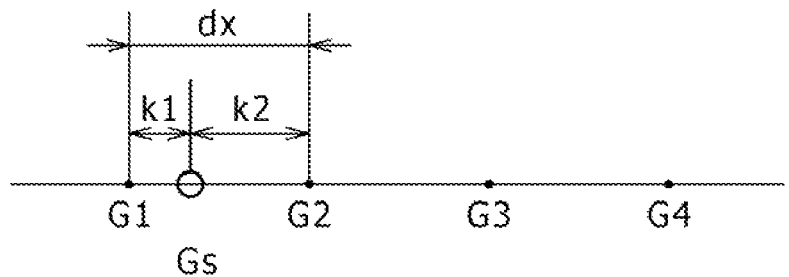
FIG. 12 is an explanatory diagram to be referred to in description of a process to compensate an image for image distortion in an embodiment implementing an image-data processing apparatus.

FIG. 12 is a diagram showing the interpolation technique described above. Let us assume for example that the computed horizontal-direction hand-movement distortion compensation quantity SX_ADD having a fraction part corresponds to a distance from an observed position mentioned above to a non-existing pixel position Gs between specific pixels G1 and G2. In this case, the image data of a pixel at the observed position is obtained by carrying out an interpolation technique based on image data of the pixels G1 and G2 existing at positions each shifted from the observed position by a distance, which is equal to a multiple of the horizontal-direction pixel pitch dx and closest to the computed horizontal-direction hand-movement distortion compensation quantity SX_ADD. Let us assume that the ratio k1:k2 of the distance k1 between G1 and Gs to the distance k2 between Gs and G2 is W: (1−W), that is, k1:k2=W:(1−W). In this case, interpolated image data found in accordance with the following interpolation equation is taken as the image data of the pixel at the observed position:

Interpolated image data at Gs=G1's image data×(W−1)+G2's image data×W

Figure 13:
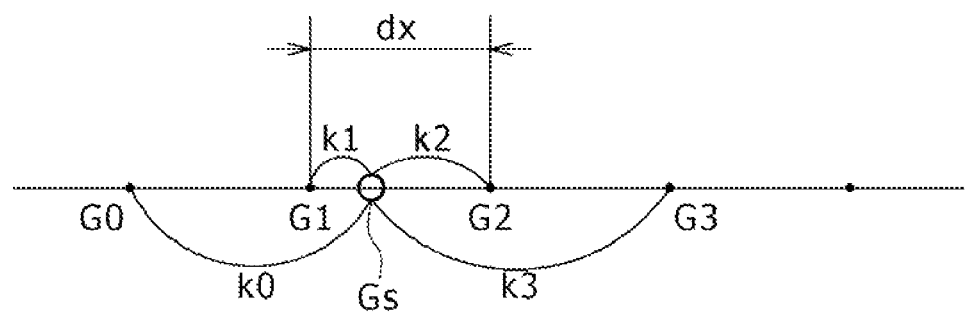
FIG. 13 is an explanatory diagram to be referred to in description of a process to compensate an image for image distortion in an embodiment implementing an image-data processing apparatus.

Instead of making use of pixel data of only 2 pixels G1 and G2 in the interpolation process as is the case with the example shown in FIG. 12, image data of more than 2 pixels can be used. In another example shown in FIG. 13, pixel data of four pixels G0 to G3 is used in the interpolation process. Much like the example shown in FIG. 12, the pixels G0 to G3 exist at positions each shifted from the observed position by a distance, which is equal to a multiple of the horizontal-direction pixel pitch dx and closest to the computed horizontal-direction hand-movement distortion compensation quantity SX_ADD. In this case, interpolation weights W0, W1, W2 and W3 for the pixels G0, G1, G2 and G3 respectively are determined on the basis of distances k0, k1, k2 and k3 from the non-existing pixel position Gs to the positions of the pixels G0, G1, G2 and G3 respectively, and interpolated image data found in accordance with the following interpolation equation is taken as the image data of the pixel at the observed position:

$$\text{Interpolated image data at } Gs = G0 \times W0 + G1 \times W1 + G2 \times W2 + G3 \times W3$$

The interpolation weights W0, W1, W2 and W3 for the pixels G0, G1, G2 and G3 respectively are typically found from an interpolation-weight table having entries each showing a set of aforementioned interpolation weights W0, W1, W2 and W3. Then, by making use of a distance ds from the non-existing pixel position Gs to the position of the pixel G1 or G2 as a search key, the interpolation-weight table is searched for an entry showing a set of aforementioned interpolation weights W0, W1, W2 and W3 corresponding to the search key. It is to be noted that, as is evident from FIG. 13, the distance ds from the non-existing pixel position Gs to the position of the pixel G1 or G2 corresponds to the fraction part of the computed horizontal-direction hand-movement distortion compensation quantity SX_ADD.

In this embodiment, the interpolation process is carried out by making use of a horizontal-direction FIR filter. That is to say, the interpolation-weight table described above is searched for a set of interpolation weights corresponding to the fraction part of a computed horizontal-direction hand-movement distortion compensation quantity SX_ADD. Then, the interpolation weights are supplied to the horizontal-direction FIR filter in order carry out the interpolation process.

A vertical-direction interpolation process is the same as the horizontal-direction image process described above except that the horizontal direction taken in the horizontal-direction image process as the interpolation direction is replaced by the vertical direction in the vertical-direction interpolation process.

In this embodiment, the vertical-direction interpolation process and the horizontal-direction image process, which are described above, are carried out as they are only if lens distortion is not generated at all. If lens distortion is generated, however, this embodiment adds a compensation quantity for compensating the image for hand-movement distortion to a compensation quantity for compensating the image for lens distortion to produce a sum used for finding a compensated position of a pixel whose data is assigned to a pixel at a pre-compensation position. The computed sum may include a fraction part in some cases. In such cases, as a basic concept, an interpolation process is carried out in exactly the same way as the interpolation processes explained above by referring to FIGS. 12 and 13.

By referring to FIG. 14, the following description explains an interpolation process carried out for a case in which the image distortion includes lens distortion. It is to be noted that, in a typical case shown in FIG. 14, 16 (=4×4) pieces of pixel data are located at positions on four vertically oriented columns arranged in the x direction and four horizontally oriented rows arranged in the y direction. Then, pixel data of an output image is determined by making use of the 16 pieces of pixel data. It is to be noted that a method for carrying out an interpolation process as part of processing to compensate an image for lens distortion is explained in detail in Japanese Patent Laid-open No. 2004-80545. Thus, the following description explains only essentials of the method. For detailed information on the method, the reader is suggested to refer to the document.

Figure 14A:
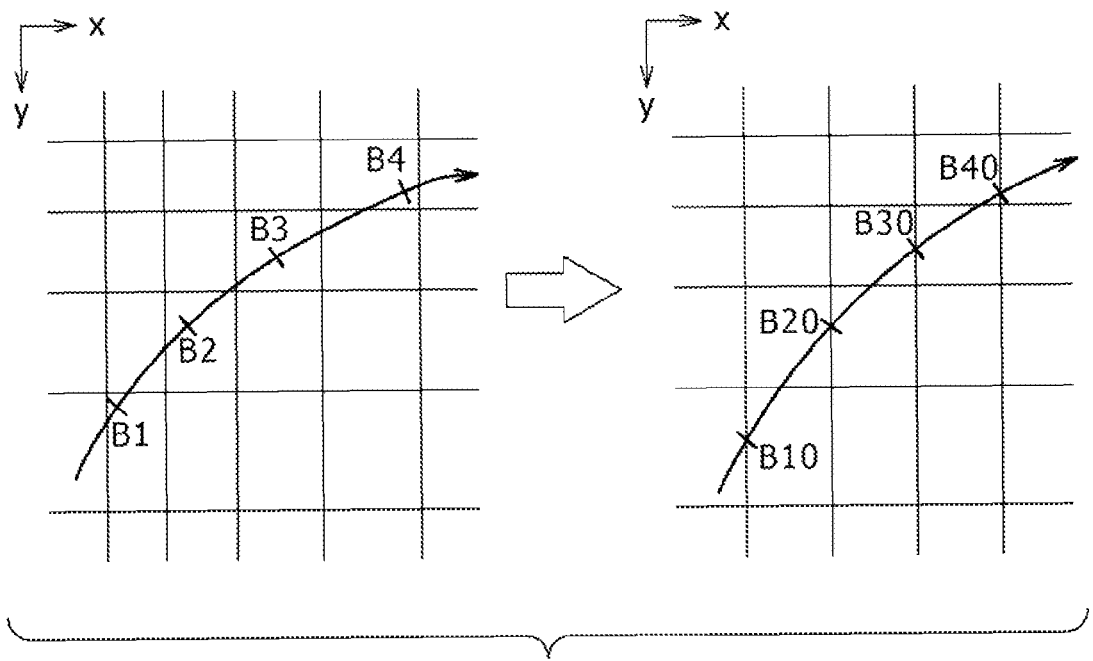
FIG. 14A is an explanatory diagram to be referred to in description of a process to compensate an image for image distortion in the x direction in an embodiment implementing an image-data processing apparatus.
Figure 14B:
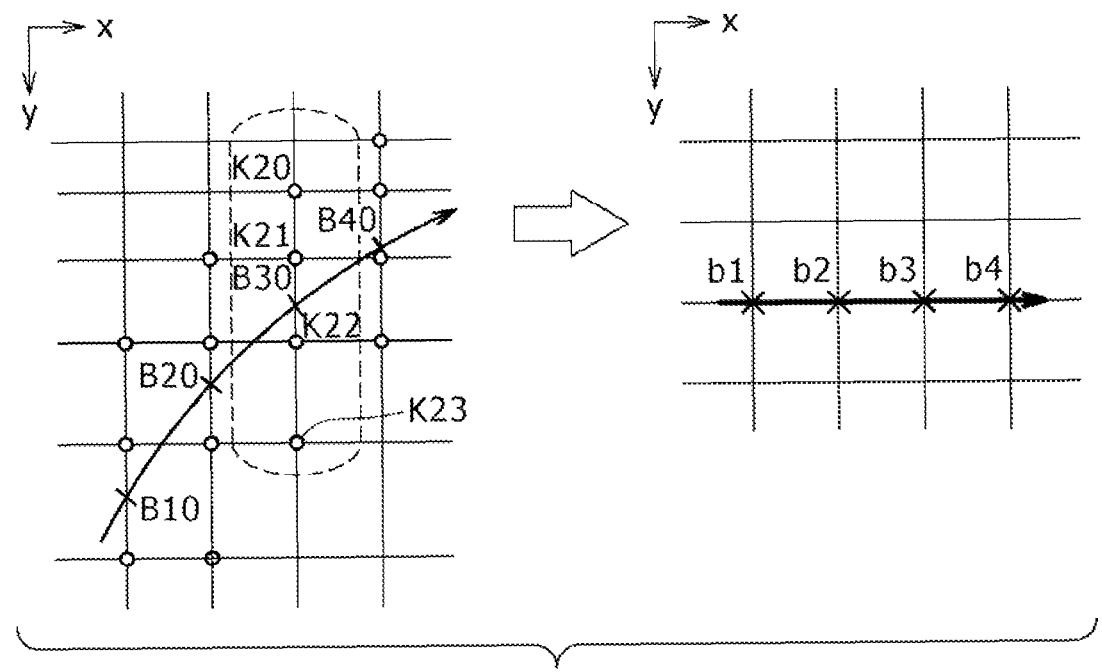
FIG. 14B is an explanatory diagram to be referred to in description of a process to compensate an image for image distortion in the y direction in an embodiment implementing an image-data processing apparatus.

FIG. 14A is a diagram showing processing to read out image data, which is to be read out originally from points B1 to B4 on an image with distorted data, from points B10 to B40 determined in a horizontal-direction interpolation process. FIG. 14B is a diagram showing processing to assign image data, which is to be read out originally from the points B10 to B40 as described above, to respectively points b1 to b4. The points b1 to b4 are separated from the points B1 to B4 respectively by the horizontal-direction and vertical-direction hand-movement distortion compensation quantities.

In this case, in this embodiment, pixel data of the points B1 to B4 located on the left side of FIG. 14A as points on the image data can be considered as pixel data to be read out from points B10 to B40 determined in a horizontal-direction interpolation process in order to compensate the image for distortion caused by a hand movement made in the horizontal direction. In this case, the horizontal-direction interpolation process carried out on each of the points B1 to B4 shown in FIG. 14A is typically the horizontal-direction interpolation process explained earlier by referring to FIG. 12. That is to say, the horizontal-direction interpolation process is a one-dimensional interpolation process making use of a horizontal-direction FIR filter.

The concept of the horizontal-direction interpolation process can also be applied to the vertical-direction interpolation process shown in FIG. 14B as well. Let us take the point B30 shown in FIG. 14B as an example. In this case, pixel data to be read out originally from the point B30 is a result of an interpolation process carried out on four pieces of pixel data actually read out from respectively four lattice points included in a lattice enclosed by a dashed line as lattice points associated with the point B30, and the result of the interpolation process is assigned to the point b3. The four lattice points are points K20 to K23 spread over the point B30 in the vertical direction. In this case, the vertical-direction interpolation process carried out on the point B30 shown in FIG. 14B is typically implemented by making use of interpolation weights in the same way the horizontal-direction interpolation process explained earlier by referring to FIG. 13. That is to say, the vertical-direction interpolation process is a one-dimensional interpolation process making use of a vertical-direction FIR filter.

Processing Operations of the Horizontal-Direction Image Processing Block 51

Cumulative-Addition Processing of the Horizontal-Direction Hand-Movement-Distortion Compensation Quantity Cumulative-Addition Unit 511

Figure 15:
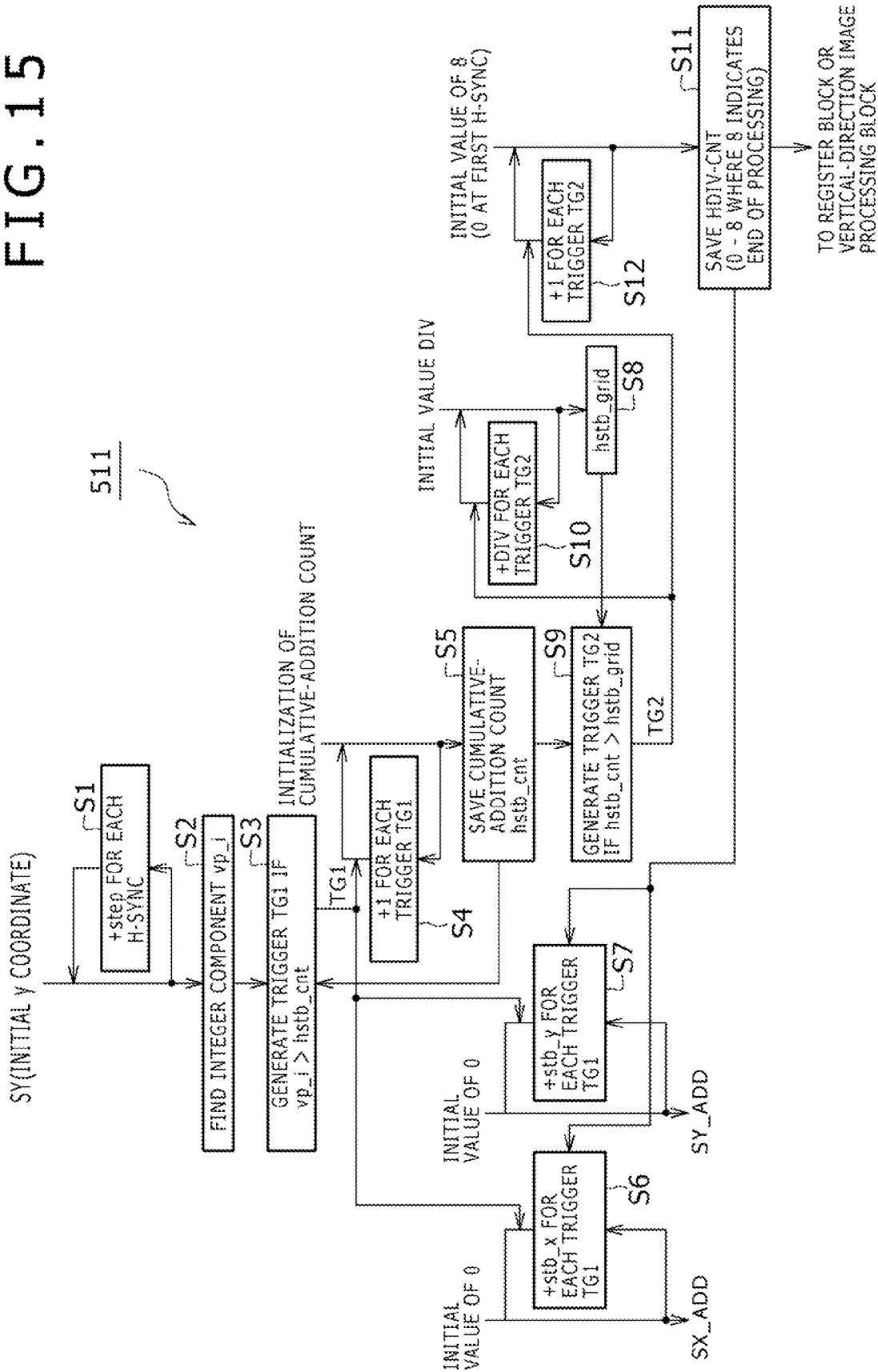
FIG. 15 shows a flowchart representing cumulative-addition processing operations carried out by a horizontal-direction hand-movement distortion compensation quantity cumulative-addition unit to produce a horizontal-direction hand-movement distortion compensation quantity as a result of cumulative addition in an embodiment implementing the image-data processing apparatus shown in FIG. 1.

FIG. 15 shows a flowchart representing cumulative-addition processing operations carried out by the horizontal-direction hand-movement-distortion compensation quantity cumulative-addition unit 511 to produce a horizontal-direction hand-movement distortion compensation quantity SX_ADD as a result of cumulative addition.

As shown in the figure, the flowchart includes a step S1 at which a value 'step' is cumulatively added to an initial y-axis coordinate SY for every pulse of a horizontal-direction synchronization signal H-SYNC. In this case, the y axis represents the positions of horizontal lines whereas the horizontal-direction synchronization signal H-SYNC means a timing signal included in an ordinary horizontal scanning signal as a signal masking out regions outside an effective pixel area.

The initial y-axis coordinate SY indicates the position the first horizontal line of an output screen in an all-pixel coordinate system on the CMOS imager. In general, the initial y-axis coordinate SY does not correspond to the y-axis coordinate of 0 of the all-pixel coordinate system. In the following description, the all-pixel coordinate system is referred to as an absolute coordinate system.

In addition to the fact that initial coordinates (SX, SY) include an initial displacement caused by a hand movement applied to the frame described above, the initial coordinates (SX, SY) are determined on the basis of the following factors. That is to say, in the case of a moving picture, normally, image data of all pixels on the CMOS imager is not supplied to the signal processing unit 5 provided at the following stage as it is. Instead, the image data is subjected to an averaging process for each of the picture divisions arranged in the vertical direction in the CMOS imager before being supplied to the signal processing unit 5. In addition, even after being supplied to the signal processing unit 5, the image data is again subjected to some processes. For this reason, the absolute coordinate of the first horizontal line does not correspond to '0' in many cases. Moreover, if a vertical-direction partial enlargement process is carried out on the input image data, the initial y-axis coordinate SY becomes the position of a horizontal line in the middle of the screen. Thus, instead of being equal to 0, the initial y-axis coordinate SY may have an extremely large value.

The value 'step' cumulatively added to the initial y-axis coordinate SY for every pulse of the horizontal-direction synchronization signal H-SYNC at the step S1 represents an inter-horizontal-line increment of the vertical coordinate of the absolute-coordinate system. Due to the averaging process carried out on image data for a plurality of horizontal lines arranged in the vertical direction in the CMOS imager of the averaging process block placed at the previous stage, it is quite within the bounds of possibility that the value 'step' is other than 1. For example, the value 'step' is 2 or 4.

By cumulatively adding the value 'step' to the initial y-axis coordinate SY for every pulse of the horizontal-direction synchronization signal H-SYNC at the step S1, the absolute coordinate of a horizontal line currently being processed can be found. Then, at a step S2, the integer component vp_i of the absolute coordinate is found. The integer component corresponds to the number of cumulative additions to be carried out on the horizontal-direction compensation velocity component X_STB_* in a cumulative-addition process up to the present point of time. Notation * is an integer in the range 0 to 7. That is to say, in the following description, the horizontal-direction compensation velocity component X_STB_* represents any of the horizontal-direction compensation velocity components X_STB_0 to X_STB_7. Notation X_STB_* is used in the following description as a symbol representing the horizontal-direction compensation velocity components X_STB_0 to X_STB_7. The number of cumulative additions carried out on a horizontal-direction compensation velocity component in the cumulative-addition process is a cumulative-addition value for the screen.

Then, at a step S3, the integer component vp_i of the absolute coordinate of the horizontal line currently being processed is compared with the number of cumulative additions carried out on a horizontal-direction compensation velocity component in the cumulative-addition process performed so far up to a horizontal line immediately leading ahead of the horizontal line currently being processed. By the way, in the following description, the horizontal line currently being processed is referred to as a currently processed horizontal line whereas the number of cumulative additions carried out on a horizontal-direction compensation velocity component in the cumulative-addition process carried out so far up to a horizontal line immediately leading ahead of the currently processed horizontal line is referred to as a horizontal-direction cumulative-addition count hstb_cnt. The difference between the integer component vp_i and the horizontal-direction cumulative-addition count vstb_cnt indicates how many more additional cumulative additions need to be carried out on a horizontal-direction compensation velocity component in the cumulative-addition process of this the currently processed horizontal line. Then, as many trigger pulses TG1 as the needed additional-direction cumulative additions of the cumulative-addition process are each generated for each processing unit cycle, which is sufficiently shorter than one horizontal period.

Then, at steps S4 and S5, the horizontal-direction cumulative-addition count hstb_cnt is incremented by 1 every time a trigger pulse TG1 is generated.

Subsequently, at a step S6, a cumulative-addition process is carried out to produce a horizontal-direction hand-movement distortion compensation quantity SX_ADD by cumulative adding a horizontal-direction compensation velocity component X_STB_*, which is selected from the horizontal-direction compensation velocity components X_STB_0 to X_STB_7 as a component for a picture division including the currently processed horizontal line, to a cumulative sum obtained so far every time the trigger pulse TG1 is generated at the step S3. Notation stb_x shown at the step S6 of the flowchart of FIG. 15 denotes the horizontal-direction compensation velocity component X_STB_* selected from the horizontal-direction compensation velocity components X_STB_0 to X_STB_7. That is to say, notation stb_x shown at the step S6 of the flowchart of FIG. 15 denotes the horizontal-direction compensation velocity component X_STB_* for a picture division to which the currently processed horizontal line pertains.

In order to obtain a horizontal-direction compensation quantity for compensating an image for horizontal-direction lens distortion at a pixel to be compensated from the horizontal-direction lens-distortion-compensation quantity decoding unit 121, the y coordinate of the pixel is also required in addition to the x coordinate of the pixel. In addition, since the y coordinate is affected by a CMOS hand movement, the horizontal-direction hand-movement-distortion compensation quantity cumulative-addition unit 511 also computes the vertical-direction hand-movement distortion compensation quantity SY_ADD by carrying out a cumulative addition process.

That is to say, at a step S7, a cumulative-addition process is carried out to produce a vertical-direction hand-movement distortion compensation quantity SY_ADD by cumulative adding a vertical-direction compensation velocity component Y_STB_*, which is selected from the horizontal-direction compensation velocity components Y_STB_0 to Y_STB_7 as a component for a picture division including the currently processed horizontal line, to a cumulative sum obtained so far every time the trigger pulse TG1 is generated at the step S3. Notation stb_y shown at the step S7 of the flowchart of FIG. 15 denotes the vertical-direction compensation velocity component Y_STB_* selected from the vertical-direction compensation velocity components Y_STB_0 to Y_STB_7. That is to say, notation stb_y shown at the step S7 of the flowchart of FIG. 15 denotes the vertical-direction compensation velocity component Y_STB_* for a picture division to which the currently processed horizontal line pertains.

If the value 'step' cumulatively added to the initial y-axis coordinate SY for every pulse of the horizontal-direction synchronization signal H-SYNC at the step S1 is 1 (that is, step=1) and the process to output an image is a normal-direction image process other than a process of enlarging the image, the trigger pulse TG1 is generated for every pulse of the horizontal-direction synchronization signal H-SYNC. Thus, at the step S6, stb_x representing the horizontal-direction compensation velocity component X_STB_* is added cumulatively (or integrated) in the cumulative-addition (integration) process for every horizontal line whereas, at the step S7, stb_y representing the vertical-direction compensation velocity component Y_STB_* is added cumulatively (or integrated) in the cumulative-addition (integration) process for every horizontal line.

As described before, the horizontal-direction hand-movement distortion compensation quantity SX_ADD obtained in this way is used as a horizontal-direction compensation quantity of the read start position for each horizontal line in the CMOS imager. That is to say, the horizontal-direction hand-movement distortion compensation quantity SX_ADD is no other than the horizontal initial position (or the horizontal offset) of each horizontal line in a horizontal-direction image-distortion process carried out by the horizontal-direction image processing block 51. The x coordinate of each pixel on the horizontal line to be compensated for distortion is shifted in the horizontal direction by the horizontal-direction hand-movement distortion compensation quantity SX_ADD.

By the same token, the vertical-direction hand-movement distortion compensation quantity SY_ADD obtained as described above is used as a vertical-direction shift quantity of each horizontal line in the CMOS imager. The y coordinate of each pixel on the horizontal line to be compensated for distortion is shifted in the vertical direction by the vertical-direction hand-movement distortion compensation quantity SY_ADD.

Information on a pixel position being compensated for the effect of a CMOS hand movement by making use of the horizontal-direction hand-movement distortion compensation quantity SX_ADD and the vertical-direction hand-movement distortion compensation quantity SY_ADD as described above is taken as information for acquiring horizontal-direction lens distortion at the position of the pixel as will be explained later.

As described above, in the cumulative-addition process carried out at the step S6, one of the horizontal-direction compensation velocity components X_STB_0 to X_STB_7 must be selected as an object of the process, depending on which of the eight picture divisions Pdiv_0 to Pdiv_7 the currently processed horizontal line pertains to. As described before, the eight picture divisions Pdiv_0 to Pdiv_7 are divisions obtained as a result of dividing one screen (or one frame, which is a vertical-direction synchronization period) in the vertical direction. A mechanism to select one of the horizontal-direction compensation velocity components X_STB_0 to X_STB_7 is implemented in processing carried out in the remaining portion of the flowchart shown in FIG. 15.

By the same token, in the cumulative-addition process carried out at the step S7, one of the vertical-direction compensation velocity components Y_STB_0 to Y_STB_7 must be selected as an object of the process, depending on which of the eight picture divisions Pdiv_0 to Pdiv_7 the currently processed horizontal line pertains to. A mechanism to select one of the vertical-direction compensation velocity components Y_STB_0 to Y_STB_7 is implemented in processing carried out in the remaining portion of the flowchart shown in FIG. 15.

In this embodiment, at a step S8, a horizontal-direction cumulative horizontal line count hstb_grid of the horizontal-direction compensation velocity components is found. The initial value of the horizontal-direction cumulative horizontal line count hstb_grid is a horizontal line count DIV representing the number of horizontal lines in one picture division.

At a step S9, the horizontal-direction cumulative horizontal line count hstb_grid is compared with the horizontal-direction cumulative-addition count hstb_cnt. Every time the horizontal-direction cumulative-addition count hstb_cnt exceeds the horizontal-direction cumulative horizontal line count hstb_grid, a trigger pulse TG2 is generated at the step S9. Every time a trigger pulse TG2 is generated, the horizontal-direction cumulative-addition count hstb_cnt is updated by adding the horizontal line count DIV representing the number of horizontal lines in one picture division to the horizontal-direction cumulative-addition count hstb_cnt at a step S10.

In the processing described above, a trigger pulse TG2 is generated every time the currently processed horizontal line transits from a picture division to the next picture division. Thus, at a step S11, a horizontal-direction picture division value HDIV_CNT representing the number of trigger pulses TG2 generated so far in the cumulative-addition process or the number of picture divisions already processed so far is found. That is to say, the horizontal-direction picture division value HDIV_CNT indicates which of the picture divisions Pdiv_0 to Pdiv_7 is being subjected to the cumulative-addition process. At a step S12, the horizontal-direction picture division value HDIV_CNT is incremented by 1 every time a trigger pulse TG2 is generated. Thus, the horizontal-direction picture division value HDIV_CNT has an integer value in the range 0 to 7 corresponding to the picture divisions Pdiv_0 to Pdiv_7 respectively. That is to say, the horizontal-direction picture division value HDIV_CNT is an indicator showing the degree of progress in the horizontal-direction cumulative-addition process.

Thus, the value of notation stb_x shown at the step S6 as a selected horizontal-direction compensation velocity component X_STB_* and the value of notation stb_y shown at the step S7 as a selected vertical-direction compensation velocity component Y_STB_* are determined by referring to the horizontal-direction picture division value HDIV_CNT.

It is to be noted that, in this embodiment, the horizontal-direction picture division value HDIV_CNT=8 means that the cumulative-addition process carried out on the image data of one frame has been completed. In addition, if the horizontal-direction picture division value HDIV_CNT=8 is incremented by one, the horizontal-direction picture division value HDIV_CNT is reset back to 0.

The horizontal-direction picture division value HDIV_CNT is supplied to the vertical-direction image processing block 52 and the register block 53 as an indicator showing which of the picture divisions Pdiv_0 to Pdiv_7 the currently processed horizontal line pertains to or the degree of progress in the horizontal-direction cumulative-addition process carried out by the horizontal-direction image processing block 51.

Processing Operations of the Horizontal-Direction Image Processing Unit 512

Figure 16:
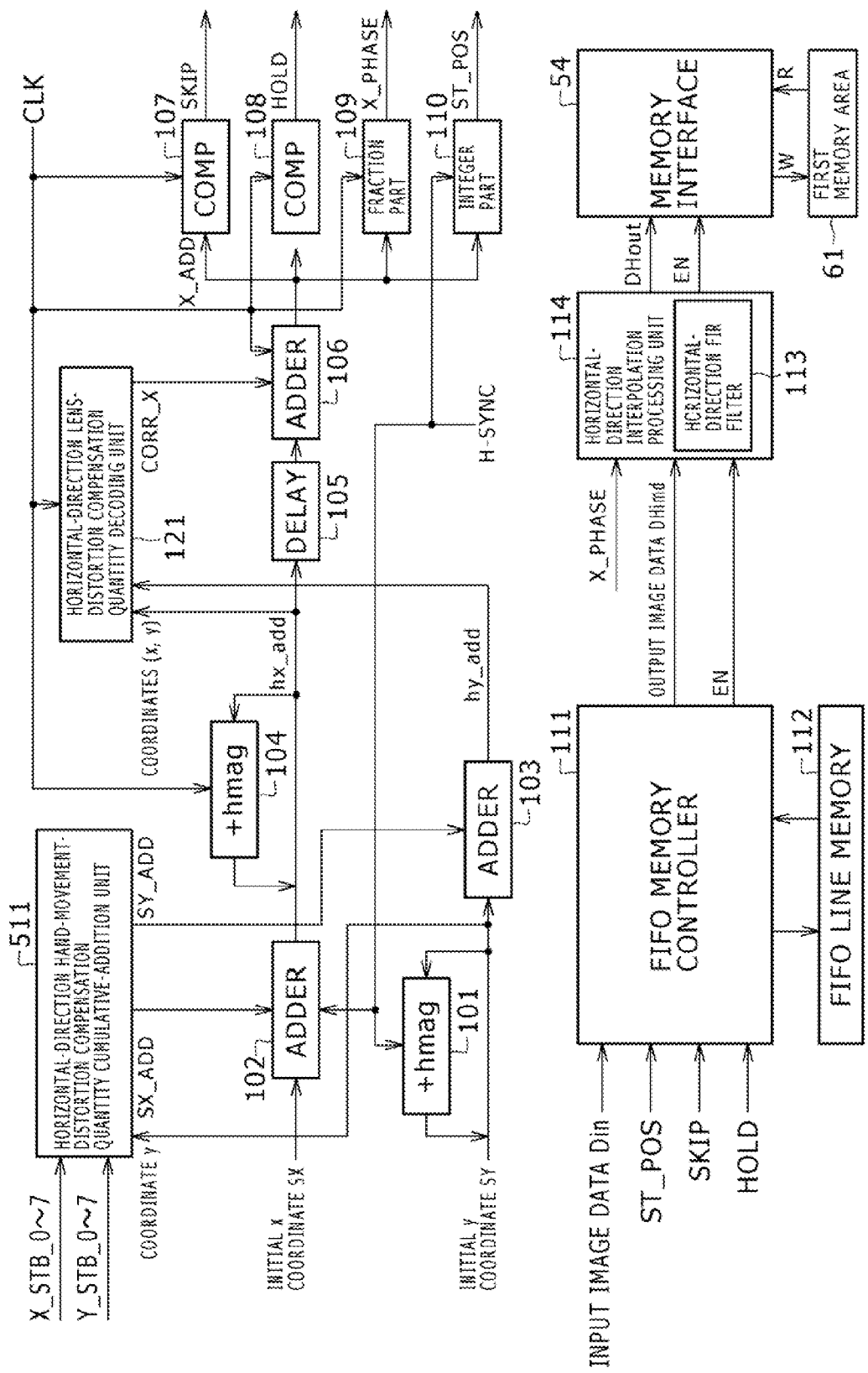
FIG. 16 is a block diagram showing a typical detailed configuration of a horizontal-direction image processing unit in an embodiment implementing the image-data processing apparatus shown in FIG. 1.

FIG. 16 is a block diagram showing a typical configuration of the horizontal-direction image processing unit 512. In the typical configuration shown in FIG. 16, an adder 101 is included in the horizontal-direction image processing unit 512 as a unit for cumulatively adding the value 'step' to the initial y-axis coordinate SY for every pulse of the horizontal-direction synchronization signal H-SYNC shown in the flowchart of FIG. 15. For this reason, the initial y-axis coordinate SY is supplied to the horizontal-direction image processing unit 512. In addition, an initial x-axis coordinate SX is also supplied to the horizontal-direction image processing unit 512. The initial y-axis coordinate SY and the initial x-axis coordinate SX are coordinates of the beginning of one frame and set typically by the control unit 10.

A y-axis coordinate SY' produced by the adder 101 as a result of cumulatively adding the value 'step' to the initial y-axis coordinate SY for every pulse of the horizontal-direction synchronization signal H-SYNC is supplied to the horizontal-direction hand-movement-distortion compensation quantity cumulative-addition unit 511. In response to the y-axis coordinate SY', the horizontal-direction hand-movement-distortion compensation quantity cumulative-addition unit 511 returns a horizontal-direction hand-movement distortion compensation quantity SX_ADD as an offset of the x-axis coordinate of the beginning of the currently processed horizontal line and a vertical-direction hand-movement distortion compensation quantity SY_ADD as an offset of the y-axis coordinate of the currently processed horizontal line to the horizontal-direction image processing unit 512.

An adder 102 employed in the horizontal-direction image processing unit 512 adds the horizontal-direction hand-movement distortion compensation quantity SX_ADD received from the horizontal-direction hand-movement-distortion compensation quantity cumulative-addition unit 511 to the initial x-axis coordinate SX only once at the beginning of each horizontal line. By the same token, an adder 103 employed in the horizontal-direction image processing unit 512 adds the vertical-direction hand-movement distortion compensation quantity SY_ADD received from the horizontal-direction hand-movement-distortion compensation quantity cumulative-addition unit 511 to the initial y-axis coordinate SY only once at the beginning of each horizontal line.

Then, an adder 104 cumulatively adds a value hmag, which is a horizontal-direction enlargement/shrinking parameter as well as a horizontal-direction resolution conversion parameter, to the output of the adder 102 for every pulse of a pixel processing clock signal CLK. The output hx_add of the adder 104 is supplied to the horizontal-direction lens-distortion-compensation quantity decoding unit 121 as an argument, which is an x coordinate of (x, y) coordinates.

On the other hand, the output hy_add of the adder 103 is supplied to the horizontal-direction lens-distortion-compensation quantity decoding unit 121 as another argument, which is a y coordinate of the (x, y) coordinates.

In return for these arguments specifying the (x, y) coordinates, the horizontal-direction lens-distortion-compensation quantity decoding unit 121 supplies a horizontal-direction lens-distortion compensation quantity CORR_X for lens distortion at the (x, y) coordinates on the imager. An adder 106 adds the horizontal-direction lens-distortion compensation quantity CORR_X to the output hx_add of the adder 104 to produce a sum X_ADD for every pulse of the pixel processing clock signal CLK.

It is to be noted that the output hx_add of the adder 104 is supplied to the adder 106 by way of a delay unit 105 for providing a delay time equivalent to the time it takes to obtain the horizontal-direction lens-distortion compensation quantity CORR_X from the horizontal-direction lens-distortion-compensation quantity decoding unit 121.

The sum X_ADD output by the adder 106 is supplied to comparison units 107 and 108 as well as a fraction-part extraction unit 109 and an integer-part extraction unit 110.

The comparison unit 107 compares the present output X_ADD received from the adder 106 with the integer part of the output X_ADD received from the adder 106 at a time leading ahead of the arrival time of the present output X_ADD by one period of the pixel processing clock signal CLK. If the difference between the present output X_ADD received from the adder 106 and the integer part of the output X_ADD leading ahead of the arrival time of the present output X_ADD by one period of the pixel processing clock signal CLK is found equal to or greater than 1, that is, if the pixel position has jumped by at least a distance equal to one pixel pitch, the comparison unit 107 outputs a signal SKIP indicating the jump. In this embodiment, by knowing the existence of the signal SKIP indicating the jump, it is possible to know the jump-destination pixel position of a pixel to be processed next with a timing indicated by the pixel processing clock signal CLK. The signal SKIP is supplied to a FIFO memory controller 111.

In addition, the comparison unit 108 compares the present output X_ADD received from the adder 106 with the integer part of the output X_ADD received from the adder 106 at a time leading ahead of the arrival time of the present output X_ADD by one period of the pixel processing clock signal CLK. If the difference between the present output X_ADD received from the adder 106 and the integer part of the output X_ADD leading ahead of the arrival time of the present output X_ADD by one period of the pixel processing clock signal CLK is found smaller than 1, the comparison unit 108 outputs a signal HOLD indicating the fact that the difference between the present output X_ADD received from the adder 106 and the integer part of the output X_ADD leading ahead of the arrival time of the present output X_ADD by one period of the pixel processing clock signal CLK is smaller than 1. Thus, by knowing the existence of the signal HOLD, it is possible to know the fact that the pixel presently read out is the same pixel as a pixel read out at the time leading ahead of the present time by one period of the pixel processing clock signal CLK. The signal HOLD is also supplied to the FIFO memory controller 111 for controlling operations to store data into a FIFO line memory 112 or read out data from the FIFO line memory 112, which has a storage capacity for accommodating data with an amount equal to one horizontal line. As described earlier, the FIFO line memory 112 can also be included as a memory area in the image memory 6. In this case, the FIFO memory controller 111 is incorporated in the memory interface 54.

The fraction-part extraction unit 109 extracts the fraction part of the output X_ADD received from the adder 106 for every pulse of the pixel processing clock signal CLK and outputs a value X_PHASE of the extracted fraction part to a horizontal-direction interpolation processing unit 114 having a horizontal-direction FIR filter 113. On the basis of the value X_PHASE, the horizontal-direction interpolation processing unit 114 searches a multiplication-coefficient table for a multiplication coefficient to be supplied to the horizontal-direction FIR filter 113.

The integer-part extraction unit 110 extracts the integer part of the output X_ADD received from the adder 106 at the beginning of every horizontal line in accordance with the horizontal-direction synchronization signal H-SYNC and outputs a value ST_POS of the extracted integer part to the FIFO memory controller 111 as the initial x-axis coordinate of the currently processed horizontal line.

The FIFO memory controller 111 carries out a horizontal-direction hand-movement distortion compensation process based on the integer part of the sum of the horizontal-direction hand-movement distortion compensation quantity SX_ADD and the horizontal-direction lens-distortion compensation quantity CORR_X on the input image data Din by making use of a horizontal-direction processing FIFO line memory 112 as well as a horizontal-direction enlargement or shrinking process and a horizontal-direction resolution conversion process. As will be described later, the horizontal-direction processing FIFO line memory 112 is actually required to have a storage capacity for accommodating image data of one horizontal line only when considering a case in which a partial enlargement process of an image is supported.

To put it in detail, the FIFO memory controller 111 determines the initial x-axis coordinate of the image data of every horizontal line of the input image data Din by making use of the value ST_POS of the integer part. In addition, the FIFO memory controller 111 refers to the signals SKIP and HOLD for every pulse of the image processing clock signal CLK in determining pixel data to be read out from the horizontal-direction processing FIFO line memory 112.

Then, the FIFO memory controller 111 supplies horizontal line pixel data read out from the horizontal-direction image processing FIFO line memory 112 as described above as the pixel data of every horizontal line to the horizontal-direction interpolation processing unit 114 as output image data DHimd along with a data enable signal EN.

The horizontal-direction interpolation processing unit 114 handles input image data as valid data only when the data enable signal EN is put in an active state and carries out a horizontal-direction interpolation process described earlier by making use of the horizontal-direction FIR filter 113 on the valid data. As described before, at that time, on the basis of the value X_PHASE supplied to the horizontal-direction interpolation processing unit 114 as the value of the fraction part, the horizontal-direction interpolation processing unit 114 searches a multiplication-coefficient table for a multiplication coefficient to be supplied to the horizontal-direction FIR filter 113.

In this way, the horizontal-direction interpolation processing unit 114 generates image data DHout as a result of the horizontal-direction hand-movement distortion compensation process carried out in accordance with the sum of the horizontal-direction hand-movement distortion compensation quantity SX_ADD and the horizontal-direction lens-distortion compensation quantity CORR_X as well as results of the horizontal-direction enlargement or shrinking process and the horizontal-direction resolution conversion process. The horizontal-direction interpolation processing unit 114 supplies the image data DHout along with the data enable signal EN to the first image memory area 61 employed in the image memory 6 by way of the memory interface 54.

By the way, the above description does not particularly mention mutual relations between processing timings of the cumulative-addition process carried out by the horizontal-direction hand-movement-distortion compensation quantity cumulative-addition unit 511 to find the horizontal-direction hand-movement distortion compensation quantity SX_ADD as well as the vertical-direction hand-movement distortion compensation quantity SY_ADD and the horizontal-direction enlargement or shrinking process and the horizontal-direction resolution conversion process, which are carried out by the horizontal-direction image processing unit 512. Convenience provided by execution of the cumulative-addition process to find the horizontal-direction hand-movement distortion compensation quantity SX_ADD as well as the vertical-direction hand-movement distortion compensation quantity SY_ADD and the horizontal-direction enlargement or shrinking process and the horizontal-direction resolution conversion process in a simple processing sequence without a time delay is limited all but to a case in which a horizontal-direction cutting-out process and a partial enlargement process are not supported as shown in FIG. 17A in the upper part of FIG. 17 to be described later. In FIG. 17, notation V-SYNC denotes a vertical-direction synchronization signal and notation ST_TG denotes a pulse indicating the starting point of an effective scanning horizontal line. In addition, in FIG. 17, each segment enclosed by a darkened rectangle represents a processing segment.

If a horizontal-direction cutting-out process and/or a partial enlargement process are supported, on the other hand, the initial y-axis coordinate SY has an extremely large value. It is thus quite within the bounds of possibility that the number of pixel processing cycles (that is, the number of cycles required in the cumulative-addition process) at the beginning of the frame is very large. Notation tm shown in a sequence of FIG. 17B in the lower part of FIG. 17 denotes the period of the cumulative-addition process at the beginning of the frame.

With a long first cumulative-addition process, the first horizontal-direction enlargement or shrinking process in a simple processing sequence shown in FIG. 17A in the upper part of FIG. 17 will go undesirably beyond one period of the horizontal-direction synchronization signal H-SYNC so that it is necessary to provide a line memory for storing the image data of the incoming second horizontal line corresponding to the second pulse of the vertical-direction synchronization signal.

In order to solve the above problem, in this embodiment, as shown in the processing sequence of FIG. 17B in the lower part of FIG. 17, the cumulative-addition process is carried out in the period corresponding to a horizontal-direction synchronization signal H-SYNC pulse leading ahead of a horizontal-direction synchronization signal H-SYNC pulse to start a horizontal-direction enlargement or shrinking process following the cumulative-addition process by one period of the horizontal-direction synchronization signal H-SYNC. That is to say, the embodiment adopts a sequence of the image processing in which the cumulative-addition process is always carried out with a timing leading a head of a timing to start a horizontal-direction enlargement or shrinking process following the cumulative-addition process by one period of the horizontal-direction synchronization signal H-SYNC. Thus, this embodiment employs a horizontal-direction image processing FIFO line memory 112 with a storage capacity for accommodating the image data of one horizontal period.

The problem described above can be avoided without regard to the image partial enlargement process or the like by adoption of an architecture for always carrying out the horizontal-direction image processing on all input horizontal lines. In either case, however, if an attempt is made to implement the processing sequence shown in FIG. 17A in the upper part of FIG. 17, a new termination signal of the cumulative-addition process needs to be generated and the signal must be detected in order to start the image processing so that the configuration becomes complicated to a certain degree. In other words, the technique adopted in the embodiment described above offers a merit that the technique can be implemented without providing additional components to the image processing circuit.

It is to be noted that the technique adopted in the embodiment described above cannot be adopted for a case in which the vertical size of the absolute coordinate system is greater than the number of image processing cycles in one period of the horizontal-direction synchronization signal H-SYNC. For such a case, it is necessary to adopt the aforementioned architecture for always carrying out the horizontal-direction image processing on all input horizontal lines.

Processing Operations of the Vertical-Direction Image Processing Block 52

Cumulative-Addition Processing of the Vertical-Direction Hand-Movement-Distortion Compensation Quantity Cumulative-Addition Unit 521

Figure 18:
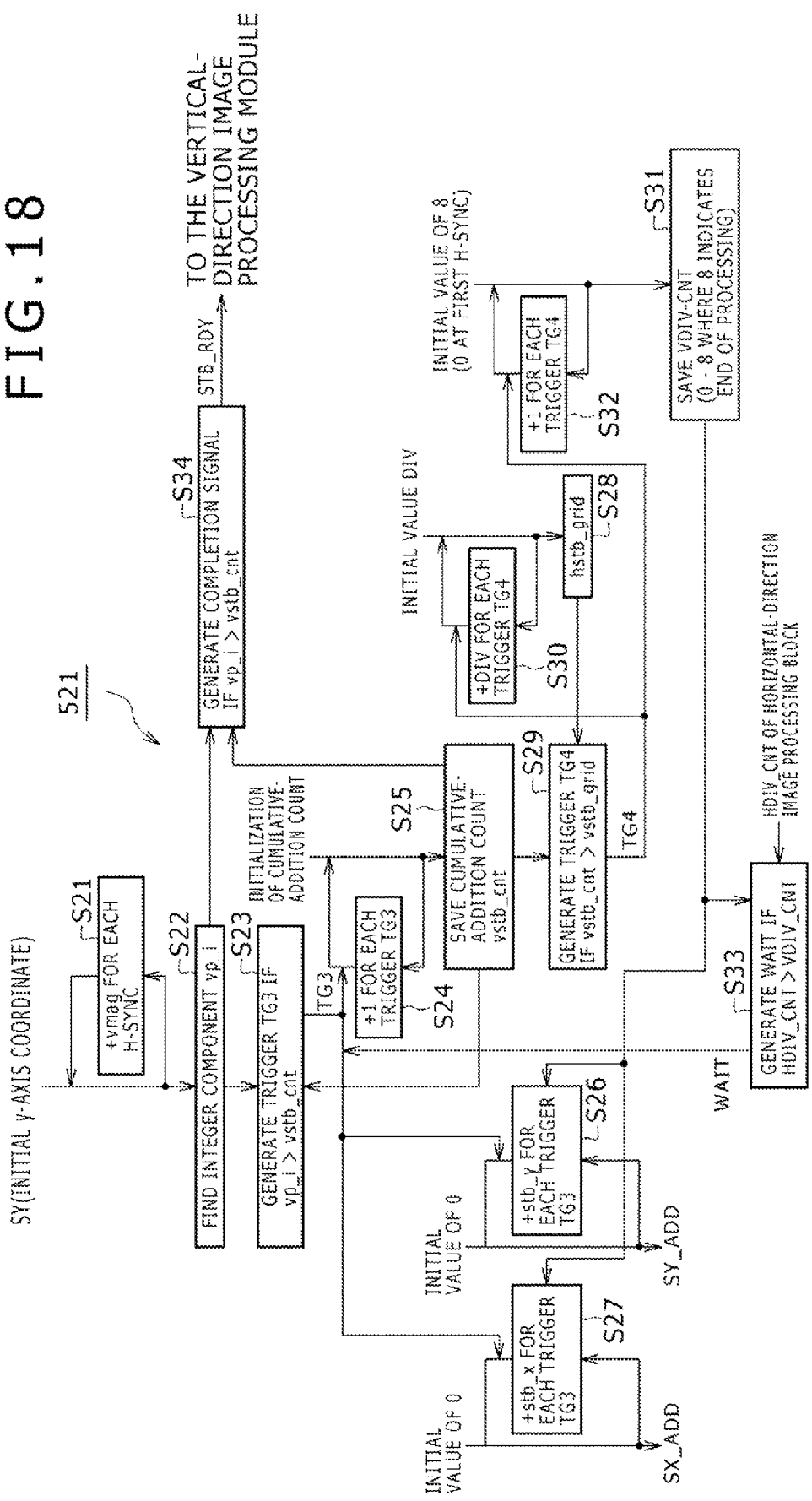
FIG. 18 shows a flowchart representing cumulative addition processing operations carried out by a vertical-direction hand-movement distortion compensation quantity cumulative addition unit to produce a vertical-direction hand-movement distortion compensation quantity as a result of cumulative addition in an embodiment implementing the image-data processing apparatus shown in FIG. 1.

The following description explains cumulative addition processing operations carried out by the vertical-direction hand-movement distortion compensation quantity cumulative-addition unit 521. FIG. 18 shows a flowchart representing cumulative addition processing operations to produce a vertical-direction hand-movement distortion compensation quantity SY_ADD as a result of cumulative addition.

The cumulative addition processing operations carried out by the vertical-direction hand-movement distortion compensation quantity cumulative-addition unit 521 are similar to the cumulative addition processing operations carried out by the horizontal-direction hand-movement-distortion compensation quantity cumulative-addition unit 511 as explained earlier by referring to FIG. 15 except for the following differences.

In the case of the cumulative addition processing operations carried out by the vertical-direction hand-movement-distortion compensation quantity cumulative-addition unit 521, the following three processes are carried out. As the first process, a value vmag is cumulatively added to the initial y-axis coordinate SY for every pulse of the horizontal-direction synchronization signal H-SYNC. As the second process, a wait state is established by considering the horizontal-direction picture division value HDIV_CNT representing the state of progress in the horizontal-direction image processing. As the third process, a cumulative addition-end signal STB_RDY indicating completion of the cumulative addition process for every horizontal line is generated to be supplied to a vertical-direction image processing module, which is the vertical-direction image processing unit 522.

It is assumed that, in this embodiment, the vertical-direction image processing includes a vertical-direction enlargement or shrinking process, and the value vmag is a parameter representing the enlargement or shrinking factor. Thus, instead of processing all image data output by the horizontal processing block 51, the vertical processing block 52 carries out processing by taking the vertical coordinate of a horizontal line output after the enlargement or shrinking process as a reference.

Therefore, also in the vertical-direction cumulative addition processing, an operation to output a cumulative addition value at a coordinate subjected to the vertical-direction image processing after the vertical-direction cumulative addition processing is demanded so that the vertical-direction coordinate increase parameter is cumulatively added to the initial y-axis coordinate SY for every pulse of the horizontal-direction synchronization signal H-SYNC. It is to be noted that, without regard to the image enlargement or shrinking process, the value vmag can be set at 1 (vmag=1) if only a CMOS hand-movement distortion compensation process is to be carried out.

As the second difference between the cumulative addition processing operations carried out by the vertical-direction hand-movement-distortion compensation quantity cumulative-addition unit 521 and the cumulative addition processing operations carried out by the horizontal-direction hand-movement-distortion compensation quantity cumulative-addition unit 511, in the case of the cumulative addition processing operations carried out by the vertical-direction hand-movement-distortion compensation quantity cumulative-addition unit 521, the horizontal-direction picture division value HDIV_CNT representing the state of progress in the horizontal-direction image processing needs to be observed because the progress in the vertical-direction image processing must not surpass the progress in the horizontal-direction image processing. In an ordinary enlargement or shrinking process of an ordinary image, the progress in the vertical-direction image processing is said to surpass the progress in the horizontal-direction image processing when the vertical-direction image processing is carried out on an image that has not been generated yet. In order to prevent the progress in the vertical-direction image processing from surpassing the progress in the horizontal-direction image processing, a mechanism for setting a wait state by itself is required. By the same token, in the vertical-direction cumulative addition processing, a mechanism for preventing the progress in the vertical-direction image processing from surpassing the progress in the horizontal-direction image processing is required even though an image is not processed directly.

To put it in slightly more detail, the horizontal-direction compensation velocity component $X\_STB\_*$ is a horizontal-direction cumulative addition parameter obtained as a result of inverting the sign of the horizontal component of a hand-movement velocity vector close the sampling time of a horizontal line currently being processed. Notation * is an integer in the range 0 to 7. That is to say, in the following description, the horizontal-direction compensation velocity component $X\_STB\_*$ represents any of the horizontal-direction compensation velocity components $X\_STB\_0$ to $X\_STB\_7$. By the same token, the vertical-direction compensation velocity component $Y\_STB\_*$ is a vertical-direction cumulative addition parameter obtain as a result of inverting the sign of the vertical component of a hand-movement velocity vector close the sampling time of a horizontal line currently being processed. Notation * is an integer in the range 0 to 7. That is to say, in the following description, the vertical-direction compensation velocity component $Y\_STB\_*$ represents any of the vertical-direction compensation velocity components $Y\_STB\_0$ to $Y\_STB\_7$. Strictly speaking, the sampling time corresponds to the center point of a light exposure period of time. The hand-movement velocity vector of a hand movement is a vector representing the magnitude and direction of the hand movement. Thus, if the case of an extremely short light exposure period of time is also taken into consideration, the horizontal-direction compensation velocity component $X\_STB\_*$ and vertical-direction compensation velocity component $Y\_STB\_*$ for a horizontal line cannot be possibly confirmed till a time immediately preceding an operation to input the image data of the horizontal line.

Taking the condition described above into consideration, after referring to the horizontal-direction picture division value HDIV_CNT indicating a picture division to which the horizontal line currently being processed in the horizontal-direction cumulative addition process pertains, the horizontal-direction compensation velocity component X_STB_* and vertical-direction compensation velocity component Y_STB_* for the horizontal line are latched respectively in a horizontal-direction image processing block register and a vertical-direction image processing block register, which are employed in the register block 53 to be described in detail later. Thus, the horizontal-direction image processing block 51 may sequentially process an input image without the need to provide a special mechanism.

In the cumulative addition process carried out by the vertical-direction image processing block 52, on the other hand, the result of the cumulative addition process is used as an initial offset coordinate of the vertical-direction image process carried out at a later stage. Thus, even if it is known that an image output by the horizontal-direction image process for a horizontal line has not been received yet at a point of time, at this point of time, the vertical-direction cumulative addition process for the horizontal line has already been undesirably completed. That is to say, the vertical-direction cumulative addition process has been carried out on an unconfirmed vertical-direction compensation velocity component.

In order to solve the problem described above, at the stage of the cumulative addition process, on the basis of the vertical-direction picture division value VDIV_CNT representing the state of progress in the horizontal-direction image process, it is necessary to determine whether or not the vertical-direction compensation velocity component Y_STB_* serving as the cumulative addition parameter for a horizontal line to be processed has been confirmed.

As a mechanism for determining whether or not the vertical-direction compensation velocity component Y_STB_* serving as the cumulative addition parameter for a horizontal line to be processed has been confirmed on the basis of the state of progress in the horizontal-direction image process, at a step S33 of the flowchart shown in FIG. 18, a WAIT signal is generated if the vertical-direction picture division value VDIV_CNT representing the state of progress in the vertical-direction image process surpasses the horizontal-direction picture division value HDIV_CNT representing the state of progress in the horizontal-direction image process. Notation stb_y denoting a vertical-direction compensation velocity component for a picture division is cumulatively added at a step S26 on the left-lower side of FIG. 18 to the vertical-direction compensation velocity component Y_STB_ADD for a picture division including the horizontal line currently being processed in the horizontal-direction cumulative addition processing with a confirmed vertical-direction compensation velocity component Y_STB_* selected. With the signal WAIT generated, however, the vertical-direction compensation velocity component stb_y for a picture division is prevented from being cumulatively added at the step S26 to the vertical-direction hand-movement distortion compensation quantity SY_ADD for a picture division including the horizontal line currently being processed in the horizontal-direction cumulative addition processing with an unconfirmed vertical-direction compensation velocity component Y_STB_* selected.

As the third difference between the cumulative addition processing operations carried out by the vertical-direction hand-movement-distortion compensation quantity cumulative-addition unit 521 as shown in FIG. 18 and the cumulative addition processing operations carried out by the horizontal-direction hand-movement-distortion compensation quantity cumulative-addition unit 511 as shown in FIG. 15, in the case of the cumulative addition processing operations carried out by the vertical-direction hand-movement-distortion compensation quantity cumulative-addition unit 521, a cumulative addition-end signal STB_RDY indicating completion of the cumulative addition process for the horizontal line currently being processed is generated to be supplied to a vertical-direction image processing module serving as the vertical-direction image processing unit 522 at a later stage. As a result of a vertical-direction cumulative addition process carried out for a picture division, the integer part vp_i of the absolute coordinate of the currently processed horizontal line becomes equal to a vertical-direction cumulative-addition count vstb_cnt. At that time, a vertical offset SY_ADD also to be supplied to the vertical-direction image processing module is found and the cumulative addition-end signal STB_RDY is used to activate the vertical-direction image processing module.

In the horizontal-direction cumulative addition process described earlier, the cumulative addition process is started with a timing leading ahead of a timing to input an effective image by one period of the horizontal-direction synchronization signal H-SYNC so that the cumulative addition process can be completed before the horizontal-direction image process is carried out on the effective image. In most cases, however, it is possible to assure a data processing system in which the cumulative addition process carried out on an effective image can be completed before the horizontal-direction image process is carried out on the effective image. However, in the vertical-direction cumulative addition process, it is quite within the bounds of possibility that a wait state mentioned above is established so that it is impossible to assure that the cumulative addition process can be completed in one immediately preceding period of the horizontal-direction synchronization signal H-SYNC for all cases. That is to say, with a wait state established, vertical-direction image processing including a vertical-direction hand-movement distortion compensation process and a vertical-direction enlargement or shrinking process is carried out when the cumulative addition-end signal STB-RDY is generated.

By referring to the flowchart shown in FIG. 18, the following description explains the vertical-direction cumulative addition process carried out by making use of a vertical-direction cumulative addition circuit having the functions described above.

As shown in the figure, the flowchart includes a step S21 at which the value 'vmag' is cumulatively added to an initial y-axis coordinate SY representing the position of a horizontal line for every pulse of a horizontal-direction synchronization signal H-SYNC.

By cumulatively adding the value 'vmag' to the initial y-axis coordinate SY for every pulse of the horizontal-direction synchronization signal H-SYNC at the step S21, the absolute coordinate of a horizontal line currently being processed can be found. Then, at a step S22, the integer component vp_i of the absolute coordinate is found. The integer component corresponds to the number of cumulative additions to be carried out on the vertical-direction compensation velocity component Y_STB_* representing the vertical-direction compensation velocity components Y_STB_0 to Y_STB_7 in a cumulative addition process up to the present point of time. The number of cumulative additions carried out on a vertical-direction compensation velocity component in the cumulative addition process is a cumulative addition value for the screen.

Then, at a step S23, the integer component vp_i of the absolute coordinate of the horizontal line currently being processed is compared with the number of cumulative additions carried out on a vertical-direction compensation velocity component in the cumulative addition process performed so far up to a horizontal line immediately leading ahead of the horizontal line currently being processed. By the way, the number of cumulative additions carried out on a vertical-direction compensation velocity component in the cumulative addition process carried out so far up to a horizontal line immediately leading ahead of the currently processed horizontal line is referred to as a vertical-direction cumulative-addition count vstb_cnt. The difference between the integer component vp_i and the vertical-direction cumulative-addition count vstb_cnt indicates how many more additional-direction cumulative additions need to be carried out on a vertical-direction compensation velocity component in the cumulative addition process for this the currently processed horizontal line. Then, as many trigger pulses TG3 as the needed additional-direction cumulative additions of the cumulative addition process are each generated for each processing time unit cycle, which is sufficiently shorter than one horizontal period.

Then, at steps S24 and S25, the vertical-direction cumulative-addition count vstb_cnt is incremented by 1 every time a trigger pulse TG3 is generated.

Subsequently, at a step S26, the cumulative addition process is carried out to produce a vertical-direction hand movement distortion compensation quantity SY_ADD by cumulative adding a vertical-direction compensation velocity component Y_STB_*, which is selected from the vertical-direction compensation velocity components Y_STB_0 to Y_STB_7 as a component for a picture division including the currently processed horizontal line, to a cumulative sum obtained so far every time the trigger pulse TG3 is generated at the step S23. Notation stb_y shown at the step S26 of the flowchart of FIG. 18 denotes the vertical-direction compensation velocity component Y_STB_* selected from the vertical-direction compensation velocity components Y_STB_0 to Y_STB_7. That is to say, notation stb_y shown at the step S26 of the flowchart of FIG. 18 denotes the vertical-direction compensation velocity component Y_STB_* for a picture division to which the currently processed horizontal line pertains.

In order to acquire a vertical-direction lens-distortion compensation quantity from the vertical-direction lens-distortion-compensation quantity decoding unit 122, both the y and x coordinates of a pixel serving as an object of compensation are required. In addition, since the CMOS hand movement affects the x coordinate, the vertical-direction hand-movement-distortion compensation quantity cumulative-addition unit 521 also carries out a cumulative addition process to find the horizontal-direction hand-movement distortion compensation quantity SX_ADD.

That is to say, at a step S27, the cumulative addition process is carried out to produce a horizontal-direction hand movement distortion compensation quantity SX_ADD by cumulative adding a horizontal-direction compensation velocity component X_STB_*, which is selected from the horizontal-direction compensation velocity components X_STB_0 to X_STB_7 as a component for a picture division including the currently processed horizontal line, to a cumulative sum obtained so far every time the trigger pulse TG3 is generated at the step S23. Notation stb_x shown at the step S27 of the flowchart of FIG. 18 denotes the horizontal-direction compensation velocity component X_STB_* selected from the horizontal-direction compensation velocity components X_STB_0 to X_STB_7. That is to say, notation stb_x shown at the step S27 of the flowchart of FIG. 18 denotes the horizontal-direction compensation velocity component X_STB_* for a picture division to which the currently processed horizontal line pertains.

If the value 'vmag' cumulatively added to the initial y-axis coordinate SY for every pulse of the horizontal-direction synchronization signal H-SYNC at the step S21 is 1 (that is, vmag=1) and the process to output an image is a process not enlarging the image or another normal-direction image process, the trigger pulse TG3 is generated for every pulse of the horizontal-direction synchronization signal H-SYNC. Thus, at the step S26, stb_y representing the vertical-direction compensation velocity component Y_STB_* is added cumulatively in the cumulative addition process for every horizontal line whereas, at the step S27, stb_x representing the horizontal-direction compensation velocity component Y_STB_* is added cumulatively in the cumulative addition process for every horizontal line As described before, the vertical-direction hand-movement distortion compensation quantity SY_ADD obtained as explained earlier is used as a vertical-direction hand-movement distortion compensation quantity of the read start position for each horizontal line in the CMOS imager. That is to say, the vertical-direction hand-movement distortion compensation quantity SY_ADD is no other than the vertical initial position (or the vertical offset) of each horizontal line in a vertical-direction image-distortion process carried out by the vertical-direction image processing block 52. Thus, the y coordinate of each pixel on a horizontal line serving as an object of compensation is shifted in the vertical direction by a distance equal to the vertical-direction hand-movement distortion compensation quantity SY_ADD.

By the same token, the horizontal-direction hand-movement distortion compensation quantity SX_ADD obtained as explained earlier is used as a horizontal-direction hand-movement distortion compensation quantity representing a coordinate shift of each horizontal line in the CMOS imager. Thus, the x coordinate of each pixel on a horizontal line serving as an object of compensation is shifted in the horizontal direction by a distance equal to the horizontal-direction hand-movement distortion compensation quantity SX_ADD.

In this way, information on a pixel position being compensated for the effect of a CMOS hand movement by making use of the horizontal-direction hand-movement distortion compensation quantity SX_ADD and the vertical-direction hand-movement distortion compensation quantity SY_ADD as described above is taken as information for acquiring vertical-direction lens distortion at the position of the pixel as will be explained later.

As described above, in the cumulative addition process carried out at the step S26, one of the vertical-direction compensation velocity components Y_STB_0 to Y_STB_7 must be selected as an object of the process, depending on which of the eight picture divisions Pdiv_0 to Pdiv_7 the currently processed horizontal line pertains to. As described before, the eight picture divisions Pdiv_0 to Pdiv_7 are divisions obtained as a result of dividing one screen (or one frame, which is a vertical-direction synchronization period) in the vertical direction. By the same token, in the cumulative addition process carried out at the step S27, one of the horizontal-direction compensation velocity components X_STB_0 to X_STB_7 must be selected as an object of the process, depending on which of the eight picture divisions Pdiv_0 to Pdiv_7 the currently processed horizontal line pertains to.

In this embodiment, at a step S28, a vertical-direction cumulative horizontal line count vstb_grid of the vertical-direction compensation velocity components is found. The initial value of the vertical-direction cumulative horizontal line count vstb_grid is the horizontal line count DIV representing the number of horizontal lines in one picture division.

At a step S29, the vertical-direction cumulative horizontal line count vstb_grid is compared with the vertical-direction cumulative-addition count vstb_cnt. Every time the vertical-direction cumulative-addition count vstb_cnt exceeds the vertical-direction cumulative horizontal line count vstb_grid, a trigger pulse TG4 is generated at a step S29 as a trigger pulse indicating completion of the cumulative addition process for one picture division. Every time a trigger pulse TG4 is generated, the vertical-direction cumulative-addition count vstb_cnt is updated by adding the horizontal line count DIV representing the number of horizontal lines in one picture division to the vertical-direction cumulative-addition count vstb_cnt at a step S30.

In the processing described above, a trigger pulse TG4 is generated every time the currently processed horizontal line transits from a picture division to the next picture division. Thus, at a step S31, a vertical-direction picture division value VDIV_CNT representing the number of trigger pulses TG4 generated so far in the cumulative addition process or the number of picture divisions already processed so far is found. That is to say, the vertical-direction picture division value VDIV_CNT indicates which of the picture divisions Pdiv_0 to Pdiv_7 is being subjected to the cumulative addition process. At a step S32, the vertical-direction picture division value VDIV_CNT is incremented by 1 every time a trigger pulse TG4 is generated. Thus, the vertical-direction picture division value VDIV_CNT has an integer value in the range 0 to 7 corresponding to the picture divisions Pdiv_0 to Pdiv_7 respectively. That is to say, the vertical-direction picture division value VDIV_CNT is an indicator showing the degree of progress in the vertical-direction cumulative addition process.

Thus, the value of notation stb_y shown at the step S6 or S26 as a selected vertical-direction compensation velocity component Y_STB_* and the value of notation stb_x shown at the step S7 or S27 as a selected horizontal-direction compensation velocity component X_STB_* are determined by referring to the vertical-direction picture division value VDIV_CNT.

It is to be noted that, in this embodiment, the vertical-direction picture division value VDIV_CNT=8 means that the cumulative addition process carried out on the image data of one frame has been completed. In addition, if the vertical-direction picture division value VDIV_CNT=8 is incremented by 1, the vertical-direction picture division value VDIV_CNT is reset back to 0.

The vertical-direction picture division value VDIV_CNT indicating the degree of progress in the vertical-direction cumulative addition process is compared with the horizontal-direction picture division value HDIV_CNT received from the horizontal-direction image processing block 51 as an indicator showing the degree of progress in the horizontal-direction cumulative addition process at a step S33. A vertical-direction picture division value VDIV_CNT greater than a horizontal-direction picture division value HDIV_CNT indicates that the progress of the vertical-direction image process surpasses the progress of the horizontal-direction image process. Thus, in this case, a wait state is established in order to delay the generation of a trigger pulse TG3. That is to say, the generation of a trigger pulse TG3 is delayed in order to generate a trigger pulse TG3 after the wait state is ended.

In this embodiment, at a step S34, the integer component vp_i obtained at the step S22 is compared with the vertical-direction cumulative-addition count vstb_cnt to produce a result of determination as to whether or not the integer component vp_i is equal to the vertical-direction cumulative-addition count vstb_cnt. If the result of the determination indicates that the integer component vp_i is equal to the vertical-direction cumulative-addition count vstb_cnt, a cumulative addition end signal STB-RDY is generated at the step S34 as a signal indicating that the vertical-direction cumulative addition process carried out on the currently processed horizontal line has been completed.

The cumulative addition end signal STB-RDY is supplied to the vertical-direction image processing unit 522 in order to notify the vertical-direction image processing unit 522 that a vertical-direction hand-movement distortion compensation process can be started for the currently processed horizontal line. Accordingly, the vertical-direction image processing unit 522 commences the vertical-direction hand-movement distortion compensation process with a timing indicated by the next pulse of the horizontal-direction synchronization signal H-SYNC.

In this embodiment, however, the image is compensated for vertical-direction hand-movement distortion and vertical-direction lens distortion at the same time. Thus, a lens-distortion compensation completion DIST_RDY not shown in the figure is also supplied to the vertical-direction image processing unit 522 for every horizontal line. That is to say, vertical-direction image processing is started with a timing indicated by the next pulse of the horizontal-direction synchronization signal H-SYNC after both the cumulative addition end signal STB-RDY and the lens-distortion compensation completion DIST_RDY are put in an active state.

Image data processed in the lens-distortion compensation processing is not data synchronous with image data of a horizontal line being processed by the horizontal-direction image processing block 51. As a matter of fact, in some cases, the image data processed in the lens-distortion compensation processing cannot be generated till the horizontal-direction image processing block 51 completes horizontal-direction image processing carried out on image data of at least several tens of horizontal lines. Thus, a delay of the lens-distortion compensation completion DIST_RDY is caused by a state of waiting for completion of the horizontal-direction image processing carried out by the horizontal-direction image processing block 51.

Processing Operations of the Vertical Image Processing Unit 522

Figure 19:
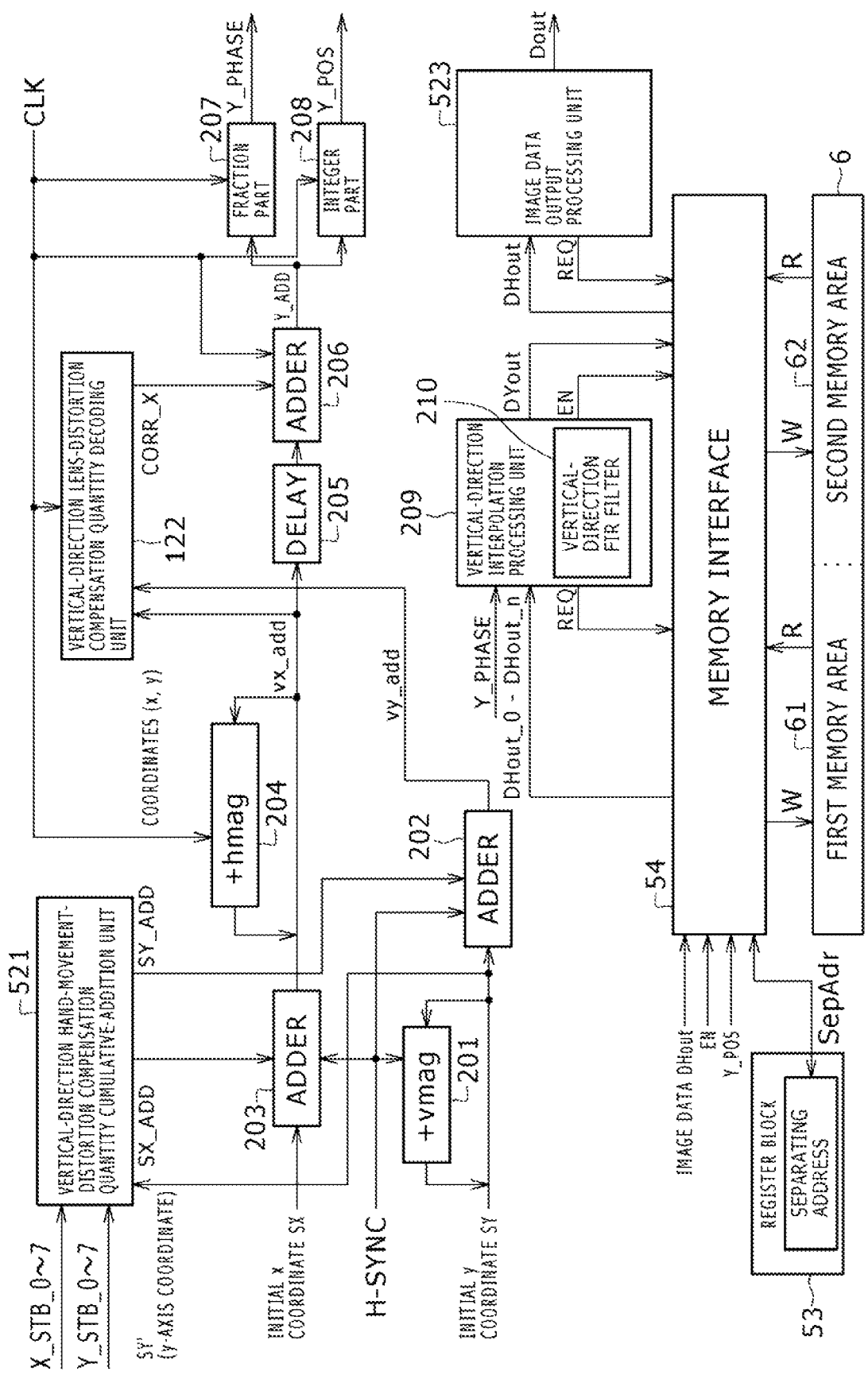
FIG. 19 is a block diagram showing a typical detailed configuration of a vertical-direction image processing unit in an embodiment implementing the image-data processing apparatus shown in FIG. 1.

FIG. 19 is a diagram showing a typical configuration of the vertical-direction image processing unit 522. In the typical configuration shown in FIG. 19, an adder 201 is included in the vertical-direction image processing unit 522 as a unit for cumulatively adding the value 'vmag' to the initial y-axis coordinate SY for every pulse of the horizontal-direction synchronization signal H-SYNC shown in the flowchart of FIG. 18. For this reason, the initial y-axis coordinate SY is supplied to the vertical-direction image processing unit 522. In addition, an initial x-axis coordinate SY is also supplied to the vertical-direction image processing unit 522.

A y-axis coordinate SY' produced by an adder 201 as a result of cumulatively adding the value 'vmag' to the initial y-axis coordinate SY for every pulse of the horizontal-direction synchronization signal H-SYNC is supplied to the vertical-direction hand-movement-distortion compensation quantity cumulative-addition unit 521. In response to the y-axis coordinate SY', the vertical-direction hand-movement-distortion compensation quantity cumulative-addition unit 521 returns a vertical-direction hand-movement distortion compensation quantity SY_ADD to the vertical-direction image processing unit 522 as an offset of the y-axis coordinate of the beginning of the currently processed horizontal line and a horizontal-direction hand-movement distortion compensation quantity SX_ADD to the vertical-direction image processing unit 522 as an offset of the x-axis coordinate of the beginning of the currently processed horizontal line.

An adder 202 employed in the vertical-direction image processing unit 522 adds the vertical-direction hand-movement distortion compensation quantity SY_ADD received from the vertical-direction hand-movement-distortion compensation quantity cumulative-addition unit 521 to the y-axis coordinate SY' only once at the beginning of each horizontal line. In addition, an adder 203 adds a horizontal-direction hand-movement distortion compensation quantity SX_ADD received from the vertical-direction hand-movement-distortion compensation quantity cumulative-addition unit 521 to the initial x-axis coordinate SX only once at the beginning of each horizontal line.

An adder 204 adds the value hmag serving as a parameter of the horizontal-direction enlargement and shrinking process to a sum output by the adder 203 for each pulse of the image processing clock signal CLK in order to produce a sum vx_add. The adder 204 supplies the sum vx_add to the vertical-direction lens-distortion-compensation quantity decoding unit 122 as an argument, which is the x coordinate of the (x, y) coordinates.

By the same token, the adder 202 supplies a sum vy_add produced thereby to the vertical-direction lens-distortion-compensation quantity decoding unit 122 as an argument, which is the y coordinate of the (x, y) coordinates.

In response to the arguments, the vertical-direction lens-distortion-compensation quantity decoding unit 122 outputs the vertical-direction lens-distortion compensation quantity CORR_Y at the (x, y) coordinates on the imager. An adder 206 adds the vertical-direction lens-distortion compensation quantity CORR_Y to the sum vy_add produced by the adder 202 for each pulse of the image processing clock signal CLK.

It is to be noted that the output vy_add of the adder 202 is supplied to the adder 206 by way of a delay unit 205 for providing a delay time equivalent to the time it takes to obtain the horizontal-direction lens-distortion compensation quantity CORR_Y from the vertical-direction lens-distortion-compensation quantity decoding unit 122.

A sum Y_ADD output by the adder 206 is supplied to a fraction-part extraction unit 207 and a integer-part extraction unit 208.

The fraction-part extraction unit 207 extracts the fraction part of the output value Y_ADD received from the adder 206 for every pulse of the pixel processing clock signal CLK and outputs a value Y_PHASE of the extracted fraction part to a vertical-direction interpolation processing time unit 209 having a vertical-direction FIR filter 210.

The vertical-direction FIR filter 210 is a component for carrying out an interpolation process by making use of image data of a plurality of horizontal lines arranged in the vertical direction. On the basis of the value Y_PHASE of the fraction part, the vertical-direction interpolation processing time unit 210 searches a multiplication-coefficient table for a multiplication coefficient to be supplied to the vertical-direction FIR filter 210. In this case, the interpolation is carried out only in the vertical direction. Thus, the interpolation process is all but the same as the interpolation process carried out in the horizontal direction by making use of the horizontal-direction FIR filter as explained before by referring to FIGS. 11 to 13.

The integer-part extraction unit 208 extracts the integer part of the output value Y_ADD received from the adder 206 for every pulse of the pixel processing clock signal CLK and outputs a value Y_POS of the extracted integer part to the memory interface 54 as the y-axis coordinate of the currently processed horizontal line for every pulse of the pixel processing clock signal CLK.

The memory interface 54 acquires the separating address SepAdr from the register block 53 in order to recognize the division-point address between the first image memory area 61 and the second image memory area 62 and the read and write range of the first image memory area 61. Knowing the read and write range of the first image memory area 61, the memory interface 54 is capable of controlling operations to store image data into the first image memory area 61 and read out image data from the first image memory area 61.

The memory interface 54 once stores image data DHout received from the horizontal-direction image processing block 51 into the first image memory area 61 of the image memory 6. Then, on the basis of the integer part Y_POS of the sum Y_ADD, the memory interface 54 determines image data DHout_0 to DHout_n of a plurality of horizontal lines as data to be read out from the first image memory area 61. As described earlier, the sum Y_ADD is the sum of the vertical-direction hand-movement distortion compensation quantity SY_ADD and the vertical-direction lens-distortion compensation quantity CORR_Y As image data with an amount large enough for starting vertical-direction image processing is stored in the first image memory area 61, in accordance with a request signal REQ received from a vertical-direction interpolation processing unit 209 as a signal indicating a requested horizontal line, the memory interface 54 reads out the image data DHout_0 to DHout_n determined on the basis of the integer part Y_POS of the sum Y_ADD as described above from the first image memory area 61 and supplies the image data DHout_0 to DHout_n to the vertical-direction interpolation processing unit 209.

On the basis of the fraction part Y_PHASE of the sum Y_ADD, the vertical-direction interpolation processing unit 209 carries out vertical-direction interpolation processing by making use of a vertical-direction FIR filter 210, vertical-direction image processing to compensate the image for hand-movement distortion and lens distortion, vertical-direction enlargement/shrinking processing and vertical-direction resolution conversion processing on the image data DHout_0 to DHout_n received from the memory interface 54. As described earlier, the sum Y_ADD is the sum of the vertical-direction hand-movement distortion compensation quantity SY_ADD and the vertical-direction lens-distortion compensation quantity CORR_Y. Also as explained before, in the vertical-direction interpolation processing, the fraction part Y_PHASE received by the vertical-direction interpolation processing unit 209 is used for determining a multiplication coefficient to be supplied to the vertical-direction FIR filter 210

In this way, the vertical-direction interpolation processing unit 209 carries out vertical-direction interpolation processing on the basis of the sum of the vertical-direction hand-movement distortion compensation quantity SY_ADD and the vertical-direction lens-distortion compensation quantity CORR_Y as well as vertical-direction image processing to compensate the image for hand-movement distortion and lens distortion, vertical-direction enlargement/shrinking processing and vertical-direction resolution conversion processing in order to generate image data DYout.

The image data DYout is supplied to the memory interface 54 along with a data enable signal EN. The memory interface 54 then stores the image data DYout in the second image memory area 62.

Subsequently, in accordance with the request signal REQ received from an image data output unit 523, the memory interface 54 reads out image data from the second image memory area 62 with a timing lagging behind the timing of the original image data by for example one vertical-direction period and outputs the data read out from the second image memory area 62 to the image data output unit 523 as output image data Dout.

Figure 20:
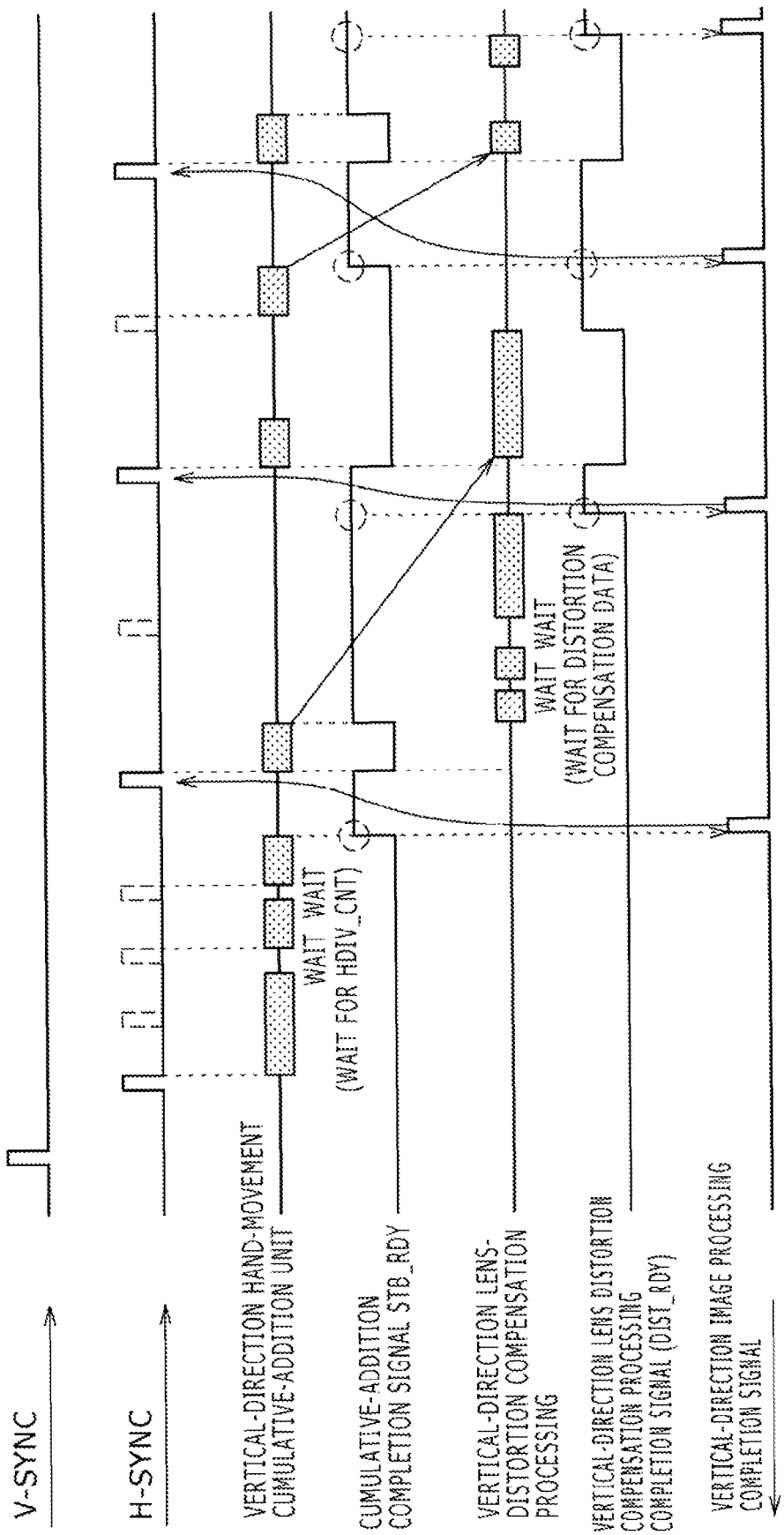
FIG. 20 is an explanatory diagram showing timing charts of operations carried out by the vertical-direction image processing unit shown in FIG. 19.

FIG. 20 is a timing diagram showing timings of the vertical-direction cumulative addition processing described before and the vertical-direction image processing carried out after the vertical-direction cumulative addition processing.

If a vertical-direction cutting-out process and a vertical-direction partial enlargement/shrinking process are not supported, the wait state described earlier is not established. In addition, the upper limit of the number of the vertical-direction cumulative additions for the currently processed horizontal line is set at a slightly small value at the most. Thus, the vertical-direction cumulative-addition processing and the vertical-direction image processing for the same horizontal line can both be carried out sequentially in one period of the horizontal-direction synchronization signal H-SYNC. As a result, in this case, it is not necessary to take the trouble to provide the cumulative-addition-end signal STB_RDY If a vertical-direction cutting-out process and/or a vertical-direction partial enlargement process are supported, on the other hand, it is quite within the bounds of possibility that a wait state is established in the course of the cumulative-addition process carried out on the first horizontal line. If a vertical-direction partial shrinking process is supported, it is quite within the bounds of possibility that a wait state is established in the course of the cumulative-addition process carried out on any horizontal line following the first horizontal line. In such cases, it is necessary to wait for the cumulative-addition-end signal STB_RDY to enter an active state, which is a high-level state in the timing diagram of FIG. 20. In addition, since the vertical-direction image processing block of the embodiment also compensates the image for lens distortion, it is also necessary to wait for the lens-distortion-compensation-end signal DIST_RDY to enter an active state, which is a high-level state in the timing diagram of FIG. 20, and generate a horizontal-direction synchronization signal H-SYNC for vertical-direction image processing as a trigger for the processing of the next horizontal line.

That is to say, as shown in FIG. 20, in the case of either a vertical-direction cutting-out process or a vertical-direction partial enlargement process, the cumulative-addition process carried out on the same horizontal line is suspended due to a wait state for several periods of the horizontal synchronization signal H-SYNC or for a longer period of time. Thus, the cumulative-addition-end signal STB_RDY is required for informing a component at a later stage that the cumulative-addition process has been ended.

In addition, as shown in FIG. 20, if the vertical-direction lens-distortion compensation processing is not completed, the processing of the next horizontal line cannot be started. Thus, in this case, as the lens-distortion-compensation-end signal DIST_RDY enters an active state in addition to a transition of the cumulative-addition-end signal STB_RDY to an active state, a vertical-direction image processing end signal is output and the vertical-direction image processing of the next horizontal line is started with the timing of the next horizontal synchronization signal H-SYNC.

In addition, when the vertical-direction image processing carried out on a certain horizontal line has not been completed either, the next pulse of the horizontal synchronization signal H-SYNC is masked as indicated by a dashed-horizontal line pulse in FIG. 20. That is to say, as long as the vertical-direction image processing end signal is not set, the horizontal synchronization signal H-SYNC serving as a trigger to start the processing of a horizontal line is masked.

Access Control and Capacity of the Image Memory 6

The next description further explains control of write and read accesses to the image memory 6 in the image processing described earlier and storage capacities required in the image processing as the storage capacities of the first image memory area 61 and the second image memory area 62.

The image pickup apparatus according to this embodiment has the following operation modes:
 (a): Moving-picture taking mode
 (b): Monitoring mode (A mode for generating an image to be displayed on a monitoring display screen typically in determining the frame of a still picture to be recorded)
 (c): Still-picture recording mode
 (d): Still-picture reproduction mode The moving-picture taking mode can be an HD (High Definition) moving-picture taking mode or an SD (Standard Definition) moving-picture taking mode.

In the still-picture recording mode or the HD moving-picture taking mode, the resolution of the output image is high, requiring a large storage capacity of the memory. Thus, in this case, the image memory 6 is used as one memory area. In the SD moving-picture taking mode, the monitoring mode or the still-picture reproduction mode, on the other hand, the resolution of the output image is relatively low, requiring a small storage capacity of the memory. In this case, the image memory 6 can be used by logically splitting the image memory 6 into the first image memory area 61 and the second image memory area 62 as described above.

Figure 21:
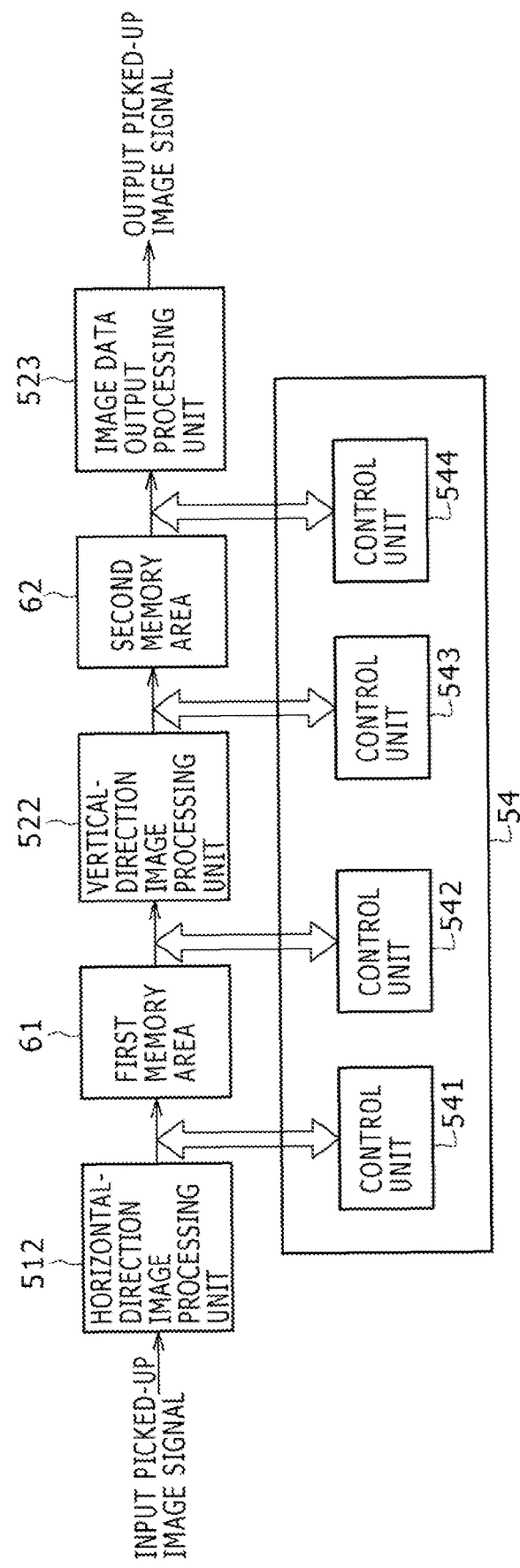
FIG. 21 is an explanatory diagram showing the entire flow of processing carried out on image data in an embodiment implementing an image-data processing apparatus.

FIG. 21 is a diagram showing the entire flow of the image processing described above as processing carried out by logically splitting the image memory 6 into the first image memory area 61 and the second image memory area 62.

As shown in the figure, a signal representing an input picked-up image is subjected to horizontal-direction image processing carried out by the horizontal-direction image processing unit 512 as described above. The result of the horizontal-direction image processing is then stored in the four banks BANK0 to BANK3 of the first image memory area 61 of the image memory 6. In this case, a control unit 541 employed in the memory interface 54 controls the operation to store the result of the horizontal-direction image processing in the four banks BANK0 to BANK3 of the first image memory area 61 of the image memory 6.

Then, at a request made by the vertical-direction image processing unit 522, the result of the horizontal-direction image processing is read out from the first image memory area 61 in accordance with control executed by a control unit 542 employed in the memory interface 54 and supplied to the vertical-direction image processing unit 522 for carrying out vertical-direction image processing on the processing result of the horizontal-direction image processing.

Then, the vertical-direction image processing unit 522 carries out the vertical-direction image processing on the result of horizontal-direction image processing and stores the result of vertical-direction image processing in the four banks BANK0 to BANK3 of the second image memory area 62 of the image memory 6. In this case, a control unit 543 employed in the memory interface 54 controls the operation to store the result of the vertical-direction image processing in the four banks BANK0 to BANK3 of the first image memory area 61 of the image memory 6.

Then, at a request made by the image data output unit 523, the result of the vertical-direction image processing is read out from the second image memory area 62 in accordance with control executed by a control unit 544 employed in the memory interface 54 and supplied to the image data output unit 523 for reproducing the processing result and outputting the result of the reproduction process.

As described above, in this embodiment, the memory interface 54 employs the control unit 541 for controlling an operation to write image data completing horizontal-direction processing, the control unit 542 for controlling an operation to read image data for vertical-direction, the control unit 543 for controlling an operation to write image data completing vertical-direction processing and the control unit 544 for controlling a read operation to output image data.

It is thus necessary to arbitrate accesses made by the four components (that is, the control unit 541, the control unit 542, the control unit 543 and the control unit 544) as accesses to the image memory 6 by using an arbitration unit 545 to be described later. In addition, in this embodiment, the image memory 6 has the four banks BANK0, BANK1, BANK2 and BANK3 as described before. Thus, the memory interface 54 needs to control operations to write image data into the four banks BANK0, BANK1, BANK2 and BANK3 as well as operations to read out image data from the four banks BANK0, BANK1, BANK2 and BANK3. For this reason, by referring to FIG. 22, the following description explains operations to write image data into the image memory 6 as well as operations to read out image data from the image memory 6 in detail.

Figure 22:
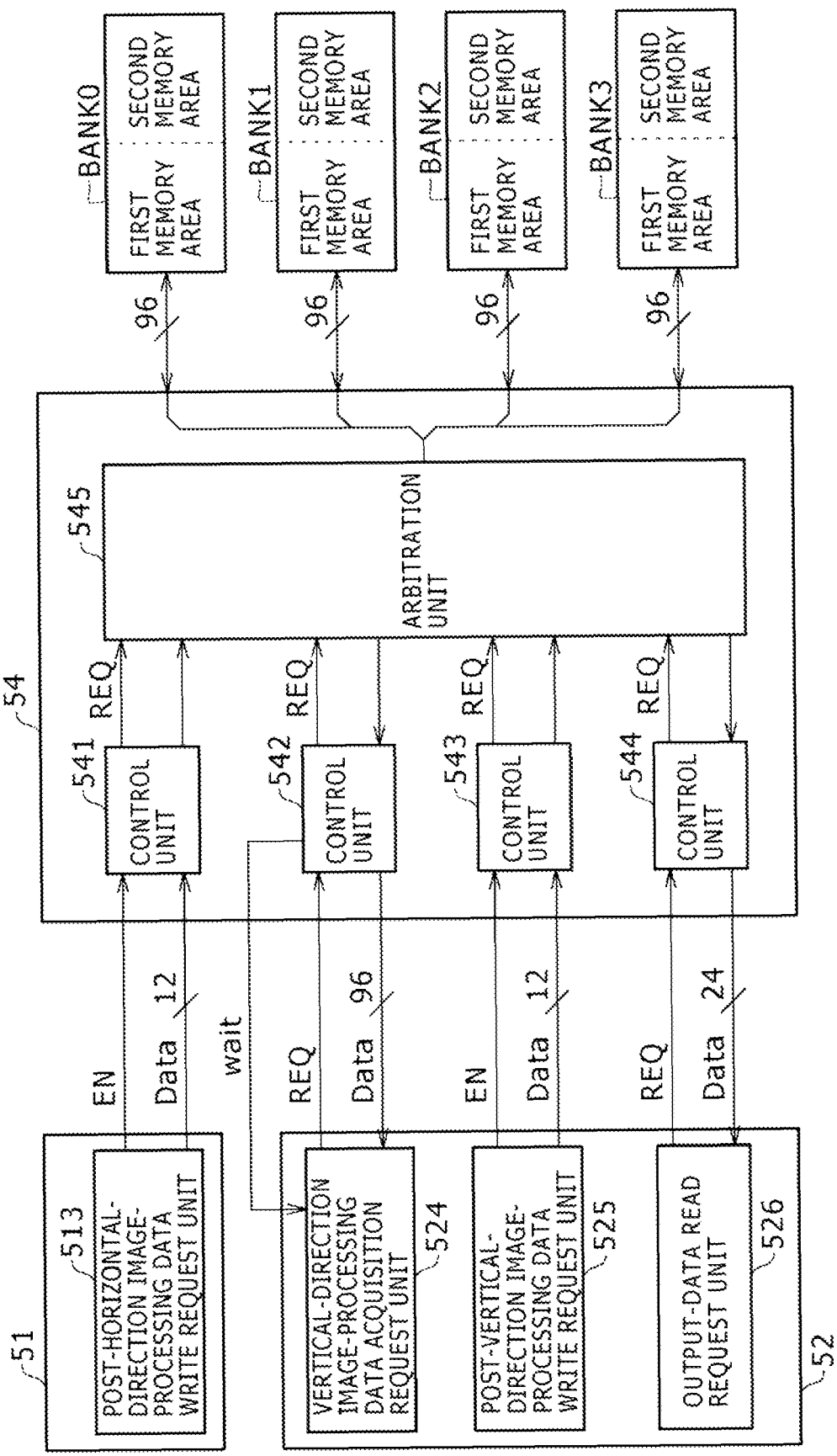
FIG. 22 is an explanatory block diagram to be referred to in description of typical control of accesses to an image memory in an embodiment implementing an image-data processing apparatus.

As shown in FIG. 22, in addition to the four components (that is, the control units 541, 542, 543 and 544), functionally, the memory interface 54 also employs the aforementioned arbitration unit 545 for arbitrating requests REQ made by the control units 541, 542, 543 and 544.

When the arbitration unit 545 receives requests REQ from any ones of the control units 541, 542, 543 and 544, the arbitration unit 545 recognizes which of the control units 541, 542, 543 and 544 have made the requests. Then, the arbitration unit 545 arbitrates executions of accesses according to the received requests REQ made by the control units 541, 542, 543 and 544 in accordance with a priority-level order set in advance for the control units 541, 542, 543 and 544.

In this embodiment, the priority-level order is set to provide read operations with priority levels higher then priority levels assigned to write operations. In addition, the more complicated the write or read operation, the higher the priority level given to the operation.

Thus, in this embodiment, the arbitration unit 545 arbitrates executions of accesses as follows:

First Priority:

The highest priority level is assigned to an operation controlled by the control unit 542 to read out image data for the vertical-direction image processing from the first image memory area 61.

Second Priority:

A high priority level is assigned to an operation controlled by the control unit 544 to read out image data to be reproduced from the second image memory area 62.

Third Priority:

A low priority level is assigned to an operation controlled by the control unit 541 to store image data completing the horizontal-direction image processing into the first image memory area 61.

Fourth Priority:

The lowest priority level is assigned to an operation controlled by the control unit 543 to store image data completing the vertical-direction image processing into the second image memory area 62.

In addition, in this embodiment, image data is stored into the image memory 6 in write units each consisting of a plurality of pixels arranged in the horizontal direction in place of pixel units or one-horizontal line units. In the case of this embodiment, the write unit consists of eight pixels arranged in the horizontal direction. That is to say, the memory interface 54 has a memory architecture in which an access to eight pixels arranged in the horizontal direction is made in one memory cycle.

In this embodiment, the ratios of the sampling frequencies for the luminance component Y, color-difference component Cr and color-difference components Cb of the image data are set at 4:1:1. Thus, eight pixels arranged in the horizontal direction suitably form a write unit. It should be no surprise that, even if the ratios of the sampling frequencies for the luminance component Y, color-difference component Cr and color-difference components Cb of the image data are not set at 4:1:1, eight pixels arranged in the horizontal direction can also be taken as a write unit as well.

It is to be noted that, in this embodiment, the luminance component Y is eight bits whereas the color-difference component Cr and the color-difference components Cb are each two bits in a pixel of 12 bits. Thus, if the write unit consists of eight pixels and a pixel consists of 12 bits, image data of 96 bits is stored in the image memory 6 in one memory cycle.

Accordingly, in this embodiment, the control units 541 to 544 each carry out a function of buffering image data in order to put data of eight pixels arranged in the horizontal direction in a package.

FIG. 22 is an explanatory diagram showing detailed operations carried out by the horizontal-direction image processing block 51 and the vertical-direction image processing block 52 in order to make write and read accesses to the image memory 6 by way of the memory interface 54.

As shown in FIG. 22, the horizontal-direction image processing block 51 functionally includes a post-horizontal-direction image-processing data write request unit 513 for requesting the control unit 541 to store image data obtained as a result of horizontal-direction image processing in the first image memory area 61 of the image memory 6.

On the other hand, the vertical-direction image processing block 52 functionally includes a vertical-direction image-processing data acquisition request unit 524, a post-vertical-direction image-processing data write request unit 525 and an output-data read request unit 526. The vertical-direction image-processing data acquisition request unit 524 is a section for requesting the control unit 542 employed in the memory interface 54 to read out image data to be subjected to vertical-direction image processing from the first image memory area 61 of the image memory 6. The post-vertical-direction image-processing data write request unit 525 is a section for requesting the control unit 543 employed in the memory interface 54 to store image data obtained as a result of the vertical-direction image processing in the second image memory area 62 of the image memory 6. The output-data read request unit 526 is a section for requesting the control unit 544 employed in the memory interface 54 to read out image data resulting from the vertical-direction image processing from the second image memory area 62 of the image memory 6 as output image data.

First of all, the following description explains control executed by the memory interface 54 to store data into the image memory 6.

In an operation to store image data obtained as a result of horizontal-direction image processing carried out by the horizontal-direction image processing block 51 in the first image memory area 61 of the image memory 6, the post-horizontaldirection image-processing data write request unit 513 employed in the horizontal-direction image processing block 51 outputs a request signal to the control unit 541 employed in the memory interface 54 synchronously with a pixel clock signal CLK. The request signal includes a data enable signal EN and valid pixel data Data. The data enable signal EN is a signal indicating that the pixel data Data is valid data. The valid pixel data Data is data of 12 bits per pixel.

In the same way as the operation to store image data obtained as a result of horizontal-direction image processing in the first image memory area 61 of the image memory 6, in an operation to store image data obtained as a result of vertical-direction image processing carried out by the vertical-direction image processing block 52 in the second image memory area 62 of the image memory 6, the post-vertical-direction image-processing data write request unit 525 employed in the vertical-direction image processing block 52 outputs a request signal to the control unit 543 employed in the memory interface 54 synchronously with a pixel clock signal CLK. By the same token, the request signal includes a data enable signal EN and valid pixel data Data. The data enable signal EN is a signal indicating that the pixel data Data is valid data. The valid pixel data Data is data of 12 bits per pixel.

FIG. 23A shows the pixel clock signal CLK cited above. FIG. 23B shows the data enable signal EN mentioned above. The high level of the data enable signal EN is the active state of the signal EN. The valid pixel data Data mentioned above includes a luminance signal shown in FIG. 23C and a color-difference signal shown in FIG. 23D. As shown in FIG. 23C, the luminance signal represents luminance components Yi of the image data where i=0, 1, 2 and so on. On the other hand, the color-difference signal shown in FIG. 23D represents color-difference components of the image data. In the operation to store image data obtained as a result of horizontal-direction image processing carried out by the horizontal-direction image processing block 51 in the first image memory area 61 of the image memory 6, the control unit 541 is put in a wait state till pixel data of eight pixels is received and, as the pixel data of eight pixels is received, the control unit 541 outputs a write request REQ shown in FIG. 23E to the image memory 6 by way of the arbitration unit 545. In the figure, the pixel data of eight pixels is enclosed in a dashed line block. By the same token, in the operation to store image data obtained as a result of vertical-direction image processing carried out by the vertical-direction image processing block 52 in the second image memory area 62 of the image memory 6, the control unit 543 is put in a wait state till pixel data of eight pixels is received and, as the pixel data of eight bits is received, the control unit 543 outputs a write request REQ to the image memory 6 by way of the arbitration unit 545.

Thus, the control unit 541 or the control unit 543 stores image data into respectively the first image memory area 61 or second image memory area 62 of the image memory 6 by way of the arbitration unit 545 in memory-cycle units each consisting of 96 bits (=(12 bits/pixel)×8 pixels).

In addition, the control unit 541 or the control unit 543 stores the image data into the banks of the first image memory area 61 or the second image memory area 62 respectively in an operation to store image data of a logical unit having a length determined in advance. In this embodiment, the logical unit having a length determined in advance is one horizontal line, which is smaller than the size of one bank. To put it in detail, if image data of one horizontal line has been stored in a bank, image data of the next horizontal line is stored in the next bank.

Let us take for example typical operations shown in FIG. 24 as operations to store image data in banks. The left-side portion of the figure shows an image data obtained as a result of horizontal-direction image processing. The image data includes non-white horizontal lines as horizontal lines to be processed in vertical-direction image processing. The non-white horizontal lines to be processed in vertical-direction image processing are stored in the four banks BANK0 to BANK3 of the first image memory area 61 of the image memory 6. In this case, after a non-white horizontal line stored in a bank, the next non-white horizontal line is stored in the next bank as shown on the right side of FIG. 24.

To put it in detail, first of all, the control unit 541 stores image data of the first non-white horizontal line in the bank BANK0 in eight-pixel units. After all the image data of the first non-white horizontal line has been stored in the bank BANK0, the control unit 541 stores image data of the second non-white horizontal line in the bank BANK1 in eight-pixel units. After all the image data of the second non-white horizontal line has been stored in the bank BANK1, the control unit 541 stores image data of the third non-white horizontal line in the bank BANK2 in eight-pixel units. After all the image data of the third non-white horizontal line has been stored in the bank BANK2, the control unit 541 stores image data of the fourth non-white horizontal line in the bank BANK3 in eight-pixel units.

After all the image data of the fourth non-white horizontal line has been stored in the bank BANK3, the control unit 541 stores image data of the fifth non-white horizontal line back in the bank BANK0 in eight-pixel units at a location immediately following the location of the first non-white horizontal line. Thereafter, the image data to be processed in vertical-direction image processing is stored in the banks in the same way in horizontal-line units by switching the write processing from bank to bank for every horizontal line unit.

In addition, in this case, as also shown in FIG. 24, the banks BANK0 to BANK3 of the image memory 6 having a 4-bank configuration are each used as a FIFO (First-In First-Out) memory or a ring memory.

Next, control executed by the memory interface 54 as control of processing to read out image data from the image memory 6 is explained.

In this embodiment, image data is read out from the image memory 6 by simultaneously fetching the data from a plurality of banks included in the image memory 6. That is to say, the image data is read out from four the banks at the same time.

Figures 25A, 25B:
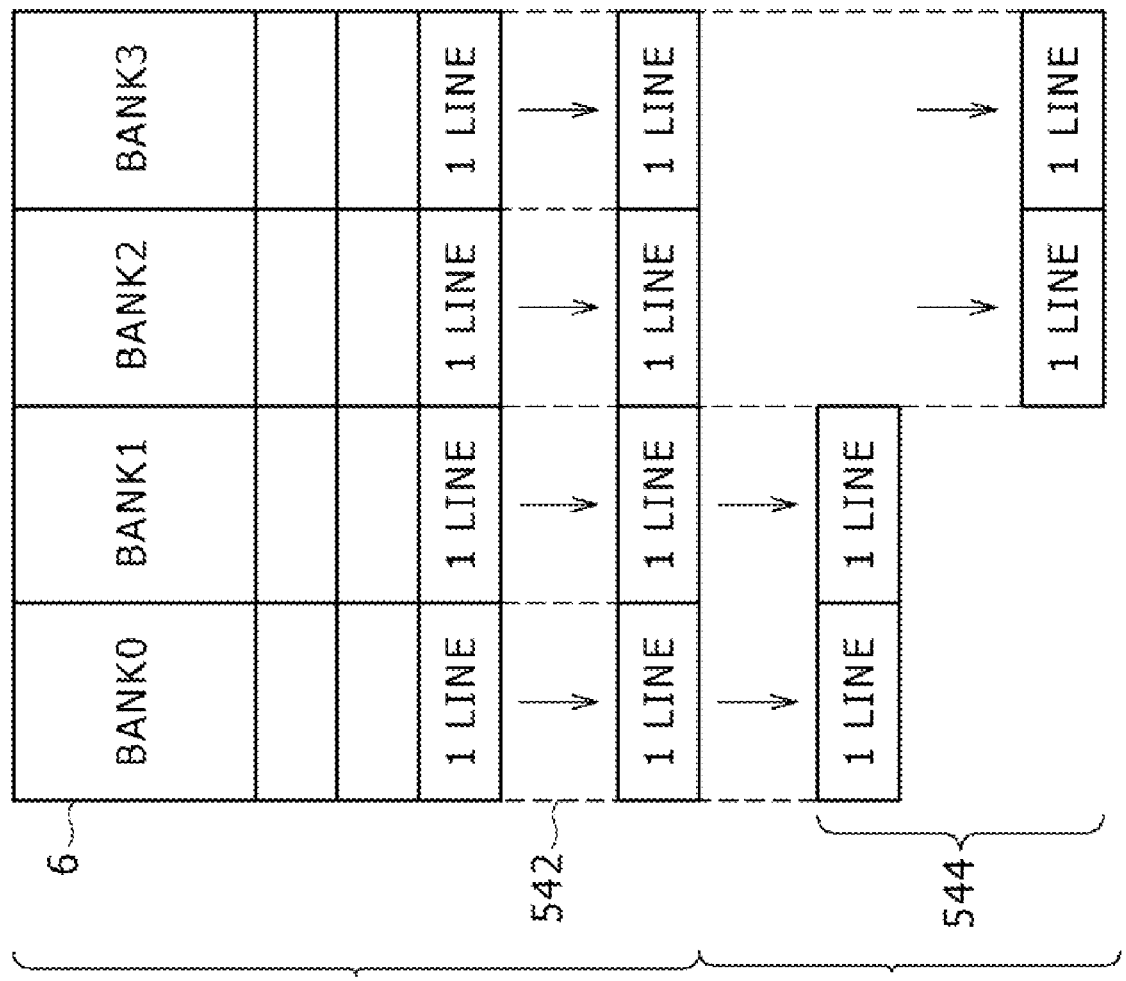
FIG. 25 is an explanatory diagram to be referred to in description of operations to read out image data from an image memory in an embodiment implementing an image-data processing apparatus.

To be more specific, in this embodiment, on the basis of a read request made by the vertical-direction image-processing data acquisition request unit 524 employed in the vertical-direction image processing block 52, the control unit 542 employed in the memory interface 54 reads out image data to be subjected to vertical-direction image processing from the first image memory area 61 of the image memory 6. In this case, image data of a total of four horizontal lines is read out at the same time from all the four banks of the first image memory area 61 of the image memory 6, that is, BANK0 to BANK3 respectively as shown in FIG. 25A. That is to say, the control unit 542 reads out data of four pixels on their respective four horizontal lines arranged in the vertical direction from the four banks respectively in one memory access cycle corresponding to one period of the pixel clock signal CLK. In one processing time unit period consisting of eight memory access cycles, the control unit 542 reads out data of 32 (=8×4) pixels of the four horizontal lines. Thus, the control unit 542 reads out all image data of the four horizontal lines in a multi-line read period, which consists of a plurality of such processing time unit periods. In the next multi-horizontal line read period, the control unit 542 reads out image data of the next four horizontal lines from the first image memory area 61 of the image memory 6.

On the other hand, on the basis of a read request made by the output-data read request unit 526 employed in the vertical-direction image processing block 52, the control unit 544 employed in the memory interface 54 reads out image data as output image data from the second image memory area 62 of the image memory 6. In this case, image data of a total of two horizontal lines is read out at the same time from two banks of the second image memory area 62 of the image memory 6, that is, the two banks BANK0 to BANK3 respectively as shown in FIG. 25B. That is to say, the control unit 544 reads out data of two pixels on their respective two horizontal lines arranged in the vertical direction from the two banks respectively in one memory access cycle corresponding to one period of the pixel clock signal CLK. In one processing time unit period consisting of eight memory access cycles, the control unit 544 reads out data of 16 8×2) pixels of the two horizontal lines.

That is to say, the control unit 544 reads out all image data of the two horizontal lines from a pair of banks in a multi-line read period. In the next multi-horizontal line read period, the control unit 544 reads out image data of the next two horizontal lines from the next pair of banks. In the case of the example shown in FIG. 25B, the pair of banks can be banks BANK0 and BANK1 or banks BANK2 and BANK3.

In addition, in this embodiment, one period of the pixel clock signal CLK is taken as one memory access cycle as described above. Let us take write and read accesses made by the four control units 541 to 544 as one set. To put it in detail, read accesses made by the control units 542 and 544 and write accesses made by the control units 541 and 543 are taken as one set. An interval for executing one set is referred to as a processing unit time interval, which is also called an access-right acquisition time interval in the following description. In the memory interface 54, the access-right acquisition time interval is seen as an interval consisting of a plurality of memory access cycles. That is to say, the access-right acquisition time interval is seen as an interval consisting of at least as many memory access cycles as control units employed in the memory interface 54. As described above, the memory access cycle can be a read or write cycle executed by a control unit. By executing the access-right acquisition time interval repeatedly, image data is stored into the image memory 6 or read out from the image memory 6 in order to process image data in a real-time manner.

In this embodiment, the access-right acquisition time interval consists of eight memory access cycles or eight periods of the pixel clock signal CLK. In the following description, one period of the pixel clock signal CLK is also referred to as a clock cycle. Then, from a concept similar to a concept described before as the concept of the priority levels assigned to the control units, during an access-right acquisition time interval (or a processing unit time interval), access rights are granted to the control units as follows:

once to the control unit 541;
at least twice but not more than 5 times to the control unit 542;
once to the control unit 543; and
once to the control unit 544.

In a clock cycle of an access-right acquisition time interval consisting of eight clock cycles, any ones of the control units 541 to 544 may not necessarily make requests REQ. That is to say, in a clock cycle, none of the control units 541 to 544 may make a request REQ in some cases.

Conversely speaking, in the same clock cycle, some of the control units 541 to 544 may each make a request REQ in some cases. In such cases, the arbitration unit 545 arbitrates the memory contention caused by simultaneous requests REQ made in the same clock cycle by determining which of the control units 541 to 544 is to receive an access right granted to a request REQ made thereby in the clock cycle in accordance with priority levels assigned to the control units 541 to 544 as described before.

FIG. 26 is a diagram showing typical granting of an access right to one of requests for each of clock cycles in an access-right acquisition time interval during which some of the control units 541 to 544 make the requests simultaneously. It is to be noted that, in FIG. 26, a high level of a waveform representing a request made by any individual one of the control units 541 to 544 indicates that the individual control unit is making the request or the request made by the individual control unit is put in an active state.

In the typical access-right granting shown in FIG. 26, during the first two clock cycles of one right-access interval, the control unit 542 is making a read request REQ. Thus, the arbitration unit 545 grants an access right to the read request REQ made by the control unit 542 as an access right to control an operation to read out image data to be subjected to vertical-direction image processing from the first image memory area 61 of the image memory 6.

During the third clock cycle, the read request REQ made by the control unit 542 overlaps with a read request REQ made by the control unit 544. In this case, the arbitration unit 545 arbitrates the memory contention caused by the read requests REQ by determining that the control unit 542 is a control unit to receive an access right granted to the read request REQ made thereby in the third clock cycle in accordance with priority levels assigned to the control units 541 to 544 as described before. Thus, the control unit 542 is again allowed to control an operation to read out image data to be subjected to vertical-direction image processing from the first image memory area 61 of the image memory 6.

During the fourth clock cycle, the control unit 543 is making a write request REQ. However, the read request REQ made by the control unit 544 in the third clock cycle but could not be implemented in the third clock cycle has a priority level higher than the priority level of the write request REQ. Thus, in the fourth cycle, the arbitration unit 545 determines that the control unit 544 is a control unit to receive an access right granted to the read request REQ made thereby in the third clock cycle. As a result, the control unit 544 is allowed to control an operation to read out image data as output image data from the second image memory area 62 of the image memory 6.

During the fifth clock cycle, the control unit 541 is making a write request REQ, which has a priority level higher than the priority level of the write request REQ made by the control unit 543 in the fourth clock cycle but could not be implemented in the fourth clock cycle. Thus, in the fifth cycle, the arbitration unit 545 determines that the control unit 541 is a control unit to receive an access right granted to the write request REQ made thereby in the fifth clock cycle. As a result, the control unit 541 is allowed to control an operation to store image data obtained as a result of horizontal-direction image processing into the first image memory area 61 of the image memory 6.

During the sixth and seventh clock cycles, the control unit 542 is making a read request REQ having the highest priority level among priority levels assigned to the control units 541 to 544. Thus, in the sixth and seventh cycles, the arbitration unit 545 determines that the control unit 542 is a control unit to receive an access right granted to the read request REQ made thereby in the same clock cycles. As a result, the control unit 542 is allowed to control an operation to read out image data to be subjected to vertical-direction image processing from the first image memory area 61 of the image memory 6.

During the last eighth clock cycle, no control unit is making an access request REQ. Thus, the arbitration unit 545 grants an access right to the write request REQ, which was made by the control unit 543 during the fourth clock cycle but still left unexecuted, in response to the write request. As a result, the control unit 543 is allowed to control an operation to store image data obtained as a result of vertical-direction image processing into the second image memory area 62 of the image memory 6.

The control unit 541 makes a write request REQ in a specific access-right acquisition time interval, during which an attempt is made to actually make a write access according to the write request REQ, as shown in FIG. 26 on the basis of a request signal shown in FIG. 22 as a write-request signal received from the post-horizontal-direction image-processing data write request unit 513 in an access-right acquisition time interval preceding the specific access-right acquisition time interval typically by one access-right acquisition time interval.

By the same token, the control unit 542 makes a read request REQ in a specific access-right acquisition time interval, during which an attempt is made to actually make a read access according to the read request REQ, as shown in FIG. 26 on the basis of a request signal shown in FIG. 22 as a read-request signal received from the vertical-direction image-processing data acquisition request unit 524 in an access-right acquisition time interval preceding the specific access-right acquisition time interval typically by one access-right acquisition time interval.

In the same way, the control unit 543 makes a write request REQ in a specific access-right acquisition time interval, during which an attempt is made to actually make a write access according to the write request REQ, as shown in FIG. 26 on the basis of a request signal shown in FIG. 22 as a write-request signal received from the post-vertical-direction image-processing data write request unit 525 in an access-right acquisition time interval preceding the specific access-right acquisition time interval typically by one access-right acquisition time interval.

Likewise, the control unit 544 makes a read request REQ in a specific access-right acquisition time interval, during which an attempt is made to actually make a read access according to the read request REQ, as shown in FIG. 26 on the basis of a request signal shown in FIG. 22 as a read-request signal received from the output-data read request unit 526 in an access-right acquisition time interval preceding the specific access-right acquisition time interval typically by one access-right acquisition time interval.

In this case, the read-request signals received from the vertical-direction image-processing data acquisition request unit 524 and the output-data read request unit 526 each include information on the position of an observed pixel. An observed pixel is a pixel from which data is to be read out. The information on the position of an observed pixel is information on the horizontal-direction and vertical-direction positions of the observed pixel.

Information included in the read-request signal generated by the output-data read request unit 526 as the information on the horizontal-direction and vertical-direction positions of an observed pixel, from which output image data is to be read out from the second image memory area 62, includes a horizontal line number unchanged all the time during the right-access acquisition time interval because the output image data no longer includes distortion. The horizontal line number is the information on the vertical-direction position. Thus, the control unit 544 generates a read request REQ at a high level as a request for a clock cycle in an access-right acquisition time interval as shown for example in FIG. 26.

On the other hand, information included in the read-request signal generated by the vertical-direction image-processing data acquisition request unit 524 as the information on the horizontal-direction and vertical-direction positions of an observed pixel, from which data being processed is to be read out from the first image memory area 61, includes the information on the vertical-direction position changing due to hand-movement distortion and lens distortion.

When the control unit 542 receives information on the positions of eight observed pixels in a right-access acquisition time interval serving as a horizontal-direction image processing time unit from the vertical-direction image-processing data acquisition request unit 524, the control unit 542 finds variations caused by vertical-direction image distortion for the eight observed pixels in order to find the number of clock cycles required for reading out all pieces of necessary pixel data according to the variations from the first image memory area 61. Then, the control unit 542 issues a read request REQ for a period with a length equivalent to the number of cycles.

The following description explains a relation between variations caused by image distortion and the number of clock cycles to be allocated in one access-right acquisition time interval for processing carried out as image processing to compensate an image for lens distortion.

First of all, a variation caused by distortion of a lens-distorted image is explained. In addition to barreled distortion shown in FIG. 58B, the image pickup apparatus according to this embodiment copes with bobbin distortion generated in a direction opposite to the direction of the barreled distortion. First of all, the gradient of distortion variations is defined.

The gradient of distortion variations is a numerical value serving as an indicator as to how much an image is distorted in the vertical direction within a certain fixed horizontal-direction size. To be more specific, the gradient of distortion variations is defined as a vertical-direction difference between a position most distorted in the downward direction to appear as a largest downward distortion variation and a position most distorted in the upward direction to appear as a largest upward distortion variation among positions in the horizontal-direction size. That is to say, the gradient of distortion variations is the maximum difference between the distortion variations and referred to hereafter simply as a variation amplitude. The variation amplitude representing the gradient of distortion variations is a positive value starting from 0. However, a variation amplitude of 0 means no distortion variations.

In the image pickup apparatus according to this embodiment, it is assumed that image data is stored into the image memory 6 and read out from the image memory 6 in eight-pixel units. FIGS. 27 to 30 are diagrams showing some of typical variation amplitudes in the range 0 to 4 for an interval of eight pixels arranged in the horizontal direction. To put it in detail, the figures show pixels on observed horizontal lines each stretched along positions of observed pixels and pixels included in eight upper and lower horizontal lines spread over the observed horizontal lines as pixels considered to be on horizontal lines required for carrying out a horizontal-direction interpolation process to compute data of the observed pixels.

Figures 27A, 27B:
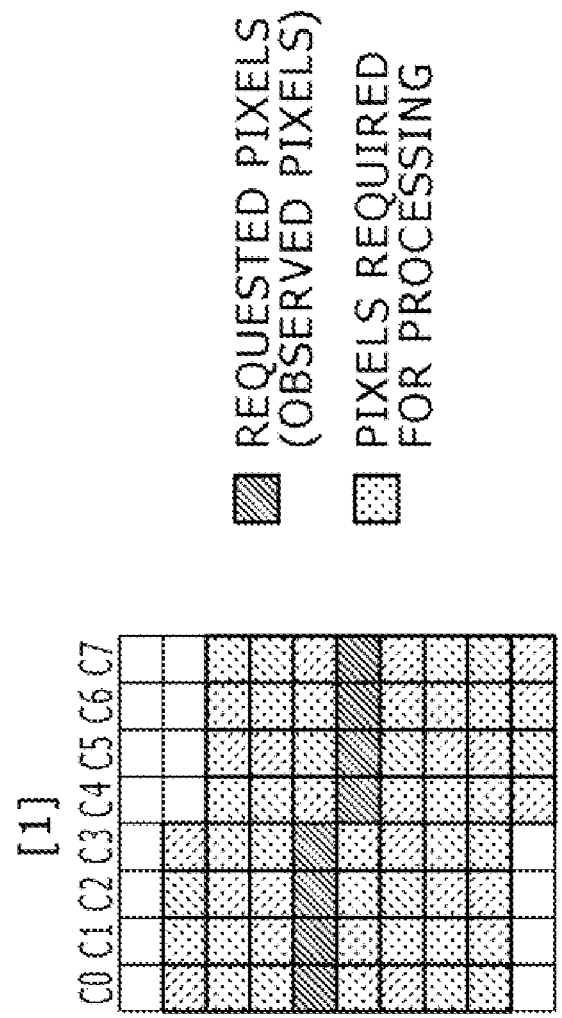
FIGS. 27A and 27B are explanatory diagrams to be referred to in description of control of operations to read out image data to be subjected to vertical-direction image processing from an image memory for a first variation amplitude in an embodiment implementing an image-data processing apparatus.

To be more specific, FIGS. 27A and 27B each show a variation pattern for a variation amplitude of 1 within a unit of eight pixels arranged in the horizontal directions. FIGS. 28A, 28B and 28C each show a variation pattern for a variation amplitude of 2 within a unit of eight pixels arranged in the horizontal directions. FIGS. 29A, 29B, 29C and 29D each show a variation pattern for a variation amplitude of 3 within a unit of eight pixels arranged in the horizontal directions. FIGS. 30A, 30B, 30C, 30D and 30E each show a variation pattern for a variation amplitude of 4 within a unit of eight pixels arranged in the horizontal directions.

Figures 29A, 29B, 29C, 29D:
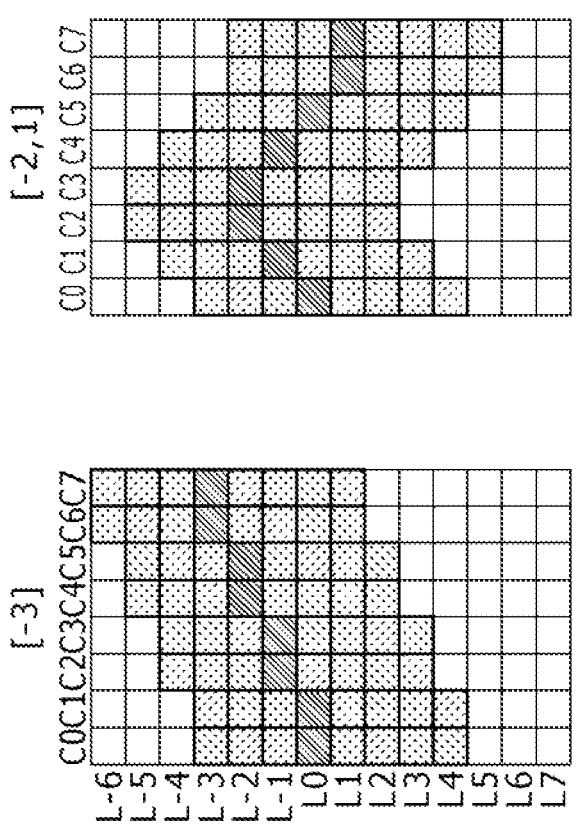
FIGS. 29A to 29D are explanatory diagrams to be referred to in description of control of operations to read out image data to be subjected to vertical-direction image processing from an image memory for a third variation amplitude in an embodiment implementing an image-data processing apparatus.

FIGS. 27A and 27B show variation patterns of [−1] and [1] respectively. FIGS. 28A, 28B and 28C show variation patterns of [−2], [−1, 1] and [2] respectively. FIGS. 29A, 29B, 29C and 29D show variation patterns of [−3], [−2, 1], [−1, 2] and [3] respectively. FIGS. 30A, 30B, 30C, 30D and 30E show variation patterns of [−4], [−3, 1], [−2, 2], [−1, 3] and [4] respectively. A negative sign assigned to a value of a variation pattern indicates that the variation pattern includes a maximum of variations occurring in a right-upward direction from the first observed pixel in a unit consisting of eight pixels arranged in the horizontal direction. On the other hand, a positive sign assigned to a value of a variation pattern indicates that the variation pattern includes a maximum of variations occurring in a right-downward direction from the first observed pixel in a unit consisting of eight pixels arranged in the horizontal direction. For example, the variation pattern of [−1] shown in FIG. 27A is a pattern including a maximum of one pixel for variations occurring in the right-upward direction from the first observed pixel in a unit consisting of eight pixels arranged in the horizontal direction. The variation pattern of [−1, 1] shown in FIG. 28B is a pattern including a maximum of one pixel for variations occurring in the right-upward direction from the first observed pixel in a unit consisting of eight pixels arranged in the horizontal direction and a maximum of one pixel for variations occurring in the right-downward direction from the first observed pixel in a unit consisting of eight pixels arranged in the horizontal direction. The variation pattern of [−2, 1] shown in FIG. 29B is a pattern including a maximum of two pixels for variations occurring in the right-upward direction from the first observed pixel in a unit consisting of eight pixels arranged in the horizontal direction and a maximum of one pixel for variations occurring in the right-downward direction from the first observed pixel in a unit consisting of eight pixels arranged in the horizontal direction.

In this embodiment, since the image memory 6 has a configuration including four banks, memory accesses for four horizontal lines can be made simultaneously at one time as described before by referring to FIG. 24. Thus, in the case of the patterns each shown in FIG. 30 as a pattern for the largest variation amplitude of 4, all required pixel data can be read out from the image memory 6 by making accesses to four horizontal lines at one time and repeating the accesses to four horizontal lines three times.

Thus, the control unit 542 issues a read request REQ to the arbitration unit 545 as a request spread over three clock cycles in one access-right acquisition time interval. In each of the three clock cycles, the arbitration unit 545 makes read accesses to four horizontal lines simultaneously. In this way, the control unit 542 is capable of reading out data from the first image memory area 61 of the image memory 6 for any distortion variations in ranges up to the ranges shown in FIG. 30 as patterns for a variation amplitude of 4. As described earlier, a variation amplitude is the gradient of variations occurring due to image distortion over a unit consisting of eight pixels arranged in the horizontal direction.

In this way, the control unit 542 computes a gradient of distortions caused by image distortion spread over a unit consisting of eight pixels arranged in the horizontal direction from positional information received from the vertical-direction image-processing data acquisition request unit 524 as information on the positions of eight observed pixels in one access-right acquisition time interval used as the unit of horizontal-direction image processing. Then, on the basis of the computed gradient of distortions caused by image distortion, the control unit 542 finds the number of horizontal lines required in vertical-direction image processing for the positions of the eight pixels arranged in the horizontal direction.

Subsequently, the control unit 542 finds the number of clock cycles required for making memory accesses to read out data of the horizontal lines required in the vertical-direction image processing from the first image memory area 61. Finally, the control unit 542 issues a read request REQ to the arbitration unit 545 as a request spread over the clock cycles in one access-right acquisition time interval.

It is to be noted that, in actuality, by computing a gradient of distortions caused by image distortion spread over a unit consisting of eight observed pixels arranged in the horizontal direction for each individual one of variation patterns shown in FIGS. 27 to 30, the number of horizontal lines required in vertical-direction image processing for the individual variation pattern can be determined.

For the reason described above, instead of finding the number of horizontal lines required in vertical-direction image processing for a unit consisting of eight observed pixels arranged in the horizontal direction from a gradient of distortions caused by image distortion spread over the unit, in this embodiment, the control unit 542 directly finds the number of clock cycles included in one access-right acquisition time interval as clock cycles for making accesses to data of the eight observed pixels on each of the required horizontal lines from the gradient. Then, the control unit 542 issues a read request REQ to the arbitration unit 545 as a request spread over the clock cycles in one access-right acquisition time interval.

By the way, in this embodiment, for processing carried out by the control unit 542 to read out image data to be subjected to vertical-direction image processing from the first image memory area 61 of the image memory 6, the control unit 542 is given a maximum of five access rights in one right-access acquisition time interval. The image data to be subjected to vertical-direction image processing is image data that can be read out at the same time from four banks of the first image memory area 61 of the image memory 6 as image data for four horizontal lines respectively. Thus, in one right-access acquisition time interval, the control unit 542 is capable of reading out image data of 20 (=4 horizontal lines per one time×5 times) horizontal lines.

Accordingly, in one right-access acquisition time interval, during which image-distortion compensation and resolution conversion processes are carried out, the control unit 542 is capable of reading out image data for the processes to be carried out in a real-time manner provided that the image data has a gradient of variations caused by image distortion in a range not exceeding a variation amplitude of 12 as shown in FIG. 65 explained earlier. As described earlier, one right-access acquisition time interval consists of eight clock cycles of the clock signal CLK and is an interval during which processing can be carried out in a real-time manner.

The variation amplitude of 12 is a value covering almost all variations caused by image distortion for an image pickup lens employed in an ordinary digital camera and an ordinary video camera. As also described in the section with a title of "Problems to be Solved by the Application," however, if a special lens such as a fish-eye lens is employed in such a camera, the gradient of variations caused by vertical-direction distortion may exceed the variation amplitude of 12 in some cases. If the gradient of variations caused by vertical-direction distortion exceeds the variation amplitude of 12, there is a problem that it is impossible to read out image data of a plurality of horizontal lines necessary for vertical-direction image processing in units consisting of eight pixels arranged in the horizontal direction from the first image memory area 61 of the image memory 6 within one specific right-access acquisition time interval or within the period of one processing time unit.

In order to solve the problem described above, in this embodiment, the control unit 542 needs to read out image data from the first image memory area 61 of the image memory 6 in subsequent right-access acquisition time intervals following the specific right-access acquisition time interval if the gradient of variations caused by vertical-direction distortion exceeds the variation amplitude of 12.

When the control unit 542 needs to read out image data as mentioned above, the control unit 542 transmits a wait request signal to the vertical-direction image-processing data acquisition request unit 524 as shown in FIG. 22. With the wait request signal asserted (or put in an active state), the vertical-direction image-processing data acquisition request unit 524 temporarily stops further issuance of a read request to acquire image data to be subjected to vertical-direction image processing. That is to say, the vertical-direction image-processing data acquisition request unit 524 is put in a wait (or stall) state. As the operation to read out image data of a plurality of horizontal lines necessary for vertical-direction image processing in units each consisting of eight pixels arranged in the horizontal direction from the first image memory area 61 of the image memory 6 is completed, the wait request signal is de-asserted (or restored to an inactive state) in order to allow the vertical-direction image-processing data acquisition request unit 524 to resume the temporarily suspended issuance of a read request to acquire image data to be subjected to vertical-direction image processing.

Figure 31:
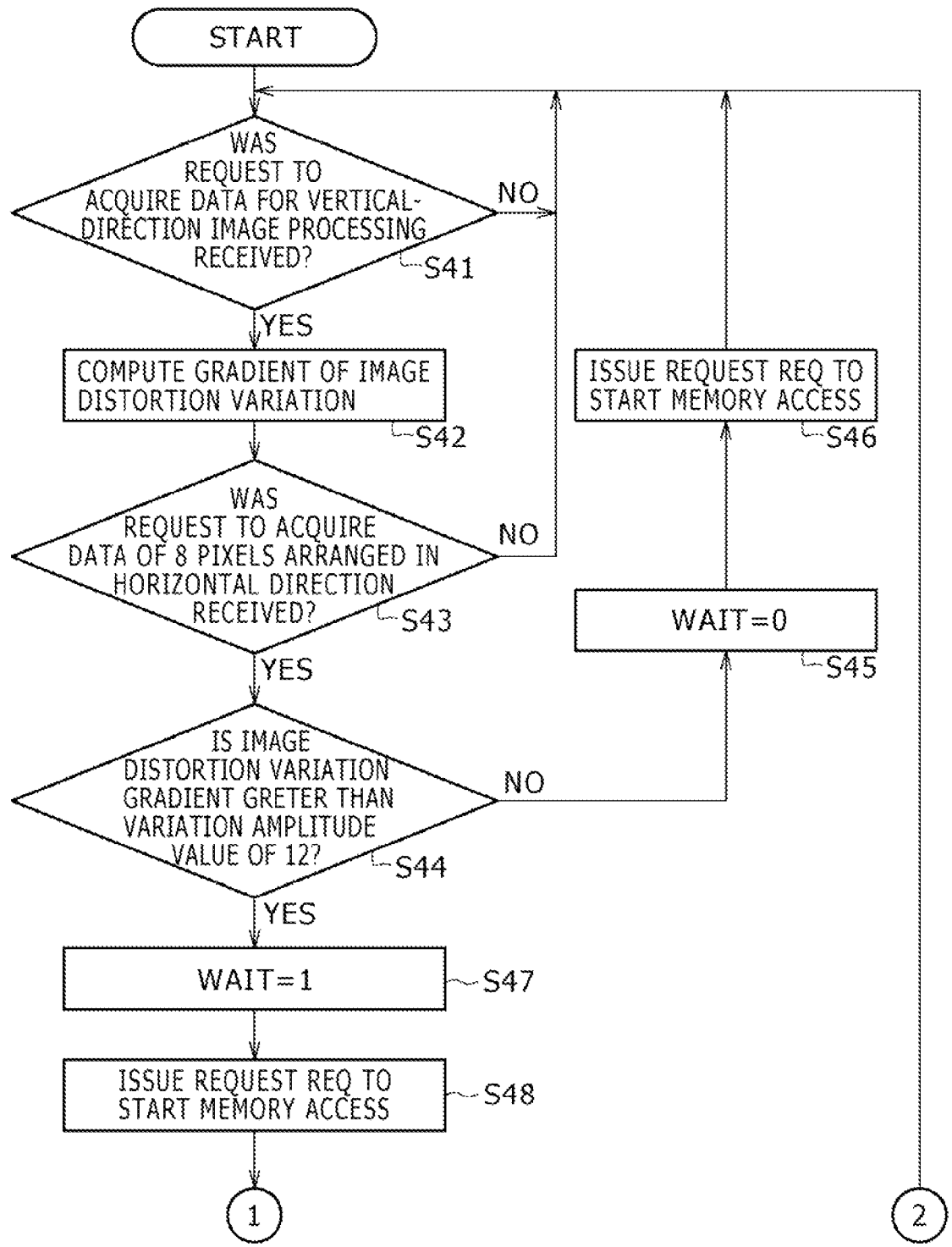
FIG. 31 shows a flowchart to be referred to in explanation of typical operations to read out image data to be subjected to vertical-direction image processing from an image memory in an embodiment implementing an image-data processing apparatus.
Figure 32:
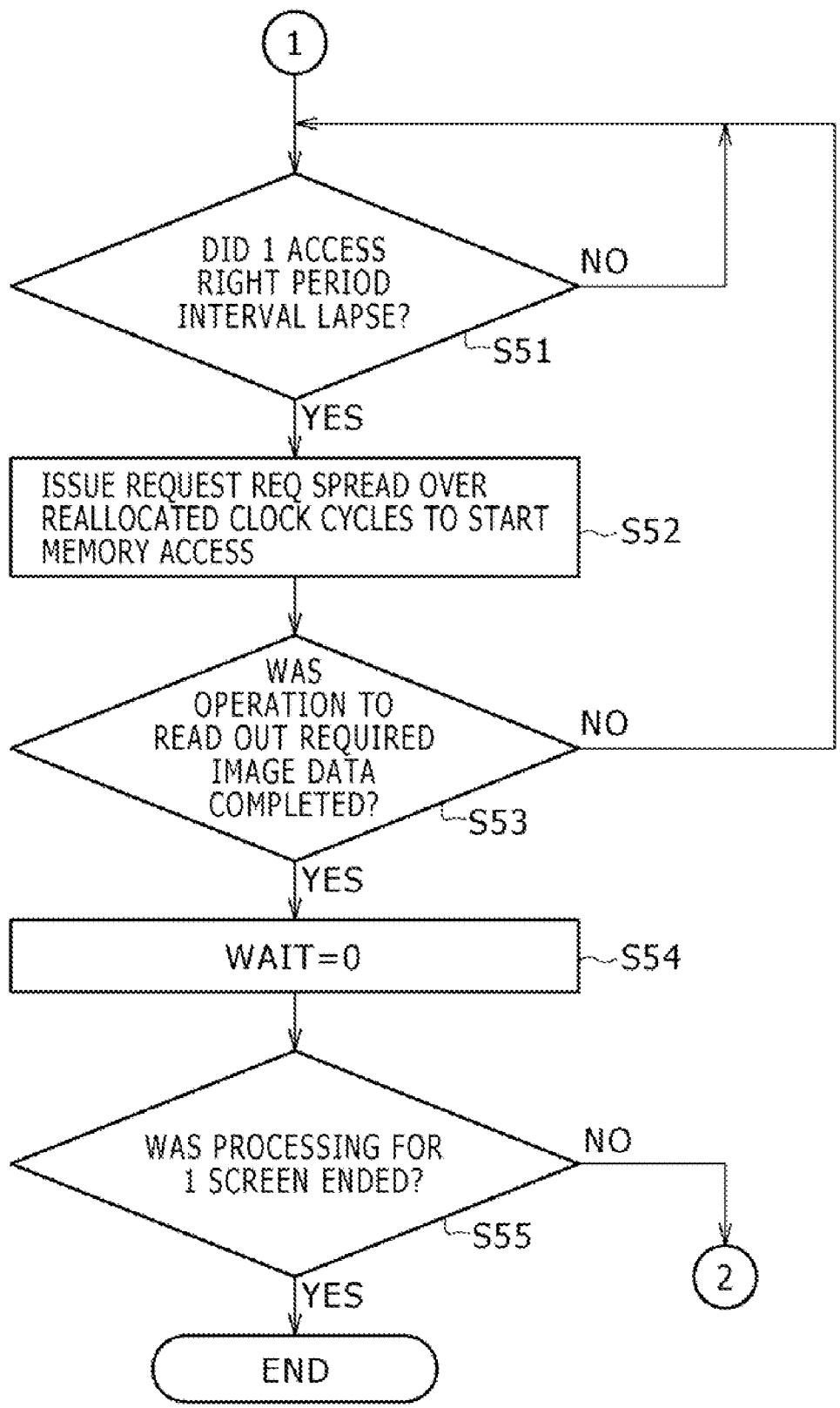
FIG. 32 shows a flowchart serving as a continuation of the flowchart shown in FIG. 31.
Figure 33:
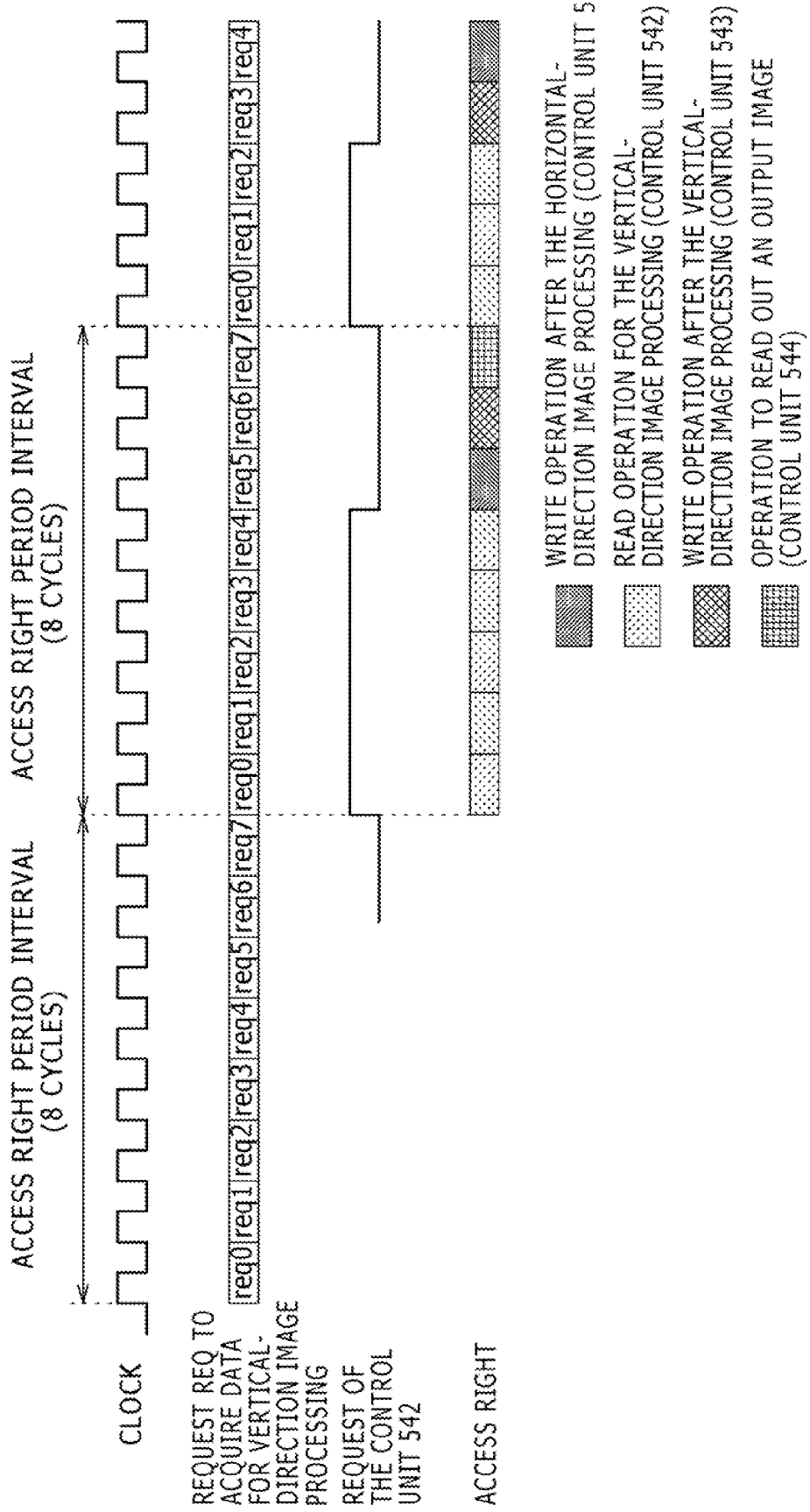
FIG. 33 is a diagram showing timing charts to be referred to in explanation of the typical operations to read out image data to be subjected to vertical-direction image processing from an image memory in an embodiment implementing an image-data processing apparatus.
Figure 34:
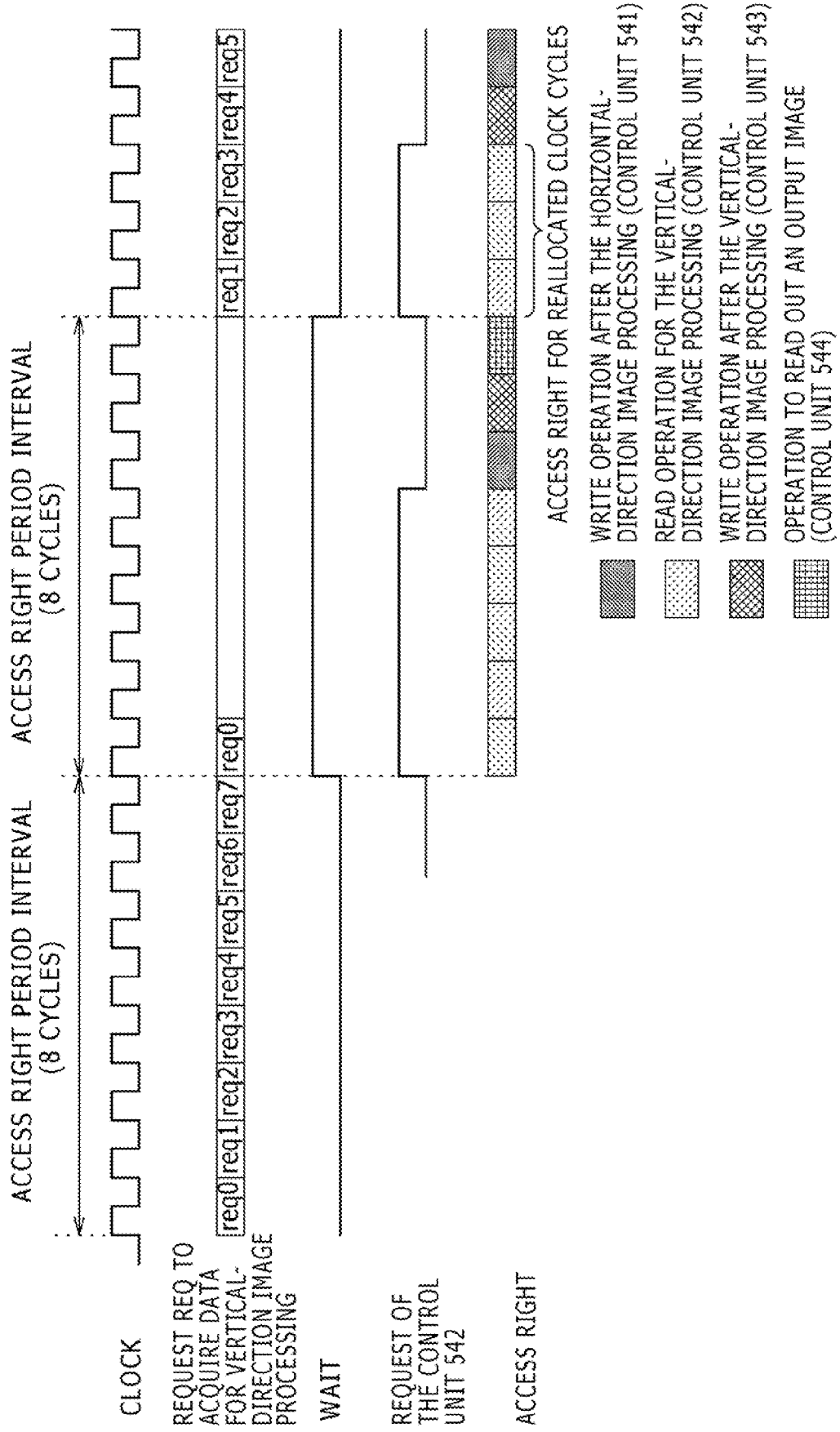
FIG. 34 is a diagram showing timing charts to be referred to in explanation of the typical operations to read out image data to be subjected to vertical-direction image processing from an image memory in an embodiment implementing an image-data processing apparatus.

FIGS. 31 and 32 show a flowchart representing processing operations carried out by the control unit 542. FIGS. 33 and 34 are each a timing chart of a request REQ made by the control unit 542 as a request to read out image data to be subjected to vertical-direction image processing from the first image memory area 61 of the image memory 6 and timing charts of typical granting of access rights in one access-right acquisition time interval. To be more specific, FIG. 33 is a timing chart of a request REQ made by the control unit 542 in accordance with a read request signal received from the vertical-direction image-processing data acquisition request unit 524 as a request REQ to read out image data to be subjected to vertical-direction image processing from the first image memory area 61 of the image memory 6 and timing charts of typical granting of access rights in one access-right acquisition time interval for a case in which the gradient of variations caused by vertical-direction distortion does not exceed the variation amplitude of 12. On the other hand, FIG. 34 is a timing chart of a request REQ made by the control unit 542 as a request to read out image data to be subjected to vertical-direction image processing from the first image memory area 61 of the image memory 6 and timing charts of typical granting of access rights in one access-right acquisition time interval for a case in which the gradient of variations caused by vertical-direction distortion exceeds the variation amplitude of 12.

Processing operations carried out by the control unit 542 are explained by referring to the flowchart shown in FIGS. 31 and 32 as well as the timing charts shown in FIGS. 33 and 34 as follows. It is to be noted that the flowchart shown in FIGS. 31 and 32 represents processing to read out image data for one screen from the first image memory area 61.

As shown in FIG. 31, the flowchart begins with a step S41 at which the control unit 542 produces a result of determination as to whether or not a vertical-direction image processing data acquisition request reqk (where k=0, 1, 2, . . . or 7) for image data of a 1-pixel unit has been received for all horizontal lines each having pixel data required in the vertical-direction image processing from the vertical-direction image-processing data acquisition request unit 524. If the determination result produced in the process carried out at the step S41 indicates that the vertical-direction image processing data acquisition request reqk for image data of a one-pixel unit has not been received for all horizontal lines each having pixel data required in the vertical-direction image processing from the vertical-direction image-processing data acquisition request unit 524, the flow of the processing goes back to the step S41 to repeat the determination process carried out at the step S41. As the determination result produced in the process carried out at the step S41 indicates that all the vertical-direction image processing data acquisition request reqk for image data of a one-pixel unit has been received for all horizontal lines each having pixel data required in the vertical-direction image processing from the vertical-direction image-processing data acquisition request unit 524, the flow of the processing goes on to a step S42 at which the control unit 542 computes the gradient of variations caused by image distortion for all variations of the pixels requested by the vertical-direction image-processing data acquisition request unit 524.

Then, at the next step S43, the control unit 542 produces a result of determination as to whether or not vertical-direction image processing data acquisition requests reqk for image data of a processing time unit consisting of eight pixels arranged in the horizontal direction have been received from the vertical-direction image-processing data acquisition request unit 524. If the determination result produced in the process carried out at the step S42 indicates that all the vertical-direction image processing data acquisition requests reqk for image data of a processing time unit consisting of eight pixels arranged in the horizontal direction have not been received from the vertical-direction image-processing data acquisition request unit 524, the flow of the processing goes back to the step S41 to repeat the processes carried out at the steps S41 to S43.

As described above, the vertical-direction image processing data acquisition requests reqk (where k=0, 1, 2, . . . and 7) appearing consecutively in the horizontal direction for each pixel in one access-right acquisition time interval consisting of eight pixels arranged in the horizontal direction are shown in FIGS. 33 and 34. For each value of k, vertical-direction image processing data acquisition requests reqk (for example req0 for k=0) are made for a pixel on each horizontal line having pixel data required for vertical-direction image processing. The determination result produced by the control unit 542 in the process carried out at the step S41 is a result of determination as to whether or not vertical-direction image processing data acquisition requests reqk of a particular value of k have been received from the vertical-direction image-processing data acquisition request unit 524 for all the horizontal lines each having pixel data required for vertical-direction image processing. Each of the vertical-direction image processing data acquisition requests reqk includes information on the position of an observed pixel.

Thus, each time the control unit 542 receives vertical-direction image processing data acquisition requests reqk (where k=0, 1, 2, . . . or 7) of a particular value of k for all the horizontal lines each having pixel data required for vertical-direction image processing, the control unit 542 computes the gradient of variations caused by image distortion. Therefore, when the control unit 542 receives the last vertical-direction image processing data acquisition request req7 of the vertical-direction image processing data acquisition requests req0 to req7 made in one access-right acquisition time interval used as the processing time unit consisting of eight pixels arranged in the horizontal direction, the control unit 542 carries out the process of the step S42 to compute the final gradient of variations caused by image distortion generated over the processing time unit consisting of eight pixels arranged in the horizontal direction.

As the determination result produced in the process carried out at the step S43 indicates that all the vertical-direction image processing data acquisition requests reqk for image data of a processing time unit consisting of eight pixels arranged in the horizontal direction have been received from the vertical-direction image-processing data acquisition request unit 524, the flow of the processing goes on to the step S44 at which the control unit 542 produces a result of determination as to whether or not the gradient computed in the process carried out at the step S42 as the final gradient of variations caused by image distortion generated over the processing time unit consisting of eight pixels arranged in the horizontal direction exceeds the variation amplitude of 12.

If the determination result produced in the process carried out at the step S44 indicates that the final gradient of variations caused by image distortion generated over the processing time unit consisting of eight pixels arranged in the horizontal direction does not exceed the variation amplitude of 12, the flow of the processing goes on to the step S45 at which the control unit 542 puts the wait request signal output to the vertical-direction image-processing data acquisition request unit 524 in an inactive state by for example setting the wait request signal at 0 (wait=0). Then, at the next step S46, the control unit 542 issues a request REQ spread over clock cycles required for reading out image data from the first image memory area 61 as image data required in vertical-direction image processing as shown in FIG. 33 to the arbitration unit 545 in order to request the arbitration unit 545 to start a memory access to the first image memory area 61 of the image memory 6. The number of clock cycles required for reading out image data from the first image memory area 61 as image data required in vertical-direction image processing is determined in accordance with a final gradient computed in the process carried out at the step S42 as the gradient of variations caused by image distortion generated over a processing time unit consisting of eight pixels arranged in the horizontal direction. It is to be noted that the request REQ shown in FIG. 33 can be spread over a maximum of 5 clock cycles. In this embodiment, the request REQ can be spread over 2 to 5 clock cycles, depending on the gradient of variations.

If the determination result produced in the process carried out at the step S44 indicates that the final gradient of variations caused by image distortion generated over the processing time unit consisting of eight pixels arranged in the horizontal direction exceeds the variation amplitude of 12, on the other hand, the flow of the processing goes on to the step S47 at which the control unit 542 puts the wait request signal output to the vertical-direction image-processing data acquisition request unit 524 in an active state by for example setting the wait request signal at 1 (wait=1). As shown in FIG. 34, the wait request signal is a signal synchronized with the access-right acquisition time interval and put in an active state extended over the period of the access-right acquisition time interval. Then, at the next step S48, the control unit 542 issues a request REQ spread over the maximum number of clock cycles allocated in advance to a read access to image data to be subjected to vertical-direction image processing as clock cycles required for reading out the image data from the first image memory area 61 as image data as shown in FIG. 34 to the arbitration unit 545 in order to request the arbitration unit 545 to start a memory access to the first image memory area 61 of the image memory 6.

In the timing charts shown in FIG. 34, the wait request signal is put in an active state. Thus, even though the vertical-direction image-processing data acquisition request unit 524 issues a vertical-direction image processing data acquisition request req0 for the first pixel in an access-right acquisition time interval consisting of eight pixels arranged in the horizontal direction to the control unit 542 employed in the memory interface 54, the vertical-direction image-processing data acquisition request unit 524 temporarily stops further issuance of vertical-direction image processing data acquisition requests req1 to req7 for the subsequent pixels in the same access-right acquisition time interval to the control unit 542, entering a wait state.

It is to be noted that, as the wait state indicated by an active state of the wait request signal is ended and followed by a transition of the wait request signal back to an inactive state, the vertical-direction image-processing data acquisition request unit 524 resumes the temporarily suspended issuance of vertical-direction image processing data acquisition requests starting with req1, which is the second vertical-direction image processing data acquisition request.

After the process carried out at the step S48 is completed, the flow of the processing goes on to a step S51 of the continuation flowchart shown in FIG. 32. At the step S51, the control unit 542 produces a result of determination as to whether or not one access-right acquisition time interval has lapsed. If the determination result produced in the process carried out at the step S51 indicates that one access-right acquisition time interval has not lapsed, the flow of the processing goes back to the step S51 to repeat the determination process carried out at the step S51. As the determination result produced in the process carried out at the step S51 indicates that one access-right acquisition time interval has lapsed, the flow of the processing goes on to a step S52 at which the control unit 542 reallocates clock cycles included in the next access-right acquisition time interval as clock cycles required for reading out image data that could not be read out from the first image memory area 61 of the image memory 6 as data to be subjected to vertical-direction image processing in the immediately preceding access-right acquisition time interval. Then, the control unit 542 makes a request REQ spread over the reallocated clock cycles to the arbitration unit 545 as shown in FIG. 34 in order to start a memory access. In this way, an access to the first image memory area 61 of the image memory 6 can be resumed.

Then, at the next step S53, the control unit 542 produces a result of determination as to whether or not an operation has been completed as an operation to read out necessary image data from the first image memory area 61 of the image memory 6 by making use of the reallocated clock cycles included in the next access-right acquisition time interval as clock cycles required for reading out image data that could not be read out from the first image memory area 61 of the image memory 6 as data to be subjected to vertical-direction image processing in the immediately preceding access-right acquisition time interval.

If the determination result produced in the process carried out at the step S53 indicates that an operation has not been completed as an operation to read out necessary image data, the flow of the processing goes back to the step S51 to repeat the processes carried out at the steps S51 to S53. As described above, at the step S52, the control unit 542 reallocates clock cycles included in the next access-right acquisition time interval as clock cycles required for reading out image data that could not be read out from the first image memory area 61 of the image memory 6 as data to be subjected to vertical-direction image processing in the immediately preceding access-right acquisition time interval. Then, the control unit 542 makes a request REQ spread over the reallocated clock cycles to the arbitration unit 545 as shown in FIG. 34 in order to start a memory access. In this way, an access to the first image memory area 61 of the image memory 6 can be resumed. At that time, however, the wait request signal has been put in an active state (in the case of this embodiment, wait=1) and the operation carried out by the vertical-direction image-processing data acquisition request unit 524 to output a request reqk of acquiring image data to be subjected to vertical-direction image processing to the control unit 542 from the first image memory area 61 of the image memory 6 is in a state of being temporarily suspended.

As the determination result produced in the process carried out at the step S53 indicates that an operation has been completed as an operation to read out necessary image data, the flow of the processing goes on to the step S54 at which the control unit 542 puts the wait request signal output to the vertical-direction image-processing data acquisition request unit 524 in an inactive state by for example setting the wait request signal at 0 (wait=0). In this way, the wait request signal is restored to the inactive state with a timing corresponding to the last reallocation of clock cycles required for reading out necessary image data in the processing to read out the image data from the first image memory area 61 of the image memory 6. Thus, if the processing to read out the necessary image data from the first image memory area 61 of the image memory 6 can be completed in two consecutive right-access acquisition time intervals as will be described later, the wait request signal is restored to the inactive state with a timing corresponding to the first reallocation of clock cycles required for reading out necessary image data in the processing to read out the image data from the first image memory area 61 of the image memory 6.

As the wait request signal is restored to the inactive state in the process carried out at the step S54, as shown in FIG. 34, the vertical-direction image-processing data acquisition request unit 524 resumes the operation to output requests reqk of acquiring image data to be subjected to vertical-direction image processing to the control unit 542 from the first image memory area 61 of the image memory 6. From this point of time, the control unit 542 receives requests req0 to req7 from the vertical-direction image-processing data acquisition request unit 524 as requests of acquiring image data of eight new pixels arranged in the horizontal direction as image data to be subjected to vertical-direction image processing from the first image memory area 61 of the image memory 6, and the control unit 542 has completed the operation to read out all the image data to be subjected to vertical-direction image processing to the control unit 542 from the first image memory area 61 of the image memory 6. In this way, the wait request signal is restored to the inactive state in the process carried out at the step S54 with a timing preceding an access-right acquisition time interval to start a read access corresponding to the requests req0 to req7 of acquiring image data of the eight new pixels. Thus, the read processing can be continued to the image data of the eight new pixels.

Then, at the next step S55, the control unit 542 produces a result of determination as to whether or not the processing carried out on image data of one screen has been completed. If the determination result produced in the process carried out at the step S55 indicates that the processing carried out on image data of one screen has not been completed, the flow of the processing goes back to the step S41 to repeat the processes carried out at the step S41 and the subsequent processes. If the determination result produced in the process carried out at the step S55 indicates that the processing carried out on image data of one screen has been completed, on the other hand, the processing represented by the flowchart is ended.

In the processing described above, the processes of the steps S51 to S53 are carried out recursively in accordance with the gradient of variations caused by image distortion in order to carry out the read access processing without imposing a limit on changes of the magnitude of the gradient of variations caused by image distortion and carry out the processing to compensate the image for the image distortion.

If the picked-up image serving as an object of processing is a still image, processing to be carried out in a real-time manner is not necessary. Thus, it is possible to carry out the operation to reallocate clock cycles included in the next access-right acquisition time interval as clock cycles required for reading out image data that could not be read out from the first image memory area 61 of the image memory 6 as data to be subjected to vertical-direction image processing in the immediately preceding access-right acquisition time interval a number of times. That is to say, it is possible to carry out the operation to reallocate clock cycles in as many next right-access acquisition time intervals as required without raising a problem.

If the picked-up image serving as an object of processing is a moving picture processed in moving-picture processing of video-signal processing, on the other hand, the processing must be carried out in a real-time manner. Thus, if it is necessary to carry out the above operation to reallocate clock cycles a number of times, it is feared that the data processing system will collapse eventually as a result. For this reason, it is not desirable to provide a configuration in which it is possible to carry out the above operation to reallocate clock cycles recursively in a large number of times without limitation.

Figure 35:
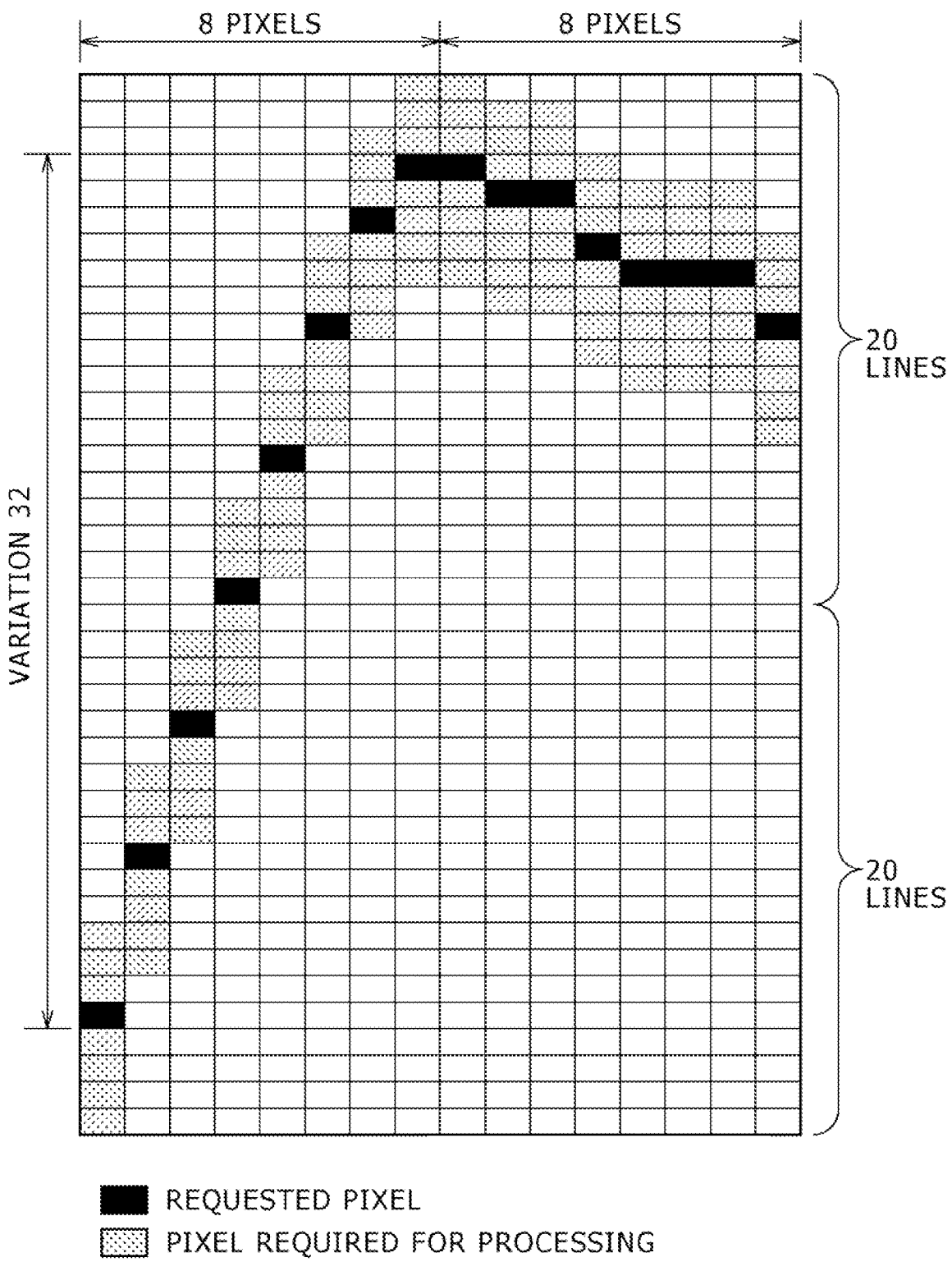
FIG. 35 is an explanatory diagram to be referred to in description of operations to read out typical image data to be subjected to vertical-direction image processing from an image memory in an embodiment implementing an image-data processing apparatus.

By the way, in the case of this embodiment, a maximum of 5 clock cycles in one access-right acquisition time interval can be allocated to a read access based on a request REQ made by the control unit 542. Since the image memory 6 has a configuration including four banks, as shown in FIG. 35, by putting the wait request signal in an active state in only one access-right acquisition time interval and allocating the clock cycles to an access to read out image data to be subjected to vertical-direction image processing from the first image memory area 61 of the image memory 6 only once, the gradient of variations caused by image distortion represents distortion having variation amplitudes of up to 32. That is because, since image data of 20 horizontal lines can be read out from the first image memory area 61 of the image memory 6 during one access-right acquisition time interval, image data of 40 horizontal lines can be read out from the first image memory area 61 of the image memory 6 during two access-right acquisition time interval. Thus, the gradient of variations caused by image distortion represents distortion having variation amplitudes of up to 32.

As described before, if a fish-eye lens is employed, image distortion such as barreled distortion like the one shown in FIG. 58B and/or bobbin distortion may be generated. In processing to compensate an image for image distortion by making use of an ordinary fish lens, however, at most positions on a picked-up image, the gradients of variations caused by distortion generated in a unit consisting of eight pixels arranged in the horizontal direction are not greater than 32. The number of reallocations of clock cycles increases because the number of variations caused by distortion generated in a unit consisting of eight pixels arranged in the horizontal direction increases. In general, the number of variations caused by distortion generated in a unit consisting of eight pixels arranged in the horizontal direction increases in areas in close proximity to the four corners of an image with bobbin distortion or barreled distortion like the one shown in FIG. 58B.

That is to say, it is not necessary to reallocate clock cycles included in the next access-right acquisition time interval as clock cycles required for reading out image data that could not be read out from the first image memory area 61 of the image memory 6 in the immediately preceding access-right acquisition time interval as data to be subjected to vertical-direction image processing for all positions on the image. When processing image portions at positions in close proximity to the four corners of the image, however, it is quite within the bounds of possibility that the control unit 542 reallocates clock cycles. It is also known in general that, even if image portions at positions in close proximity to the four corners of the image are not strictly compensated for distortion, there will be no problem of the picture quality.

By taking what has been described so far into consideration, in order to carry out processing on image data in a real-time manner, in a second embodiment described below, it is possible to carry out the process of reallocating clock cycles included in the next access-right acquisition time interval as clock cycles required for reading out image data that could not be read out from the first image memory area 61 of the image memory 6 in the immediately preceding access-right acquisition time interval as data to be subjected to vertical-direction image processing only once. That is to say, the control unit 542 does not reallocate clock cycles as data to be subjected to vertical-direction image processing in the immediately preceding access-right acquisition time interval recursively in a large number of times without limitation.

In addition, the image data read out from the first image memory area 61 of the image memory 6 during the reallocated read access cycles as image data to be subjected to vertical-direction image processing is image data of only 40 horizontal lines described earlier by referring to FIG. 35 for a case in which the gradient of variations caused by image distortion does not exceed the variation amplitude of 32.

Figure 36:
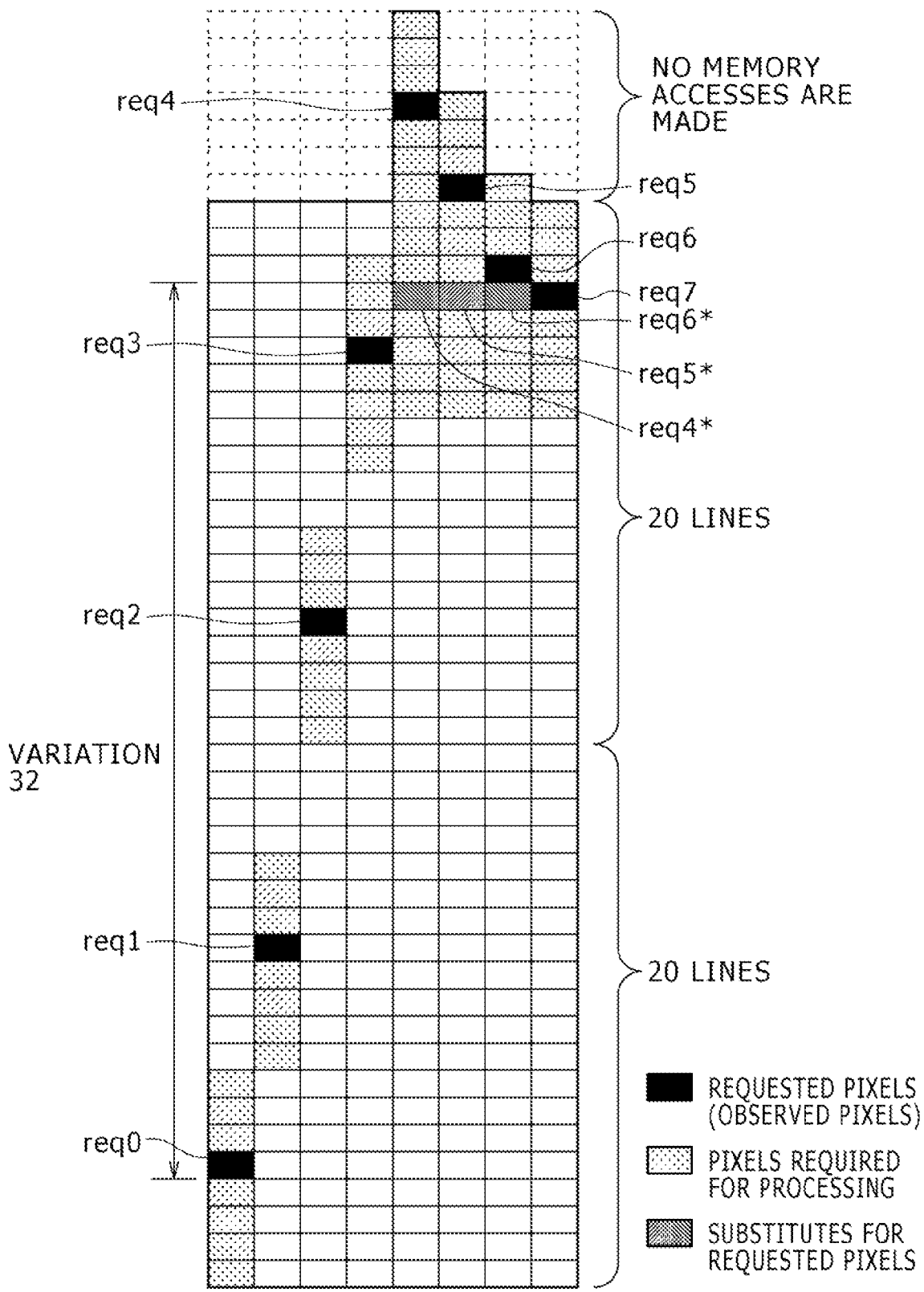
FIG. 36 is an explanatory diagram to be referred to in description of operations to read out other typical image data to be subjected to vertical-direction image processing from an image memory in an embodiment implementing an image-data processing apparatus.

The reader may assume a case in which the gradient of variations caused by image distortion generated in image data to be subjected to vertical-direction image processing for a horizontal-direction pixel unit undesirably exceeds the variation amplitude of 32 as shown in FIG. 36. In the typical case shown in FIG. 36, pixel data required for processing observed pixels shown by requests req4 to req6 to acquire image to be subjected to vertical-direction image processing is data at positions beyond the range of the 40 horizontal lines corresponding to the variation amplitude of 32.

In order to solve the problem described above, the control unit 542 employed in the memory interface 54 according to the second embodiment forcibly replaces the positions of observed pixels indicated by the requests req4 to req6 to acquire image data to be subjected to vertical-direction image processing with respectively pixel positions req4* to req6* included in the range of the 40 horizontal lines corresponding to the variation amplitude of 32 as positions that must be closest to respectively the positions of observed pixels indicated by the requests req4 to req6. In addition, as another requirement, it is also required that image data to be subjected to vertical-direction image processing can be read out from the pixel positions req4* to req6*.

Eight pixels arranged in the vertical direction as eight pixels of each of replacement pixel positions req4* to req6* are eight pixels having data to be subjected to vertical-direction image processing. The control unit 542 employed in the memory interface 54 reads out data of these eight pixels from the range of the 40 horizontal lines corresponding to the variation amplitude of 32 as data to be subjected to vertical-direction image processing in place of original data to be subjected to vertical-direction image processing. The original data to be subjected to vertical-direction image processing is data of eight pixels, which are arranged in the vertical direction as eight pixels of each of pixel positions req4 to req6.

Thus, by replacing the original observed pixels as described above, the image obtained as a result of the compensation processing still has residual distortion left therein. As described earlier, however, such processing is carried out only on positions in close proximity to the four corners of the image. Thus, the residual distortion left at the positions in close proximity to the four corners of the image is not striking. As a result there is no big picture quality problem.

Figure 37:
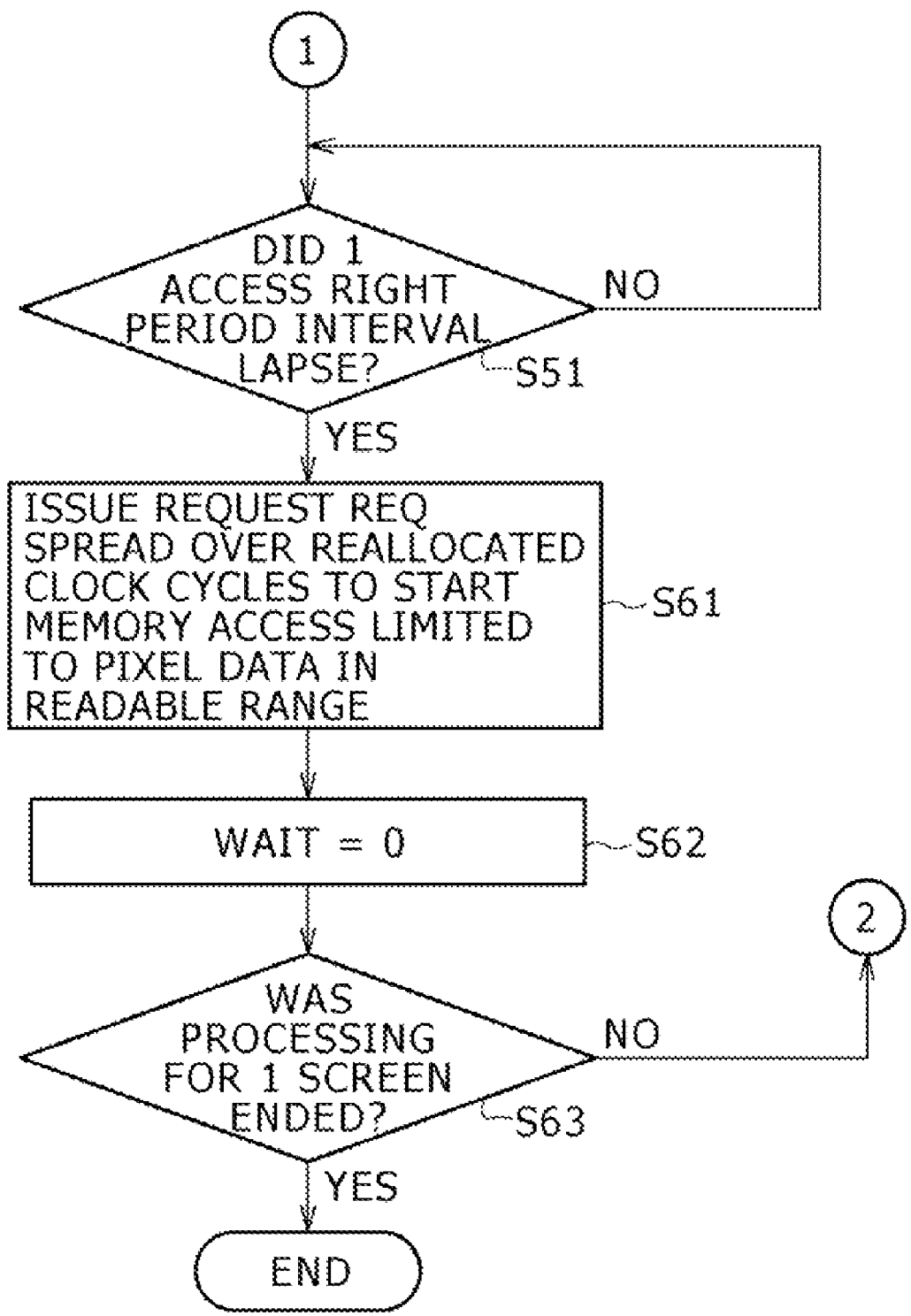
FIG. 37 shows a flowchart serving as another continuation of the flowchart shown in FIG. 31.

FIG. 37 shows a flowchart representing essentials of processing carried out by the control unit 542 according to the second embodiment. The flowchart shown in FIG. 37 is a continuation of the flowchart shown in FIG. 31. That is to say, the flowchart shown in FIG. 37 corresponds to the flowchart shown in FIG. 32.

Also in the case of the second embodiment, if the gradient of variations caused by image distortion does not exceed the variation amplitude of 12 as indicated by the determination result produced in the process carried out at the step S44 of the flowchart shown in FIG. 31, the processing portion for a range, in which it is not necessary to reallocate clock cycles to an access to read out image data to be subjected to vertical-direction image processing, is carried out in exactly the same way as the first embodiment described previously.

In the case the second embodiment, if the gradient of variations caused by image distortion exceeds the variation amplitude of 12, processing is carried out in a way different from the first embodiment described previously.

That is to say, also in the case of the second embodiment, if the determination result produced in the process carried out at the step S44 of the flowchart shown in FIG. 31 indicates that the gradient of variations caused by image distortion generated over the processing time unit consisting of eight pixels arranged in the horizontal direction exceeds the variation amplitude of 12, the flow of the processing goes on to the step S47 included in the same flowchart as a step at which the control unit 542 puts the wait request signal output to the vertical-direction image-processing data acquisition request unit 524 in an active state by for example setting the wait request signal at 1 (wait=1). As shown in FIG. 34, the wait request signal is a signal synchronized with the access-right acquisition time interval and put in an active state extended over the period of the access-right acquisition time interval. Then, at the next step S48 of the same flowchart, the control unit 542 issues a request REQ spread over the maximum number of clock cycles allocated in advance to a read access to image data to be subjected to vertical-direction image processing as clock cycles required for reading out the image data from the first image memory area 61 as image data as shown in FIG. 34 to the arbitration unit 545 in order to request the arbitration unit 545 to start a memory access to the first image memory area 61 of the image memory 6.

After the process carried out at the step S48 is completed, the flow of the processing goes on to a step S51 of the continuation flowchart shown in FIG. 37. At the step S51, the control unit 542 produces a result of determination as to whether or not one access-right acquisition time interval has lapsed. If the determination result produced in the process carried out at the step S51 indicates that one access-right acquisition time interval has not lapsed, the flow of the processing goes back to the step S51 to repeat the determination process carried out at the step S51. As the determination result produced in the process carried out at the step S51 indicates that one access-right acquisition time interval has lapsed, the flow of the processing goes on to a step S61 at which the control unit 542 reallocates clock cycles included in the next access-right acquisition time interval as clock cycles required for reading out image data that could not be read out from the first image memory area 61 of the image memory 6 as data to be subjected to vertical-direction image processing in the immediately preceding access-right acquisition time interval. Then, the control unit 542 makes a request REQ spread over the reallocated clock cycles to the arbitration unit 545 as shown in FIG. 34 in order to start a memory access. In this way, an access to the first image memory area 61 of the image memory 6 can be resumed.

In the process carried out at the step S61, if the gradient found in the process carried out at the step S42 as the gradient of variations caused by image distortion does not exceed the variation amplitude of 32, the control unit 542 reallocates no more than 5 clock cycles included in the next access-right acquisition time interval as clock cycles required for reading out image data that could not be read out from the first image memory area 61 of the image memory 6 as data to be subjected to vertical-direction image processing in the immediately preceding access-right acquisition time interval.

If the gradient found in the process carried out at the step S42 as the gradient of variations caused by image distortion exceeds the variation amplitude of 32, on the other hand, as described earlier by referring to FIG. 36, the control unit 542 employed in the memory interface 54 according to the second embodiment forcibly replaces the positions of observed pixels indicated by the requests req4 to req6 to acquire image data to be subjected to vertical-direction image processing with respectively pixel positions req4* to req6* included in the range of the 40 horizontal lines corresponding to the variation amplitude of 32 as positions that must be closest to respectively the positions of observed pixels indicated by the requests req4 to req6. In addition, it is also required that image data to be subjected to vertical-direction image processing can be read out from the pixel positions req4* to req6*. Eight pixels arranged in the vertical direction as eight pixels of each of replacement pixel positions req4* to req6* are eight pixels having data to be subjected to vertical-direction image processing. The control unit 542 employed in the memory interface 54 reads out data of these eight pixels from the range of the 40 horizontal lines corresponding to the variation amplitude of 32 as data to be subjected to vertical-direction image processing in place of original data to be subjected to vertical-direction image processing. The original data to be subjected to vertical-direction image processing is data of eight pixels, which are arranged in the vertical direction as eight pixels of each of pixel positions req4 to req6.

Then, the flow of the processing goes on to the step S62 at which the control unit 542 according to the second embodiment puts the wait request signal output to the vertical-direction image-processing data acquisition request unit 524 in an inactive state by for example setting the wait request signal at 0 (wait=0). As the wait request signal is restored to the inactive state, as shown in FIG. 34, the vertical-direction image-processing data acquisition request unit 524 resumes the operation to output requests reqk of acquiring image data to be subjected to vertical-direction image processing to the control unit 542 from the first image memory area 61 of the image memory 6.

Then, at the next step S63, the control unit 542 produces a result of determination as to whether or not the processing carried out on image data of one screen has been completed. If the determination result produced in the process carried out at the step S63 indicates that the processing carried out on image data of one screen has not been completed, the flow of the processing goes back to the step S41 of the flowchart shown in FIG. 31 to repeat the processes carried out at the step S41 and the subsequent processes. If the determination result produced in the process carried out at the step S63 indicates that the processing carried out on image data of one screen has been completed, on the other hand, the processing represented by the flowchart is ended.

In accordance with the second embodiment, the number of operations to reallocate clock cycles included in the next access-right acquisition time interval as clock cycles required for reading out image data that could not be read out from the first image memory area 61 of the image memory 6 as data to be subjected to vertical-direction image processing in the immediately preceding access-right acquisition time interval is limited to prevent the data processing system from collapsing. Thus, in the case of data of a moving picture, real-time processing can be carried out with a high degree of reliability.

It is to be noted that, in the case of the second embodiment, the number of operations to reallocate clock cycles included in the next access-right acquisition time interval as clock cycles required for reading out image data that could not be read out from the first image memory area 61 of the image memory 6 as data to be subjected to vertical-direction image processing in the immediately preceding access-right acquisition time interval is limited to one. However, it is possible to carry out the operation to reallocate clock cycles included in the next access-right acquisition time interval as clock cycles required for reading out image data that could not be read out from the first image memory area 61 of the image memory 6 as data to be subjected to vertical-direction image processing in the immediately preceding access-right acquisition time interval any number of times as long as the number of times the operation is carried out does not cause the data processing system to collapse.

As described above, in the image pickup apparatus according to the embodiments, if the vertical-direction gradient of variations caused by image distortion generated in a range spread over eight pixels arranged in the horizontal direction does not exceed the variation amplitude of 12, the processing to compensate the image for vertical-direction image distortion can be carried out in one access-right acquisition time interval. Since the vertical-direction gradient of variations caused by image distortion generated by an ordinary image pickup lens is normally equal to or smaller than the variation amplitude of 12, the image pickup apparatus according to the embodiment is capable of satisfactorily dealing with distortion generated by an ordinary image pickup lens and capable of carrying out processing to compensate an image for distortion to produce an image with a high quality and resolution conversion processing in a real-time manner.

In addition, if the vertical-direction gradient of variations caused by image distortion generated in a range spread over eight pixels arranged in the horizontal direction exceeds the variation amplitude of 12 as is the case with an image-processing apparatus employing a fish-eye lens as an image pickup lens, on the other hand, the control unit 542 puts the wait request signal output to the vertical-direction image-processing data acquisition request unit 524 in an active state by for example setting the wait request signal at 1 in order to request the vertical-direction image-processing data acquisition request unit 524 to temporarily stop issuance of further requests to acquire image data to be subjected to vertical-direction image processing. At the same time, the control unit 542 carries out access processing to read out image data requested so far as image data to be subjected to vertical-direction image processing from the first image memory area 61 of the image memory 6 in a plurality of access-right acquisition time intervals. In this way, it is possible to avoid a situation in which compensation processing cannot be carried out.

In addition, if the vertical-direction gradient of variations caused by image distortion generated in a range spread over eight pixels arranged in the horizontal direction exceeds the variation amplitude of 12, the number of access-right acquisition time intervals for carrying out the access processing to read out image data requested so far as image data to be subjected to vertical-direction image processing is limited in order to assure the real-time characteristic of the processing.

On top of that, after checking the vertical-direction gradient of variations caused by image distortion generated in a range spread over eight pixels arranged in the horizontal direction, the control unit 542 determines a minimum access range in the range consisting of eight pixels arranged in the horizontal direction as an access range to make vertical-direction memory accesses. In this way, unnecessary operations to read out image data from the first image memory area 61 of the image memory 6 can be eliminated.

Figure 60:
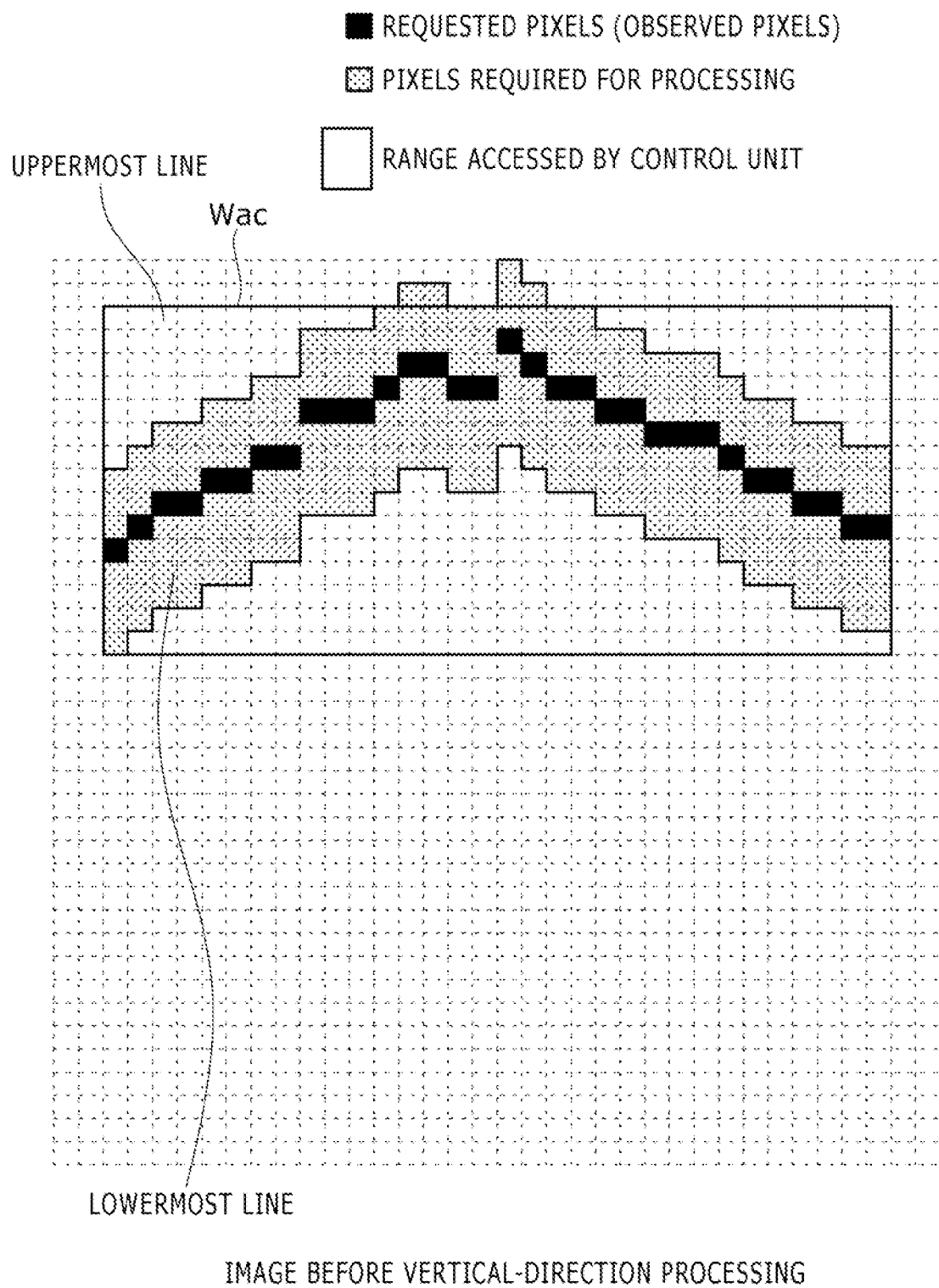
FIG. 60 is an explanatory block diagram to be referred to in description of typical operations to read out image data from an image memory as image data to be subjected to vertical-direction image processing to be carried out for compensating the image data for distortion caused by a distortion characteristic of an image pickup lens.
Figure 61:
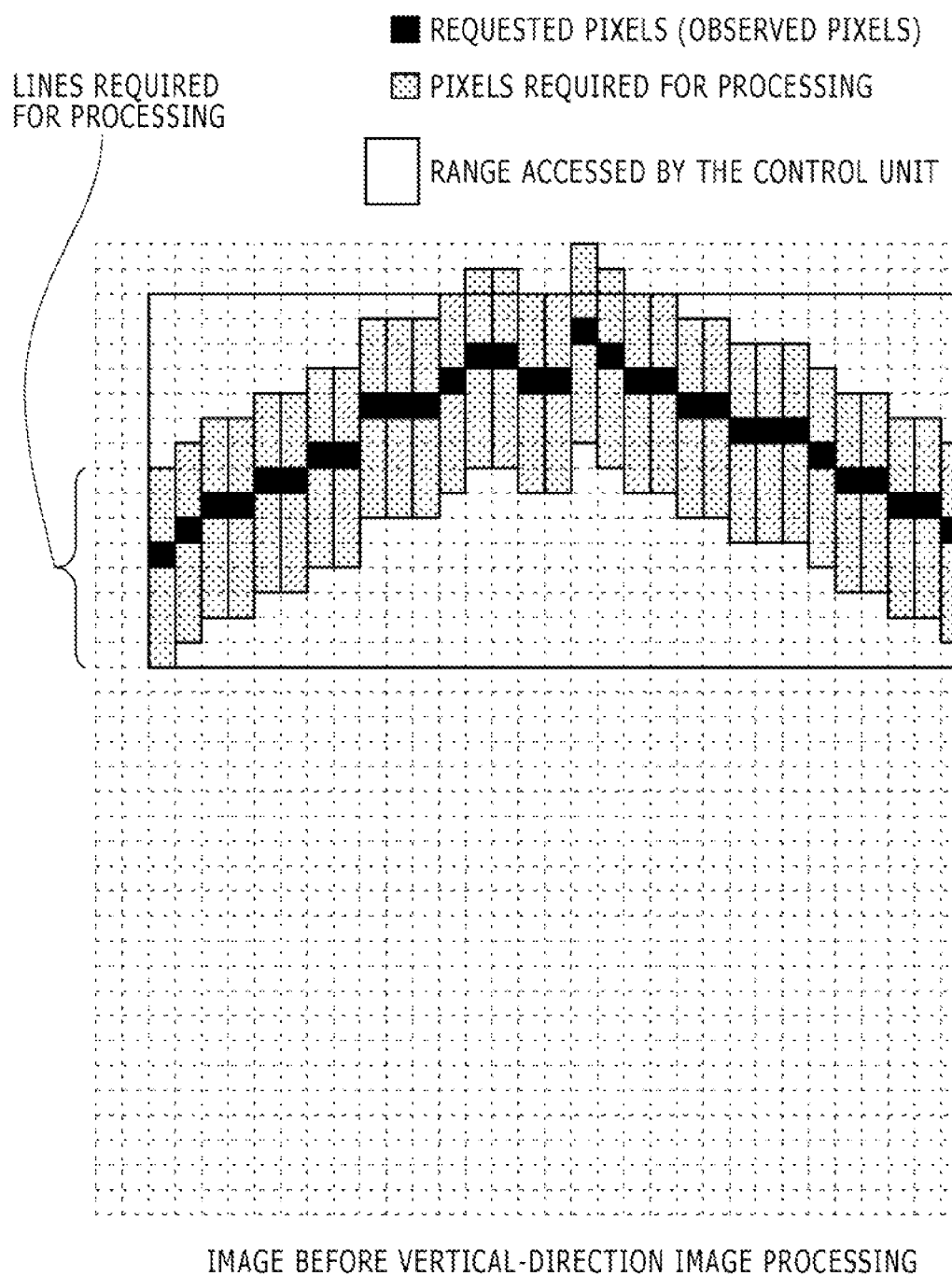
FIG. 61 is an explanatory block diagram to be referred to in description of other typical operations to read out image data from an image memory as image data to be subjected to vertical-direction image processing to be carried out for compensating the image data for distortion caused by a distortion characteristic of an image pickup lens.
Figure 62:
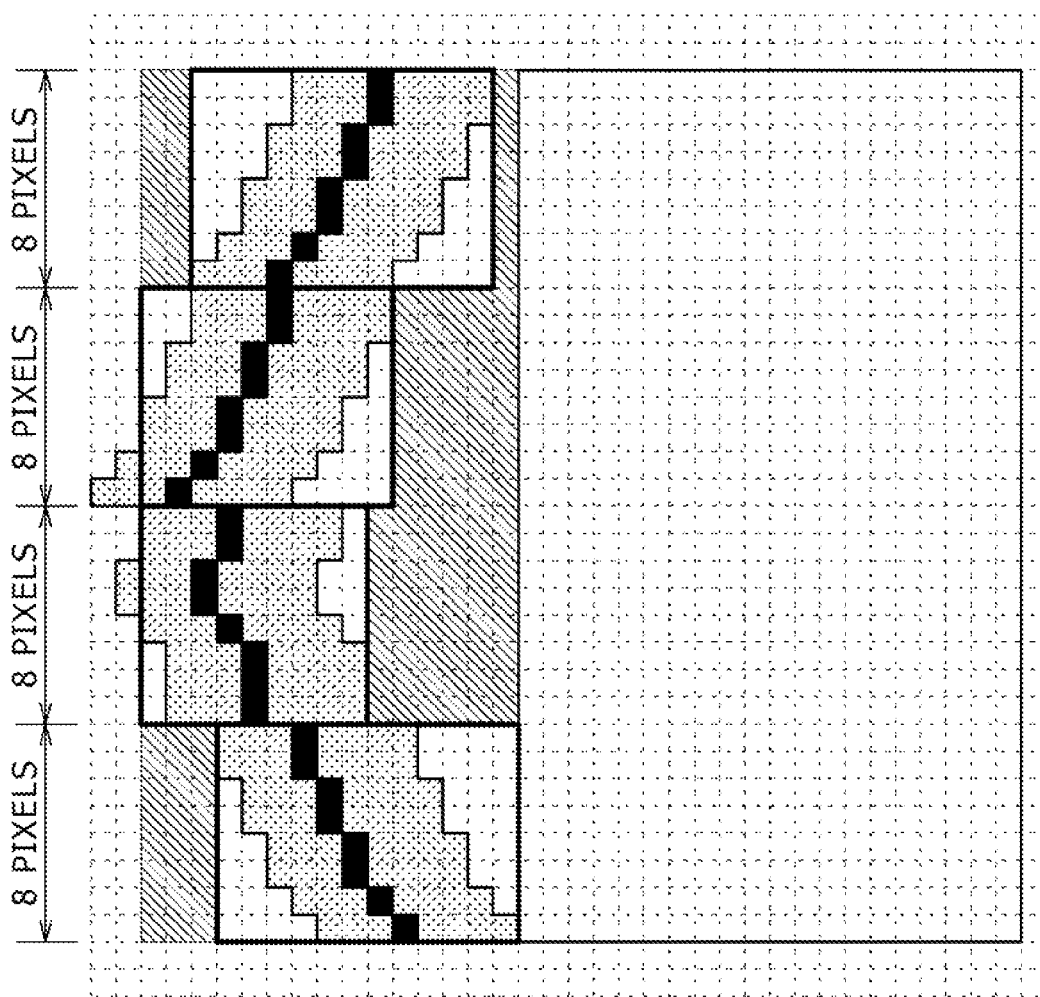
FIG. 62 is an explanatory block diagram to be referred to in description of further typical operations to read out image data from an image memory as image data to be subjected to vertical-direction image processing to be carried out for compensating the image data for distortion caused by a distortion characteristic of an image pickup lens.
Figure 63:
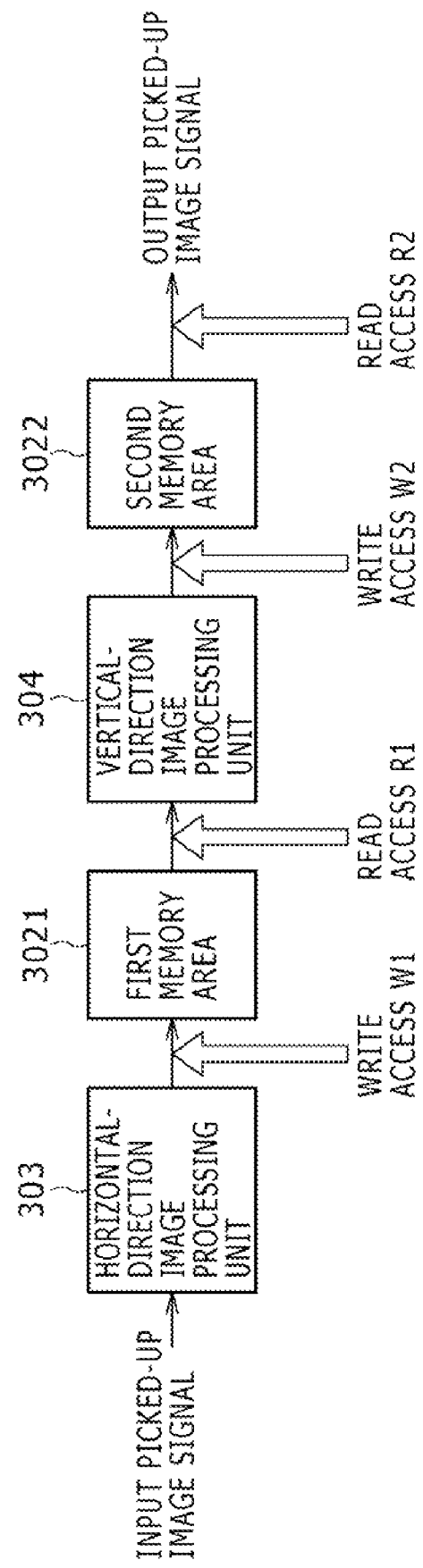
FIG. 63 is an explanatory block diagram to be referred to in description of control of operations to store image data in memory areas of an image memory and read out image data from the memory areas the image memory in an embodiment implementing an image-data processing apparatus provided by an application proposed earlier.
Figure 64:
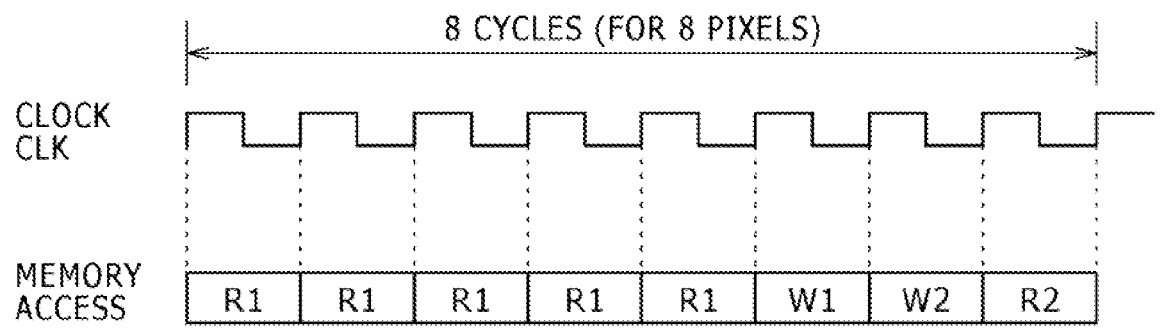
FIG. 64 is an explanatory block diagram to be referred to in description of processing of accesses to a memory in an embodiment implementing an image-data processing apparatus provided by an application proposed earlier.

In accordance with the technique provided by the embodiments, fine accesses like ones shown in FIG. 61 are difficult to make. In comparison with that shown in FIG. 60, however, unnecessary operations to read out image data from the first image memory area 61 of the image memory 6 can be eliminated as shown in FIG. 62.

In addition, in accordance with the technique shown in FIG. 61, it is necessary to always compute an address and make a memory access for each vertical-direction pixel application. Thus, in order to carry out vertical-direction image processing for eight horizontal lines in an interval consisting of eight pixels arranged in the horizontal direction, data of 64 (8 pixels/horizontal line×8 horizontal lines) pixels is required. Therefore, it is necessary to compute an address and issue a command 64 times.

In accordance with the technique provided by the embodiments as a technique capable of handing up to 20 horizontal lines, on the other hand, by making one access, data of eight pixels arranged in the horizontal direction on each of the horizontal lines can be acquired. Thus, in the case of 20 horizontal lines, it is necessary to compute an address and issue a command only 20 times in order to acquire data of eight pixels arranged in the horizontal direction on each of the 20 horizontal lines.

As is evident from the above description, it is possible to solve the problems raised in the cases shown in FIGS. 60 and 61. Thus, the power consumption can be reduced and the image processing can be carried out with a higher degree of efficiency.

As described before, by arbitrating accesses made in an access-right acquisition time interval and controlling operations to store data into a plurality of banks such the ones described earlier and read out data from the banks, it is possible to carry out image processing such as the hand-movement distortion compensation process, the lens distortion compensation process and the resolution conversion process in a real-time manner. That is to say, the control units 541 to 544 process data in pipe line processing and all the control units 541 to 544 make accesses to eight pixels in eight respective clock cycles like the ones shown in FIG. 26 in order to carry out image processing such as the hand-movement distortion compensation process, the lens distortion compensation process and the resolution conversion process in a real-time manner.

Figure 38:
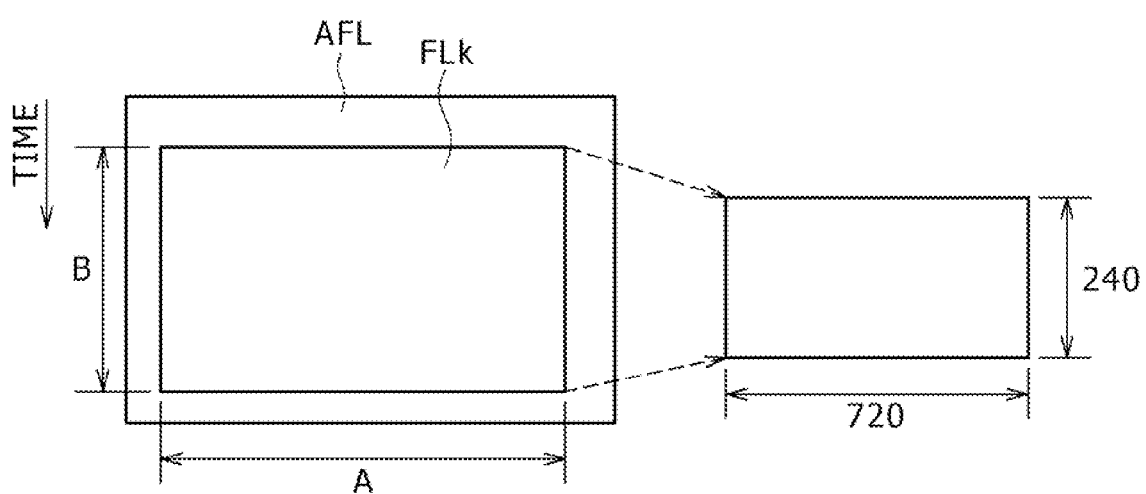
FIG. 38 is an explanatory diagram to be referred to in description of typical processing carried out on image data in an embodiment implementing an image-data processing apparatus.

As image processing, let us assume for example a process to convert the resolution of original pixel data in an available pixel area FLk into the resolution of output pixel data of pixels in an output area consisting of 720 columns each including pixels arranged in the vertical direction and 240 rows each including pixels arranged in the horizontal direction as shown in FIG. 38. Used for carrying out the resolution conversion process, the available pixel area FLk is a center part of the entire available pixel area AFL of the imager 2. FIG. 39 is a diagram showing operations to store image data into the first and second memory areas 61 and 62 of the image memory 6 and read out image data from the first and second memory areas 61 and 62 in the resolution conversion process.

Figures 39A, 39B, 39C, 39D, 39E, 39F:
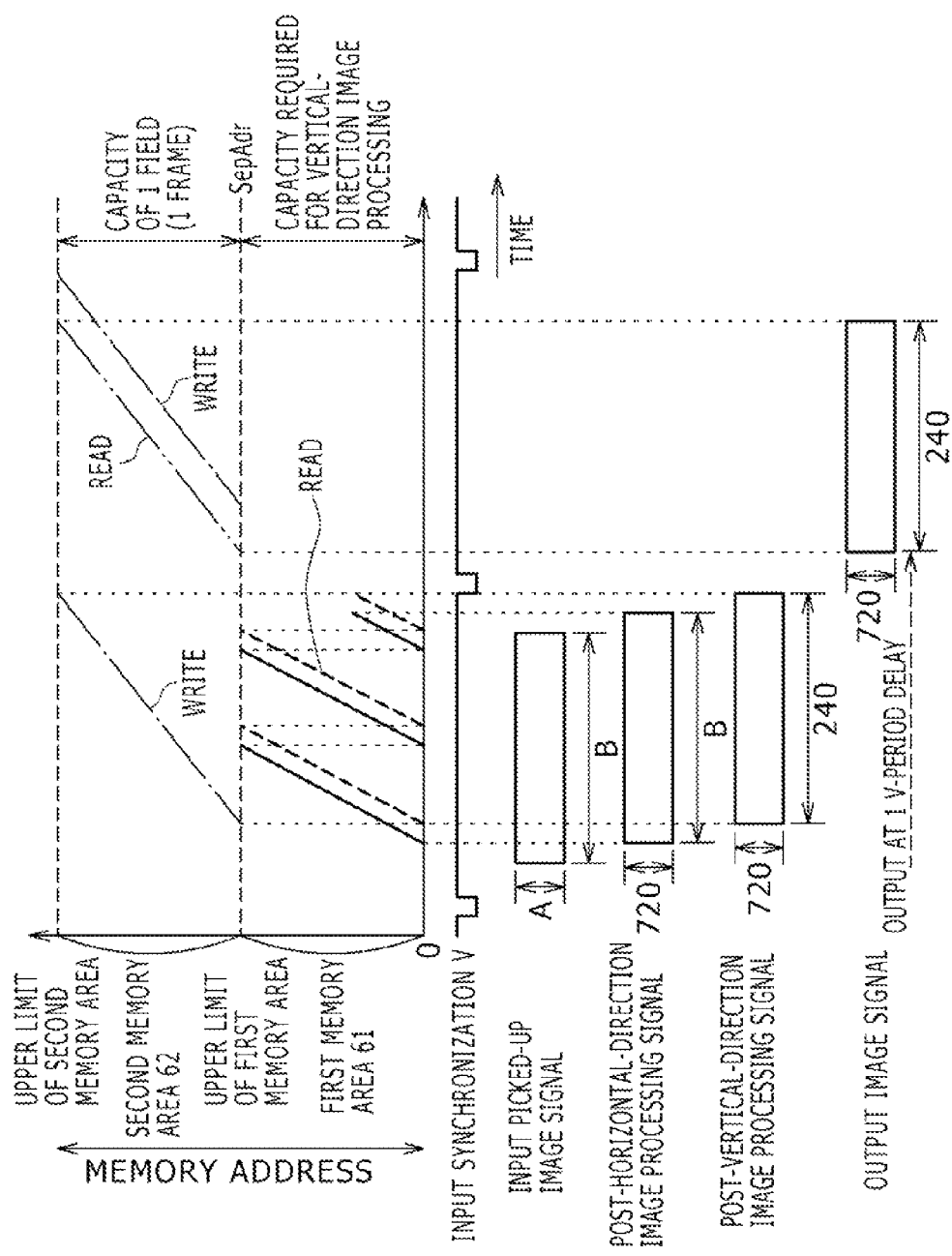
FIG. 39A is an explanatory diagram to be referred to in description of typical operations to store image data into an image memory and read out image data from the memory in the typical processing shown in FIG. 38 in an embodiment implementing an image-data processing apparatus.
FIG. 39B shows an input synchronization signal.
FIG. 39C shows a signal representing an input picked-up image.
FIG. 39D shows a signal obtained as a result of horizontal-direction image processing.
FIG. 39E shows a signal obtained as a result of vertical-direction image processing.
FIG. 39F shows an output image signal.

An input picked-up image signal shown in FIG. 39C as a signal coming from the imager 2 is supplied to the horizontal-direction image processing unit 512 for carrying out horizontal-direction image processing on the signal and storing the result of the horizontal-direction image processing in the first image memory area 61 of the image memory 6.

As described before, the first image memory area 61 is provided with a storage capacity large enough for accommodating image data allowing vertical-direction image processing to be started plus a margin. The amount of the image data allowing the vertical-direction image processing to be started can be smaller than that of image data of one screen (that is, one field or one frame) as long as the amount of the image data allowing the vertical-direction image processing to be started is at least equal to the amount of image data of a plurality of horizontal lines according to the number of taps of a vertical-direction FIR filter.

The input picked-up image signal shown in FIG. 39C as a signal of one screen is subjected to the horizontal-direction image processing and then stored in the first image memory area 61 as shown by an inclined solid horizontal line in FIG. 39A. As shown in FIG. 39A, during one vertical-direction period, the input picked-up image signal of one screen is stored in the first image memory area 61 a plurality of times as indicated by a plurality of aforementioned inclined solid horizontal lines. FIG. 39D shows an image signal stored in the first image memory area 61 as an image signal completing the horizontal-direction image processing. An image signal shown in FIG. 39D as an image signal completing the horizontal-direction image processing is delayed from the input picked-up image signal shown in FIG. 39C by a delay time. In the case of this embodiment, as described before, the delay time is attributed to the horizontal-direction processing FIFO line memory 112 for storing image data of one horizontal line.

A bold inclined dashed horizontal line shown in FIG. 39A represents an operation to read out image data, which has been stored earlier in the first image memory area 61, as image data to be subjected to vertical-direction image processing from the first image memory area 61. As shown in FIG. 39A, the operation to read out image data from the first image memory area 61 is started before the next operation to store the input picked-up image signal of the same screen as the initial operation to store the input picked-up image signal into the first image memory area 61 but must be started after an input picked-up image signal allowing the vertical-direction image processing to be started has been stored in the first image memory area 61 in the course of the initial operation to store the input picked-up image signal into the first image memory area 61 since the start of the initial operation.

Then, the picked-up image data read out from the first image memory area 61 is supplied to the vertical-direction image processing unit 522 for carrying out the vertical-direction image processing on the data. The result of the vertical-direction image processing is stored in the second image memory area 62 as shown by a single-dotted inclined line in FIG. 39A. FIG. 39E shows the result of the vertical-direction image processing, that is, an image signal completing the vertical-direction image processing. The signal shown in FIG. 39E as the image signal completing the vertical-direction image processing is further delayed from the image signal shown in FIG. 39D as an image signal completing the horizontal-direction image processing by a delay time. In the case of this embodiment, the delay time is determined by the number of taps of the vertical-direction FIR filter as described earlier.

In this way, while the input picked-up image signal of one screen is being stored in the first image memory area 61 a plurality of times, the signal is subjected to the vertical-direction image processing and the result of the vertical-direction image processing is stored into the second image memory area 62. Then, after one vertical-direction period lapses as indicated by a pulse of vertical-direction synchronization signal (or an input synchronization signal V shown in FIG. 39B), the result of the vertical-direction image processing is read out from the second image memory area 62 as shown by a double-dotted inclined line in FIG. 39A. The operation to read out the result of the vertical-direction image processing from the second image memory area 62 is begun before the start of the next operation to store the result of vertical-direction image processing into the second image memory area 62. FIG. 39F shows the timing of an output image signal representing data read out from the second image memory area 62 as a result of the vertical-direction image processing.

Thereafter, the processing described above is carried out repeatedly for each one-screen unit from screen to screen. As is evident from FIGS. 39A to 39F, the input picked-up image data is subjected to the processing described above and, after one vertical-direction period lapses, output image data is obtained synchronously to a vertical-direction synchronization signal and a horizontal-direction synchronization signal.

In this case, image data is read out from the first image memory area 61 on a FIFO-operation basis. In the example shown in FIG. 39, image data of one screen is stored in the first image memory area 61 in two write folding-back operations and read out from the first image memory area 61 also in two read folding-back operations.

In the above description, image data is stored into the image memory 6 and read out from the image memory 6 in operations not spread over a pulse of the vertical-direction synchronization signal. If the image is partially enlarged, however, the processing interval may be spread over a pulse of the vertical-direction synchronization signal in some cases. Since the output image signal is generated after a delay of one vertical-direction period, nevertheless, the output image signal conforms to the synchronization standard, raising no problems.

Figure 40:
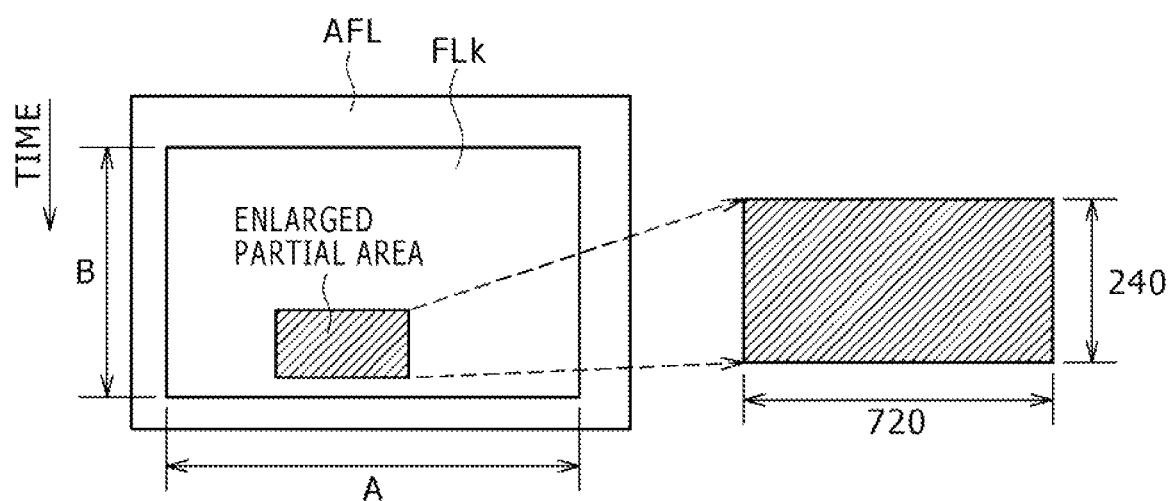
FIG. 40 is an explanatory diagram to be referred to in description of typical processing carried out on image data in an embodiment implementing an image-data processing apparatus.
Figure 41:
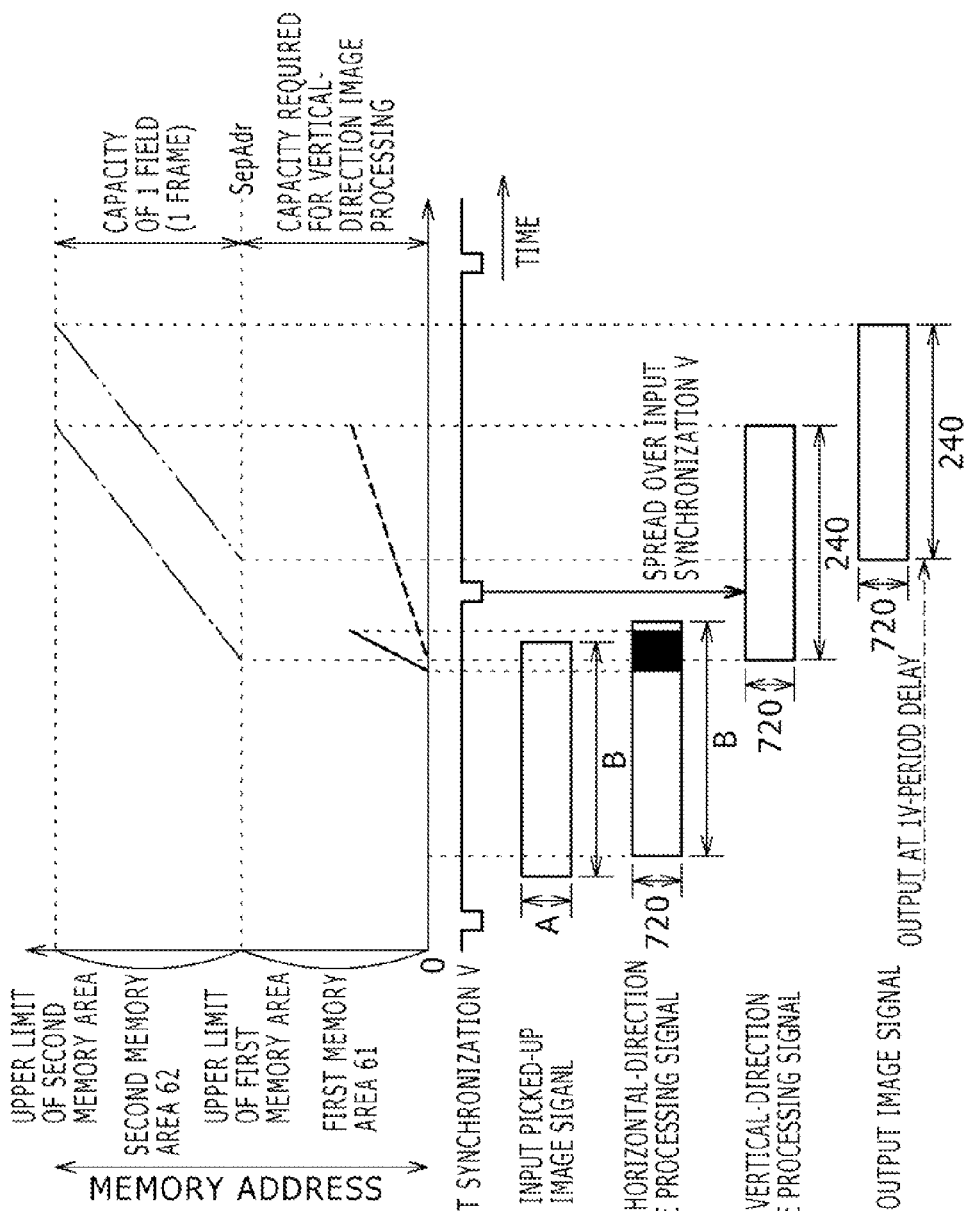
FIG. 41A is an explanatory diagram to be referred to in description of typical operations to store image data into an image memory and read out image data from the memory during the typical processing shown in FIG. 40 in an embodiment implementing an image-data processing apparatus.
FIG. 41B shows an input synchronization signal.
FIG. 41C shows a signal representing an input picked-up image.
FIG. 41D shows a signal obtained as a result of horizontal-direction image processing.
FIG. 41E shows a signal obtained as a result of vertical-direction image processing.
FIG. 41F shows an output image signal.

Let us assume for example image processing shown in FIG. 40. In this case, a portion typically specified by the user as a portion of the available pixel area FLk included in the surface of the imager 2 as an area to be subjected to a resolution conversion process is enlarged by carrying out an electronic zoom process for converting the resolution of the portion into an output-image resolution of 720 columns each including pixels arranged in the vertical direction and 240 rows each including pixels arranged in the horizontal direction as shown on the right side of FIG. 40. FIG. 41 is a diagram showing operations to store image data into the first and second memory areas 61 and 62 of the image memory 6 and read out data from the first and second memory areas 61 and 62 in the electronic zoom process.

In this case, FIG. 41C shows an input picked-up image signal coming from the imager 2. This input picked-up image signal includes a portion to be enlarged. The portion included in the input picked-up image signal shown in FIG. 41C is subjected to horizontal-direction image processing to be carried out by the horizontal-direction image processing unit 512 and the result of the horizontal-direction image processing is stored in the first image memory area 61 as shown by a bold solid inclined line in FIG. 41A. FIG. 41D shows an image signal including the result of the horizontal-direction image processing. A black portion included in the image signal shown in FIG. 41D is the result of the horizontal-direction image processing. The black portion is the portion stored in the first image memory area 61 as shown by the bold solid inclined line in FIG. 41A.

As image data included in the partially enlarged area as data with an amount at least large enough for starting vertical-direction image processing is stored in the first image memory area 61, the image data of the partially enlarged area is read out from the first image memory area 61 as shown by a bold dashed inclined line in FIG. 41A and then subjected to the vertical-direction image processing. Subsequently, image data obtained as the result of the vertical-direction image processing is stored in the second image memory area 62 as shown by a single-dotted inclined line in FIG. 41A. Thus, an image signal generated in the vertical-direction image processing is stored in the second image memory area 62 in a period stretched over a pulse of the vertical-direction synchronization signal (or the input synchronization signal shown in FIG. 41B) as shown in FIG. 41E.

Then, the result of the vertical-direction image processing is read out from the second image memory area 62 as shown by a double-dotted inclined line in FIG. 41A as an output image signal shown in FIG. 41F. The double-dotted inclined line shown in FIG. 41A starts from a point following the pulse of the vertical-direction synchronization signal (or the input synchronization signal V shown in FIG. 41B). That is to say, the operation to read out the result of the vertical-direction image processing from the second image memory area 62 starts with a timing before the next operation to store the next result of the vertical-direction image processing into the second image memory area 62 is started. It is to be noted that the next operation to store the next result of the vertical-direction image processing into the second image memory area 62 is not shown in the figure.

Next, the required size of the first image memory area 61 of the image memory 6 is explained. As described before, the required size of the first image memory area 61 varies, depending on the number of taps of a vertical-direction FIR filter used for carrying out a vertical-direction resolution conversion process and a vertical-direction interpolation process, an electronic zoom rate, a lens-distortion compensation rate and a hand-movement distortion compensation rate.

Figure 42:
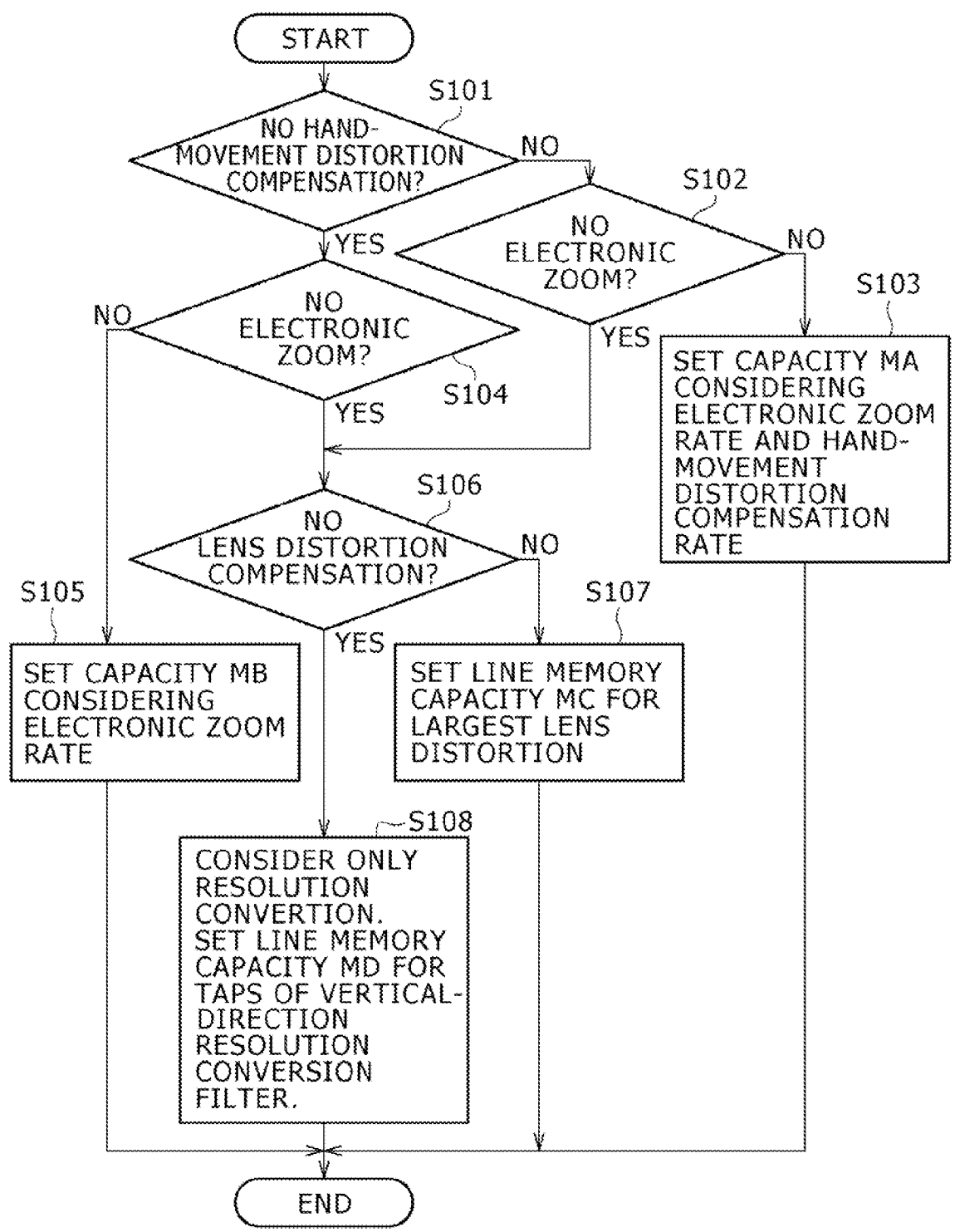
FIG. 42 shows a flowchart to be referred to in explanation of a method for determining the size of a first memory area of an image memory in an embodiment implementing an image-data processing apparatus.

A method for determining the size of the first image memory area 61 is explained by referring to a flowchart shown in FIG. 42. The image pickup apparatus according to the embodiments allows the user to select options as to whether or not to carry out the processing to compensate the image for distortion caused by a hand movement, whether or not to carry out the electronic zoom processing and whether or not to carry out the processing to compensate the image for lens distortion. Then, in accordance with the options selected by the user, the required size of the first image memory area 61 is determined or changed. Thus, the processing represented by the flowchart is carried out by the control unit 10 on the basis of information on the selected options, which are entered by the user to the control unit 10 via the user interface 9.

The flowchart shown in FIG. 42 begins with a S101 to produce a result of determination as to whether or not no hand-movement distortion compensation has been set. If the determination result produced in the process carried out at the step S101 indicates that hand-movement distortion compensation has been set, the flow of the processing goes on to a step S102 to produce a result of determination as to whether or not no electronic zoom option has been selected. If the determination result produced in the process carried out at the step S102 indicates that the electronic zoom option has been selected, the flow of the processing goes on to a step S103 at which the control unit 10 sets a memory capacity MA by considering an electronic zoom rate and a hand-movement distortion compensation rate as a storage size of the first image memory area 61. The electronic zoom rate is a maximum electronic zoom magnification whereas the hand-movement distortion compensation rate represents the degree of hand-movement distortion for which the image can be compensated. To put it concretely, the separating address SepAdr is determined to set the storage size of the first image memory area 61 at the memory capacity MA and stored in a register employed in the register block 53 as a register for holding the separating address SepAdr.

Figure 43:
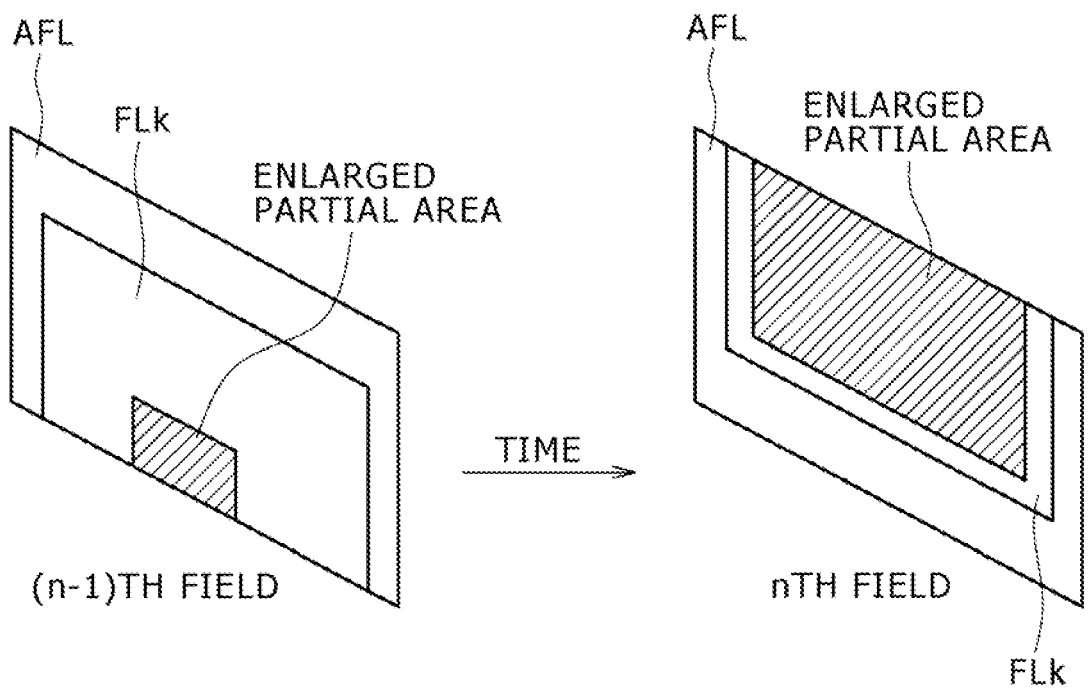
FIG. 43 is an explanatory diagram to be referred to in description of typical processing carried out on image data in an embodiment implementing an image-data processing apparatus.

The memory capacity MA is set in the process carried out at the step S103 by considering an electronic zoom rate and a hand-movement distortion compensation rate at a capacity satisfying a condition demanding a largest capacity. In an operating mode with the hand-movement distortion compensation set and the electronic zoom option selected, the condition demanding a largest capacity is a condition for operations carried out as shown in FIG. 43. As shown in the figure, an input image lowermost portion including a hand-movement distortion compensation range in the (n−1)th field is enlarged. In the nth field, an enlarged area starts with horizontal lines, which include an uppermost portion of the input image. If the enlarged area in the nth field is combined with the lowermost portion of the input image in the (n−1)th field, the combination has image data with an amount exceeding the size of the first image memory area 61.

In a process of enlarging an input image lowermost portion including a hand-movement distortion compensation range in the (n−1)th field in order to generate an output image signal, image data to be subjected to vertical-direction image processing is read out from the first image memory area 61 in a period stretched over a pulse of the input vertical-direction synchronization signal V. In addition, since the processing is processing carried out on a lowermost portion of the input image, the operation to read out the image data to be subjected to vertical-direction image processing from the first image memory area 61 is started at a latest time. At that time, vertical-direction read processing to be carried out on the nth field immediately following the (n−1)th field is put in a wait state. If processing is to be carried out on an uppermost portion of the nth field, it is necessary to save an input image portion corresponding to the time of the wait state. Thus, the number of horizontal-line memories required for saving the input image portion corresponding to the time of the wait state must be increased. In addition, since the operation to store image data obtained as a result of the vertical-direction image processing in the first image memory area 61 must not surpass the operation to read out image data to be subjected to vertical-direction image processing from the first image memory area 61, it is necessary to set the size of the first image memory area 61 at a value corresponding to the number of horizontal-line memories so as to satisfy the required electronic zoom rate and the required hand-movement distortion compensation rate.

FIG. 44 is a diagram showing operations to store image data into the first and second memory areas 61 and 62 of the image memory 6 and read out data from the first and second memory areas 61 and 62 for the case described above.

In this case, FIG. 44C shows an input picked-up image signal coming from the imager 2. This input picked-up image signal includes a portion to be enlarged. The portion included in the input picked-up image signal shown in FIG. 44C is subjected to horizontal-direction image processing to be carried out by the horizontal-direction image processing unit 512 and the result of the horizontal-direction image processing is stored in the first image memory area 61 as shown by a solid inclined line in FIG. 44A. FIG. 44D shows an image signal including the result of the horizontal-direction image processing. A black portion included in the image signal shown in FIG. 44D is the result of the horizontal-direction image processing. The black portion is the portion stored in the first image memory area 61 as shown by the solid inclined line in FIG. 44A.

As image data included in the partially enlarged area in the (n−1) field as data with an amount at least large enough for starting vertical-direction image processing is stored in the first image memory area 61, the image data of the partially enlarged area is read out from the first image memory area 61 as shown by a bold dashed inclined line in FIG. 44A and then subjected to the vertical-direction image processing. Subsequently, image data obtained as the result of the vertical-direction image processing is stored in the second image memory area 62 as shown by a single-dotted inclined line in FIG. 44A. Thus, an image signal generated in the vertical-direction image processing is stored in the second image memory area 62 in a period stretched over a pulse of the vertical-direction synchronization signal as shown in FIG. 44E.

Then, when the image data portion in the partially enlarged area of the nth field is received, the horizontal-direction image processing carried out on this image data portion and the operation also carried out to store the result of the horizontal-direction image processing in the first image memory area 61 are started as shown by another solid inclined line in FIG. 44A. When the operation to store the result of the horizontal-direction image processing in the first image memory area 61 reaches the separating address SepAdr, the operation is folded back to the start address of the first image memory area 61 so that all the image data of the partially enlarged area in the nth field can be stored in the first image memory area 61.

The operation to store the image data included in the nth field as data resulting from the horizontal-direction image processing in the first image memory area 61 is carried out while the operation to read out the image data included in the (n−1)th field as data resulting from the horizontal-direction image processing from the first image memory area 61 is being performed. Thus, the operation to store the image data included in the nth field as data resulting from the horizontal-direction image processing in the first image memory area 61 must be carried out by not surpassing the operation to read out the image data included in the (n−1)th field as data resulting from the horizontal-direction image processing from the first image memory area 61. That is to say, the size of the first image memory area 61 must be set at such a value that the operation to store the image data included in the nth field as data resulting from the horizontal-direction image processing in the first image memory area 61 does not surpass the operation to read out the image data included in the (n−1)th field as data resulting from the horizontal-direction image processing from the first image memory area 61.

Then, before the operation to store the result of the vertical-direction image processing in the second image memory area 62 is completed, an operation to read out the result of the vertical-direction image processing from the second image memory area 62 is started as shown by a double-dotted inclined line in FIG. 44A as an output image signal shown in FIG. 44F. That is to say, the operation to read out the result of the vertical-direction image processing from the second image memory area 62 starts with a timing before the next operation to store the next result of the vertical-direction image processing into the second image memory area 62 is started.

As described above, when an attempt is made to enlarge the lowermost portion of an input image including distortion caused by a hand movement in the (n−1)th field in order to generate an output signal representing the enlarged portion, image data to be subjected to vertical-direction image processing is read out from the first image memory area 61 in a period stretched over a pulse of the input synchronization signal V. In addition, since the horizontal-direction image processing is processing carried out on a lowermost portion of the input image, the operation to read out the image data to be subjected to vertical-direction image processing from the first image memory area 61 is started at a latest time.

At that time, vertical-direction read processing to be carried out on the nth field immediately following the (n−1)th field is put in a wait state. If processing is to be carried out on an uppermost portion of the nth field, it is necessary to save an input image portion corresponding to the time of the wait state. Thus, the number of horizontal-line memories required for saving the input image portion corresponding to the time of the wait state must be increased. In addition, since the operation to store image data obtained as a result of the horizontal-direction image processing in the first image memory area 61 must not surpass the operation to read out image data to be subjected to vertical-direction image processing from the first image memory area 61, it is necessary to set the size of the first image memory area 61 at a value MA equivalent to the number of horizontal-line memories so as to satisfy the required electronic zoom rate and the required hand-movement distortion compensation rate.

Let us refer back to the flowchart shown in FIG. 42. If the determination result produced in the process carried out at the step S101 indicates that no hand-movement distortion compensation has been set, on the other hand, the flow of the processing goes on to a step S104 to produce a result of determination as to whether or not no electronic zoom option has been selected. If the determination result produced in the process carried out at the step S104 indicates that the electronic zoom option has been selected, the flow of the processing goes on to a step S105 at which the size of the first image memory area 61 is set at a storage capacity MB taking only the electronic zoom rate into consideration. To put it concretely, the separating address SepAdr is determined to set the storage size of the first image memory area 61 at the memory capacity MB and stored in a register employed in the register block 53 as a register for holding the separating address SepAdr.

Figure 45:
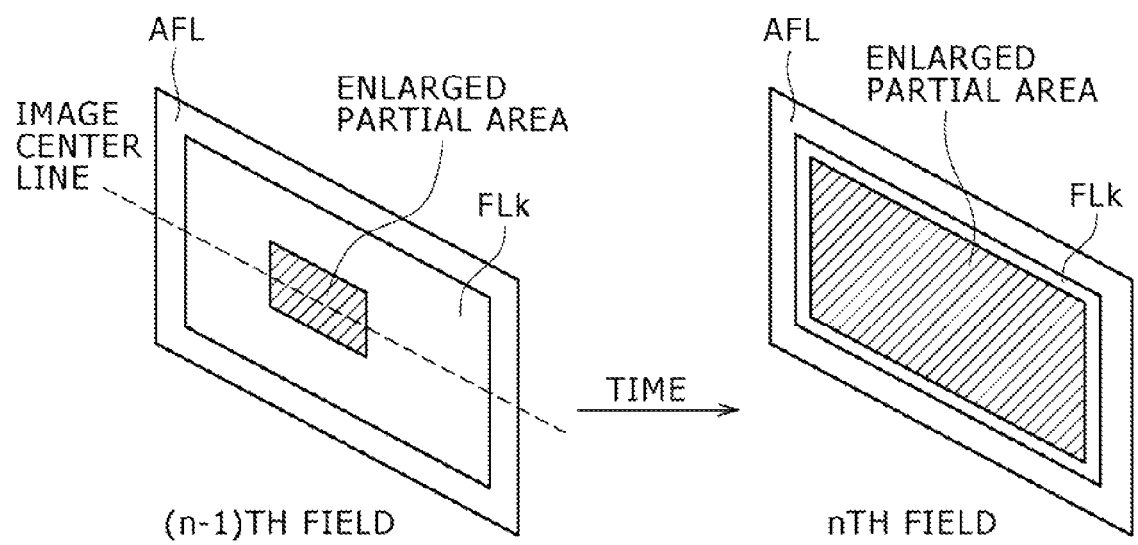
FIG. 45 is an explanatory diagram to be referred to in description of typical processing carried out on image data in an embodiment implementing an image-data processing apparatus.

In this case, the memory capacity MB is found by considering an application in which an enlargement electronic zoom process is carried out on a center portion of the (n−1)th field to be followed by an ordinary resolution conversion process performed on the nth field as shown in FIG. 45. In this case, since the process to compensate the image for distortion caused by a hand movement is not carried out, the time it takes to perform the operation to read out data to be subjected to vertical-direction image processing from the first image memory area 61 can be shortened by a period corresponding to the process to compensate the image for distortion caused by a hand movement. Thus, it is also possible to shorten the period stretched over a pulse of the input synchronization signal V as a period, during which the operation to read out data to be subjected to vertical-direction image processing from the first image memory area 61 is carried out. As a result, in comparison with the storage capacity MA set in the process carried out at the step S103, the memory capacity MB set as the size of the first image memory area 61 is small.

Figure 46:
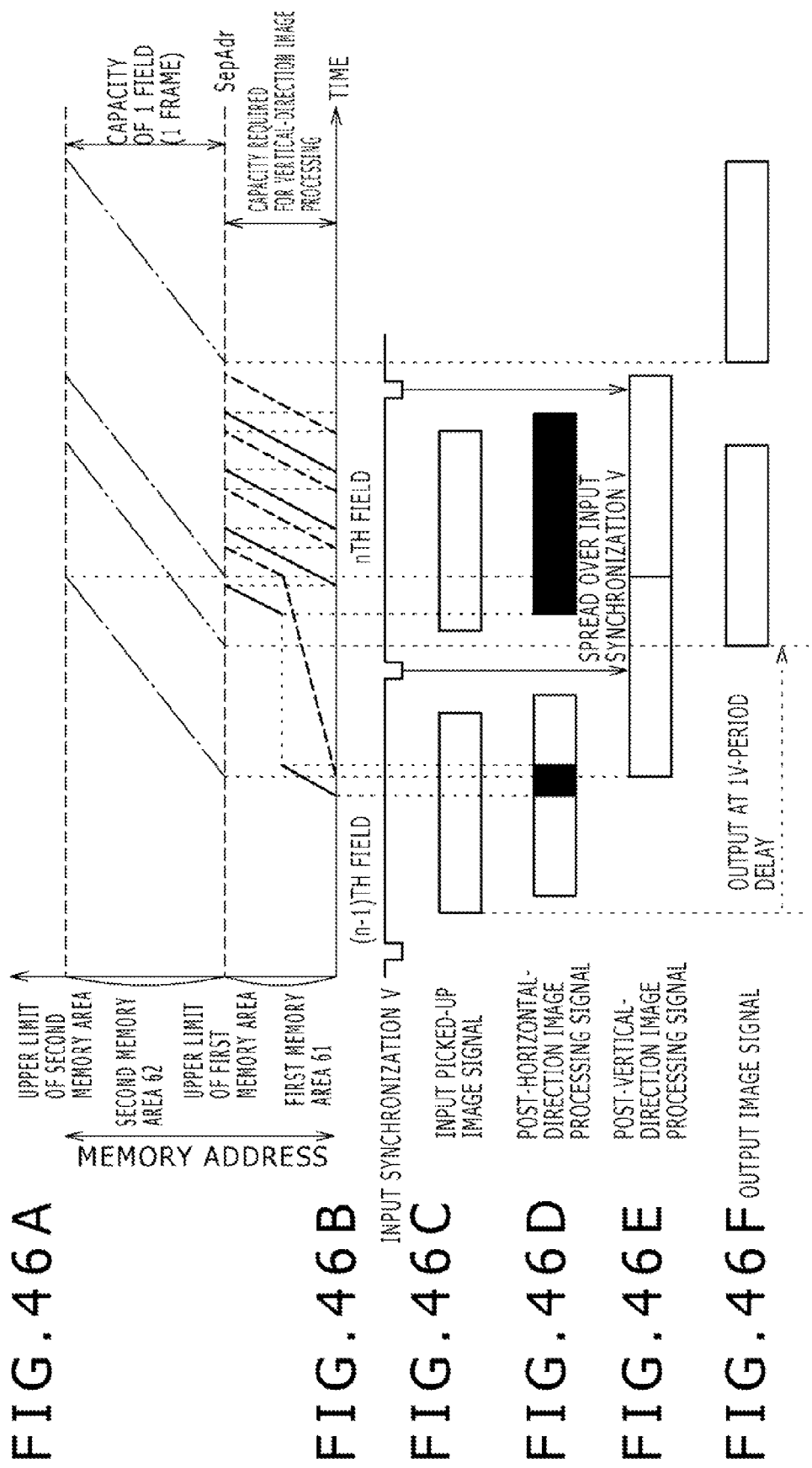
FIG. 46A is an explanatory diagram to be referred to in description of typical operations to store image data into an image memory and read out image data from the memory during the typical processing shown in FIG. 45 in an embodiment implementing an image-data processing apparatus.
FIG. 46B shows an input synchronization signal.
FIG. 46C shows a signal representing an input picked-up image.
FIG. 46D shows a signal obtained as a result of horizontal-direction image processing.
FIG. 46E shows a signal obtained as a result of vertical-direction image processing.
FIG. 46F shows an output image signal.

FIG. 46 is a diagram showing operations to store image data into the first and second memory areas 61 and 62 of the image memory 6 and read out data from the first and second memory areas 61 and 62 for the case described above.

In this case, FIG. 46C shows an input picked-up image signal coming from the imager 2. This input picked-up image signal includes a portion to be enlarged. The portion included in the input picked-up image signal shown in FIG. 46C is subjected to horizontal-direction image processing to be carried out by the horizontal-direction image processing unit 512 and the result of the horizontal-direction image processing is stored in the first image memory area 61 as shown by a solid inclined line in FIG. 46A. FIG. 46D shows an image signal including the result of the horizontal-direction image processing. A black portion included in the image signal shown in FIG. 46D is the result of the horizontal-direction image processing. The black portion is the portion stored in the first image memory area 61 as shown by the solid inclined line in FIG. 46A.

As image data included in the partially enlarged area in the (n−1) field as data with an amount at least large enough for starting vertical-direction image processing is stored in the first image memory area 61, the image data of the partially enlarged area is read out from the first image memory area 61 as shown by a bold dashed inclined line in FIG. 46A and then subjected to the vertical-direction image processing. Subsequently, image data obtained as the result of the vertical-direction image processing is stored in the second image memory area 62 as shown by a single-dotted inclined line in FIG. 46A. Thus, an image signal generated in the vertical-direction image processing is stored in the second image memory area 62 in a period stretched over a pulse of the vertical-direction synchronization signal as shown in FIG. 46E.

Then, when the image data portion in the partially enlarged area of the nth field is received, the horizontal-direction image processing carried out on this image data portion and the operation also carried out to store the result of the horizontal-direction image processing in the first image memory area 61 are started as shown by another solid inclined line in FIG. 46A. When the operation to store the result of the horizontal-direction image processing in the first image memory area 61 reaches the separating address SepAdr, the operation is folded back to the start address of the first image memory area 61 so that all the image data of the partially enlarged area in the nth field can be stored in the first image memory area 61.

The operation to store the image data included in the nth field as data resulting from the horizontal-direction image processing in the first image memory area 61 is carried out while the operation to read out the image data included in the (n−1)th field as data resulting from the horizontal-direction image processing from the first image memory area 61 is being performed. Thus, the operation to store the image data included in the nth field as data resulting from the horizontal-direction image processing in the first image memory area 61 must be carried out by not surpassing the operation to read out the image data included in the (n−1)th field as data resulting from the horizontal-direction image processing from the first image memory area 61. That is to say, the size of the first image memory area 61 must be set at such a value that the operation to store the image data included in the nth field as data resulting from the horizontal-direction image processing in the first image memory area 61 does not surpass the operation to read out the image data included in the (n−1)th field as data resulting from the horizontal-direction image processing from the first image memory area 61.

Then, before the operation to store the result of the vertical-direction image processing in the second image memory area 62 is completed, an operation to read out the result of the vertical-direction image processing from the second image memory area 62 is started as shown by a double-dotted inclined line in FIG. 46A as an output image signal shown in FIG. 46F. That is to say, the operation to read out the result of the vertical-direction image processing from the second image memory area 62 starts with a timing before the next operation to store the next result of the vertical-direction image processing into the second image memory area 62 is started.

Let us refer back to the flowchart shown in FIG. 42. If the determination result produced in the process carried out at the step S104 indicates that the electronic zoom option has not been selected, on the other hand, the flow of the processing goes on to a step S106 to produce a result of determination as to whether or not no lens-distortion compensation has been set. The flow of the processing also goes on to a step S106 to produce a result of determination as to whether or not no lens-distortion compensation has been set if the determination result produced in the process carried out at the step S102 indicates that the electronic zoom option has not been selected.

Figure 47:
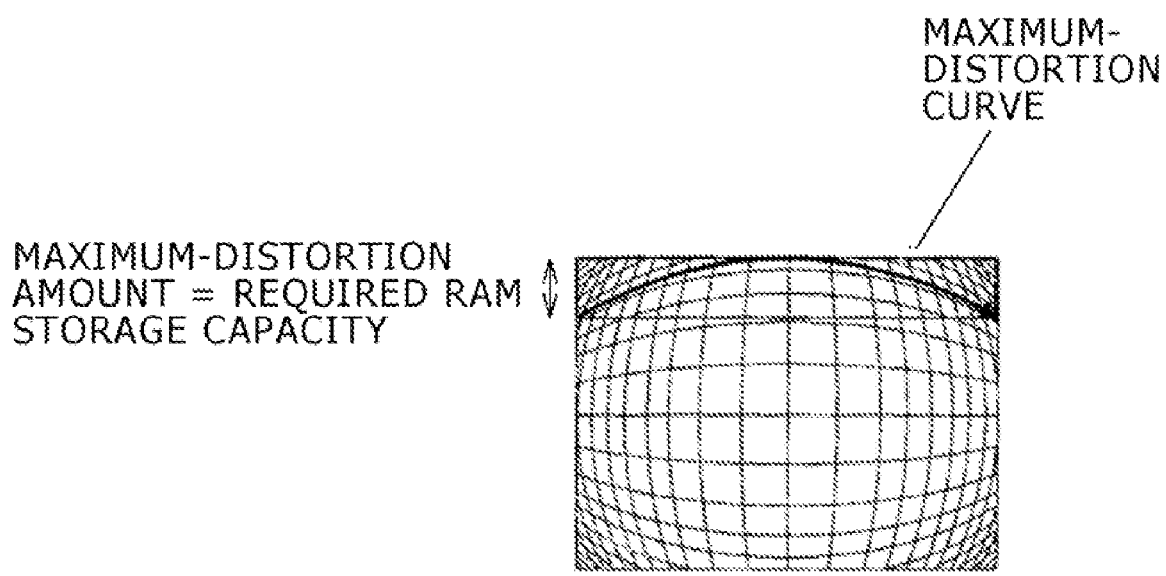
FIG. 47 is an explanatory diagram to be referred to in description of lens distortion.

If the determination result produced in the process carried out at the step S106 indicates that lens-distortion compensation has been set, the flow of the processing goes on to a step S107 at which the control unit 10 sets the size of the first image memory area 61 at a memory capacity MC capable of accommodating horizontal lines affected by anticipated largest lens distortion like one shown in FIG. 47. To put it concretely, the separating address SepAdr is determined to set the storage size of the first image memory area 61 at the memory capacity MC and stored in a register employed in the register block 53 as a register for holding the separating address SepAdr.

This is because, in order to process observed horizontal lines affected by the largest lens distortion in processing to compensate the image for the lens distortion, it is necessary to save image data of the horizontal lines. Since the process to compensate the image for distortion caused by a hand movement and the electronic zoom process are not carried out, the vertical-direction image processing is not stretched over a pulse of the input vertical-direction synchronization signal V. Thus, the process of the step S107 can be carried out without the need to take an overwriting case into consideration. As a result, the horizontal-line memories with a storage capacity for the anticipated largest distortion can be used for dealing with the case.

Finally, if the determination result produced in the process carried out at the step S106 indicates that no lens-distortion compensation has been set, on the other hand, the flow of the processing goes on to a step S108 at which, by taking only the resolution conversion process into consideration, the control unit 10 sets the size of the first image memory area 61 at a memory capacity MD as a horizontal-line memory storage capacity corresponding to the number of taps of a vertical-direction FIR filter serving as vertical-direction resolution conversion filter. To put it concretely, the separating address SepAdr is determined to set the storage size of the first image memory area 61 at the memory capacity MD and stored in a register employed in the register block 53 as a register for holding the separating address SepAdr.

Figure 57:
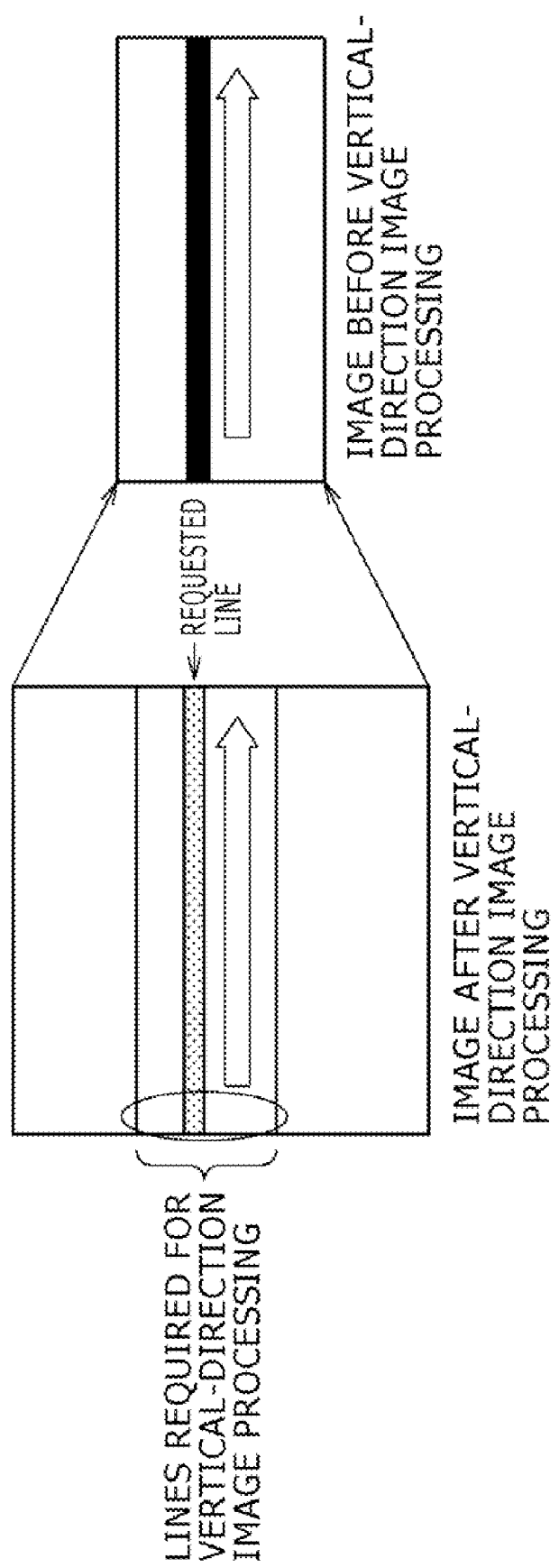
FIG. 57 is an explanatory block diagram to be referred to in description of operations to read out image data to be subjected to vertical-direction image processing from an image memory.

In this case, the resolution conversion process is carried out to generate image data of one horizontal line as a result of the process by using a vertical-direction FIR filter from a plurality of horizontal lines of an image received before the process is carried out as shown in FIG. 57. A horizontal line count set for a requested horizontal line of an image received before the resolution conversion process is carried out as a horizontal line count representing the number of horizontal lines of the pre-conversion image as an image to be processed by using the vertical-direction FIR filter in order to generate image data of one horizontal line as a result of the process is equal to the number of taps of the vertical-direction FIR filter. Thus, as a plurality of horizontal lines is accumulated in the first image memory area 61, the resolution conversion process can be carried out. Therefore, the size of the first image memory area 61 can be set at the storage capacity MD corresponding to the horizontal line count, which is equal to the number of taps of the vertical-direction FIR filter. In actuality, however, the storage capacity MD is equivalent to the sum of a capacity corresponding to the horizontal line count, which is equal to the number of taps of the vertical-direction FIR filter, and a capacity margin.

The size of the first image memory area 61 is determined as described above. Much like the processing represented by the flowchart shown in FIG. 42, however, the storage capacities MA, MB, MC and MD are pre-stored in registers which can be selected in accordance with conditions depending on factors such as the operating mode, whether or not the hand-movement distortion compensation is set, whether or not the lens-distortion compensation is set and whether or not the electronic zoom option is selected. Then, the control unit 10 may examine the conditions and set the separating address SepAdr determining the size of the image memory 6 at a storage capacity read out from one properly selected among the registers on the basis of the result of examining the conditions. Instead of storing the storage capacities MA, MB, MC and MD in the registers in advance, the value of the separating address SepAdr can also be stored in the register block 53 in advance and, if necessary, the value of the separating address SepAdr can be read out from the register block 53 to be used for dividing the memory area of the image memory 6.

As described above, in the embodiments, the control unit 10 dynamically changes the size of the first image memory area 61 of the image memory 6 in accordance with information entered by the user as information on selected setting. However, such information can also be set at the design stage of the image pickup apparatus. In this case, the value of the separating address SepAdr is fixed at the design stage. Nevertheless, a procedure similar to the flowchart shown in FIG. 42 can be executed in order to determine the sizes of the first image memory area 61 and the second image memory area 62. The information cited above includes information indicating whether or not the electronic zoom function is included in the image pickup apparatus, a zoom rate in case the electronic zoom function is included in the image pickup apparatus, information indicating whether or not the hand-movement distortion compensation function is included in the image pickup apparatus, the degree of the hand-movement distortion compensation in case the hand-movement distortion compensation function is included in the image pickup apparatus, information indicating whether or not the lens-distortion compensation function is included in the image pickup apparatus and the degree of the lens distortion compensation in case the lens distortion compensation function is included in the image pickup apparatus.

By taking an entire-image shrinking process as an example, the following description exemplifies the storage capacity of the image memory 6 employed in the image pickup apparatus according to the embodiments. Instead of partially cutting off an input image, the entire-image shrinking processing is processing to convert a signal extracted from the entire input image into a signal representing an output image having a required resolution.

Let us assume that the horizontal-direction size of the image is X pixels, the vertical-direction size of the image is Y pixels and the amount of information per pixel is Z bits. In this case, the storage capacity required for holding the image is given as follows:

$SUM_{mem} = X \times Y \times Z$ (bits)

If the image is an SD image conforming to the NTSC (National Television System Committee) standard in which the output image signal has the ratios of the sampling frequencies for the luminance component Y, color-difference component Cr and color-difference components Cb of the image data set at 4:1:1, the size of the second image memory area 62 is given as follows:

$SUM_{mem2} = 720 \times 240 \times 12 =$ about 2.0 (megabits)

As described before, the required size of the first image memory area 61 varies, depending on factors such as a tap count representing the number of taps used in the vertical-direction resolution conversion processing, the range a hand-movement distortion compensation process, an electronic zoom rate and an electronic distortion compensation rate. Conditions entailing the largest size of the first image memory area 61 include a condition requiring that a hand-movement distortion compensation process range shall be set at the entire available pixel area of the imager 2, a condition requiring that an electronic zoom rate limit shall be set at a rate for coverage of enlargement from the vertical-direction size of the vertical-direction tap count to the size of an output image signal and a condition requiring that the electronic hand-movement distortion compensation function shall be implemented. For such conditions, the required size of the first image memory area 61 is given below as a value actually tested in the field:

$SUM_{mem1} =$ about 2.0 (megabits) (actual performance value)

Thus, the required storage capacity of the image memory 6 is given as follows:

$SUM_{all} = SUM_{mem1} + SUM_{mem2} = 2.0 + 2.0 =$ about 4.0 (megabits)

Since the second image memory area 62 is used for storing all data obtained as a result of the resolution conversion processing, the required size of the first image memory area 61 is about 2.0 megabits without regard to the size of the input image.

Figure 54:
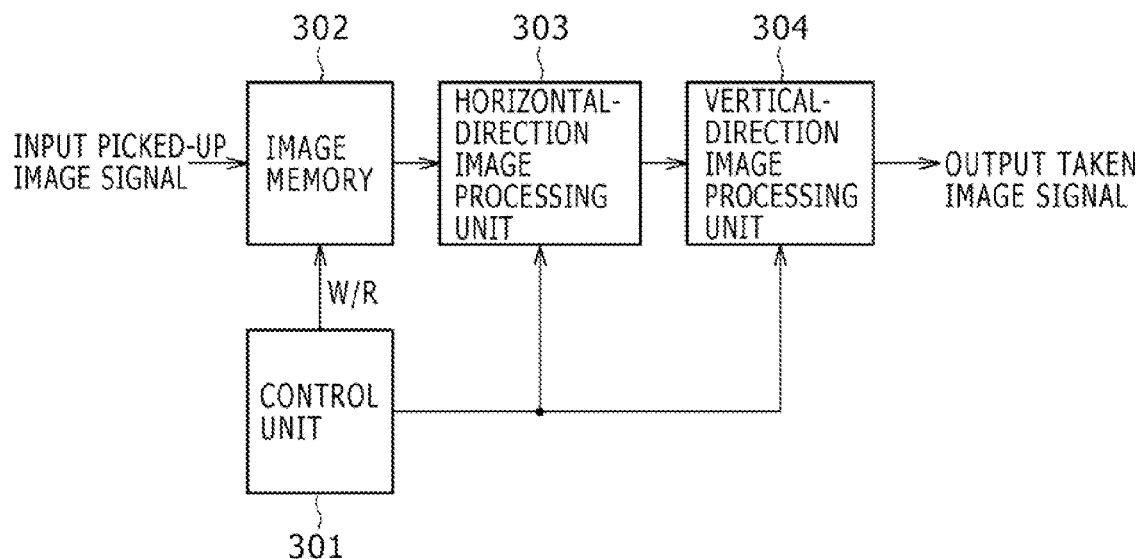
FIG. 54 is an explanatory block diagram showing an existing image-data processing apparatus.
Figure 56:
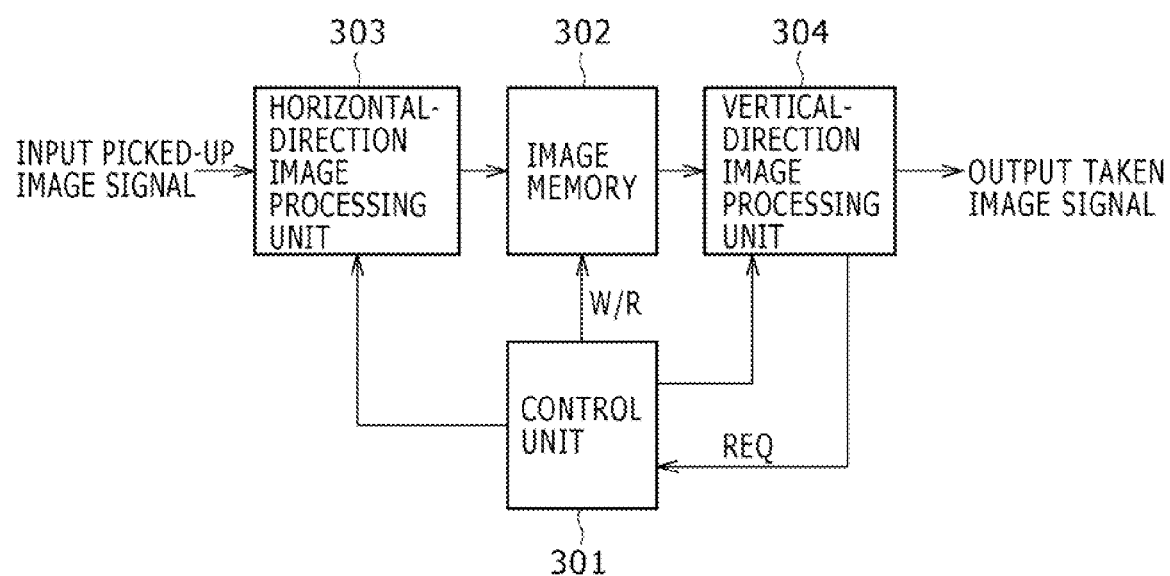
FIG. 56 is an explanatory block diagram showing another image-data processing apparatus.

In the case of the existing methods described at the beginning of the specification by referring to FIGS. 54 and 56, on the other hand, the size of the input image is 1,152 pixels per horizontal line×864 horizontal lines=1 mega bits or 1 mega size. In this case, the sizes of the SD images for the existing methods described at the beginning of the specification by referring to FIGS. 54 and 56 are given respectively as follows:

$SUM_{all} = 1,152 \times 864 \times 12 =$ about 11.0 (megabits)

$SUM_{all} = 720 \times 864 \times 12 =$ about 7.0 (megabits)

Thus, in comparison the existing methods, the required storage capacity of the image memory 6 in the embodiments described above can be reduced to 60% and 40% respectively. The effect provided by the embodiments for an image of one mega size or one mega bits has been described above. Even for input images each having a larger size, the required storage capacity of the image memory 6 in the embodiment described above does not increase. Thus, the effect provided by the embodiments is even greater for input images each having a larger size.

Write Timing Control of the Image Memory 6

As described above, the first image memory area 61 in the embodiments is not used for storing the image data obtained as a result of the horizontal-direction image processing as the image of the entire screen. Instead, while the size of the first image memory area 61 is smaller than one screen, the operation to read out image data from the first image memory area 61 is started before the image data is erased by being overwritten with newly stored image data. That is to say, vertical-direction image processing to be carried out on image data obtained as a result of horizontal-direction image processing can be started without being put in a wait state of one vertical-direction period. The following description explains a method to control a timing to start reading out image data from the first image memory area 61 of the image memory 6.

An embodiment described below adopts two different methods to control a timing to read out image data from the first image memory area 61 of the image memory 6 in accordance with the four different image taking modes described earlier.

First Method:

A read start timing is computed in advance. Then, on the basis of signals such as horizontal-direction and vertical-direction synchronization signals showing the beginning of valid input image data, the computed read start timing is detected to start the operation to read out image data from the first image memory area 61 of the image memory 6.

Second Method:

The memory interface 54 itself internally generates a read start timing in order to control the vertical-direction image processing.

Since it is difficult to finely predetermine a timing according to certain conditions as a timing to start the operation to read out image data from the first image memory area 61 of the image memory 6 in accordance with the first method, fine control may not be executed. The certain conditions include a condition as to whether or not the hand-move distortion compensation processing is to be carried out, the value of the electronic zoom rate and the value of the electronic distortion compensation rate. However, the first method has a merit that timing control can be implemented with ease without the need to execute fine control by making use of a memory controller or the like. In addition, the first method has another merit that special control can be executed so that, depending on the set value of the read start timing, the processing circuits do not enter a wait state since the start of the processing.

In this embodiment, the first method is adopted for the HD moving-picture taking mode and the still-picture recording mode.

In accordance with the second method, on the other hand, the memory interface 54 itself internally generates a read start timing in order to control the vertical-direction mage processing. Thus, it is necessary to manage and update information required for generation of the read start timing. However, the second method has merits that image data stored in the image memory 6 can be managed in a real-time manner and fine control of the read start timing can be executed. In addition, the second method demonstrates a good effect when it is desired to execute fine control by limiting the storage capacity. In this embodiment, the second method is adopted for the SD moving-picture taking mode and the monitoring mode.

The above applications of the first and second methods are typical. That is to say, the applications of the first and second methods are by no means limited to the operating modes described above.

Next, the second method is explained in detail as follows. An important point for implementing the second method is that the image management information of a field (or a frame) stored in the first image memory area 61 is always updated and managed. The image management information of a field (or a frame) stored in the first image memory area 61 includes the range of image data stored in the first image memory area 61 as image data within a field (or a frame), the start address of the image range and the end address of the image range.

Figure 48:
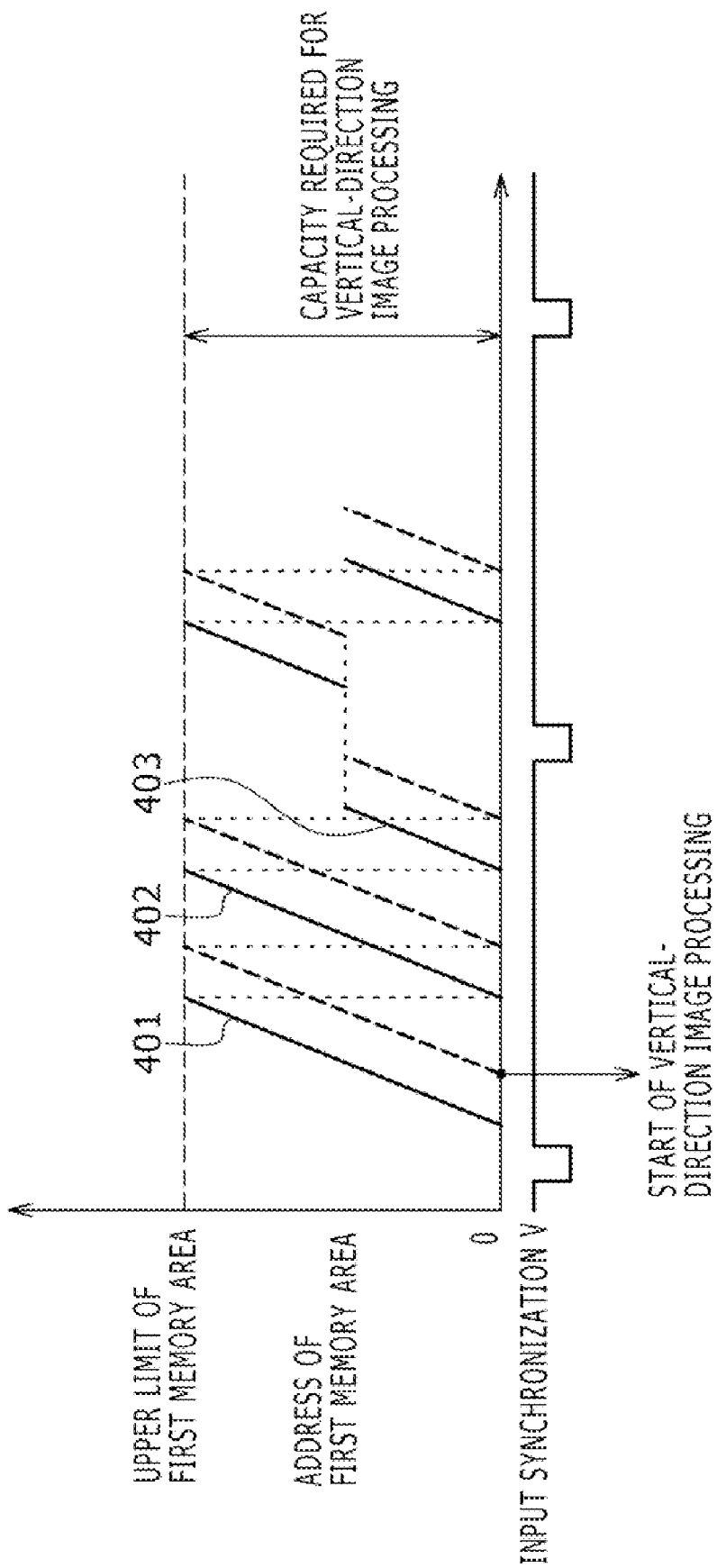
FIG. 48 is an explanatory diagram to be referred to in description of typical operations to store image data into an image memory and read out image data from the memory in an embodiment implementing an image-data processing apparatus.
Figure 49:
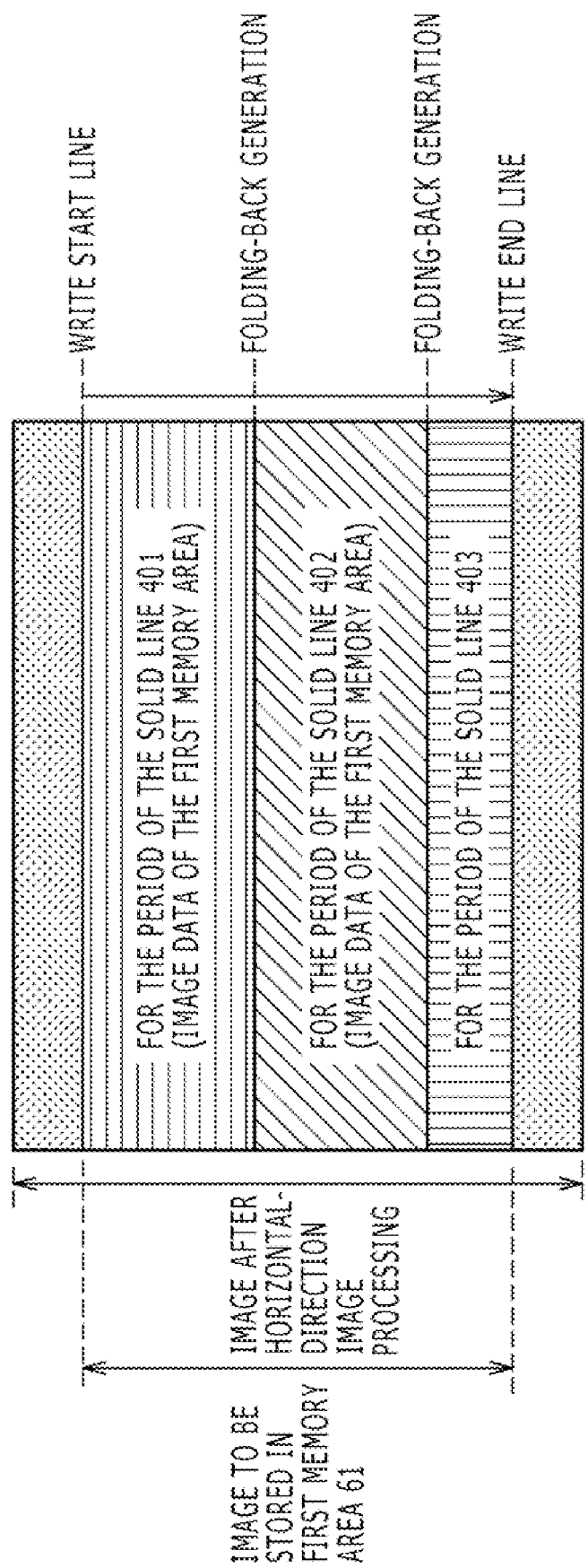
FIG. 49 is an explanatory diagram to be referred to in description of typical operations to store image data into an image memory and read out image data from the memory in an embodiment implementing an image-data processing apparatus.

FIG. 48 is a diagram showing a close-up timing chart of the operations to store image data into the first image memory area 61 and read out image data from the first image memory area 61 for the typical case explained before by referring to FIGS. 38 and 39. FIG. 49 is a diagram showing how image data of one screen for the typical case shown in FIG. 48 is stored in the first image memory area 61. To be more specific, FIG. 49 shows a case in which the valid image data portion only is stored into the first image memory area 61 after the entire input image data has been subjected to horizontal-direction image processing.

First of all, as shown by a solid horizontal line 401 in FIG. 48, a write operation to store a valid image obtained as a result of the horizontal-direction image processing in the first image memory area 61 is started. The write start address of this write operation is an arbitrary address. As the write operation is carried forward, the write address reaches the upper limit of the first image memory area 61. At that time, the write operation is folded back.

Then, after being folded back, the write operation to store the valid image in the first image memory area 61 is continued. This time, the start write address of the write operation is a write address set previously. The write operation carried out this time is shown by a solid horizontal line 402 in FIG. 48. This time, image data is stored in the first image memory area 61, overwriting the image data stored previously as shown by the solid horizontal line 401. As the write operation is carried forward, the write address again reaches the upper limit of the first image memory area 61. At that time, the write operation is folded back again.

Then, after being folded back, the write operation to store the valid image in the first image memory area 61 is continued. This time, the start write address of the write operation is a write address set previously. The write operation carried out this time is shown by a solid horizontal line 403 in FIG. 48. This time, image data is stored in the first image memory area 61, overwriting the image data stored previously as shown by the solid horizontal line 402.

The image data stored into the first image memory area 61 in the write operations shown by the solid horizontal lines 401, 402 and 403 in FIG. 48 is shown in FIG. 49 as the image data of one screen.

Figure 50A:
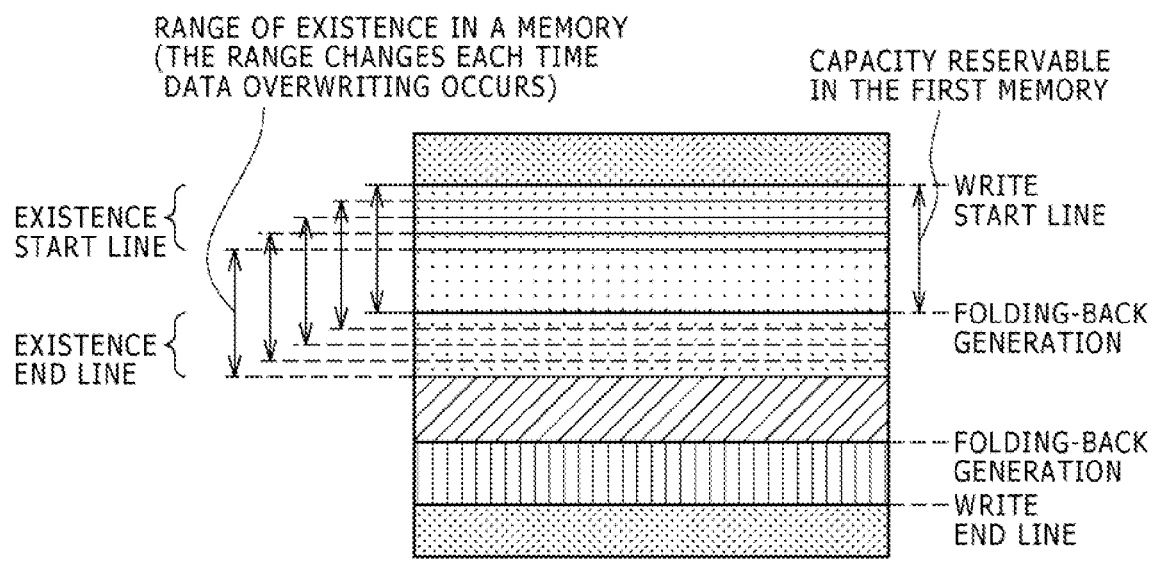
FIGS. 50A and 50B are explanatory diagrams to be referred to in description of typical operations to store image data into an image memory and read out image data from the memory in an embodiment implementing an image-data processing apparatus.
Figure 50B:
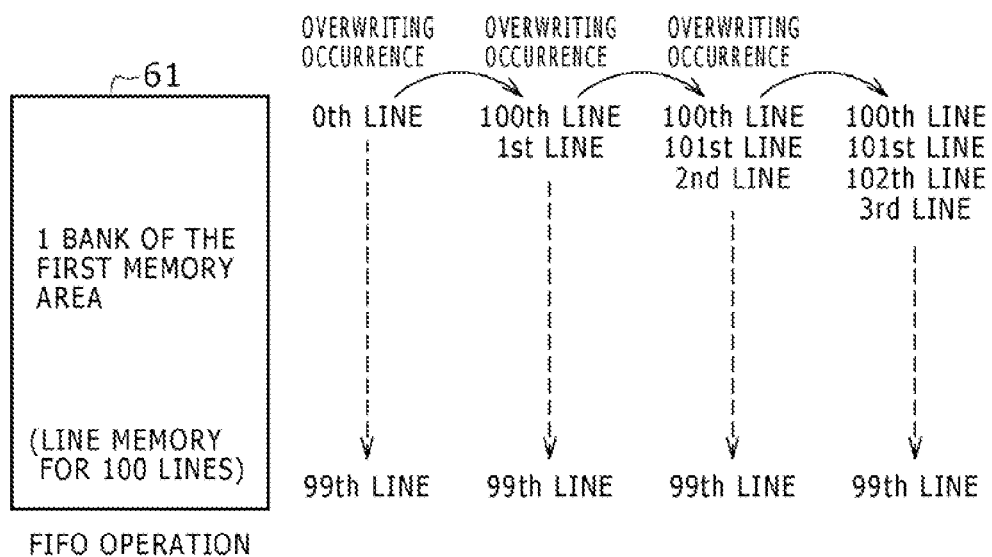

FIGS. 50A and 50B are diagrams showing image-range transitions along a bank of the first image memory area 61 for the image data shown in FIGS. 48 and 49. In order to make the explanation easy to understand, the storage capacity of the bank shown in FIG. 50B is assumed to be 100 horizontal lines.

After image data having an amount equal to the storage capacity of the bank of the first image memory area 61 has been stored in the bank since the start of the write operation, as shown by the second dashed-horizontal line arrow from the left side of FIG. 50B, the first overwriting of the newly stored image data of the $100^{th}$ horizontal line on the already stored image data of the $0^{th}$ horizontal line serving as the first horizontal line occurs as the image data of $100^{th}$ horizontal line is stored in the bank. At that time, the already stored image data of the $0^{th}$ horizontal line is erased, being replaced by the newly stored image data of the $100^{th}$ horizontal line. However, the number of the horizontal line with having image data most recently stored in the bank (the existence end horizontal line) is increases by one from 99 to 100. Thus, the difference between the number of the existence end horizontal line and the number of the horizontal line with having image data least recently stored in the bank (the existence start horizontal line) is constant all the time since the start of the write operation. The numbers and addresses of the existence end horizontal line and the existence start horizontal line are kept in the memory interface 54, being always managed and updated in order to automatically generate a read start timing to read out image data to be subjected to vertical-direction image processing.

Figure 55:
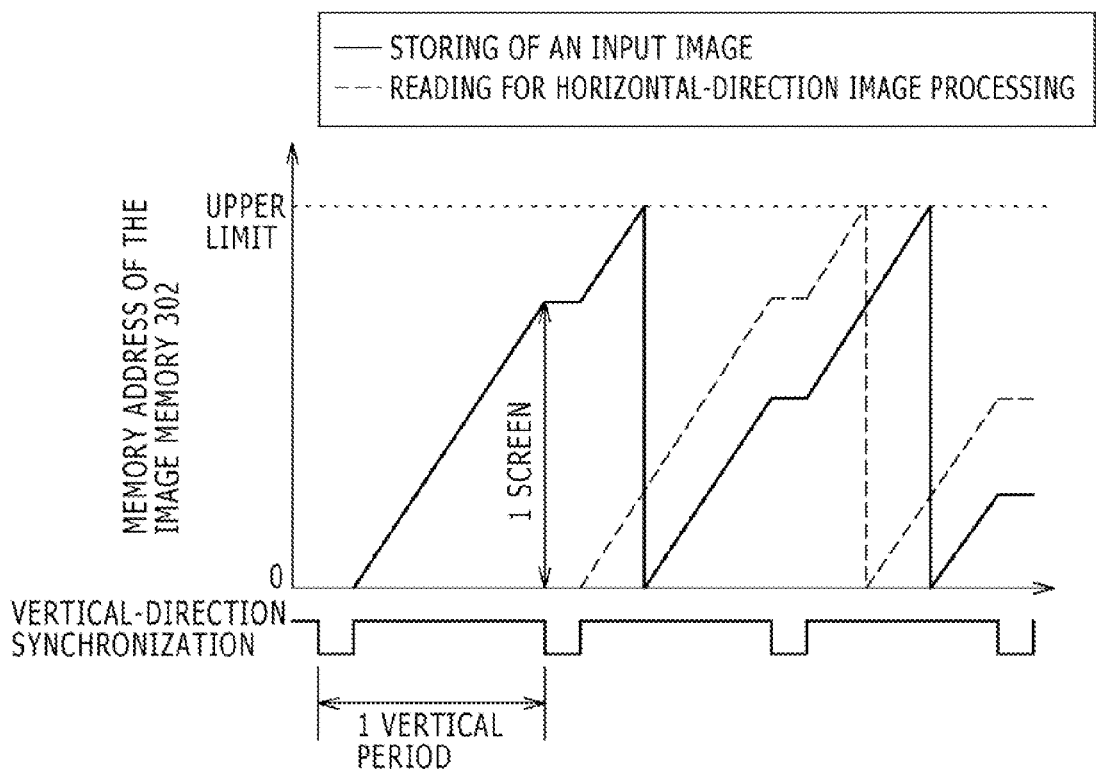
FIG. 55 is an explanatory block diagram to be referred to in description of operations to store image data in an image memory and read out image data from the memory in the image-data processing apparatus shown in FIG. 54.

That is to say, by managing the image range in the first image memory area 61 as well as the start and end addresses of the image range, the embodiment is capable of expediting the read start timing to read out image data to be subjected to vertical-direction image processing in order to read out image data of a horizontal line before the image data is overwritten by image data of a later horizontal line. In addition, the embodiment requires the image memory 6 to have a storage capacity smaller than the storage capacities required in the existing method explained earlier by referring to FIGS. 54 and 55. On top of that, the embodiment is yet capable of converting an input image having any size into a video signal.

In addition, by computing the read address of a desired horizontal line on the basis of information on the least recently stored horizontal line, the embodiment allows the complex address calculation method adopted in the past to be made simpler.

That is to say, in accordance with the existing method explained earlier by referring to FIGS. 54 and 55, the address calculation process finds information on a write start horizontal line shown in FIG. 49 and the start address of the horizontal line. In other words, in accordance with the existing method, an address relative to the write start horizontal line is used in the computation of the read address of an image. The information on the write start horizontal line and the address is once updated in the vertical-direction blanking period.

Figure 51:
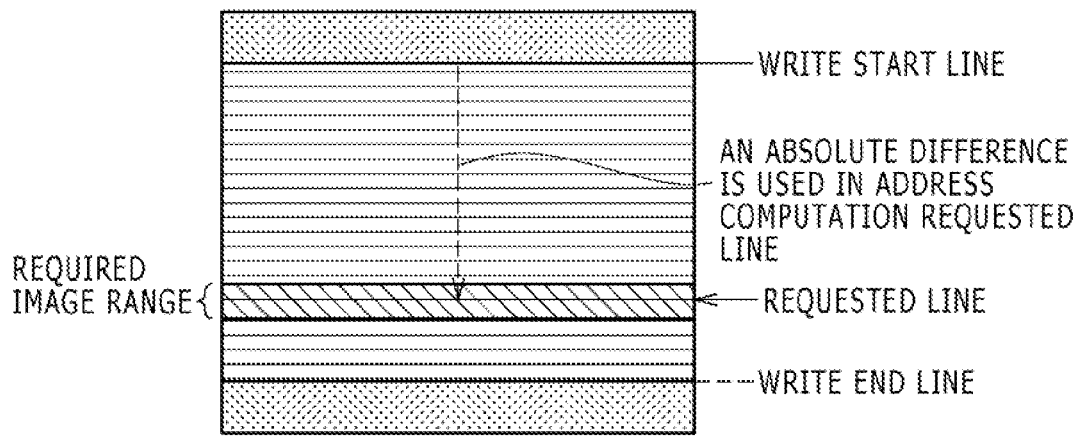
FIG. 51 is an explanatory diagram to be referred to in description of typical operations to store image data into an image memory and read out image data from the memory in an embodiment implementing an image-data processing apparatus.

FIG. 51 is a diagram showing an existing method for computing a read start timing to read out image data to be subjected to vertical-direction image processing from an image memory. As shown in FIG. 51, when a horizontal line to be subjected to vertical-direction image processing is specified and a vertical-direction image processing unit issues a request for the horizontal line, a memory controller finds the addresses of a plurality of horizontal lines included in an image range required for processing the specified horizontal line by making use of differences from the write start horizontal line. The memory controller then produces a result of determination as to whether or not an operation to store image data of the horizontal lines included in the required image range into the image memory has been completed and an operation to read out the image data of the horizontal lines from the image memory can be started.

If the existing method to compute addresses by making use of differences from the address of the write start horizontal line as shown in FIG. 51 is applied to the image pickup apparatus according to the embodiment as a method for computing a read start timing to read out image data to be subjected to vertical-direction image processing from an image memory, however, the following problems will be raised.

1: A division unit is required to deal with an arbitrary fold-back address.

2: If the fold-back address is a nth power of 2 where n is a positive integer, the division unit can be replaced by a shift register. However, a shift register has a lack of generality. In addition, it is difficult to change the fold-back address dynamically.

For the reason described above, the embodiment makes use of the an existence start horizontal line shown in FIG. 50 and the address of the existence start horizontal line in order to solve the problems described above.

Figure 52:
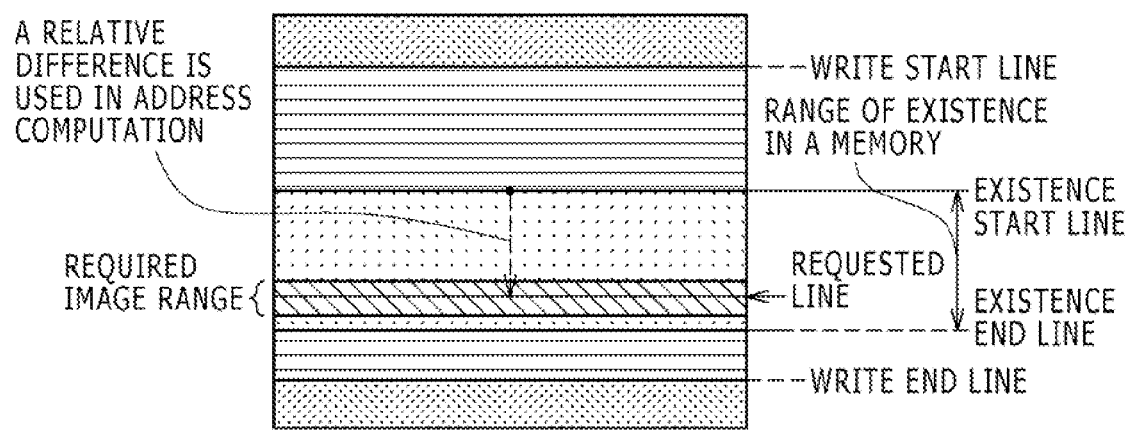
FIG. 52 is an explanatory diagram to be referred to in description of typical operations to store image data into an image memory and read out image data from the memory in an embodiment implementing an image-data processing apparatus.

FIG. 52 is a diagram showing a method for computing a read start timing to read out image data to be subjected to vertical-direction image processing in accordance with the embodiment. As shown in FIG. 52, when a horizontal line to be subjected to vertical-direction horizontal line processing is specified and a vertical-direction image processing unit issues a request for the horizontal line, the memory interface 54 finds the addresses of a plurality of horizontal lines included in an image range required for processing the specified horizontal line by making use of differences from the existence start horizontal line. The memory interface 54 then produces a result of determination as to whether or not an operation to store image data of the horizontal lines included in the required image range into the image memory has been completed and an operation to read out the image data of the horizontal lines from the image memory can be started.

In this embodiment, since the differences from the existence start horizontal line are used in the address computation to determine a read timing address to read out image data to be subjected to vertical-direction horizontal line processing, the folding-back occurrence is observed once at the most in the address computation. Thus, the address computation can be carried out by making use of typically a subtraction unit as a substitute for the division unit described above. As a result, the computation can be made simpler.

In addition, the embodiment is capable of coping with any arbitrary fold-back address. On top of that, since the folding-back occurrence is observed once at the most in the address computation, image data of an image having any size can be converted into output image data with ease.

Figure 53:
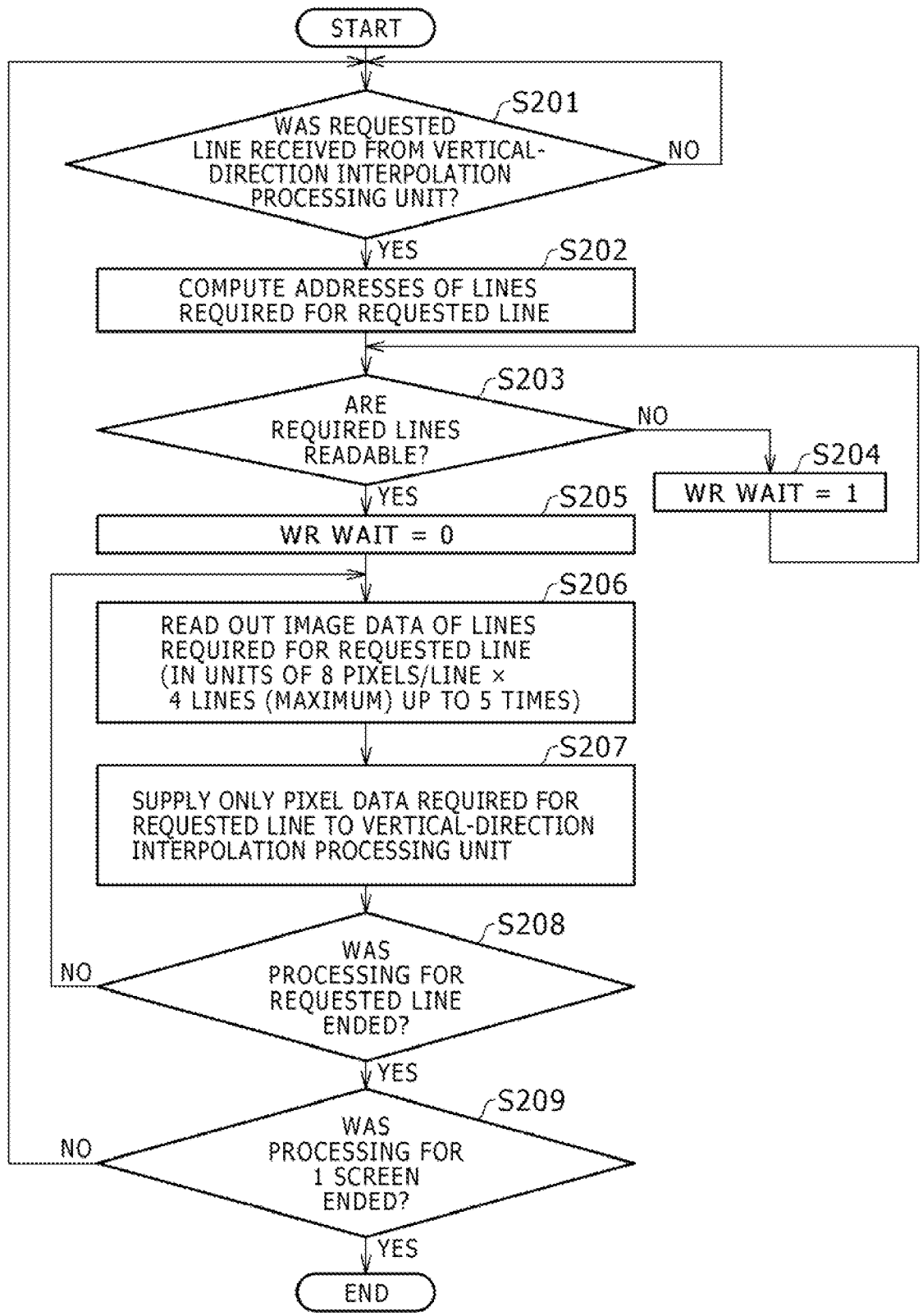
FIG. 53 shows a flowchart to be referred to in description of operations to read out image data to be subjected to vertical-direction image processing from an image memory in an embodiment implementing an image-data processing apparatus.

FIG. 53 shows a flowchart representing processing carried out by the control unit 542 employed in the memory interface 54 as processing to control the operation to read out image data to be subjected to vertical-direction interpolation processing from an image memory for the case shown in FIG. 52. However, the flowchart represents processing carried out only on image data of one screen. Thus, in the case of image data of a moving picture, the processing represented by the flowchart shown in FIG. 53 must be carried out repeatedly.

Prior to the processing represented by the flowchart shown in FIG. 53, upon completion of vertical-direction interpolation processing carried out on a previous horizontal line, the vertical-direction interpolation processing unit 209 supplies information on a new requested horizontal line to the control unit 542 employed in the memory interface 54 as shown in FIG. 19 in order to acquire image data of the new requested horizontal line as image data to be subjected to vertical-direction interpolation processing. It is to be noted that the control unit 542 itself is not shown in FIG. 19.

The flowchart begins with a step S201 at which the control unit 542 employed in the memory interface 54 produces a result of determination as to whether or not information on a requested horizontal line has been received from the vertical-direction interpolation processing unit 209. As the determination result produced in the process carried out at the step S201 indicates that the information on a requested horizontal line has been received from the vertical-direction interpolation processing unit 209, the flow of the processing goes on to a step S202 at which the control unit 542 determines a plurality of horizontal lines required for the requested horizontal line, and computes addresses relative an existence start horizontal line as the addresses of the determined horizontal lines required for the requested horizontal line.

To put it in detail, at that time, information received from the control unit 10 as information on the operating mode has been saved in the register block 53. The information on the operating mode includes information indicating whether or not hand-movement distortion compensation processing is to be carried out, information indicating whether or not lens-distortion compensation processing is to be carried out and information indicating whether or not electronic zoom processing is to be carried out. The control unit 542 employed in the memory interface 54 determines a plurality of horizontal lines required for vertical-direction interpolation processing to be carried out on the requested horizontal line in an operating mode recognized from information read out from the register block 53 as the information on the operating mode. Then, the control unit 542 computes addresses relative the existence start horizontal line as the addresses of the determined horizontal lines required for the requested horizontal line.

Then, at the next step S203, the control unit 542 employed in the memory interface 54 produces a result of determination as to whether or not image data of the required horizontal line determined in the process carried out at the step S202 can be read out from the first image memory area 61. If the determination result produced in the process carried out at the step S203 indicates that the image data of the required horizontal line may not be read out from the first image memory area 61 yet due to the fact that an operation to store the image data into the first image memory area 61 has not been completed, the flow of the processing goes on to a step S204 at which the control unit 542 sets a wait signal WRwait output to the vertical-direction interpolation processing unit 209 at 1 (WRwait=1) in order to notify the vertical-direction interpolation processing unit 209 that the operation to store the image data into the first image memory area 61 has not been completed. Then, the flow of the processing goes on to the step S203 to repeat the determination process of this step.

As the determination result produced in the process carried out at the step S203 indicates that the image data of the required horizontal line can be read out from the first image memory area 61, the flow of the processing goes on to a step S205 at which the control unit 542 employed in the memory interface 54 resets the wait signal WRwait output to the vertical-direction interpolation processing unit 209 to 0 (WRwait=0). Then, at the next step S206, the memory interface 54 reads out the image data of the required horizontal line from the first image memory area 61. As described before, depending on the amount of the lens distortion, up to five accesses to read out the image data from the first image memory area 61 can be made during an access-right acquisition time interval consisting of eight memory cycles (or eight clock cycles) at the step S206. The image data of four horizontal lines is read out from the first image memory area 61 at the same time in eight-pixel units.

Then, at the next step S207, the control unit 542 employed in the memory interface 54 selects only pixel data required in the vertical-direction interpolation processing from the data read out at one time as data of eight pixels and supplies the selected pixel data to the vertical-direction interpolation processing unit 209. Subsequently, the vertical-direction interpolation processing unit 209 starts the execution of the vertical-direction interpolation processing on the requested horizontal lines.

Then, at the next step S208, the control unit 542 employed in the memory interface 54 produces a result of determination as to whether or not the vertical-direction interpolation processing carried out on the horizontal line requested by the vertical-direction interpolation processing unit 209 has not been completed. If the determination result produced in the process carried out at the step S208 indicates that the vertical-direction interpolation processing carried out on the requested horizontal line has not been completed, the flow of the processing goes back to the step S206 to repeat the processes of the steps S206, S207 and S208.

If the determination result produced in the process carried out at the step S208 indicates that the vertical-direction interpolation processing carried out on the requested horizontal line has been completed, on the other hand, the flow of the processing goes on to a step S209 at which the control unit 542 employed in the memory interface 54 produces a result of determination as to whether or not the processing described above has been carried out on image data of one screen. If the determination result produced in the process carried out at the step S209 indicates that the processing described above has not been carried out on image data of one screen, the flow of the processing goes back to the step S201 to repeat the processing described above. If the determination result produced in the process carried out at the step S209 indicates that the processing described above has been carried out on image data of one screen, on the other hand, the execution of the processing described above is ended.

The embodiment described above is implemented for the case of a signal representing an image taken mainly in the moving-picture recording mode. It is to be noted, however, that the address computation method similar to what is described so far can also be applied to the case of signals each representing an image taken in another operating mode such as the still-picture recording mode or the still-picture reproduction mode.

As described above, in accordance with the embodiments, by merely adding a storage capacity required to start vertical-direction image processing such as vertical-direction resolution conversion processing to the storage capacity for accommodating image data of one field (or one frame), an input image signal representing an image with any arbitrary amount of data can be converted into an output image signal. Thus, image processing such as resolution conversion processing can be carried out in a real-time manner by making use of a memory with a storage capacity smaller than the existing system requiring a memory with a storage capacity large enough for accommodating the data of an input image.

In addition, in real-time image processing, with the embodiments, read and write accesses to the image memory are carried out in eight-pixel units. Thus, the image processing can be carried out at a lower power consumption and with a higher degree of efficiency.

On top of that, the image memory of the embodiments is configured to include a plurality of banks and operations to store image data into the banks and read out image data from the banks are devised so as to allow image processing to be carried out in a real-time manner.

In addition, the four read/write control units 541 to 544 for controlling operations to store image data into the image memory 6 and read out image data from the image memory 6 are provided to operate independently of each other. On top of that, accesses made by the four read/write control units 541 to 544 to the image memory 6 are arbitrated by the arbitration unit 545. Thus, this scheme also contributes to easy execution of image processing in a real-time manner.

In addition, the embodiments also include a register for holding a separating address logically dividing the image memory 6 into the first image memory area 61 and the second image memory area 62. Thus, the circuit configuration can be changed dynamically. As a result, the image-processing apparatus according to the embodiments is capable of keeping up with a variety of operating modes and making seamless transitions from one mode to another.

On top of that, image management information stored in a memory is managed and updated in a real-time manner in order to simplify the computation of an address used in a read operation. In addition, any arbitrary fold-back address can be dealt with.

On top of that, image processing such as resolution conversion processing can be implemented by making use of a memory with a fixed storage capacity independent of the size of the input image. Thus, in comparison with the existing system, the larger the size of the input image, the greater the effect exhibited by the embodiments. In addition, the embodiments can be applied to still-picture processing as well as moving-picture processing. Thus, applications of the embodiments in a wider area can be expected.

On top of that, the configuration of the image memory can be changed dynamically and the timing to start vertical-direction image processing can be set in a flexible manner by adoption of two different methods. Thus, the embodiments offer a high degree of generality so that it can be expected that the embodiments can be incorporated in a variety of image processing systems as well as an image pickup apparatus.

OTHER EMBODIMENTS AND MODIFIED VERSIONS

The embodiments explained so far are applied to a case in which, during processing to read out image data to be subjected to vertical-direction image processing, a memory access process may not probably be completed in the period of one processing time unit. It is to be noted, however, that the scope is by no means limited to such a case.

For example, in the configuration shown in FIG. 22, the post-horizontal-direction image-processing data write request unit 513 employed in the horizontal-direction image processing block 51 as well as the vertical-direction image-processing data acquisition request unit 524, the post-vertical-direction image-processing data write request unit 525 and the output-data read request unit 526, which are employed in the vertical-direction image processing block 52, each serve as a client requesting an access to the image memory 6 through the memory interface 54. In this case, the present application can be applied to processing to handle a request made by one of these clients.

The embodiments are described for a case in which an image is compensated for distortion caused by a hand movement made by the user in operating an image pickup apparatus. It is to be noted, however, that the distortion is not limited to distortion caused by a hand movement made by the user in operating an image pickup apparatus. It is needless to say that the distortion can be distortion caused by a biasing force generated typically by vibration working to generate a positional change of the taken image in the horizontal and/or vertical directions relative to the imager in a photographing operation.

In addition, in these embodiments, the lens-distortion-compensation data deriving/encoding unit 11 is provided in order to take replacement of lens and movements of the lens along the optical axis in a zoom operation into consideration. In the case of an image pickup apparatus with no lens replaced and with no optical zoom function, however, a vector for compensating an image for lens distortion is determined unambiguously. Thus, as a substitute for the lens-distortion-compensation data deriving/encoding unit 11, a storage unit used for storing data for lens-distortion compensation is provided. In this case, by supplying pixel coordinates to the storage unit used for storing data for lens-distortion compensation as arguments, a vertical-direction lens-distortion compensation quantity and a horizontal-direction lens-distortion compensation quantity can be read out from the storage unit.

In addition, in these embodiments, a CMOS imager is employed as an X-Y address solid-state image pickup device. It is needless to say, however, that the imager does not have to be a CMOS imager. As a matter of fact, the imager is by no means limited to an X-Y address solid-state image pickup device. For example, the imager can also be a CCD solid-state image pickup device.

In addition, the present application can be applied to any other apparatus such as a hand phone and a portable terminal, which are used as an apparatus for taking an image in a photographing operation as well as an image pickup apparatus (that is, a camera).

On top of that, in the embodiments, image processing is carried out on data of an picked up image. It is needless to say, however, image data processed by the present application is by no means limited to data of an picked up image.

In the case of the embodiments described above, the control units 541 to 544 and the arbitration unit 545, which are employed in the memory interface 54, are each implemented by hardware. It is to be noted, however, that these units can also be implemented by software.

In addition, in the embodiments described above, image data on a horizontal-direction pixel array is read out from a memory first and, after image data of one horizontal line has been read out from the memory, image data of the next horizontal line is read from the memory. Thus, horizontal-direction image processing is carried out first and the result of the horizontal-direction image processing is stored in the first image memory area 61. Then, the result of the horizontal-direction image processing is read out from the first image memory area 61 to be subjected to vertical-direction image processing. However, it is also possible to provide a configuration in which image data on a vertical-direction pixel array is read out from the memory first and, after image data of one vertical column has been read out from the memory, image data of the next vertical column is read from the memory. Thus, vertical-direction image processing is carried out first and the result of the vertical-direction image processing is stored in the first image memory area 61. Then, the result of the vertical-direction image processing is read out from the first image memory area 61 to be subjected to horizontal-direction image processing.

In addition, it should be understood by those skilled in the art that a variety of modifications, combinations, sub-combinations and alterations may occur in dependence on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is as follows:

1. An image-data processing apparatus comprising:
    an image memory configured to store image data;
    a plurality of processing sections each configured to output image data to be stored in said image memory, receive image data read out from said image memory and carry out image processing determined in advance on said received image data; and
    a memory control section configured to:
    (a) receive a write or read request from each of said processing sections and control a write access to store image data in said image memory in accordance with said write request and a read access to read out image data from said image memory in accordance with said read request,
    (b) execute every cycle of said write access to said image memory or every cycle of said read access to said image memory for each horizontal-direction multi-pixel line segment consisting of 1/N times the number of pixels included in one horizontal line where N is a positive integer at least equal to 2, and
    (c) take a plurality of said cycles as a processing time unit period during which said memory control section carries out access processing to make write and read accesses according to respectively said write and read requests made by said processing sections as accesses to said image memory by allocating each of said cycles in said processing time unit period to one of said processing sections and repeats said processing time unit period, and
    wherein said memory control section includes:
    (a) a determination section configured to produce a determination result as to whether or not said access processing specified on the basis of said write or read request made by any specific one of said processing sections in a particular processing time unit period can be completed in said cycles included in said particular processing time unit period as cycles allocated to said specific processing section, and
    (b) an access execution section configured to supply a wait request signal in said particular processing time unit period to said specific processing section to temporarily stop making further requests and continue said access processing uncompleted in said particular processing time unit period to cycles allocated to said specific processing section in one or a plurality of said processing time unit periods following said particular processing time unit period if said determination result produced by said determination section indicates that said access processing cannot be completed in said cycles included in said particular processing time unit period as cycles allocated to said specific processing section.

2. The image-data processing apparatus according to claim 1 wherein:
one of said processing sections is a vertical-direction processing section configured to issue a read request to said memory control section as a request to read out image data of observed pixels from said image memory by specifying said pixels and carry out vertical-direction image processing on said image data read out from said image memory in order to eliminate vertical-direction image distortion;
said determination section employed in said memory control section produces a result of determination as to whether or not image data required in said vertical-direction image processing as image data of all observed pixels specified by a request signal output by said vertical-direction processing section as a signal representing said read request as observed pixels included in said horizontal-direction multi-pixel line segment can be read out from said image memory for all said specified observed pixels in said cycles included in a particular processing time unit period as cycles allocated to said read request made by said vertical-direction processing section on the basis of said request signal; and
said access execution section employed in said memory control section supplies said wait request signal in said particular processing time unit period to said vertical-direction processing section to temporarily suspend an operation to output said request signal and continues said access processing uncompleted in said particular processing time unit period as access processing for remaining observed pixels of said horizontal-direction multi-pixel line segment to cycles allocated to said vertical-direction processing section in one or a plurality of said processing time unit periods following said particular processing time unit period if said determination result produced by said determination section indicates that all said image data required in said vertical-direction image processing cannot be read out from said image memory in said cycles included in said particular processing time unit period as cycles allocated to said vertical-direction processing section.

3. The image-data processing apparatus according to claim 1 wherein said horizontal-direction multi-pixel line segment in which every cycle of said write access to said image memory and every cycle of said read access to said image memory are made is a horizontal-direction eight-pixel line segment.

4. The image-data processing apparatus according to claim 2 wherein:
said vertical-direction image processing is a processing of vertical direction obtained as a result of dividing predetermined image processing to be carried out on image data into said vertical-direction image processing and a horizontal-direction image processing; and
image data obtained as a processing result of said horizontal-direction image processing is stored in said image memory as image data to be subjected to said vertical-direction image processing.

5. The image-data processing apparatus according to claim 1 wherein:
said image memory is physically divided into a plurality of banks;

an operation to store image data into said image memory is sequentially switched from one of said banks to another one for each data amount determined in advance; and
an operation to read out image data from said image memory is carried out by fetching image data of said data amount determined in advance from each of said banks at the same time.

6. The image-data processing apparatus according to claim 5 wherein:
said image data has one luminance component and two color-difference components;
sampling frequency ratios of said luminance component to said two color-difference components are 4:1:2; and
the number of said banks is a multiple of 4.

7. The image-data processing apparatus according to claim 5 or 6 wherein said data amount is equivalent to one horizontal line or a plurality of horizontal lines.

8. The image-data processing apparatus according to claim 2 wherein a plurality of said cycles in said processing time unit period are allocated to a read access according to a read request made by said vertical-direction processing section.

9. The image-data processing apparatus according to claim 2 wherein:
said access execution section employed in said memory control section supplies said wait request signal in said particular processing time unit period to said vertical-direction processing section to temporarily stop an operation to output said request signal and continues said access processing uncompleted in said particular processing time unit period to only cycles allocated to said vertical-direction processing section in one subsequent processing time unit period following said particular processing time unit period as cycles corresponding to said request signal if said determination result produced by said determination section indicates that all said image data required in said vertical-direction image processing cannot be read out from said image memory in said cycles included in said particular processing time unit period as cycles allocated to said vertical-direction processing section; and
if image data required for said observed pixels specified in said read request made by said vertical-direction processing section is beyond an image-data range readable in only said cycles allocated to said vertical-direction processing section in one subsequent processing time unit period following said particular processing time unit period as said cycles corresponding to said request signal, image data included in said image-data range as image data of pixels closed to said observed pixels is read out from said image memory.

10. The image-data processing apparatus according to claim 4 wherein:
said image data is picked-up image data output from an imager; and
predetermined image processing to be carried out on said image data is lens-distortion compensation processing to compensate said image data for image distortion caused by a lens used in an operation to take an image represented by said image data.

11. An image-data processing method adopted in an image-data processing apparatus including an image memory, a plurality of processing sections, and a memory control section, the image-data processing method comprising:
storing image data in the image memory;
outputting, by each of the plurality of processing sections, image data to be stored in said image memory;

receiving, by each of the plurality of processing sections, image data read out from said image memory and carrying out image processing determined in advance on said received image data, receiving, by the memory control section, a write or read request from each of said processing sections and controlling a write access to store image data in said image memory in accordance with said write request and a read access to read out image data from said image memory in accordance with said read request, executing, by the memory control section, every cycle of said write access to said image memory or every cycle of said read access to said image memory for each horizontal-direction multi-pixel line segment consisting of 1/N times the number of pixels included in one horizontal line where N is a positive integer at least equal to 2, and taking, by the memory control section, a plurality of said cycles as a processing time unit period during which said memory control section carries out access processing to make write and read accesses according to respectively said write and read requests made by said processing sections as accesses to said image memory by allocating each of said cycles in said processing time unit period to one of said processing sections and repeats said processing time unit period; and producing, by the memory control section, a determination result as to whether or not said access processing specified on the basis of said write or read request made by any specific one of said processing sections in a particular processing time unit period can be completed in said cycles included in said particular processing time unit period as cycles allocated to said specific processing section, and supplying, by the memory control section, a wait request signal in said particular processing time unit period to said specific processing section to temporarily stop making further requests and continue said access processing uncompleted in said particular processing time unit period to cycles allocated to said specific processing section in one or a plurality of said processing time unit periods following said particular processing time unit period if said determination result indicates that said access processing cannot be completed in said cycles included in said particular processing time unit period as cycles allocated to said specific processing section.

12. An image-data processing apparatus comprising:

a first image memory area configured to store first image data, which is image data of an image including vertical-direction image distortion;

a vertical-direction processing section configured to carry out vertical-direction image processing on said first image data read out from said first image memory area in order to eliminate said vertical-direction image distortion from said image;

a second image memory area configured to store second image data, which is image data of said image with said vertical-direction image distortion already eliminated by said vertical-direction processing line segment; and a memory control section provided between said first and second image memory areas and said vertical-direction processing section and configured to control operations to store said first image data into said first image memory area, read out said first image data from said first image memory area, store said second image data into said second image memory area and read out said second image data from said second image memory area, wherein said memory control section is further configured to:

(a) make at least a first read access to said first image memory area by receiving a request signal from said vertical-direction processing section, reading out said first image data required for said vertical-direction image processing as said first image data of observed pixels specified by said request signal from said first image memory area and supplying said first image data read out from said first image memory area to said vertical-direction processing section, and a second write access to said second image memory area in order to store said second image data received from said vertical-direction image processing section in said second image memory area, (b) execute every cycle of said second write access to said second image memory area or every cycle of said first read access to said first image memory area for each horizontal-direction multi-pixel line segment consisting of 1/N times the number of pixels included in one horizontal line where N is a positive integer at least equal to 2, and (c) take a plurality of said cycles as a processing time unit period during which said memory control section carries out access processing to make said second write and first read accesses to said image memory by allocating some of said cycles in said processing time unit period to said vertical-direction processing section and repeats said processing time unit period, and said memory control section includes:

(a) a determination section configured to produce a result of determination as to whether or not said first image data required in said vertical-direction image processing as image data of all observed pixels specified by a request signal output by said vertical-direction processing section as a signal representing said read request as observed pixels included in a horizontal-direction multi-pixel line segment can be read out from said first image memory area in said cycles allocated to said vertical-direction processing section in a particular processing time unit period as cycles for said first read access on the basis of said request signal, and (b) an access execution section configured to supply a wait request signal in said particular processing time unit period to said vertical-direction processing section to temporarily stop making further requests and continue said read access uncompleted in said particular processing time unit period as a read access to read out said first image data of remaining observed cycles of said multi-pixel line segment to cycles allocated to said vertical-direction processing section in one or a plurality of said processing time unit periods following said particular processing time unit period if said determination produced by said determination section indicates that all said image data required in said vertical-direction image processing cannot be read out from said image memory in said cycles included in said particular processing time unit period as cycles allocated to said vertical-direction processing section.

* * * * *